(12) United States Patent
Taniguchi et al.

(10) Patent No.: US 10,208,250 B2
(45) Date of Patent: Feb. 19, 2019

(54) LIQUID CRYSTAL COMPOSITION AND LIQUID CRYSTAL DISPLAY ELEMENT USING SAME

(71) Applicant: DIC CORPORATION, Tokyo (JP)

(72) Inventors: Shirou Taniguchi, Kita-adachi-gun (JP); Joji Kawamura, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/105,914

(22) PCT Filed: Dec. 17, 2014

(86) PCT No.: PCT/JP2014/083443
§ 371 (c)(1),
(2) Date: Jun. 17, 2016

(87) PCT Pub. No.: WO2015/098659
PCT Pub. Date: Jul. 2, 2015

(65) Prior Publication Data
US 2017/0029700 A1 Feb. 2, 2017

(30) Foreign Application Priority Data
Dec. 25, 2013 (JP) .................................. 2013-266995

(51) Int. Cl.
*C09K 19/42* (2006.01)
*C09K 19/34* (2006.01)
(Continued)

(52) U.S. Cl.
CPC ...... *C09K 19/3402* (2013.01); *C09K 19/0216* (2013.01); *C09K 19/44* (2013.01);
(Continued)

(58) Field of Classification Search
CPC ...................................................... C09K 19/42
See application file for complete search history.

(56) References Cited

U.S. PATENT DOCUMENTS

| 2011/0001089 A1* | 1/2011 | Wittek ............... C09K 19/3402 |
| | | 252/299.61 |
| 2011/0301360 A1 | 12/2011 | Lietzau et al. |

(Continued)

FOREIGN PATENT DOCUMENTS

| JP | 2011-052120 A | 3/2011 |
| JP | 2011-514410 A | 5/2011 |

(Continued)

OTHER PUBLICATIONS

International Search Report dated Mar. 17, 2015, issued in counterpart International Application No. PCT/JP2014/083443 (2 pages).

*Primary Examiner* — Chanceity N Robinson
(74) *Attorney, Agent, or Firm* — Westerman, Hattori, Daniels & Adrian, LLP

(57) ABSTRACT

Provided are a liquid crystal composition including at least one or more compounds represented by General Formula (i) and at least one or more compounds represented by General Formula (M-1), in which the dielectric constant anisotropy at 25° C. is larger than 0 and 5 or less; and a liquid crystal display element using this composition. The liquid crystal composition has a positive $\Delta\varepsilon$, can have the electrical capacity of the liquid crystal layer ($C_{LC}$) reduced to a low level, can be driven at a voltage that is practically sufficiently low, and satisfies at least any one of the requirements of maintaining a liquid crystal phase over a wider temperature range, low viscosity, satisfactory solubility at low temperature, high specific resistance or voltage retention rate, and stability to heat or light; and provide an excellent liquid crystal display element.

7 Claims, 6 Drawing Sheets

(51) Int. Cl.
  *C09K 19/44* (2006.01)
  *C09K 19/02* (2006.01)
  *G02F 1/00* (2006.01)
  *G02F 1/1343* (2006.01)
  *G02F 1/137* (2006.01)
  *C09K 19/04* (2006.01)
  *C09K 19/12* (2006.01)
  *G02F 1/1335* (2006.01)
  *G02F 1/1337* (2006.01)
  *G02F 1/1339* (2006.01)
  *G02F 1/1341* (2006.01)
  *G02F 1/1362* (2006.01)

(52) U.S. Cl.
  CPC .... *G02F 1/0045* (2013.01); *C09K 2019/0466* (2013.01); *C09K 2019/123* (2013.01); *C09K 2019/3422* (2013.01); *G02F 1/1339* (2013.01); *G02F 1/1341* (2013.01); *G02F 1/1362* (2013.01); *G02F 1/13439* (2013.01); *G02F 1/133516* (2013.01); *G02F 1/133788* (2013.01); *G02F 1/134363* (2013.01); *G02F 2001/13706* (2013.01); *G02F 2001/133746* (2013.01); *G02F 2001/134372* (2013.01)

(56) References Cited

U.S. PATENT DOCUMENTS

| | | |
|---|---|---|
| 2012/0001123 A1* | 1/2012 | Jansen ................. C07D 333/12 |
| | | 252/299.61 |
| 2012/0256124 A1 | 10/2012 | Ohgiri et al. |
| 2012/0273723 A1 | 11/2012 | Wittek et al. |
| 2012/0314146 A1 | 12/2012 | Wittek et al. |
| 2013/0327984 A1 | 12/2013 | Inittek et al. |
| 2014/0061534 A1* | 3/2014 | Goebel ............. C09K 19/3003 |
| | | 252/299.61 |
| 2014/0070141 A1 | 3/2014 | Lietzau et al. |

FOREIGN PATENT DOCUMENTS

| | | |
|---|---|---|
| JP | 2012-518017 A | 8/2012 |
| JP | 2012-219270 A | 11/2012 |
| JP | 2013-519741 A | 5/2013 |
| JP | 2013-112621 A | 6/2013 |
| JP | 2014-047354 A | 3/2014 |
| WO | 2011/076329 A1 | 6/2011 |
| WO | 2014/155480 A1 | 10/2014 |

* cited by examiner

LIQUID CRYSTAL COMPOSITION AND LIQUID CRYSTAL DISPLAY ELEMENT USING SAME

TECHNICAL FIELD

The present invention relates to a nematic liquid crystal composition that is useful as a liquid crystal display material, in which the dielectric constant anisotropy (Δε) has a positive value, and a liquid crystal display element using this liquid crystal composition.

BACKGROUND ART

Liquid crystal display elements are used in various measuring instruments, including timepieces and calculators, automotive instrument panels, word processors, electronic organizers, printers, computers, televisions, timepieces, advertising signboards, and the like. Representative examples of liquid crystal display systems include TN (twisted nematic) type, STN (super-twisted nematic) type, vertical alignment type using TFT (thin film transistors), IPS (in-plane switching) type, and FFS (fringe field switching) type display systems. The liquid crystal compositions used in these liquid crystal display elements are required to be stable against external stimuli such as moisture, air, heat, and light; exhibit a liquid crystal phase over a temperature range that is as wide as possible while centered on room temperature; have low viscosity; and have a low driving voltage. Furthermore, liquid crystal compositions are composed of from several to several dozens of compounds, in order to have optimal values for the dielectric constant anisotropy (Δε), the refractive index anisotropy (Δn), and the like in individual display elements. Furthermore, there is a demand for a liquid crystal composition which exhibits low-voltage driving, rapid response, and a wide operating temperature range in all driving systems including horizontal alignment type displays such as TN-type, STN-type, IPS-type and FFS-type displays, as well as vertical alignment (VA) type displays. Furthermore, in order to set the value of Δn×d, which is the product of Δn and the cell gap (d), to a predetermined value, it is necessary to regulate the Δn of the liquid crystal composition to an appropriate range in accordance with the cell gap. In addition, in a case in which a liquid crystal display element is applied to a television or the like, since rapid responsiveness is regarded as important, a liquid crystal composition having low rotational viscosity (γ1) is needed.

Regarding the configuration of a p-type liquid crystal composition intended for such rapid responsiveness, for example, a liquid crystal composition that uses a compound represented by Formula (A-1) or (A-2), which is a liquid crystal compound having a positive Δε, and a liquid crystal compound (B) having neutral Δ in combination, has been disclosed. Regarding the features of these liquid crystal compositions, it is widely known in the field of liquid crystal compositions that a liquid crystal compound having a positive Δε has a —CF$_2$O— structure, or that a liquid crystal compound having a neutral Δε has an alkenyl group (Patent Literature 1).

[Chemical Formula 1]

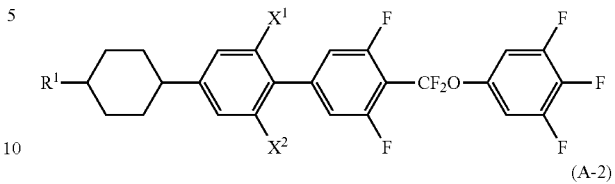

(A-1)

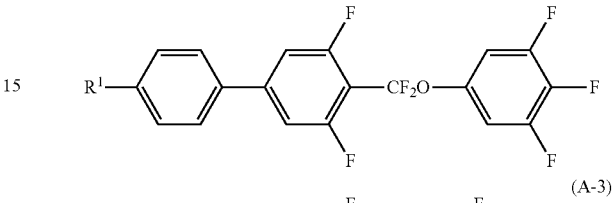

(A-2)

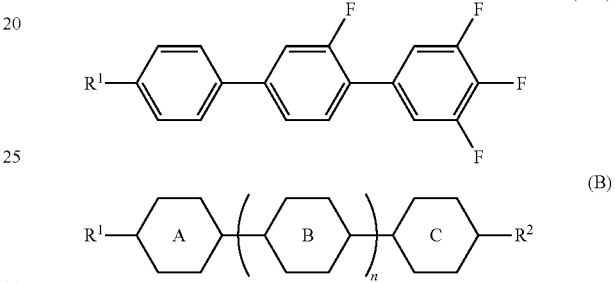

(A-3)

(B)

On the other hand, as the tendency to reduce CO$_2$ discharged by the consumption of fossil fuels, which causes global warming, rushes in even to the field of liquid crystal displays for televisions and vehicle applications, the demand for a liquid crystal display element of a low power consumption model is increasing especially high in recent years. Furthermore, due to the popularization of portable tablet computers, which are represented by smartphones, the demand for a liquid crystal panel of a low power consumption model is ever more increasing.

As a technology developed as a result of paying attention to such low voltage driving and rapid responsiveness, for example, a liquid crystal composition including a —CH$_2$CHFCF$_2$O— linking group-containing compound is disclosed in Patent Literature 2.

CITATION LIST

Patent Literature

Patent Literature 1: JP 2011-052120 A
Patent Literature 2: JP 2013-112621 A

SUMMARY OF INVENTION

Technical Problem

In Patent Literature 1 described above, attention was paid to the fact that high dielectric constant anisotropy in a composition contributes to a low threshold voltage, low power consumption, and a high contrast ratio for an element, and thus a composition exhibiting high dielectric constant anisotropy is provided. In the Examples of the relevant Patent Literature 1, a maximum Δε value of 12.6 or the like is disclosed. Furthermore, in Patent Literature 2, since there is a problem that a —CF$_2$O— linking group-containing compound and a —CH$_2$CH$_2$CF$_2$O— linking group-containing compound may have the moiety —CF$_2$O— decomposed depending on the structure, or the production process may be complicated, a liquid crystal compound which has excellent rapid responsiveness in a wide temperature range and has properties enabling low voltage driving, is provided using a liquid crystal composition including a —CH$_2$CHFCF$_2$O— linking group-containing compound.

However, in a case in which the liquid crystal composition itself in a liquid crystal layer has a high dielectric constant, the electrical capacity ($C_{TOTAL}$) of the panel driving part, which is determined as the sum of the electrical capacity of the liquid crystal layer ($C_{LC}$) and the electrical capacity on the TFT substrate side ($C_{ST}$), becomes large. Therefore, during voltage input scanning for a TFT, the time for charging a condenser corresponding to the $C_{TOTAL}$ occurs to an extent that is non-negligible, and this causes distortion or delay of the voltage waveform, and consequently causes phenomena such as flickering and deterioration of the response speed in connection with displays. Therefore, in a case in which the dielectric constant of the liquid crystal composition itself is high, it is necessary to reduce the electrical capacity on the TFT substrate side ($C_{ST}$) to a low level to some extent, and consequently, the structure of the ITO electrode or the TFT, and even the material or thickness of the insulating layer in the FFS mode, are under significant restrictions. Furthermore, a liquid crystal composition having a high dielectric constant is generally highly viscous and disadvantageous from the viewpoint of the response speed. Therefore, as a means for enhancing the display quality and for achieving rapid response, a method of decreasing the capacitance of the liquid crystal layer, that is, using a liquid crystal composition having a Δε that is positive and very small, has been considered. However, since a liquid crystal composition having a small Δε includes dielectrically neutral components for the most of the composition, it has been confirmed that there is also a problem that compatibility is low, and practical low-temperature storability cannot be secured. Also, in order to secure compatibility, it is necessary to add a certain amount of a compound that is disadvantageous in view of viscosity, and this adversely affects the response speed. That is, there has been a demand for a liquid crystal composition which has a positive and small Δε, has high compatibility, and has low viscosity.

Thus, in regard to the liquid crystal composition related to the present invention and a liquid crystal display element using the liquid crystal composition, it is an object to provide a liquid crystal composition which has a positive Δε, can have the electrical capacity of the liquid crystal layer ($C_{LC}$) reduced to a low level, can be driven at a voltage that is practically sufficiently low, and satisfies at least any one of the requirements of maintaining a liquid crystal phase over a wider temperature range, low viscosity, satisfactory solubility at low temperature, high specific resistance or voltage retention rate, and stability to heat or light. It is another object to provide a liquid crystal display element in which display defects attributable to image burn-in and dropping marks are suppressed, and excellent display quality is exhibited, with high product yield by using this liquid crystal composition, and to provide a liquid crystal display element which uses this liquid crystal composition.

Solution to Problem

In order to solve the above problem, the present invention provides a liquid crystal composition including:

at least one or more compounds represented by General Formula (i):

[Chemical Formula 2]

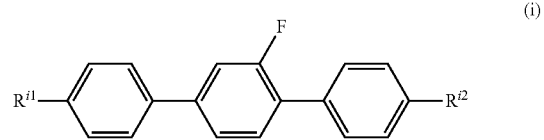

(i)

(wherein in General Formula (i), R$^{i1}$ and R$^{i2}$ each independently represent an alkyl group having 1 to 10 carbon atoms, an alkenyl group having 2 to 1.0 carbon atoms, or an alkoxy group having 1 to 10 carbon atoms; and at least any one of R$^{i1}$ or R$^{i2}$ is an alkenyl group), and at least one or more compounds represented by General Formula (M-1):

[Chemical Formula 3]

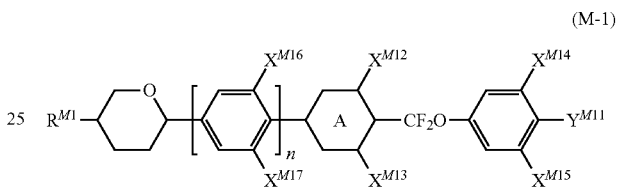

(M-1)

(wherein in General Formula (M-1), X$^{M12}$, X$^{M13}$, X$^{M14}$, X$^{M15}$, X$^{M16}$, and X$^{M17}$ each independently represent a hydrogen atom or a fluorine atom;

rings A each independently represent a group selected from the group consisting of:

(a) a 1,4-cyclohexylene group (one —CH$_2$— moiety or at least two non-adjacent —CH$_2$— moieties present in this group may be substituted by —O—), and (b) a 1,4-phenylene group (one —CH= moiety or at least two non-adjacent —CH= moieties present in this group may be substituted by —N=), while the group (a) and the group (b) may be each independently substituted with a cyano group, a fluorine atom, or a chlorine atom;

R$^{M1}$ represents an alkyl group having 1 to 10 carbon atoms, an alkenyl group having 2 to 10 carbon atoms, or an alkoxy group having 1 to 10 carbon atoms;

Y$^{M11}$ represents an alkyl group having 1 to 10 carbon atoms, an alkenyl group having 2 to 10 carbon atoms, an alkoxy group having 1 to 10 carbon atoms, a hydrogen atom, a fluorine atom, a cyano group, —CF$_3$, or —OCF$_3$; and n represents an integer from 0 to 2), wherein the dielectric constant anisotropy at 25° C. is larger than 0 and 5 or less.

Advantageous Effects of Invention

According to the present invention, a liquid crystal composition which has low viscosity and high compatibility, undergoes deterioration caused by heat or light to a reduced extent, and has relatively low dielectric constant anisotropy; and a liquid crystal display element using the liquid crystal composition can be provided.

The liquid crystal composition related to the present invention is useful for liquid crystal displays in which the driving voltage can be set to a relatively high value (for example, TV's and car navigation systems).

DESCRIPTION OF EMBODIMENTS

Figure 1:
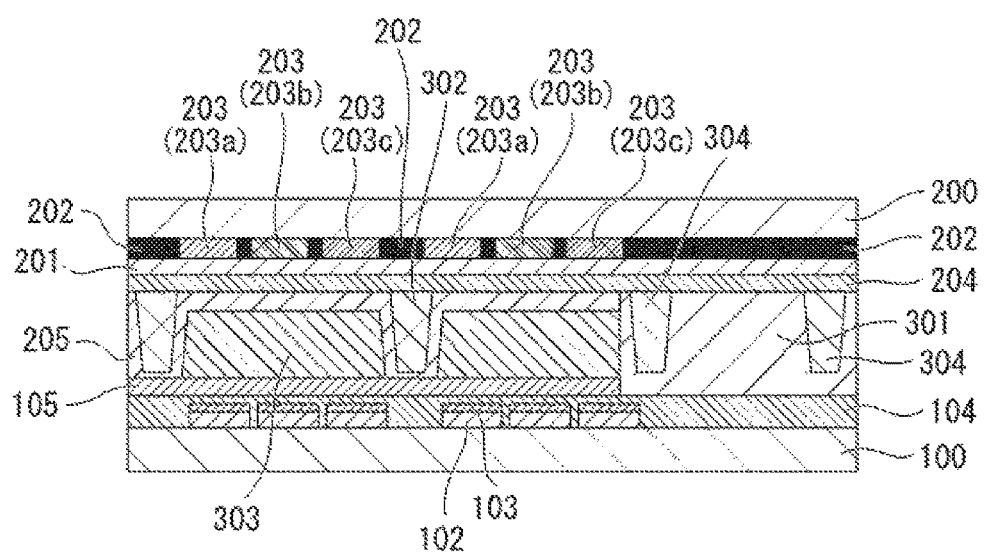
FIG. 1 is a diagram schematically illustrating the configuration of the liquid crystal display element according to an embodiment of the present invention.

Hereinafter, preferred embodiments of the present invention will be described; however, the present invention is not intended to be limited to these embodiments. The configuration can be subjected to addition, deletion, substitution, and other modifications to the extent that the gist of the present invention is maintained.

A first aspect of the present invention is a liquid crystal composition including:

at least one or more compounds represented by General Formula (i):

[Chemical Formula 4]

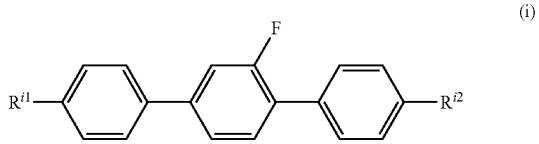

(i)

(wherein in General Formula (i), $R^{i1}$ and $R^{i2}$ each independently represent an alkyl group having 1 to 10 carbon atoms, an alkenyl group having 2 to 10 carbon atoms, or an alkoxy group having 1 to 10 carbon atoms; and at least any one of $R^{i1}$ or $R^{i2}$ is an alkenyl group), and at least one or more compounds represented by General Formula (M-1):

[Chemical Formula 5]

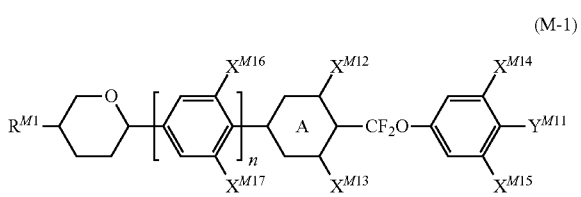

(M-1)

(wherein in General Formula (M-1), $X^{12}$, $X^{M13}$, $X^{M14}$, $X^{M15}$, $X^{M16}$, and $X^{M17}$ each independently represent a hydrogen atom or a fluorine atom;

rings A each independently represent a group selected from the group consisting of:

(a) a 1,4-cyclohexylene group (one —$CH_2$— moiety or at least two non-adjacent —$CH_2$— moieties present in this group may be substituted by —O—), and (b) a 1,4-phenylene group (one —CH= moiety or at least two non-adjacent —CH= moieties present in this group may be substituted by —N=), while the group (a) and the group (b) may be each independently substituted with a cyano group, a fluorine atom, or a chlorine atom;

$R^{M1}$ represents an alkyl group having 1 to 10 carbon atoms, an alkenyl group having 2 to 10 carbon atoms, or an alkoxy group having 1 to 10 carbon atoms;

$Y^{M11}$ represents an alkyl group having 1 to 10 carbon atoms, an alkenyl group having 2 to 10 carbon atoms, an alkoxy group having 1 to 10 carbon atoms, a hydrogen atom, a fluorine atom, a cyano group, —$CF_3$, or —$OCF_3$; and n represents an integer from 0 to 2), wherein the dielectric constant anisotropy at 25° C. is larger than 0 and 5 or less.

Thereby, since the liquid crystal composition has relatively low dielectric constant anisotropy, the $C_{LC}$ can be reduced to a low level, and effects selected from low viscosity, high compatibility (solubility), or deterioration caused by heat or light, are provided. Particularly, since the compatibility between the compound represented by General Formula (i) and the compound represented by General Formula (M-1) is excellent, a liquid crystal composition in which a large amount of a non-polar compound having low viscosity is mixed with a pyran-based compound having a high dielectric constant, can be provided.

Particularly, since the compound represented by General Formula (i) has a very large refractive index anisotropy ($\Delta n$=about 0.25), and the compound represented by General Formula (M-1) also has a refractive index anisotropy that is approximately equal to or larger than the general refractive index anisotropy required from a liquid crystal composition ($\Delta n$=about 0.1), a compound with a low $\Delta n$, which is generally advantageous in view of viscosity and solubility, can be used in a relatively large amount as another component that is dielectrically neutral, and a liquid crystal composition having excellent solubility and decreased viscosity can be provided. Furthermore, since the compound represented by General Formula (i) and the compound represented by General Formula (M-1) have a relatively high upper limit range of nematic temperature of 100° C. or higher, in a case in which a biphenyl-based liquid crystal compound which generally has a low upper limit range of nematic temperature and is dielectrically neutral, is used in combination, a liquid crystal composition which has a nematic temperature range suitable for liquid crystal display elements and has a high refractive index anisotropy suitable for a thin cell gap can be provided.

The liquid crystal composition related to the present invention is preferably a p-type liquid crystal composition, and the dielectric anisotropy of the relevant liquid crystal composition is preferably 5 or less, more preferably 4.5 or less, even more preferably 4 or less, still more preferably 3.5 or less, and particularly preferably 3 or less.

When the dielectric anisotropy is 5 or less, since the liquid crystal composition has a relatively low dielectric constant anisotropy, the electrical capacity ($C_{LC}$) of the liquid crystal layer can be reduced to a low level, and this is effective for the suppression of phenomena such as flickering and deterioration of the response speed, which are attributable to distortion or delay of the voltage waveform during voltage input scanning for a TFT.

The liquid crystal composition related to the present invention essentially includes one or more kinds of the compound represented by General Formula (i), and although there are no particular limitations on the kind of the compound that can be used in combination, compounds are combined according to the required performance such as solubility at low temperature, transition temperature, electrical reliability, and birefringence.

The content of the compound represented by General Formula (i) related to the present invention needs to be appropriately adjusted according to the required performance such as solubility at low temperature, transition temperature, electrical reliability, birefringence, process suitability, dropping marks, image burn-in, and dielectric constant anisotropy. For example, the content (total) of the compound represented by General Formula (i) relative to the total mass of the liquid crystal composition of the present invention is preferably 1% to 35% by mass. Regarding more preferable contents, contents of 1% to 32% by mass, 2% to 31% by mass, 3% to 30% by mass, 4% to 28% by mass, 5% to 26% by mass, and 6% to 25% by mass, are preferable in this order.

In regard to the compound represented by General Formula (i) related to the present invention, examples of the alkenyl group having 2 to 10 carbon atoms include a vinyl group, an allyl group, a 1-propenyl group, an isopropenyl group, a 2-butenyl group, a 3-butenyl group, a 1,3-butadienyl group, a 2-pentenyl group, a 3-pentenyl group, and a 2-hexenyl group. A linear form or a branched form is preferred, and a linear form is more preferred.

Examples of the "alkyl group having 1 to 10 carbon atoms" related to the present invention include a methyl group, an ethyl group, a propyl group, a butyl group, an isopropyl group, an isobutyl group, a t-butyl group, a 3-pentyl group, an isopentyl group, a neopentyl group, a pentyl group, a hexyl group, a heptyl group, an octyl group, a nonyl group, a decyl group, a dodecyl group, and a pentadecyl group. Meanwhile, according to the present specification, the examples of the alkyl group are common, and the alkyl group is appropriately selected from the examples described above according to the number of carbon atoms of the respective alkyl groups. Furthermore, according to the present specification, the examples of the alkenyl group are common, and the alkenyl group having 1 to 10 carbon atoms related to the present invention is preferably a linear form or a branched form, while a linear form is more preferred. Furthermore, more preferred examples of the alkenyl group related to the present invention include groups represented by Formula (xi) (vinyl group), Formula (xii) (1-propenyl group), Formula (xiii) (3-butenyl group), and Formula (xiv) (3-pentenyl group) described below:

[Chemical Formula 6]

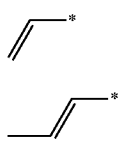

(xi)

(xii)

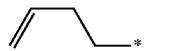

(xiii)

(xiv)

(wherein in Formulae (i) to (iv), the symbol * represents a site of bonding to a cyclic structure).

Examples of the "alkyl group having 1 to 10 carbon atoms" related to the present invention include a methyl group, an ethyl group, a propyl group, a butyl group, an isopropyl group, an isobutyl group, a t-butyl group, a 3-pentyl group, an isopentyl group, a neopentyl group, a pentyl group, a hexyl group, a heptyl group, an octyl group, a nonyl group, and a decyl group. Meanwhile, according to the present specification, examples of the alkyl group are common, and the alkyl group is appropriately selected from the examples described above according to the number of carbon atoms of the respective alkyl groups. Furthermore, the alkyl group having 1 to 10 carbon atoms related to the present invention is preferably a linear form or a branched form, and more preferably a linear form.

Furthermore, the compound represented by General Formula (i) is preferably, for example, any one of compounds represented by Formula (i.1) to Formula (i.20), and among them, compounds represented by Formulae (i.1), (i.2), (i.5), (i.6), (i.11), and (i.12) are preferred.

[Chemical Formula 7]

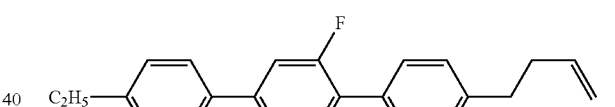

(i.1)

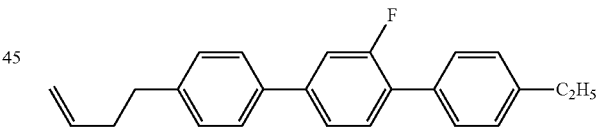

(i.2)

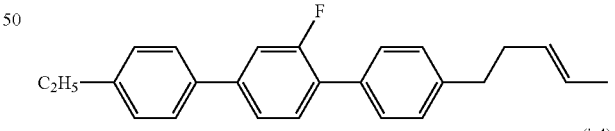

(i.3)

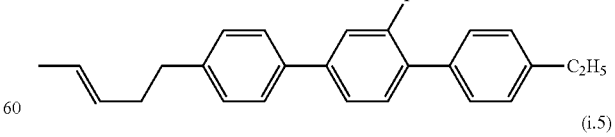

(i.4)

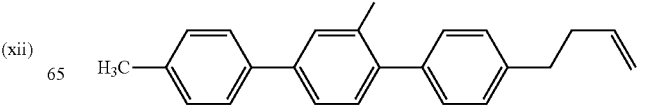

(i.5)

-continued (i.6)
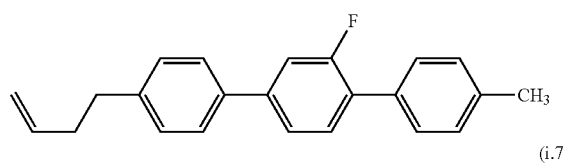

(i.7)
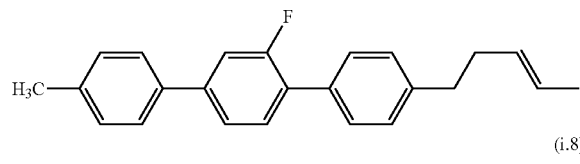

(i.8)
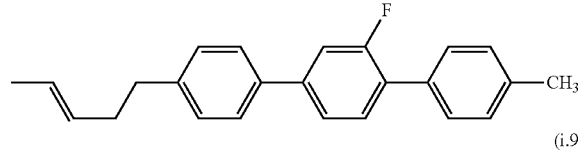

(i.9)
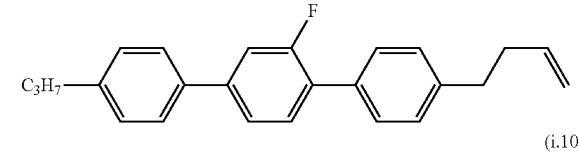

(i.10)
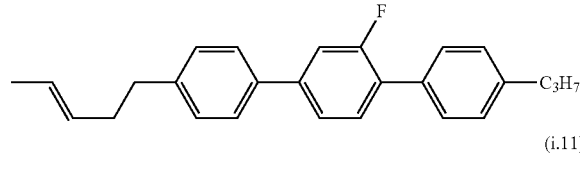

(i.11)
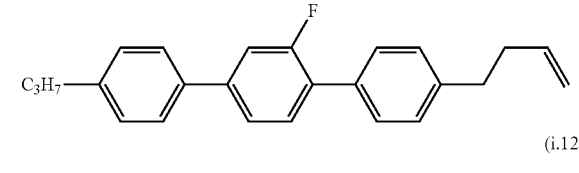

[Chemical Formula 8]

(i.12)
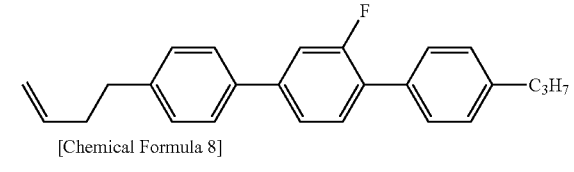

(i.13)
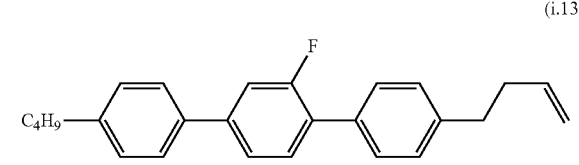

(i.14)
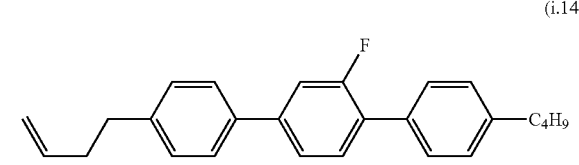

(i.15)
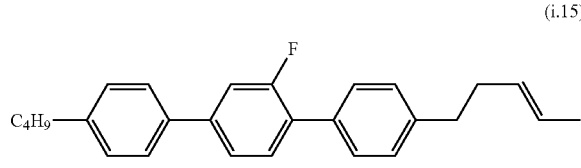

-continued (i.16)
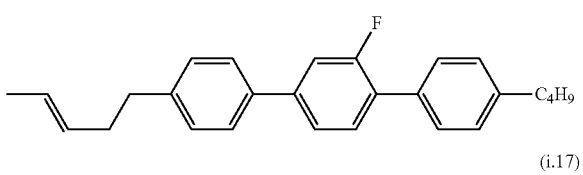

(i.17)
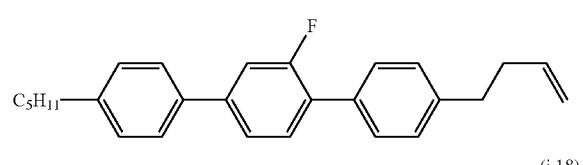

(i.18)
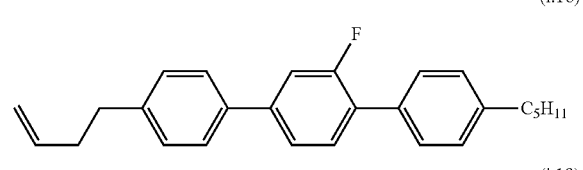

(i.19)
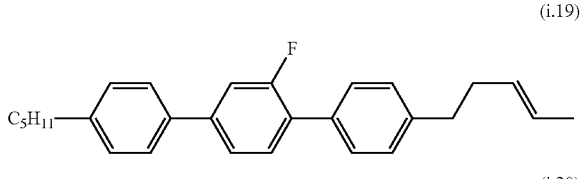

(i.20)
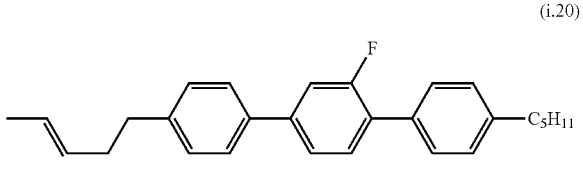

The compound represented by General Formula (i) that is included in the liquid crystal composition related to the present invention is, for example, of one kind according to an embodiment of the present invention. Alternatively, one or two kinds of compounds are included according to another embodiment of the present invention. Also, 1 to 3 kinds of compounds are included according to another embodiment of the present invention. Furthermore, 1 to 5 kinds of compounds are included according to another embodiment of the present invention. Furthermore, 2 to 5 kinds of compounds are included according to another embodiment of the present invention. Furthermore, 2 to 4 kinds of compounds are included according to another embodiment of the present invention. Moreover, 2 or 3 kinds of compounds are included according to another embodiment of the present invention.

When the compound selected as a component of the liquid crystal composition has a wide molecular weight distribution, this is also effective for solubility. Therefore, it is particularly preferable to select one kind from the compounds represented by Formulae (i.1) and (i.2), one kind from the compounds represented by Formulae (i.5) and (i.6), and one kind from the compounds represented by Formulae (i.11) and (i.12), respectively, and appropriately combining these selected compounds.

The compound represented by General Formula (M-1) related to the present invention is preferably at least one selected from the group consisting of compounds represented by the following General Formulae (M-2) and (M-3).

[Chemical Formula 9]

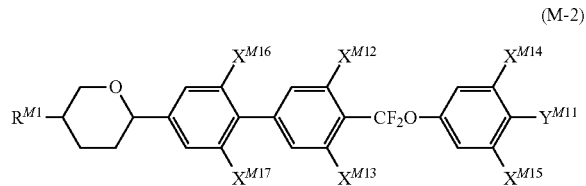

(M-2)

[Chemical Formula 10]

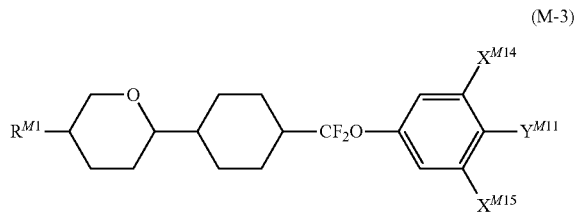

(M-3)

(wherein in General Formulae (M-2) and (M-3), RM1, $X^{M12}$, $X^{M13}$, $X^{M14}$, $X^{M15}$, $X^{M16}$, $X^{M17}$, and $Y^{M11}$ are the same as those in General Formula (M-1) described above).

In regard to General Formula (M-2), it is preferable that $X^{M12}$ and $X^{M13}$ represent fluorine atoms. Furthermore, it is preferable that $X^{M12}$, $X^{M13}$, $X^{M14}$, and $X^{M15}$ represent fluorine atoms.

In regard to the liquid crystal composition related to the present invention, there are no particular limitations on the compound that can be used in combination with General Formula (M-2); however, in view of solubility at low temperature, transition temperature, electrical reliability, birefringence, and the like, for example, 1 to 5 kinds of compounds are used in combination according to an embodiment of the present invention. Alternatively, 1 to 4 kinds of compounds are used in combination according to another embodiment of the present invention. Furthermore, 1 to 3 kinds of compounds are used in combination according to another embodiment of the present invention. Furthermore, 1 or 2 kinds of compounds are used in combination according to another embodiment of the present invention. Furthermore, 2 to 5 kinds of compounds are used in combination according to another embodiment of the present invention. 2 to 4 kinds of compounds are used in combination according to another embodiment of the present invention. Furthermore, 2 or 3 kinds of compounds are used in combination according to another embodiment of the present invention.

In regard to the liquid crystal composition related to the present invention, it has been confirmed that when compounds represented by General Formula (i) and General Formula (M-2) are present, the compounds exhibit high transition points, large $\Delta\varepsilon$ dielectric constants, and viscosity that is lower for a tetracyclic compound. Furthermore, it has been confirmed that the compound exhibits particularly satisfactory compatibility with compounds represented by General Formula (i), General Formula (M-1), General Formula (M-2), and General Formula (M-3).

In regard to the liquid crystal composition related to the present invention, the content of the compound represented by General Formula (M-2) has an upper limit and a lower limit for each embodiment, in view of characteristics such as solubility at low temperature, transition temperature, electrical reliability, and birefringence. The lower limit of the content is, for example, 1% relative to the total amount of the liquid crystal composition of the present invention according to an embodiment of the present invent ion, 3% according to another embodiment, 4% according to another embodiment, 5% according to another embodiment, 6% according to still another embodiment, 7% according to still another embodiment, and 8% according to still another embodiment. Furthermore, the lower limit of the content is 9% according to another embodiment.

Furthermore, in regard to the liquid crystal composition related to the present invention, the upper limit of the content of the compound represented by General Formula (M-2) is, for example, 30% according to an embodiment of the present invent ion, 28% according to another embodiment, 27% according to another embodiment, 26% according to still another embodiment, 7% according to still another embodiment, and 25% according to still another embodiment.

In regard to General Formula (M-3), it is preferable that $X^{M14}$ and $X^{M15}$ are fluorine atoms.

In regard to General Formula (M-3), there are no particular limitations on the compound that can be used in combination; however, in view of solubility at low temperature, transition temperature, electrical reliability, birefringence and the like, for example, 1 to 5 kinds of compounds can be used in combination according to an embodiment of the present invention. Alternatively, 1 to 4 kinds of compounds can be used in combination according to another embodiment of the present invention. Furthermore, 1 to 3 kinds of compounds can be used in combination according to another embodiment of the present invention. Furthermore, 1 or 2 kinds of compounds can be used in combination according to another embodiment of the present invention. Furthermore, 2 to 5 kinds of compounds can be used in combination according to another embodiment of the present invention. Furthermore, 2 to 4 kinds of compounds can be used in combination according to another embodiment of the present invention. Moreover, 2 or 3 kinds of compounds can be used in combination according to another embodiment of the present invention.

In regard to the liquid crystal composition related to the present invent ion, it has been confirmed that when compounds represented by General Formula (i) and General Formula (M-3) are present, the compounds exhibit high transition points, large $\Delta\varepsilon$ dielectric constants, and viscosity that is lower for a tricyclic compound. Furthermore, it has been confirmed that the compounds exhibit particularly satisfactory compatibility with compounds represented by General Formula (i), General. Formula (M-1), General Formula (M-2), and General Formula (M-3).

The content of the compound represented by General Formula (M-3) has an upper limit and a lower limit for each embodiment, in view of characteristics such as solubility at low temperature, transition temperature, electrical reliability, and birefringence. The lower limit of the content is, for example, 1% relative to the total amount of the liquid crystal composition of the present invention according to an embodiment of the present invention, 2% according to another embodiment, 3% according to another embodiment, 4% according to still another embodiment, 5% according to still another embodiment, 6% according to still another embodiment, and 8% according to still another embodiment. Furthermore, the lower limit of the content is 10% according to another embodiment.

The upper limit of the content is, for example, 30% according to an embodiment of the present invention, 20% according to another embodiment, 13% according to still another embodiment, 10% according to still another embodiment, 7% according to still another embodiment, and 3% according to still another embodiment.

Regarding preferable examples of the compound represented by General Formula (M-2) related to the present invention, at least one selected from the group consisting of the following Formulae (m.1) to (m.20) is preferred.

[Chemical Formula 11]

(m.1)

(m.2)

(m.3)

(m.4)

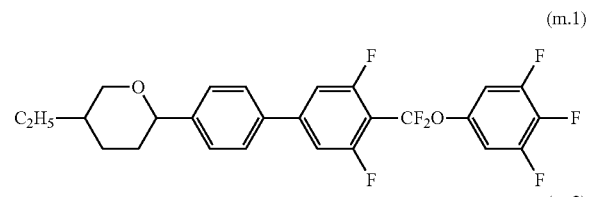

(m.5)

(m.6)

(m.7)

(m.8)

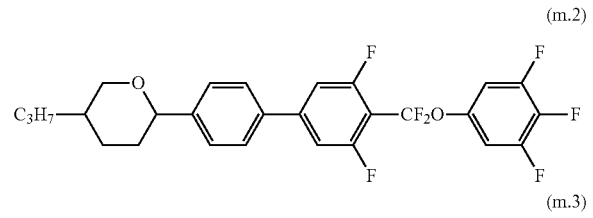
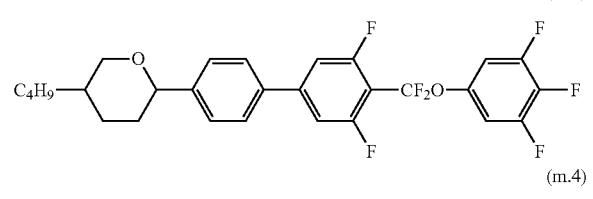
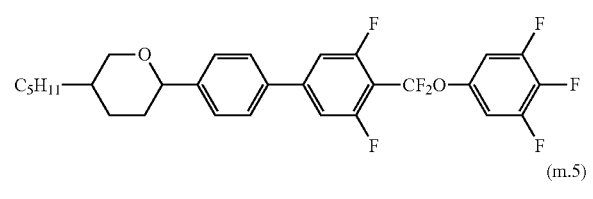
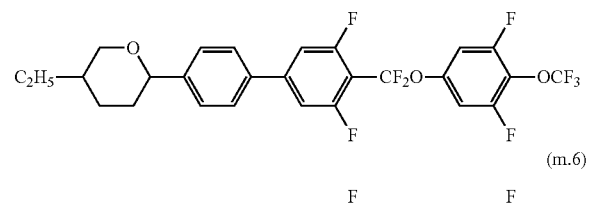
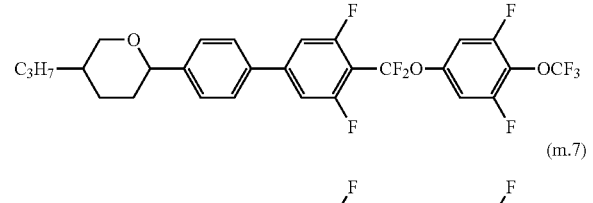
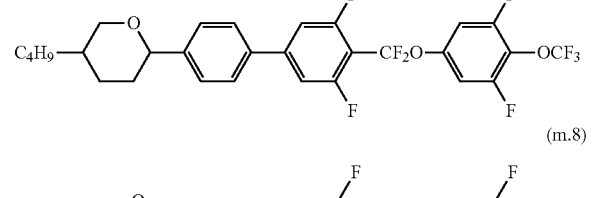
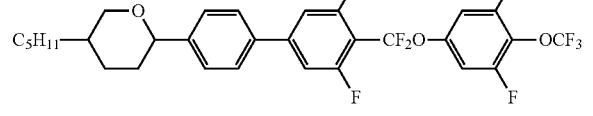

[Chemical Formula 12]

(m.9)

(m.10)

(m.11)

(m.12)

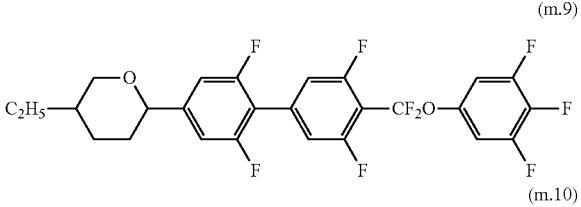

(m.13)

(m.14)

(m.15)

(m.16)

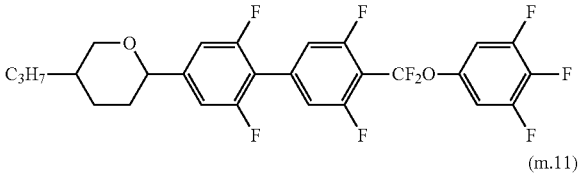
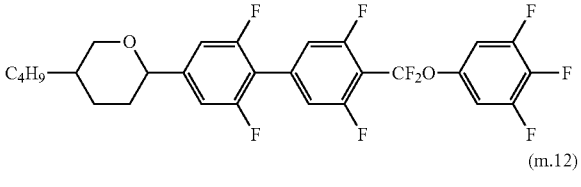
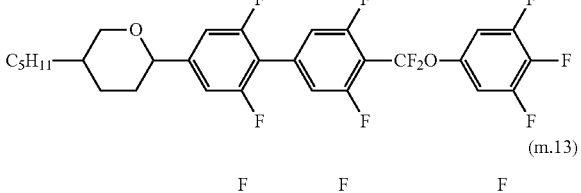
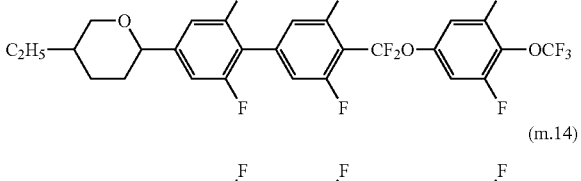
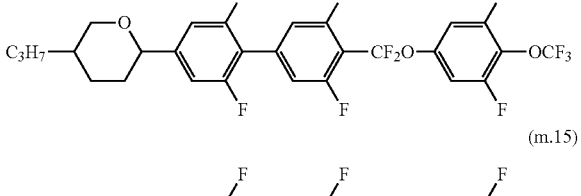
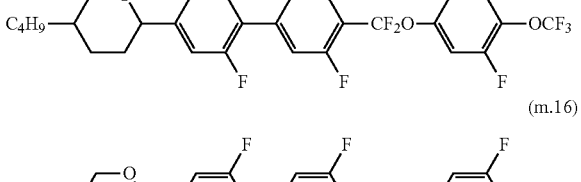

[Chemical Formula 13]

(m.17)

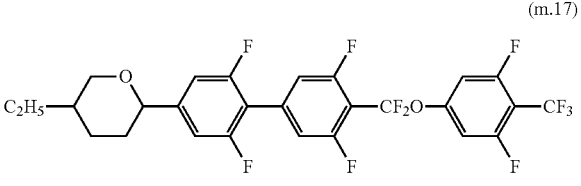

-continued (m.18)
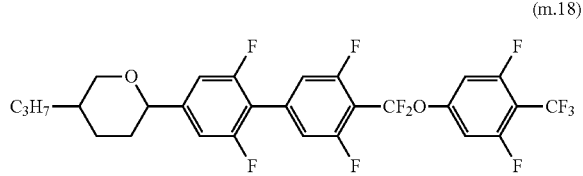

(m.19)
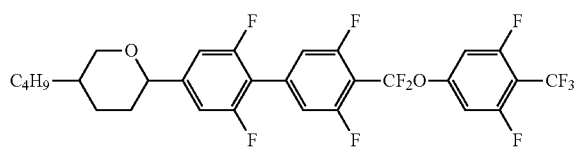

(m.20)
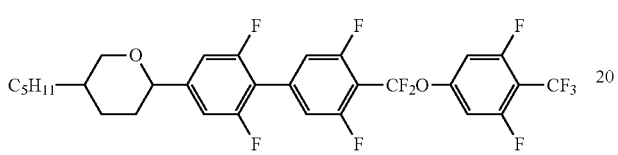

Regarding preferable examples of the compound represented by General Formula (M-3) related to the present invention, at least one selected from the group consisting of the following Formulae (m.21) to (m.28) is preferred.

[Chemical Formula 14]

(m.21)
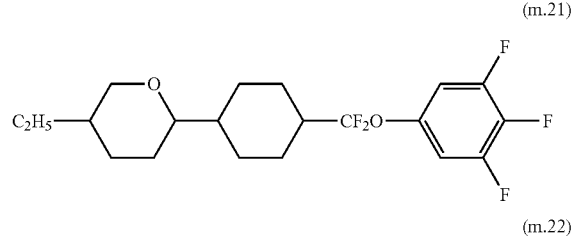

(m.22)
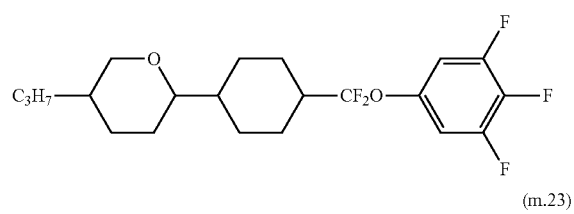

(m.23)
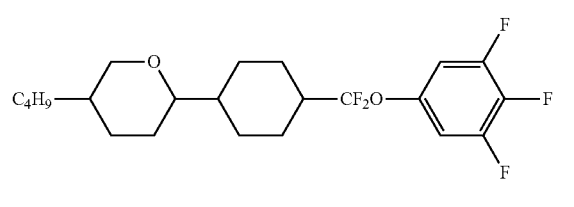

(m.24)
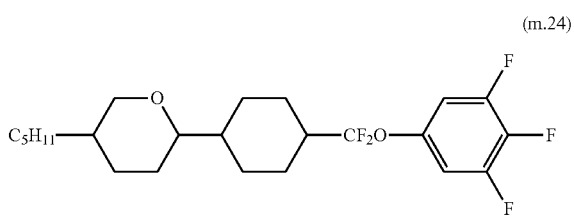

-continued (m.25)
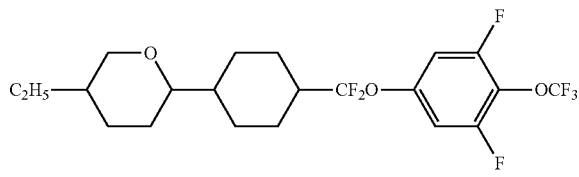

(m.26)
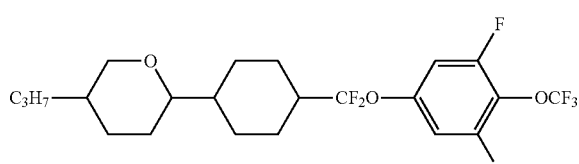

(m.27)
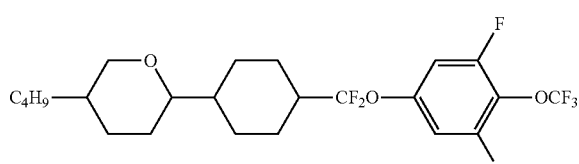

(m.28)
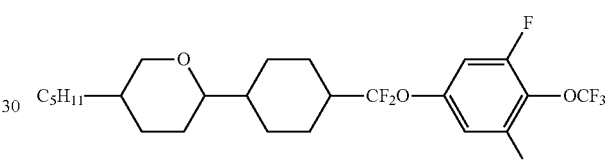

Since the liquid crystal composition related to the present invention has a dielectric constant anisotropy at 25° C. of more than 0 and 5 or less, the electrical capacity ($C_{LC}$) of the liquid crystal layer can be reduced to a low level, and it is effective for the suppression of an occurrence such as flickering or deterioration of the response speed. Furthermore, on the other hand, the applications of liquid crystal display elements have been extended in recent years, and significant changes can also be seen in methods for use of a liquid crystal display element and methods for producing a liquid crystal display element. In order to cope with these changes, it has become desirable to optimize characteristics other than the basic physical properties that are conventionally known. That is, along with the increase in size of the liquid crystal display elements to 50 frames or more, the method for injecting a liquid crystal composition into a substrate also changes, and the mainstream of the injection method is shifting from the conventional vacuum injection method to a one drop fill (ODF) method. However, the problem that the dropping marks generated when a liquid crystal composition is dropped on a substrate causes a decrease in the display quality, is emerging from the surface.

Furthermore, in a liquid crystal display element production process according to the ODF method, it is necessary to drop the optimum amount depending on the size of the liquid crystal display element. If the discrepancy in the dropping amount becomes larger than the optimum value, the balance in the refractive index of the liquid crystal display element or the driving electric field, which has been designed in advance, is destroyed, and the occurrence of unevenness or display defects such as contrast defects occur. Particularly, in the small-sized liquid crystal display elements that are frequently used in the recently popularized smartphones, since the optimum liquid crystal dropping amount is small, it is difficult per se to control the discrepancies from the optimum value to be within a certain range. Therefore, in order to maintain the production yield of a liquid crystal display element high, a liquid crystal composition is required to be, for example, less susceptible to a rapid pressure change inside the dropping apparatus or an impact, which occurs at the time of liquid crystal dropping, and capable of stable dropping continuously over a long time period.

Thus, it is another object of the present invention to solve such problems by incorporating the compound represented by General Formula (i) and the compound represented by General Formula (M-1) described above into the liquid crystal composition related to the present invention.

The liquid crystal composition related to the present invention may further include, as an optional component, a compound represented by the following General Formula (L), and the relevant compound represented by General Formula (L) is preferably a non-polar compound (having a dielectric anisotropy of −1.0 to 1.0).

It is preferable that the liquid crystal composition includes a compound represented by General Formula (L) described above:

[Chemical Formula 15]

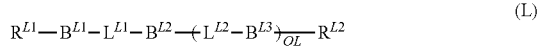

(L)

(wherein in General Formula (L), $R^{L1}$ and $R^{L2}$ each independently represent an alkyl group having 1 to 8 carbon atoms, while one —$CH_2$— moiety or at least two non-adjacent —$CH_2$— moieties in the alkyl group may be each independently substituted with —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of:

(a) a 1,4-cyclohexylene group (one —$CH_2$— moiety or at least two non-adjacent —$CH_2$— moieties present in this group may be substituted by —O—), and (b) a 1,4-phenylene group (one —CH= moiety or at least two non-adjacent —CH= moieties present in this group may be substituted by —N=), and the group (a) and the group (b) may be each independently substituted with a cyano group, a fluorine atom, or a chlorine atom;

$L^{L1}$ and $L^{L2}$ each independently represent a single bond, —$CH_2CH$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—;

in a case in which OL represents 2 or 3, and there are plural $L^{L2}$'s, those may be identical or different, and in a case in which OL represents 2 or 3, and there are plural $B^{L3}$'s, those may be identical or different; however, compounds represented by General Formula (i) and General Formula (M-1) described above are excluded). Furthermore, it is preferable that in General Formula (L), $R^{L1}$ and $R^{L2}$ each independently represent an alkyl group having 1 to 8 carbon atoms, and one —$CH_2$— moiety or at least two non-adjacent —$CH_2$— moieties in the alkyl group are each independently substituted by —CH=CH—, —C≡, —O—, —CO—, —COO—, or —OCO—. It is more preferable that the relevant $R^{L1}$ and $R^{L2}$ each independently represent an alkyl group having 1 to 8 carbon atoms, an alkoxy group having 1 to 8 carbon atoms, or an alkenyl group having 2 to 10 carbon atoms. The same also applies to General Formula (M) that will be described below.

The liquid crystal composition related to the present invention may also include one or more kinds of compounds represented by General Formula (L). There are no particular limitations on the kind of the compounds that can be used in combination, and the compounds are used in appropriate combination according to the desired performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention. According to another embodiment of the present invention, 3 kinds of compounds are used. According to another embodiment of the present invention, 5 kinds of compounds are used. Furthermore, according to still another embodiment of the present invention, 6 kinds of compounds are used. According to still another embodiment of the present invention, 7 kinds of compounds are used. Furthermore, according to still another embodiment of the present invention, 8 kinds of compounds are used. According to still another embodiment, 9 kinds of compounds are used. According to still another embodiment, 10 kinds of compounds are used. Furthermore, according to still another embodiment, 12 or more kinds of compounds are used. Also, it is preferable that one kind to 15 kinds of compounds represented by General Formula (L) are included, it is more preferable that 3 kinds to 14 kinds of compounds represented by General Formula (L) are included, and it is even more preferable that 5 kinds to 12 kinds of compounds represented by General Formula (L) are included.

In regard to the liquid crystal composition of the present invention, the content of the compound represented by General Formula (L) needs to be appropriately adjusted according to the required performance such as solubility at low temperature, transition temperature, electrical reliability, birefringence, process suitability, dropping marks, image burn-in, and dielectric constant anisotropy.

The content of the compound represented by General Formula (L) relative to the total mass of the liquid crystal composition of the present invention is, for example, 20% to 98% by mass according to an embodiment of the present invention. Furthermore, the content is 30% to 90% by mass according to another embodiment of the present invention. Furthermore, the content is 40% to 85% by mass according to another embodiment of the present invention. Furthermore, the content is 45% to 85% by mass according to still another embodiment of the present invention. Furthermore, the content is 50% to 75% by mass according to still another embodiment of the present invention. The content is 55% to 70% by mass according to still another embodiment of the present invention. The content is 56% to 65% by mass according to still another embodiment of the present invention. The content is 25% to 85% by mass according to still another embodiment of the present invention. Furthermore, the content is 30% to 80% by mass according to still another embodiment of the present invention. The content is 47% to 75% by mass according to still another embodiment of the present invention. Furthermore, the content is 53% by mass to 70% by mass according to still another embodiment of the present invention. The content is 60% to 98% by mass according to still another embodiment of the present invention. The content is 62% to 95% by mass according to still another embodiment of the present invention. Furthermore, the content is 58% to 78% by mass according to still another embodiment of the present invention. The content is 65% to 85% by mass according to still another embodiment of the present invention. The content is 70% to 98% by mass according to still another embodiment of the present invention. Furthermore, the content is 47% to 97.5% by mass according to still another embodiment of the present invention.

In a case in which the viscosity of the liquid crystal composition of the present invent ion needs to be maintained low, and a liquid crystal composition having a fast response speed is needed, it is preferable that the lower limit described above is high, while the upper limit is high. Furthermore, in a case in which the Tni of the liquid crystal composition of the present invention needs to be maintained high, and a liquid crystal composition having satisfactory temperature stability is needed, it is preferable that the lower limit described above is high, while the upper limit is high. Furthermore, when it is wished to have a large dielectric constant anisotropy in order to maintain the driving voltage at a low level, it is preferable that the lower limit described above is low, while the upper limit is low.

Regarding $R^{L1}$ and $R^{L2}$, in a case in which the cyclic structure to which $R^{L1}$ and $R^{L2}$ are bonded is a phenyl group (aromatic), a linear alkyl group having 1 to 5 carbon atoms, a linear alkoxy group having 1 to 4 carbon atoms (or more), and an alkenyl group having 4 or 5 carbon atoms are preferred, and in a case in which the cyclic structure to which $R^{L1}$ and $R^{L2}$ are bonded is a saturated cyclic structure such as cyclohexane, pyran or dioxane, a linear alkyl group having 1 to 5 carbon atoms, a linear alkoxy group having 1 to 4 carbon atoms (or more), and a linear alkenyl group having 2 to 5 carbon atoms are preferred.

It is preferable that in a case in which chemical stability of the liquid crystal composition is required, the compound represented by General Formula (L) related to the present invention does not have a chlorine atom in the molecule.

The compound represented by General Formula (L) related to the present invention is preferably, for example, a compound selected from the group of compounds represented by General Formula (I):

[Chemical Formula 16]

(wherein in General Formula (I), $R^{11}$ and $R^{12}$ each independently represent an alkyl group having 1 to 8 carbon atoms, an alkoxy group having 1 to 8 carbon atoms, or an alkenyl group having 2 to 8 carbon atoms, while one or more hydrogen atoms of the alkyl group, alkenyl group, alkoxy group, or alkenyloxy group may be substituted by fluorine atoms, and a methylene group in the alkyl group, alkenyl group, alkoxy group, or alkenyloxy group may be substituted by an oxygen atom as long as oxygen atoms are not linked in succession, or may be substituted by a carbonyl group as long as carbonyl groups are not linked in succession; and $A^{11}$ and $A^{12}$ each independently represent a 1,4-cyclohexylene group, a 1,4-phenylene group, a 2-fluoro-1,4-phenylene group, or a 3-fluoro-1,4-phenylene group).

There are no particular limitations on the kind of the compound that can be used in combination with the group of compounds represented by General Formula (I) described above; however, the compounds are used in appropriate combinations according to the required performance such as solubility at low temperature, viscosity, transition temperature, electrical reliability, and birefringence. The compound to be used is, for example, of one kind according to an embodiment of the present invention. Alternatively, 2 kinds of compounds are used according to another embodiment of the present invention. Furthermore, 3 kinds are used according to another embodiment of the present invention. According to another embodiment of the present invention, 4 kinds of compounds are used. According to still another embodiment of the present invention, 5 kinds of compounds are used. Furthermore, 6 kinds of compounds are used according to another embodiment of the present invention.

The content of a so-called bicyclic compound represented by General Formula (I) in the liquid crystal composition of the present invention needs to be appropriately adjusted according to the required performance such as solubility at low temperature, viscosity, transition temperature, electrical reliability, birefringence, process suitability, dropping marks, image burn-in, and dielectric constant anisotropy.

The content of the compound represented by General Formula (I) relative to the total mass of the liquid crystal composition of the present invention is, for example, 10% to 75% by mass according to an embodiment of the present invention. Alternatively, the content is 10% to 70% by mass according to another embodiment of the present invention. Furthermore, the content is 10% to 65% by mass according to another embodiment of the present invention. Furthermore, the content is 10% to 60% by mass according to still another embodiment of the present invention. Furthermore, the content is 15% to 60% by mass according to another embodiment of the present invention. Furthermore, the content is 15% to 59% by mass according to still another embodiment of the present invention. The content is 15% to 56% by mass according to still another embodiment of the present invention. Furthermore, the content is 15% to 52% by mass according to still another embodiment of the present invention. Furthermore, the content is 15% to 51% by mass according to still another embodiment of the present invention. Furthermore, the content is 15% to 49% by mass according to still another embodiment of the present invention. Furthermore, the content is 15% to 48% by mass according to still another embodiment of the present invention. Furthermore, the content is 15% to 47% by mass according to still another embodiment of the present invention. Furthermore, the content is 15% to 45% by mass according to still another embodiment of the present invention. Furthermore, the content is 15% to 44% by mass according to still another embodiment of the present invention. Furthermore, the content is 15% to 43% by mass according to still another embodiment of the present invention. Furthermore, the content is 15% to 41% by mass according to still another embodiment of the present invention. Furthermore, the content is 15% to 39% by mass according to still another embodiment of the present invention. Furthermore, the content is 15% to 38% by mass according to still another embodiment of the present invention. Furthermore, the content is 15% to 35% by mass according to still another embodiment of the present invention. Furthermore, the content is 15% to 33% by mass according to still another embodiment of the present invention. Furthermore, the content is 15% to 31% by mass according to still another embodiment of the present invention. Furthermore, the content is 15% to 30% by mass according to still another embodiment of the present invention. Furthermore, the content is 1.5% to 29% by mass according to still another embodiment of the present invention. Furthermore, the content is 15% to 28% by mass according to still another embodiment of the present invention. Furthermore, the content is 15% to 20% by mass according to still another embodiment of the present invention. Furthermore, the content is 17% to 60% by mass according to still another embodiment of the present invention. Furthermore, the content is 20% to 60% by mass according to still another embodiment of the present invention. Furthermore, the content is 27% to 60% by mass according to still another embodiment of the present invention. Furthermore, the content is 28% to 60% by mass according to still another embodiment of the present invention. Furthermore, the content is 30% to 60% by mass according to still another embodiment of the present invention. Furthermore, the content is 31% to 60% by mass according to still another embodiment of the present invention. Furthermore, the content is 32% to 60% by mass according to still another embodiment of the present invention. Furthermore, the content is 33% to 60% by mass according to still another embodiment of the present invention. Furthermore, the content is 34% to 60% by mass according to still another embodiment of the present invention. Furthermore, the content is 35% to 60% by mass according to still another embodiment of the present invention. Furthermore, the content is 36% to 60% by mass according to still another embodiment of the present invention. Furthermore, the content is 37% to 60% by mass according to still another embodiment of the present invention. Furthermore, the content is 39% to 60% by mass according to still another embodiment of the present invention. Furthermore, the content is 41% to 60% by mass according to still another embodiment of the present invention. Furthermore, the content is 42% to 60% by mass according to still another embodiment of the present invention. Furthermore, the content is 43% to 60% by mass according to still another embodiment of the present invention. Furthermore, the content is 44% to 60% by mass according to still another embodiment of the present invention. Furthermore, the content is 46% to 60% by mass according to still another embodiment of the present invention. Furthermore, the content is 47% to 60% by mass according to still another embodiment of the present invention. Furthermore, the content is 48% to 60% by mass according to still another embodiment of the present invention. Furthermore, the content is 49% to 60% by mass according to still another embodiment of the present invention. Furthermore, the content is 51% to 60% by mass according to still another embodiment of the present invention. Furthermore, the content is 17% to 45% by mass according to still another embodiment of the present invention. Furthermore, the content is 27% to 29% by mass according to still another embodiment of the present invention. Furthermore, the content is 32% to 43% by mass according to still another embodiment of the present invention. Furthermore, the content is 34% to 38% by mass according to still another embodiment of the present invention. Furthermore, the content is 36% to 45% by mass according to still another embodiment of the present invention. Furthermore, the content is 37% to 48% by mass according to still another embodiment of the present invention. Furthermore, the content is 42% to 56% by mass according to still another embodiment of the present invention. Furthermore, the content is 43% to 52% by mass according to still another embodiment of the present invention. Furthermore, the content is 43% to 49% by mass according to still another embodiment of the present invention. Furthermore, the content is 43% to 44% by mass according to still another embodiment of the present invention. Furthermore, the content is 44% to 48% by mass according to still another embodiment of the present invention. Furthermore, the content is 47% to 51% by mass according to still another embodiment of the present invention.

In regard to the liquid crystal composition related to the present invention, from the viewpoint that the viscosity can be maintained low and a liquid crystal composition having a fast response speed can be provided, it is particularly preferable that the liquid crystal composition includes a group of compounds represented by General Formula (I).

In a case in which the viscosity of the liquid crystal composition of the invention needs to be maintained low, and a liquid crystal composition having a fast response speed is needed, it is preferable that the lower limit of the content of the compound (group) represented by General Formula (I) is high, and the upper limit is high.

Furthermore, it is preferable that the compound represented by General Formula (I) is a compound selected from the group of compounds represented by General Formula (I-1):

[Chemical Formula 17]

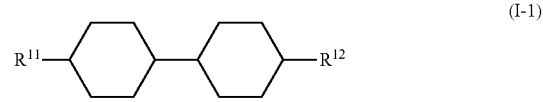

(I-1)

(wherein in General Formula (I-1), $R^{11}$ and $R^{12}$ have the same meanings as the meanings for General Formula (I) described above, respectively).

It is preferable that the liquid crystal composition of the present invention includes 1 to 10 kinds, 1 to 9 kinds, 1 to 8 kinds, 1 to 7 kinds, 1 to 6 kinds, 2 to 9 kinds, 2 to 8 kinds, 2 to 6 kinds, 3 to 9 kinds, 3 to 7 kinds, 3 to 6 kinds, or 4 to 6 kinds of the compounds represented by General Formula (I-1) as mixtures.

From the viewpoint that the viscosity can be maintained low, and a liquid crystal composition having a fast response speed can be provided, it is particularly preferable that the liquid crystal composition related to the present invention includes a group of compounds represented by General Formula (I-1).

The content of the compound represented by General Formula (I-1) relative to the total mass of the liquid crystal composition of the present invention is, for example, 10% to 70% by mass according to an embodiment of the present invention. Alternatively, according to another embodiment of the present invention, the content is 10% to 60% by mass. Furthermore, according to another embodiment of the present invention, the content is 15% to 60% by mass. Furthermore, according to still another embodiment of the present invention, the content is 15% to 59% by mass. Furthermore, according to still another embodiment of the present invention, the content is 15% to 56% by mass. Furthermore, according to still another embodiment of the present invention, the content is 15% to 52% by mass. Furthermore, according to still another embodiment of the present invention, the content is 15% to 50% by mass. Furthermore, according to still another embodiment of the present invention, the content is 1.5% to 49% by mass. Furthermore, according to still another embodiment of the present invention, the content is 15% to 48% by mass. Furthermore, according to still another embodiment of the present invention, the content is 15% to 47% by mass. Furthermore, according to still another embodiment of the present invention, the content is 15% to 46% by mass. Furthermore, according to still another embodiment of the present invention, the content is 15% to 45% by mass. Furthermore, according to still another embodiment of the present invention, the content is 15% to 39% by mass. Furthermore, according to still another embodiment of the present invention, the content is 15% to 38% by mass. Furthermore, according to still another embodiment of the present invention, the content is 15% to 35% by mass. Furthermore, according to still another embodiment of the present invention, the content is 15% to 33% by mass. Furthermore, according to still another embodiment of the present invention, the content is 15% to 30% by mass. Furthermore, according to still another embodiment of the present invention, the content is 15% to 28% by mass. Furthermore, according to still another embodiment of the present invention, the content is 15% to 26% by mass. Furthermore, according to still another embodiment of the present invention, the content is 15% to 20% by mass. Furthermore, according to still another embodiment of the present invention, the content is 17% to 60% by mass. Furthermore, according to still another embodiment of the present invention, the content is 20% to 60% by mass. Furthermore, according to still another embodiment of the present invention, the content is 21% to 60% by mass. Furthermore, according to still another embodiment of the present invention, the content is 23% to 60% by mass. Furthermore, according to still another embodiment of the present invention, the content is 26% to 60% by mass. Furthermore, according to still another embodiment of the present invention, the content is 27% to 60% by mass. Furthermore, according to still another embodiment of the present invention, the content is 2% to 60% by mass. Furthermore, according to still another embodiment of the present invention, the content is 30% to 60% by mass. Furthermore, according to still another embodiment of the present invention, the content is 33% to 60% by mass. Furthermore, according to still another embodiment of the present invention, the content is 34% to 60% by mass. Furthermore, according to still another embodiment of the present invention, the content is 35% to 60% by mass. Furthermore, according to still another embodiment of the present invention, the content is 36% to 60% by mass. Furthermore, according to still another embodiment of the present invention, the content is 37% to 60% by mass. Furthermore, according to still another embodiment of the present invention, the content is 38% to 60% by mass. Furthermore, according to still another embodiment of the present invention, the content is 39% to 60% by mass. Furthermore, according to still another embodiment of the present invention, the content is 42% to 60% by mass. Furthermore, according to still another embodiment of the present invention, the content is 43% to 60% by mass. Furthermore, according to still another embodiment of the present invention, the content is 46% to 60% by mass. Furthermore, according to still another embodiment of the present invention, the content is 47% to 60% by mass. Furthermore, according to still another embodiment of the present invention, the content is 49% to 60% by mass. Furthermore, according to still another embodiment of the present invention, the content is 50% to 60% by mass. Furthermore, according to still another embodiment of the present invention, the content is 17% to 45% by mass. Furthermore, according to still another embodiment of the present invention, the content is 21% to 24% by mass. Furthermore, according to still another embodiment of the present invention, the content is 27% to 38% by mass. Furthermore, according to still another embodiment of the present invention, the content is 28% to 29% by mass. Furthermore, according to still another embodiment of the present invention, the content is 23% to 46% by mass. Furthermore, according to still another embodiment of the present invention, the content is 34% to 38% by mass. Furthermore, according to still another embodiment of the present invention, the content is 36% to 45% by mass. Furthermore, according to still another embodiment of the present invention, the content is 37% to 48% by mass. Furthermore, according to still another embodiment of the present invention, the content is 42% to 48% by mass. Furthermore, according to still another embodiment of the present invention, the content is 38% to 49% by mass. Furthermore, according to still another embodiment of the present invention, the content is 42% to 56% by mass. Furthermore, according to still another embodiment of the present invention, the content is 42% to 50% by mass. Furthermore, according to still another embodiment of the present invention, the content is 43% to 52% by mass. Furthermore, according to still another embodiment of the present invention, the content is 46% to 47% by mass.

In a case in which the viscosity of the liquid crystal composition of the present invention needs to be maintained low, and a liquid crystal composition having a fast response speed is needed, it is preferable that the lower limit described above is high, and the upper limit is high.

Furthermore, the compound represented by General Formula (I-1) is preferably a compound selected from the group of compounds represented by General Formula (I-1-1):

[Chemical Formula 18]

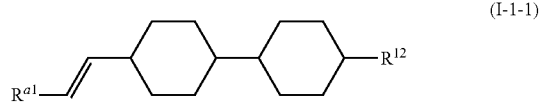

(I-1-1)

(wherein in General Formula (I-1-1), $R^{12}$ has the same meaning as the meaning for General Formula (I); and $R^{a1}$ represents a hydrogen atom or an alkyl group having 1 to 3 carbon atoms).

From the viewpoint that the viscosity can be maintained low, and a liquid crystal composition having a fast response speed can be provided, it is particularly preferable that the liquid crystal composition related to the present invention includes a group of compounds represented by General Formula (I-1-1).

The content of the compound represented by General Formula (I-1-1) relative to the total mass of the liquid crystal composition of the present invention is, for example, 1% to 45% by mass according to an embodiment of the present invention. Furthermore, according to another embodiment of the present invention, the content is 1% to 35% by mass. Alternatively, according to another embodiment of the present invention, the content is 1% to 30% by mass. Furthermore, according to still another embodiment of the present invention, the content is 1% to 26% by mass. Furthermore, according to still another embodiment of the present invention, the content is 1% to 21% by mass. Furthermore, according to still another embodiment of the present invention, the content is 1% to 16% by mass. Furthermore, according to still another embodiment of the present invention, the content is 1% to 15% by mass. Furthermore, according to still another embodiment of the present invention, the content is 1% to 13% by mass. Furthermore, according to still another embodiment of the present invention, the content is 1% to 1.2% by mass. Furthermore, according to still another embodiment of the present invention, the content is 1% to 11% by mass. Furthermore, according to still another embodiment of the present invention, the content is 1% to 10% by mass. Furthermore, according to still another embodiment of the present invention, the content is 1% to 8% by mass. Furthermore, according to still another embodiment of the present invention, the content is 1% to 7% by mass. Furthermore, according to still another embodiment of the present invention, the content is 1% to 5% by mass. Furthermore, according to still another embodiment of the present invention, the content is 1% to 4% by mass. Furthermore, according to still another embodiment of the present invention, the content is 3% to 30% by mass. Furthermore, according to still another embodiment of the present invention, the content is 4% to 30% by mass. Furthermore, according to still another embodiment of the present invention, the content is 5% to 30% by mass. Furthermore, according to still another embodiment of the present invention, the content is 6% to 30% by mass. Furthermore, according to still another embodiment of the present invention, the content is 7% to 30% by mass. Furthermore, according to still another embodiment of the present invention, the content is 8% to 30% by mass. Furthermore, according to still another embodiment of the present invention, the content is 9% to 30% by mass. Furthermore, according to still another embodiment of the present invention, the content is 10% to 30% by mass. Furthermore, according to still another embodiment of the present invention, the content is 11% to 30% by mass. Furthermore, according to still another embodiment of the present invention, the content is 12% to 30% by mass. Furthermore, according to still another embodiment of the present invention, the content is 13% to 30% by mass. Furthermore, according to still another embodiment of the present invention, the content is 3% to 26% by mass. Furthermore, according to still another embodiment of the present invention, the content is 3% to 13% by mass. Furthermore, according to still another embodiment of the present invention, the content is 3% to 8% by mass. Furthermore, according to still another embodiment of the present invention, the content is 4% to 7% by mass. Furthermore, according to still another embodiment of the present invention, the content is 5% to 12% by mass. Furthermore, according to still another embodiment of the present invention, the content is 9% to 12% by mass. Furthermore, according to still another embodiment of the present invention, the content is 6% to 16% by mass. Furthermore, according to still another embodiment of the present invention, the content is 7% to 16% by mass. Furthermore, according to still another embodiment of the present invention, the content is 7% to 10% by mass. Furthermore, according to still another embodiment of the present invention, the content is 8% to 26% by mass. Furthermore, according to still another embodiment of the present invention, the content is 8% to 15% by mass. Furthermore, according to still another embodiment of the present invention, the content is 8% to 13% by mass. Furthermore, according to still another embodiment of the present invention, the content is 9% to 25% by mass. Furthermore, according to still another embodiment of the present invention, the content is 10% to 21% by mass. Furthermore, according to still another embodiment of the present invention, the content is 12% to 21% by mass. Furthermore, according to still another embodiment of the present invention, the content is 1.3% to 16% by mass.

Furthermore, according to still another embodiment of the present invention, the content is 11% to 26% by mass.

Furthermore, the compound represented by General Formula (I-1-1) is preferably a compound selected from the group of compounds represented by Formula (1.1) to Formula (1.5), more preferably a compound represented by Formula (1.2) or Formula (1.3), and particularly preferably a compound represented by Formula (1.3):

[Chemical Formula 19]

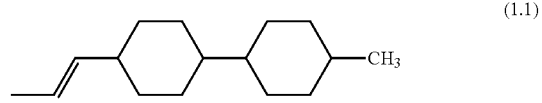
(1.1)

[Chemical Formula 20]

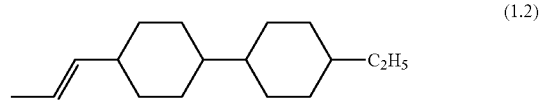
(1.2)

[Chemical Formula 21]

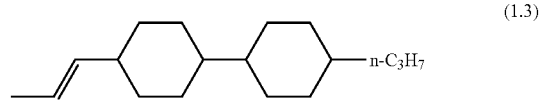
(1.3)

[Chemical Formula 22]

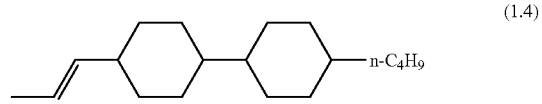
(1.4)

[Chemical Formula 23]

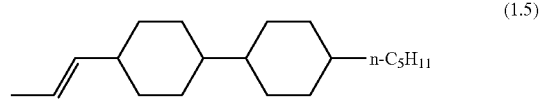
(1.5)

In a case in which the compounds represented by Formula (1.2) and Formula (1.3) are respectively used singly, when the content of the compound represented by Formula (1.2) is high, it is effective for improving the response speed. When the content of the compound represented by Formula (1.3) is in the range described below, a liquid crystal composition having a fast response speed and having high electrical and optical reliability is produced, and therefore, it is preferable.

The content of the compound represented by Formula (1.3) is, for example, 1% to 45% by mass relative to the total mass of the liquid crystal composition of the present invention according to an embodiment of the present invention. Furthermore, the content of the compound is 1% to 35% by mass according to another embodiment of the present invention. Alternatively, the content is 1% to 30% by mass according to another embodiment of the present invention. Alternatively, the content is 1% to 25% by mass according to still another embodiment of the present invention. Alternatively, the content is 1% to 21% by mass according to still another embodiment of the present invention. Alternatively, the content is 1% to 18% by mass according to still another embodiment of the present invention. Alternatively, the content is 1% to 16% by mass according to still another embodiment of the present invention. Alternatively, the content is 1% to 15% by mass according to still another embodiment of the present invention. Alternatively, the content is 1% to 13% by mass according to still another embodiment of the present invention. Alternatively, the content is 1% to 12% by mass according to still another embodiment of the present invention. Alternatively, the content is 1% to 11% by mass according to still another embodiment of the present invention. Alternatively, the content is 1% to 10% by mass according to still another embodiment of the present invention. Alternatively, the content is 1% to 8% by mass according to still another embodiment of the present invention. Alternatively, the content is 1% to 7% by mass according to still another embodiment of the present invention. Alternatively, the content is 1% to 5% by mass according to still another embodiment of the present invention. Alternatively, the content is 1% to 4% by mass according to still another embodiment of the present invention. Alternatively, the content is 3% to 21% by mass according to still another embodiment of the present invention. Alternatively, the content is 4% to 21% by mass according to still another embodiment of the present invention. Alternatively, the content is 5% to 21% by mass according to still another embodiment of the present invention. Alternatively, the content is 6% to 21% by mass according to still another embodiment of the present invention. Alternatively, the content is 7% to 21% by mass according to still another embodiment of the present invention. Alternatively, the content is 8% to 21% by mass according to still another embodiment of the present invention. Alternatively, the content is 9% to 21% by mass according to still another embodiment of the present invention. Alternatively, the content is 10% to 21% by mass according to still another embodiment of the present invention. Alternatively, the content is 11% to 21% by mass according to still another embodiment of the present invention. Alternatively, the content is 12% to 21% by mass according to still another embodiment of the present invention. Alternatively, the content is 13% to 21% by mass according to still another embodiment of the present invention. Alternatively, the content is 3% to 13% by mass according to still another embodiment of the present invention. Alternatively, the content is 3% to 8% by mass according to still another embodiment of the present invention. Alternatively, the content is 4% to 7% by mass according to still another embodiment of the present invention. Alternatively, the content is 5% to 12% by mass according to still another embodiment of the present invention. Alternatively, the content is 9% to 12% by mass according to still another embodiment of the present invention. Alternatively, the content is 6% to 16% by mass according to still another embodiment of the present invention. Alternatively, the content is 10% to 16% by mass according to still another embodiment of the present invention. Alternatively, the content is 13% to 16% by mass according to still another embodiment of the present invention. Alternatively, the content is 7% to 16% by mass according to still another embodiment of the present invention. Alternatively, the content is 7% to 10% by mass according to still another embodiment of the present invention. Alternatively, the content is 8% to 18% by mass according to still another embodiment of the present invention. Alternatively, the content is 8% to 15% by mass according to still another embodiment of the present invention. Alternatively, the content is 8% to 13% by mass according to still another embodiment of the present invention. Alternatively, the content is 9% to 13% by mass according to still another embodiment of the present invention.

Furthermore, the compound represented by General Formula (I-1) related to the present invention is preferably a compound selected from the group of compounds represented by General Formula (I-1-2):

[Chemical Formula 24]

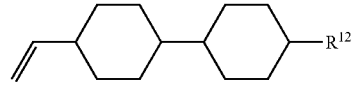

(I-1-2)

(wherein in General Formula (I-1-2), $R^{12}$ has the same meaning as the meaning for General Formula (I)).

The compound used as the compound of General Formula (I-1-2) is, for example, of one kind according to an embodiment of the present invention. Alternatively, according to another embodiment of the present invention, 2 kinds of compounds are used. Furthermore, according to another embodiment of the present invention, 3 kinds of compounds are used.

In regard to the liquid crystal composition of the present invention, the content of the compound represented by General Formula (I-1-2) needs to be appropriately adjusted according to the required performance such as solubility at low temperature, viscosity, transition temperature, electrical reliability, birefringence, process suitability, dropping marks, image burn-in, and dielectric constant anisotropy.

The content of the compound represented by General Formula (I-1-2) relative to the total mass of the liquid crystal composition of the present invention is, for example, 1% to 70% by mass according to an embodiment of the present invention. Furthermore, according to another embodiment of the present invention, the content of the compound is 1% to 65% by mass. Furthermore, according to another embodiment of the present invention, the content of the compound is 1% to 55% by mass. Alternatively, according to still another embodiment of the present invention, the content is 1% to 50% by mass. Furthermore, according to still another embodiment of the present invention, the content is 1% to 49% by mass. Furthermore, according to still another embodiment of the present invention, the content is 1% to 47% by mass. Furthermore, according to still another embodiment of the present invention, the content is 1% to 45% by mass. Furthermore, according to still another embodiment of the present invention, the content is 1% to 44% by mass. Furthermore, according to still another embodiment of the present invention, the content is 1% to 40% by mass. Furthermore, according to still another embodiment of the present invention, the content is 1% to 39% by mass. Furthermore, according to still another embodiment of the present invention, the content is 1% to 38% by mass. Furthermore, according to still another embodiment of the present invention, the content is 1% to 36% by mass. Furthermore, according to still another embodiment of the present invention, the content is 1% to 35% by mass. Furthermore, according to still another embodiment of the present invention, the content is 1% to 32% by mass. Furthermore, according to still another embodiment of the present invention, the content is 1% to 30% by mass. Furthermore, according to still another embodiment of the present invention, the content is 1% to 28% by mass. Furthermore, according to still another embodiment of the present invention, the content is 1% to 27% by mass. Furthermore, according to still another embodiment of the present invention, the content is 1% to 26% by mass. Furthermore, according to still another embodiment of the present invention, the content is 1% to 24% by mass. Furthermore, according to still another embodiment of the present invention, the content is 1% to 21% by mass. Furthermore, according to still another embodiment of the present invention, the content is 1% to 20% by mass. Furthermore, according to still another embodiment of the present invention, the content is 1% to 19% by mass. Furthermore, according to still another embodiment of the present invention, the content is 1% to 1.6% by mass. Furthermore, according to still another embodiment of the present invention, the content is 1% to 15% by mass. Furthermore, according to still another embodiment of the present invention, the content is 11% to 49% by mass. Furthermore, according to still another embodiment of the present invention, the content is 12% to 49% by mass. Furthermore, according to still another embodiment of the present invention, the content is 13% to 49% by mass. Furthermore, according to still another embodiment of the present invention, the content is 1.5% to 49% by mass. Furthermore, according to still another embodiment of the present invention, the content is 16% to 49% by mass. Furthermore, according to still another embodiment of the present invention, the content is 17% to 49% by mass. Furthermore, according to still another embodiment of the present invention, the content is 20% to 49% by mass. Furthermore, according to still another embodiment of the present invention, the content is 23% to 49% by mass. Furthermore, according to still another embodiment of the present invention, the content is 24% to 49% by mass. Furthermore, according to still another embodiment of the present invention, the content is 25% to 49% by mass. Furthermore, according to still another embodiment of the present invention, the content is 28% to 49% by mass. Furthermore, according to still another embodiment of the present invention, the content is 30% to 49% by mass. Furthermore, according to still another embodiment of the present invention, the content is 33% to 49% by mass. Furthermore, according to still another embodiment of the present invention, the content is 35% to 49% by mass. Furthermore, according to still another embodiment of the present invention, the content is 38% to 49% by mass. Furthermore, according to still another embodiment of the present invention, the content is 39% to 49% by mass. Furthermore, according to still another embodiment of the present invention, the content is 45% to 49% by mass. Furthermore, according to still another embodiment of the present invention, the content is 11% to 44% by mass. Furthermore, according to still another embodiment of the present invention, the content is 12% to 24% by mass. Furthermore, according to still another embodiment of the present invention, the content is 13% to 16% by mass. Furthermore, according to still another embodiment of the present invention, the content is 15% to 32% by mass. Furthermore, according to still another embodiment of the present invention, the content is 15% to 21% by mass. Furthermore, according to still another embodiment of the present invention, the content is 17% to 20% by mass. Furthermore, according to still another embodiment of the present invention, the content is 16% to 27% by mass. Furthermore, according to still another embodiment of the present invention, the content is 17% to 28% by mass. Furthermore, according to still another embodiment of the present invention, the content is 20% to 35% by mass. Furthermore, according to still another embodiment of the present invention, the content is 23% to 26% by mass. Furthermore, according to still another embodiment of the present invention, the content is 24% to 40% by mass. Furthermore, according to still another embodiment of the present invention, the content is 28% to 38% by mass. Furthermore, according to still another embodiment of the present invention, the content is 30% to 38% by mass. Furthermore, according to still another embodiment of the present invention, the content is 25% to 36% by mass. Furthermore, according to still another embodiment of the present invention, the content is 27% to 30% by mass. Furthermore, according to still another embodiment of the present invention, the content is 30% to 40% by mass. Furthermore, according to still another embodiment of the present invention, the content is 30% to 39% by mass. Furthermore, according to still another embodiment of the present invention, the content is 35% to 44% by mass. Furthermore, according to still another embodiment of the present invention, the content is 35% to 40% by mass. Furthermore, according to still another embodiment of the present invention, the content is 33% to 47% by mass. Furthermore, according to still another embodiment of the present invention, the content is 39% to 47% by mass. Furthermore, according to still another embodiment of the present invention, the content is 38% to 45% by mass.

Furthermore, the compound represented by General Formula (I-1-2) is preferably a compound selected from the group of compounds represented by Formula (2.1) to Formula (2.8), and preferably a compound represented by any one of Formula (2.2) to Formula (2.4). Particularly, a compound represented by Formula (2.2) is preferable because the response speed of the liquid crystal composition of the present invention is especially improved. Furthermore, when a Tni higher than the response speed is required, it is preferable to use a compound represented by Formula (2.3) or Formula (2.4). It is preferable that the content of the compounds represented by Formula (2.3) and Formula (2.4) is set to less than 30% in order to obtain satisfactory solubility at low temperature.

[Chemical Formula 25]

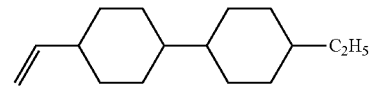

(2.1)

[Chemical Formula 26]

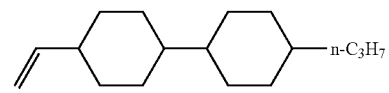

(2.2)

[Chemical Formula 27]

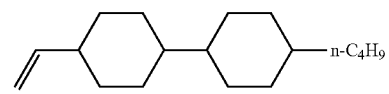

(2.3)

[Chemical Formula 28]

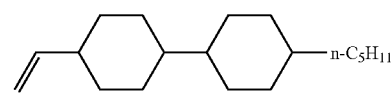

(2.4)

The content of the compound represented by Formula (2.2) in the liquid crystal composition of the present invention is preferably from 1% by mass to 70% by mass, preferably from 1% by mass to 65% by mass, preferably from 1% by mass to 60% by mass, preferably from 1% by mass to 55% by mass, preferably from 1% by mass to 50% by mass, and preferably from 5% by mass to 50% by mass, relative to the total mass of the liquid crystal composition of the present invention. Above all, the content is preferably from 9% by mass to 47% by mass, from 9% by mass to 15% by mass, from 11% by mass to 44% by mass, from 15% by mass to 32% by mass, from 20% by mass to 35% by mass, from 23% by mass to 26% by mass, from 24% by mass to 40% by mass, from 25% by mass to 36% by mass, from 28% by mass to 38% by mass, from 30% by mass to 40% by mass, from 30% by mass to 39% by mass, from 30% by mass to 38% by mass, from 33% by mass to 47% by mass, from 35% by mass to 44% by mass, from 35% by mass to 40% by mass, from 38% by mass to 45% by mass, or from 39% by mass to 47% by mass.

The content of the compound represented by Formula (2.3) in the liquid crystal composition of the present invention is preferably from 1% by mass to 30% by mass, preferably 1% by mass to 25% by mass or less, preferably from 3% by mass to 25% by mass, preferably from 4% by mass to 22% by mass, preferably from 5% by mass to 22% by mass, preferably from 11% by mass to 22% by mass, preferably from 13% by mass to 22% by mass, preferably from 4% by mass to 16% by mass, preferably from 4% by mass to 15% by mass, preferably from 4% by mass to 10% by mass, preferably from 5% by mass to 10% by mass, preferably from 12% by mass to 15% by mass, and preferably from 13% by mass to 16% by mass, relative to the total mass of the liquid crystal composition of the present invention.

The content of the compound represented by Formula (2.4) in the liquid crystal composition of the present invention is preferably from 1% by mass to 30% by mass, more preferably 1% by mass to 25% by mass or less, preferably from 3% by mass to 25% by mass, preferably from 4% by mass to 25% by mass, preferably from 12% by mass to 25% by mass, by mass, preferably from 17% by mass to 25% by mass, preferably from 20% by mass to 25% by mass, preferably from 4% by mass to 20% by mass, preferably from 4% by mass to 13% by mass, preferably from 12% by mass to 24% by mass, and preferably from 17% by mass to 20% by mass, relative to the total mass of the liquid crystal composition of the present invention.

The liquid crystal composition of the present invention may further include a compound represented by Formula (2.5), which has a structure similar to that of the compound represented by General Formula (I-1-2):

[Chemical Formula 29]

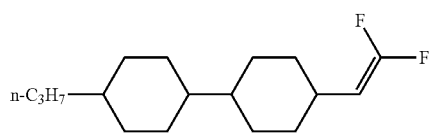
(2.5)

It is preferable to adjust the content of the compound represented by Formula (2.5) according to the required performance such as solubility at low temperature, transition temperature, electrical reliability, and birefringence, and a preferred range of the content is as described in the table given below.

It is preferable to adjust the content of the compound represented by Formula (2.5) according to the required performance such as solubility at low temperature, transition temperature, electrical reliability, and birefringence. It is preferable for the liquid crystal composition of the present invention to include this compound at a proportion of 0% to 40% by mass, preferably 1% to 35% by mass, preferably 1% to 30% by mass, preferably 5% to 30% by mass, preferably 10% to 30% by mass, preferably 15% to 30% by mass, preferably 20% to 30% by mass, and preferably 25% to 30% by mass, relative to the total mass of the liquid crystal composition of the present invention.

Furthermore, it is preferable that the compound represented by General Formula (I) related to the present invention is a compound selected from the group of compounds represented by General Formula (I-2):

[Chemical Formula 30]

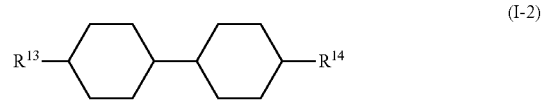
(I-2)

(wherein in General Formula (I-2), $R^{13}$ and $R^{14}$ each independently represent an alkyl group having 1 to 5 carbon atoms).

There are no particular limitations on the kind of the compounds that can be used in combination, but the compounds are combined according to the required performance such as solubility at low temperature, transition temperature, electrical reliability, and birefringence. The compound to be used is, for example, of one kind according to an embodiment of the present invent ion. Alternatively, two kinds of compounds are used according to another embodiment of the present invention. Furthermore, three kinds of compounds are used according to another embodiment of the present invention.

The content of the compound represented by General Formula (I-2) in the liquid crystal composition of the present invention needs to be appropriately adjusted according to the required performance such as solubility at low temperature, transition temperature, electrical reliability, birefringence, process suitability, dropping marks, image burn-in, and dielectric constant anisotropy.

The content of the compound represented by General Formula (I-2) relative to the total mass of the liquid crystal composition of the present invention is, for example, 1% to 30% by mass according to an embodiment of the present invention. Alternatively, the content is 2% to 30% by mass according to another embodiment of the present invention. Furthermore, the content is 4% to 30% by mass according to another embodiment of the present invention. Furthermore, the content is 4% to 25% by mass according to another embodiment of the present invention. Furthermore, the content is 4% to 23% by mass according to another embodiment of the present invention.

Furthermore, the compound represented by General Formula (I-2) is preferably a compound selected from the group of compounds represented by Formula (3.1) to Formula (3.4), and preferably a compound represented by Formula (3.1), Formula (3.3), or Formula (3.4). Particularly, a compound represented by Formula (3.2) is preferable because the response speed of the liquid crystal composition of the present invention is particularly improved. Furthermore, when a Tni higher than the response speed is required, it is preferable to use a compound represented by Formula (3.3) or Formula (3.4). It is preferable that the content of the compounds represented by Formula (3.3) and Formula (3.4) is adjusted to be less than 20% in order to obtain satisfactory solubility at low temperature.

Furthermore, the compound represented by General Formula (I-2) is preferably a compound selected from the group of compounds represented by Formula (3.1) to Formula (3.4), and preferably a compound represented by Formula (3.1), Formula (3.3), and/or Formula (3.4).

[Chemical Formula 31]

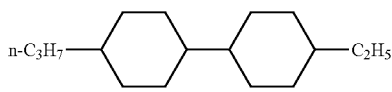

(3.1)

[Chemical Formula 32]

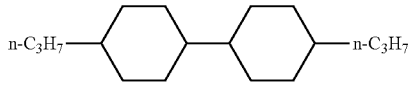

(3.2)

[Chemical Formula 33]

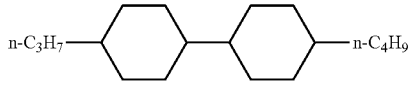

(3.3)

[Chemical Formula 34]

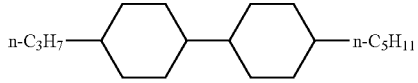

(3.4)

In regard to the liquid crystal composition of the present invention, the content of the compound represented by Formula (3.3) is preferably from 1% by mass to 25% by mass, preferably from 1% by mass to 20% by mass, preferably from 1% by mass to 15% by mass, preferably from 1% by mass to 10% by mass, and preferably from 1% by mass to 5% by mass, relative to the total mass of the liquid crystal composition of the present invent ion.

Furthermore, the compound represented by General Formula (I) related to the present invention is preferably a compound selected from the group of compounds represented by General Formula (I-3):

[Chemical Formula 35]

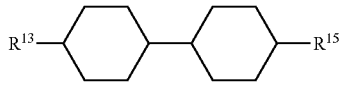

(I-3)

(wherein in General Formula (I-3), $R^{12}$ has the same meaning as the meaning for General Formula (I-2)).

There are no particular limitations on the kind of the compound that can be used in combination, and the compounds are combined according to the required performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention. Furthermore, 3 kinds of compounds are used according to another embodiment of the present invention.

The content of the compound represented by General Formula (I-3) in the liquid crystal composition of the present invention needs to be appropriately adjusted according to the required performance such as solubility at low temperature, transition temperature, electrical reliability, birefringence, process suitability, dropping marks, image burn-in, and dielectric constant anisotropy.

A preferred range of the content is as described in the table given below.

The content of the compound represented by General Formula (I-3) relative to the total mass of the liquid crystal composition of the present invention is, for example, 3% to 30% by mass according to an embodiment of the present invention. Alternatively, the content is 4% to 30% by mass according to another embodiment of the present invention. The content is 15% to 30% by mass according to another embodiment of the present invent ion. The content is 25% to 30% by mass according to another embodiment of the present invention. Furthermore, the content is 3% to 25% by mass according to another embodiment of the present invention. Furthermore, the content is 3% to 20% by mass according to another embodiment of the present invention. Furthermore, the content is 3% to 15% by mass according to another embodiment of the present invention. Furthermore, the content is 3% to 5% by mass according to another embodiment of the present invent ion.

In a case in which the solubility at low temperature is regarded as important, it is more effective if the content is set to a larger value, and on the contrary, in a case in which the response speed is regarded as important, it is more effective if the content is set to a smaller value. Furthermore, in a case in which dropping marks or image burn-in characteristics are ameliorated, it is preferable to set the range of the content to an intermediate value.

Furthermore, the compound represented by General Formula (I-3) is preferably a compound selected from the group of compounds represented by Formula (4.1) to Formula (4.3), and preferably a compound represented by Formula (4.3).

[Chemical Formula 36]

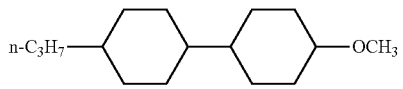

(4.1)

[Chemical Formula 37]

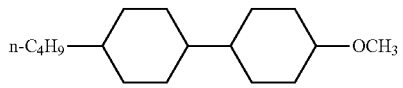

(4.2)

[Chemical Formula 38]

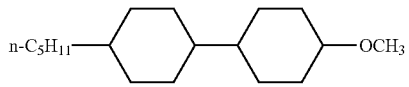

(4.3)

The content of the compound represented by Formula (4.3) is preferably from 2% to 30% by mass, preferably from 4% by mass to 30% by mass, preferably from 6% by mass to 30% by mass, preferably from 8% by mass to 30% by mass, preferably from 10% by mass to 30% by mass, preferably from 12% by mass to 30% by mass, preferably from 14% by mass to 30% by mass, preferably from 16% by mass to 30% by mass, preferably from 18% by mass to 25% by mass, preferably from 20% by mass to 24% by mass, and particularly preferably from 22% by mass to 23% by mass, relative to the total mass of the liquid crystal composition of the present invention.

Furthermore, the compound represented by General Formula (I) related to the present invention is preferably a compound selected from the group of compounds represented by General Formula (I-0):

It is preferable that at least one is selected from the group of compounds represented by the formula:

[Chemical Formula 39]

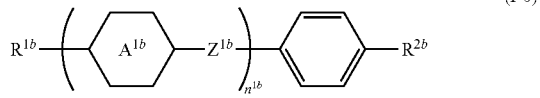

(I-0)

(wherein in General Formula (I-0), $R^{1b}$ has the same meaning as $R^1$ in General Formula (L); $R^{2b}$ has the same meaning as $R^2$ in General Formula (L); $n^{1b}$ represents 1 or 2; $A^{1b}$ has the same meaning as $A^1$ in General Formula (L); and $Z^{1b}$ has the same meaning as $Z^1$ in General Formula (L)).

The content of the compound represented by General Formula (I-0) in the liquid crystal composition of the present invention is preferably from 1% by mass to 55% by mass, preferably from 1% by mass to 50% by mass, and preferably from 5% by mass to 50% by mass, relative to the total mass of the liquid crystal composition of the present invention. Above all, the content is preferably 9% by mass to 47% by mass or less, from 9% by mass to 15% by mass, from 11% by mass to 44% by mass, from 15% by mass to 32% by mass, from 20% by mass to 35% by mass, from 23% by mass to 26% by mass, from 24% by mass to 40% by mass, from 25% by mass to 36% by mass, from 28% by mass to 38% by mass, from 30% by mass to 40% by mass, from 30% by mass to 39% by mass, from 30% by mass to 38% by mass, from 33% by mass to 47% by mass, from 35% by mass to 44% by mass, from 35% by mass to 40% by mass, from 38% by mass to 45% by mass, or from 39% by mass to 47% by mass.

The content of the compound represented by Formula (2.3) in the liquid crystal composition of the present invention is preferably from 1% by mass to 30% by mass, preferably 1% by mass to 25% by mass or less, preferably from 3% by mass to 25% by mass, preferably from 4% by mass to 22% by mass, preferably from 5% by mass to 22% by mass, preferably from 11% by mass to 22% by mass, preferably from 13% by mass to 22% by mass, preferably from 4% by mass to 16% by mass, preferably from 4% by mass to 15% by mass, preferably from 4% by mass to 10% by mass, preferably from 5% by mass to 10% by mass, preferably from 12% by mass to 15% by mass, and preferably from 13% by mass to 16% by mass, relative to the total mass of the liquid crystal composition of the present invention.

The content of the compound represented by General Formula (I) in the liquid crystal composition of the present invention needs to be appropriately adjusted according to the required performance such as solubility at low temperature, transition temperature, electrical reliability, birefringence, process suitability, viscosity, dropping marks, image burn-in, and dielectric constant anisotropy.

Particularly, when a compound represented by General Formula (II-2) that will be described below is included in the composition, it is preferable from the viewpoint of increasing the response speed of the liquid crystal composition.

Furthermore, the compound represented by General Formula (I) related to the present invention is preferably a compound selected from the group of compounds represented by General Formula (I-4):

[Chemical Formula 40]

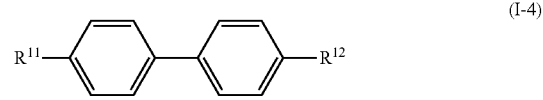

(I-4)

(wherein in General Formula (I-4), $R^{11}$ and $R^{12}$ have the same meanings as the meanings for General Formula (L), respectively).

There are no particular limitations on the kind of the compounds that can be used in combination, and the compounds are combined according to the required performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention.

The content of the compound represented by General Formula (I-4) in the liquid crystal composition of the present invention needs to be appropriately adjusted according to the required performance such as solubility at low temperature, transition temperature, electrical reliability, birefringence, process suitability, dropping marks, image burn-in, and dielectric constant anisotropy.

Particularly, when a compound of Formula (5.4) that will be described below is included in the composition, it is preferable from the viewpoint of increasing the response speed of the liquid crystal composition. Furthermore, it is also preferable from the viewpoint of the even-odd effect or the elastic coefficient ($K_{33}$).

The content of the compound represented by General Formula (I-4) relative to the total mass of the liquid crystal composition of the present invention is, for example, 2% to 30% by mass according to an embodiment of the present invention. Alternatively, the content is 5% to 30% by mass according to another embodiment of the present invention. The content is 6% to 30% by mass according to another embodiment of the present invention. Furthermore, the content is 8% to 30% by mass according to still another embodiment of the present invention. Furthermore, the content is 10% to 30% by mass according to still another embodiment of the present invention. Furthermore, the content is 12% to 30% by mass according to still another embodiment of the present invention. Furthermore, the content is 15% to 30% by mass according to still another embodiment of the present invention. Furthermore, the content is 20% to 30% by mass according to still another embodiment of the present invention. Furthermore, the content is 25% to 30% by mass according to still another embodiment of the present invention. Furthermore, the content is 2% to 25% by mass according to still another embodiment of the present invention. Furthermore, the content is 2% to 20% by mass according to still another embodiment of the present invention. Furthermore, the content is 2% to 15% by mass according to still another embodiment of the present invention. Furthermore, the content is 2% to 10% by mass according to still another embodiment of the present invention. Furthermore, the content is 5% to 8% by mass according to still another embodiment of the present invention.

In regard to the liquid crystal composition related to the present invention, there are no particular limitations on the kind of the compound that can be used in combination with the compound represented by General Formula (I-4), and the compounds are combined according to the required performance such as solubility at low temperature, transition temperature, electrical reliability, and birefringence. The compound to be used is, for example, of 1 to 1.0 kinds according to an embodiment of the present invention. Alternatively, 1 to 8 kinds of compounds are used according to another embodiment of the present invention. Furthermore, 1 to 5 kinds of compounds are used according to another embodiment of the present invention. According to another embodiment, 1 to 3 kinds of compounds are used.

In a case in which high birefringence is to be obtained, it is more effective if the content is set to a larger value, and on the contrary, in a case in which a high Tni is regarded as important, it is more effective if the content is set to a smaller value. Furthermore, in a case in which dropping marks or image burn-in characteristics are to be ameliorated, it is preferable to set the range of the content to an intermediate value.

In addition, the compound represented by General Formula (I-4) is preferably a compound selected from the group of compounds represented by Formula (5.1) to Formula (5.4), and more preferably a compound represented by any one of Formula (5.2) to Formula (5.7). It is even more preferable that the composition includes at least one compound selected from the group of compounds consisting of Formula (5.2) to Formula (5.4).

It is preferable that the skeleton represented by general Formula (I-4) contains an alkenyl group having 1 to 8 carbon atoms on one of the terminal substituents, from the viewpoint of rapid responsiveness of the liquid crystal composition.

[Chemical Formula 41]

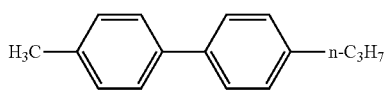

(5.1)

[Chemical Formula 42]

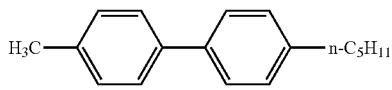

(5.2)

[Chemical Formula 43]

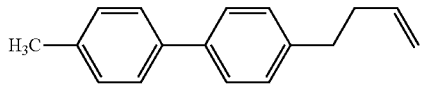

(5.3)

[Chemical Formula 44]

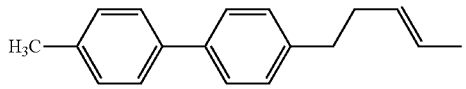

(5.4)

[Chemical Formula 45]

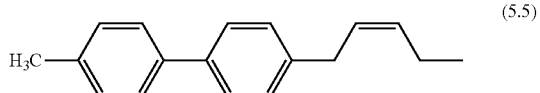

(5.5)

[Chemical Formula 46]

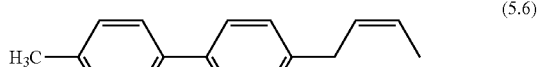

(5.6)

[Chemical Formula 47]

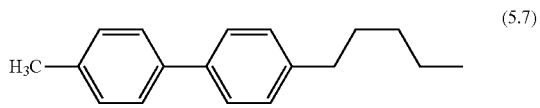

(5.7)

Particularly, the content of the compounds represented by Formulae (5.1) to (5.7) is preferably from 1% by mass to 30% by mass relative to the total mass of the liquid crystal composition of the present invention. Above all, the content is preferably, for example, from 4% by mass to 30% by mass, from 6% by mass to 30% by mass, from 8% by mass to 30% by mass, from 10% by mass to 30% by mass, from 12% by mass to 30% by mass, from 14% by mass to 30% by mass, from 16% by mass to 30% by mass, from 18% by mass to 30% by mass, from 20% by mass to 30% by mass, from 22% by mass to 30% by mass, from 23% by mass to 30% by mass, from 24% by mass to 30% by mass, from 25% by mass to 30% by mass, or from 4% by mass to 6% by mass, from 4% by mass to 8% by mass, from 4% by mass to 10% by mass, from 4% by mass to 12% by mass, from 4% by mass to 14% by mass, from 4% by mass to 16% by mass, from 4% by mass to 18% by mass, from 4% by mass to 20% by mass, from 4% by mass to 22% by mass, from 4% by mass to 23% by mass, from 4% by mass to 24% by mass, from 4% by mass to 25% by mass, from 2% by mass to 25% by mass, from 2% by mass to 20% by mass, or from 2% by mass to 15% by mass.

Furthermore, the compound represented by General Formula (I) related to the present invention is preferably a compound selected from the group of compounds represented by General Formula (I-5):

[Chemical Formula 48]

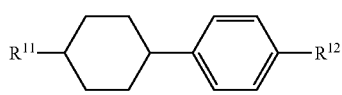

(I-5)

(wherein in General Formula (I-5), $R^{11}$ and $R^{12}$ have the same meanings as the meanings for General Formula (I), respectively).

There are no particular limitations on the kind of the compounds that can be used in combination, and the compounds are combined according to the required performance such as solubility at low temperature, transition temperature, electrical reliability, and birefringence. The compound to be used is, for example, of one kind according to an embodiment of the present invention. Alternatively, two kinds of compounds are used according to another embodiment of the present invention.

The content of the compound represented by General Formula (I-5) in the liquid crystal composition of the present invention needs to be appropriately adjusted according to the required performance such as solubility at low temperature, transition temperature, electrical reliability, birefringence, process suitability, dropping marks, image burn-in, and dielectric constant anisotropy.

A preferred range of the content is as described in the table given below.

The content of the compound represented by General Formula (I-5) relative to the total mass of the liquid crystal composition of the present invention is, for example, 1% to 30% by mass according to an embodiment of the present invention. Alternatively, the content is 1% to 25% by mass according to another embodiment of the present invention. The content is 1% to 20% by mass according to another embodiment of the present invention. Furthermore, the content is 1% to 15% by mass according to still another embodiment of the present invention. Furthermore, the content is 1% to 11% by mass according to still another embodiment of the present invention. Furthermore, the content is 1% to 8% by mass according to still another embodiment of the present invention. Furthermore, the content is 1% to 5% by mass according to still another embodiment of the present invention. Furthermore, the content is 1% to 4% by mass according to still another embodiment of the present invention. Furthermore, the content is 4% to 11% by mass according to still another embodiment of the present invention. Furthermore, the content is 5% to 11% by mass according to still another embodiment of the present invention. Furthermore, the content is 8% to 11% by mass according to still another embodiment of the present invention. Furthermore, the content is 10% to 11% by mass according to still another embodiment of the present invention.

In a case in which the solubility at low temperature is regarded as important, it is more effective if the content is set to a larger value, and on the contrary, in a case in which the response speed is regarded as important, it is more effective if the content is set to a smaller value. Furthermore, in a case in which the dropping marks or image burn-in characteristics are to be ameliorated, it is preferable to set the range of the content to an intermediate value.

Furthermore, the compound represented by General Formula (I-5) is preferably a compound selected from the group of compounds represented by Formula (6.1) to Formula (6.6), and preferably a compound represented by Formula (6.3), Formula (6.4), or Formula (6.6).

[Chemical Formula 49]

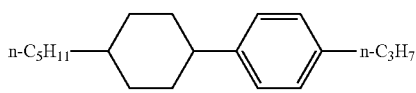
(6.1)

[Chemical Formula 50]

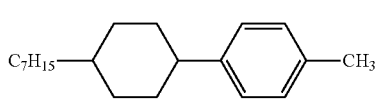
(6.2)

[Chemical Formula 51]

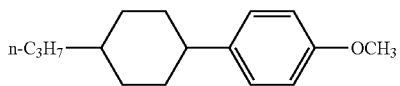
(6.3)

[Chemical Formula 52]

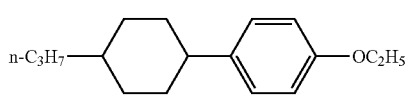
(6.4)

[Chemical Formula 53]

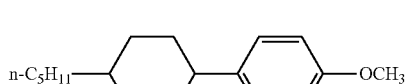
(6.5)

[Chemical Formula 54]

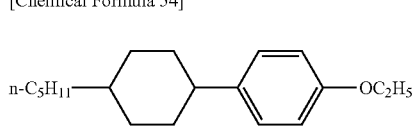
(6.6)

The content of the compounds represented by Formulae (6.1) to (6.6) is, for example, 1% to 30% by mass according to an embodiment of the present invention. Alternatively, the content is 1% to 25% by mass according to another embodiment of the present invention. Furthermore, the content is 1% to 20% by mass according to another embodiment of the present invention. Furthermore, the content is 1% to 15% by mass according to still another embodiment of the present invention. Furthermore, the content is 1% to 11% by mass according to still another embodiment of the present invention. Furthermore, the content is 1% to 8% by mass according to still another embodiment of the present invention. Furthermore, the content is 1% to 5% by mass according to still another embodiment of the present invention. Furthermore, the content is 1% to 4% by mass according to still another embodiment of the present invention. Furthermore, the content is 4% to 11% by mass according to still another embodiment of the present invention. Furthermore, the content is 5% to 11% by mass according to still another embodiment of the present invention. Furthermore, the content is 6% to 11% by mass according to still another embodiment of the present invention. Furthermore, the content is 8% to 11% by mass according to still another embodiment of the present invention.

The liquid crystal composition of the present invention may further include compounds represented by Formula (6.7) to Formula (6.11), which have structures similar to that of the compound represented by General Formula (I-5).

[Chemical Formula 55]

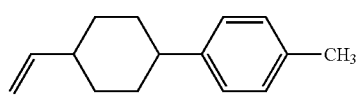
(6.7)

[Chemical Formula 56]

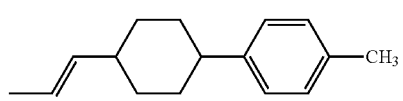
(6.8)

[Chemical Formula 57]

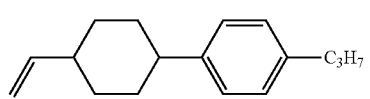
(6.9)

-continued

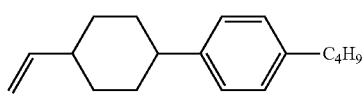

(6.10)

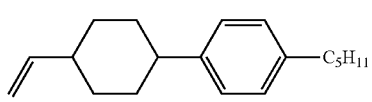

(6.11)

It is preferable to adjust the content of the compound represented by Formula (6.7) to Formula (6.1.0) according to the required performance such as solubility at low temperature, transition temperature, electrical reliability, and birefringence.

The content of the compounds represented by Formulae (6.7) to (6.10) is, for example, 1% to 15% by mass according to an embodiment of the present invention. Alternatively, the content is 1% to 14% by mass according to another embodiment of the present invention. Furthermore, the content is 1% to 12% by mass according to another embodiment of the present invention. Furthermore, the content is 1% to 11% by mass according to still another embodiment of the present invention. Furthermore, the content is 1% to 10% by mass according to still another embodiment of the present invention. Furthermore, the content is 1% to 9% by mass according to still another embodiment of the present invention. Furthermore, the content is 1% to 5% by mass according to still another embodiment of the present invention. Furthermore, the content is 1% to 4% by mass according to still another embodiment of the present invention. Furthermore, the content is 3% to 11% by mass according to still another embodiment of the present invention. Furthermore, the content is 4% to 11% by mass according to still another embodiment of the present invention. Furthermore, the content is 5% to 11% by mass according to still another embodiment of the present invention. Furthermore, the content is 6% to 11% by mass according to still another embodiment of the present invention.

Furthermore, the compound represented by General Formula (A) related to the present invention is preferably a compound selected from the group of compounds represented by General Formula (I-6):

[Chemical Formula 58]

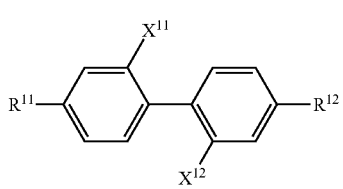

(I-6)

(wherein in General Formula (I-6), $R^{11}$ and $R^{12}$ have the same meanings as the meanings for General Formula (I), respectively).

The content of the compound represented by General Formula (I-6) is preferably from 2% by mass to 30% by mass, preferably from 4% by mass to 30% by mass, preferably from 5% by mass to 30% by mass, preferably from 6% by mass to 30% by mass, preferably from 9% by mass to 30% by mass, preferably from 12% by mass to 30% by mass, preferably from 14% by mass to 30% by mass, preferably from 16% by mass to 30% by mass, preferably from 1.8% by mass to 25% by mass, preferably from 20% by mass to 24% by mass, and preferably from 22% by mass to 23% by mass, relative to the total mass of the liquid crystal composition of the present invention. Furthermore, the compound represented by Formula (I-6) is preferably a compound represented by Formula (7.1).

[Chemical Formula 59]

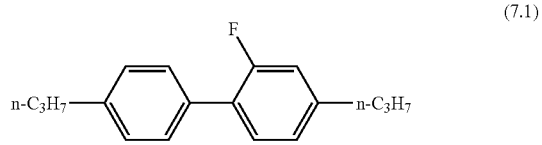

(7.1)

Furthermore, the compound represented by General Formula (I) is preferably a compound selected from the group of compounds represented by General Formula (I-7):

[Chemical Formula 60]

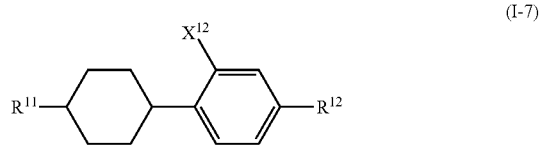

(I-7)

(wherein $R^{11}$ and $R^{12}$ have the same meanings as the meanings for General Formula (I), respectively).

The content of the compound represented by General Formula (I-7) relative to the total mass of the liquid crystal composition of the present invention is preferably from 1% by mass to 20% by mass, preferably from 1% by mass to 15% by mass, preferably from 1% by mass to 10% by mass, and preferably from 1% by mass to 5% by mass.

Furthermore, the compound represented by General Formula (I-7) is preferably a compound represented by Formula (8.1):

[Chemical Formula 61]

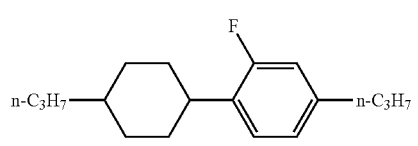

(8.1)

Furthermore, the compound represented by General Formula (I) is preferably a compound selected from the group of compounds represented by General Formula (I-8):

[Chemical Formula 62]

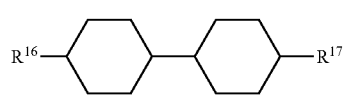

(I-8)

(wherein $R^{16}$ and $R^{17}$ each independently represent an alkenyl group having 2 to 5 carbon atoms).

There are no particular limitations on the kind of the compounds that can be used in combination, and it is preferable to use one kind to three kinds in combination according to the required performance such as solubility at low temperature, transition temperature, electrical reliability, and birefringence. Furthermore, the content of the compound represented by General Formula (I-8) is preferably 1% to 30% by mass, preferably 1% to 25% by mass, preferably 1% to 20% by mass, preferably 1% to 18% by mass, preferably 3% to 18% by mass, preferably 4% to 9% by mass, and preferably 4% to 6% by mass, relative to the total mass of the liquid crystal composition of the present invention, according to the required performance such as solubility at low temperature, transition temperature, electrical reliability, birefringence, process suitability, dropping marks, image burn-in, and dielectric constant anisotropy.

Furthermore, the compound represented by General Formula (I-8) is preferably a compound selected from the group of compounds represented by Formula (9.1) to Formula (9.10), and preferably a compound represented by Formula (9.2), Formula (9.4), or Formula (9.7).

[Chemical Formula 63]

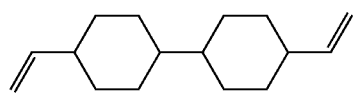
(9.1)

[Chemical Formula 64]

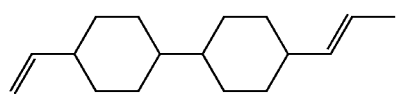
(9.2)

[Chemical Formula 65]

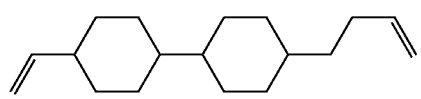
(9.3)

[Chemical Formula 66]

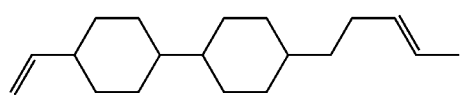
(9.4)

[Chemical Formula 67]

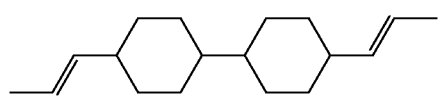
(9.5)

[Chemical Formula 68]

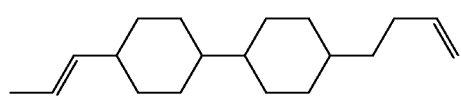
(9.6)

[Chemical Formula 69]

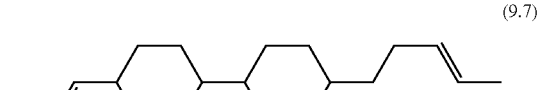
(9.7)

[Chemical Formula 70]

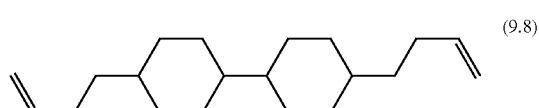
(9.8)

-continued

[Chemical Formula 71]

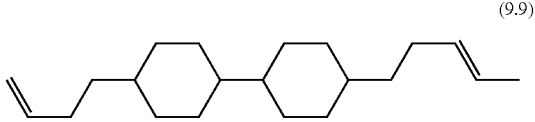
(9.9)

[Chemical Formula 72]

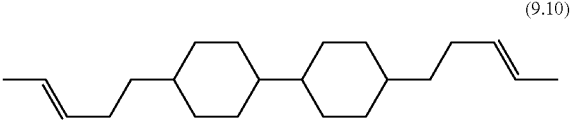
(9.10)

Furthermore, the compound represented by General Formula (L) related to the present invention is preferably, for example, a compound selected from compounds represented by General Formula (II)

[Chemical Formula 73]

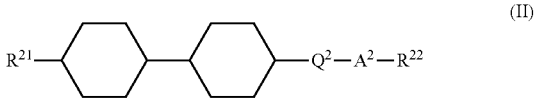
(II)

(wherein in General Formula (II), $R^{21}$ and $R^{22}$ each independently represent an alkenyl group having 2 to 5 carbon atoms, an alkyl group having 1 to 5 carbon atoms, or an alkoxy group having 1 to 4 carbon atoms; $A^2$ represents a 1,4-cyclohexylene group or a 1,4-phenylene group; and $Q^2$ represents a single bond, —COO—, —$CH_2$—$CH_2$—, or —$CF_2O$—).

There are no particular limitations on the kind of the compounds that can be used in combination, and the compounds are combined according to the required performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention. Furthermore, 3 kinds of compounds are used according to another embodiment of the present invention. Furthermore, 4 kinds of compounds are used according to another embodiment of the present invention.

The content of the compound represented by General Formula (II) in the liquid crystal composition of the present invention needs to be appropriately adjusted according to the required performance such as solubility at low temperature, transition temperature, electrical reliability, birefringence, process suitability, dropping marks, image burn-in, and dielectric constant anisotropy.

The content of the compound represented by General Formula (II) relative to the total mass of the liquid crystal composition of the present invention is, for example, 3% to 35% by mass according to an embodiment of the present invention. Alternatively, the content is 3% to 30% by mass according to another embodiment of the present invention. Furthermore, the content is 3% to 25% by mass according to another embodiment of the present invention. Furthermore, the content is 3% to 21% by mass according to still another embodiment of the present invention. Furthermore, the content is 3% to 20% by mass according to still another embodiment of the present invention. Furthermore, the content is 3% to 18% by mass according to still another embodiment of the present invention. Furthermore, the content is 3% to 15% by mass according to still another embodiment of the present invention. Furthermore, the content is 3% to 12% by mass according to still another embodiment of the present invention. Furthermore, the content is 4% to 21% by mass according to still another embodiment of the present invention. Furthermore, the content is 11% to 21% by mass according to still another embodiment of the present invention. Furthermore, the content is 13% to 21% by mass according to still another embodiment of the present invention. Furthermore, the content is 15% to 21% by mass according to still another embodiment of the present invention. Furthermore, the content is 16% to 21% by mass according to still another embodiment of the present invention. Furthermore, the content is 4% to 12% by mass according to still another embodiment of the present invention. Furthermore, the content is 11% to 20% by mass according to still another embodiment of the present invention. Furthermore, the content is 13% to 15% by mass according to still another embodiment of the present invention. Furthermore, the content is 15% to 18% by mass according to still another embodiment of the present invention.

Furthermore, the compound represented by General Formula (II) is preferably, for example, a compound selected from the group of compounds represented by General Formula (II-1):

[Chemical Formula 74]

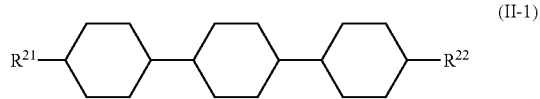

(II-1)

(wherein in General Formula (II-1), $R^{21}$ and $R^{22}$ have the same meanings as the meanings for General Formula (II), respectively).

It is preferable to adjust the content of the compound represented by General Formula (II-1) according to the required performance such as solubility at low temperature, transition temperature, electrical reliability, and birefringence.

A preferred range of the content is as described in the table given below.

It is preferable to adjust the content of the compound represented by General Formula (II-1) according to the required performance such as solubility at low temperature, transition temperature, electrical reliability, and birefringence. The content is preferably from 4% by mass to 24% by mass, preferably from 8% by mass to 18% by mass, and more preferably from 12% by mass to 14% by mass.

Furthermore, the compound represented by General Formula (II-1) is preferably, for example, a compound represented by Formula (10.1) or Formula (10.2):

[Chemical Formula 75]

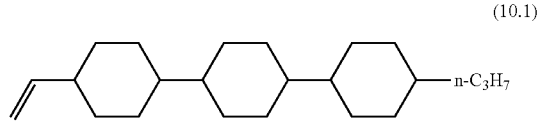

(10.1)

-continued

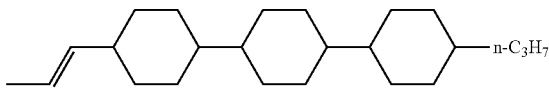

(10.2)

Furthermore, the compound represented by General Formula (II) related to the present invention is preferably, for example, a compound selected from the group of compounds represented by General Formula (II-2):

[Chemical Formula 76]

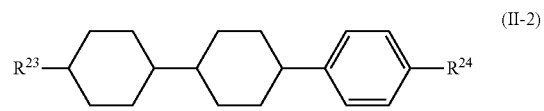

(II-2)

(wherein in General Formula (II-2), $R^{23}$ represents an alkenyl group having 2 to 5 carbon atoms; and $R^{24}$ represents an alkyl group having 1 to 5 carbon atoms, or an alkoxy group having 1 to 4 carbon atoms).

There are no particular limitations on the kind of the compounds that can be used in combination, and the compounds are combined according to the required performance such as solubility at low temperature, transition temperature, electrical reliability, and birefringence. When compounds of Formula (11.1) and Formula (11.2) are included in a liquid crystal composition, these compounds contribute to an improvement in the parameters related to rapid response of the liquid crystal composition. Furthermore, the compound to be used is, for example, of one kind according to an embodiment of the present invention. Alternatively, 2 or more kinds of compounds are used according to another embodiment of the present invention.

The content of the compound represented by General Formula (II-2) in the liquid crystal composition of the present invention needs to be appropriately adjusted according to the required performance such as solubility at low temperature, transition temperature, electrical reliability, birefringence, process suitability, dropping marks, image burn-in, rapid responsiveness, and dielectric constant anisotropy.

A preferred content of the compound represented by General Formula (II-2) is, for example, 2% to 45% by mass relative to the total mass of the liquid crystal composition of the present invention. Above all, the content is preferably, for example, 5% to 45% by mass, 8% to 45% by mass, 11% to 45% by mass, 14% to 45% by mass, 17% to 35% by mass, 17% to 31% by mass, 18% to 28% by mass, 18% to 27% by mass, 18% to 26% by mass, or 2% to 45% by mass, 3% to 40% by mass, 4% to 35% by mass, 5% to 30% by mass, 6% to 25% by mass, 7% to 24% by mass, 8% to 23% by mass, or 9% to 23% by mass.

Furthermore, the compound represented by General Formula (II-2) related to the present invention is preferably, for example, a compound represented by any one of Formula (11.1) to Formula (11.9):

[Chemical Formula 77]

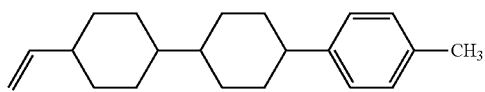
(11.1)

[Chemical Formula 78]

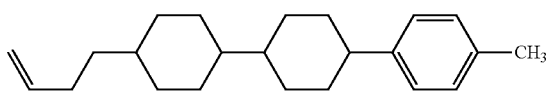
(11.2)

[Chemical Formula 79]

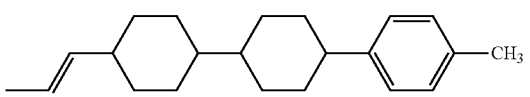
(11.3)

[Chemical Formula 80]

(11.4)

[Chemical Formula 81]

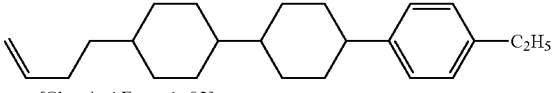
(11.5)

[Chemical Formula 82]

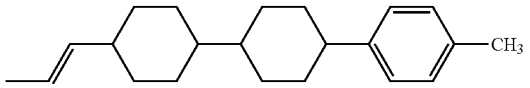
(11.6)

[Chemical Formula 83]

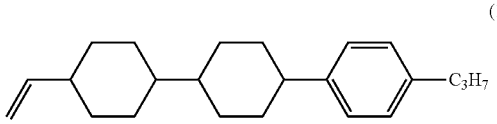
(11.7)

[Chemical Formula 84]

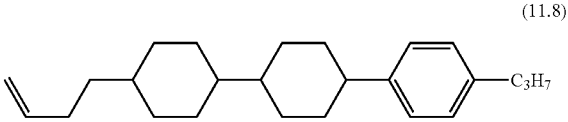
(11.8)

[Chemical Formula 85]

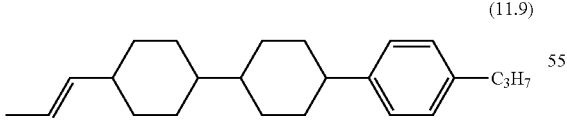
(11.9)

According to the required performance such as solubility at low temperature, transition temperature, electrical reliability, and birefringence, the liquid crystal composition may include one of the compounds represented by Formulae (11.1) to (11.9), may include two of the compounds represented by Formulae (11.1) to (11.9), or may include three of the compounds represented by Formulae (11.1) to (11.9). Furthermore, the liquid crystal composition may include one compound represented by Formula (11.1), may include one compound represented by Formula (11.2), or may include both a compound represented by Formula (11.1) and a compound represented by Formula (11.2), or the liquid crystal composition may include all of compounds represented by Formula (11.1) to Formula (11.3). It is more preferable that the liquid crystal composition includes compounds represented by Formula (11.1) and/or Formula (11.2), and preferred ranges of the contents of the respective compounds are as described below.

The content of each of the compounds represented by Formula (11.1) in the liquid crystal composition of the present invention is preferably from 1% by mass to 55% by mass, preferably from 1% by mass to 35% by mass, and preferably from 1% by mass to 25% by mass, relative to the total mass of the liquid crystal composition of the present invention. Above all, the content is preferably 1% by mass to 20% by mass or less, from 2% by mass to 19% by mass, from 3% by mass to 1.8% by mass, from 3% by mass to 16% by mass, or from 4% by mass to 15% by mass.

The content of each of the compounds represented by Formula (11.2) in the liquid crystal composition of the present invention is preferably from 1% by mass to 55% by mass, preferably from 1% by mass to 35% by mass, and preferably from 1% by mass to 25% by mass, relative to the total mass of the liquid crystal composition of the present invention. Above all, the content is preferably 1% by mass to 20% by mass or less, from 2% by mass to 19% by mass, from 3% by mass to 18% by mass, from 3% by mass to 16% by mass, or from 4% by mass to 15% by mass.

In regard to the liquid crystal composition related to the present invention, it is preferable that the liquid crystal composition includes both a compound represented by Formula (11.1) and a compound represented by Formula (11.2), from the viewpoint of compatibility. In a case in which the liquid crystal composition includes both the relevant compound represented by Formula (11.1) and the relevant compound represented by Formula (11.2), a preferred range of the total content of the two compounds is preferably from 5% by mass to 35% by mass, preferably from 6% by mass to 30% by mass, and preferably from 7% by mass to 28% by mass, relative to the total mass of the liquid crystal composition of the present invention. Above all, a preferred range is 8% by mass to 27% by mass or less, from 9% by mass to 28% by mass, or from 10% by mass to 25% by mass.

Furthermore, the compound represented by General Formula (II) is preferably, for example, a compound selected from the group of compounds represented by General Formula (II-3):

[Chemical Formula 86]

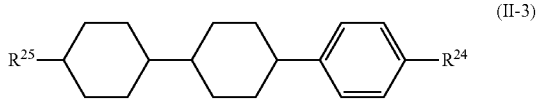
(II-3)

(wherein in General Formula (II-3), $R^{25}$ represents an alkyl group having 1 to 5 carbon atoms; and $R^{24}$ represents an alkyl group having 1 to 5 carbon atoms, or an alkoxy group having 1 to 4 carbon atoms).

There are no particular limitations on the kind of the compounds that can be used in combination; however, it is preferable that one kind to three kinds among these compounds are included according to the required performance such as solubility at low temperature, transition temperature, electrical reliability, and birefringence.

The content of the compound represented by General Formula (II-3) needs to be appropriately adjusted according to the required performance such as solubility at low temperature, transition temperature, electrical reliability, birefringence, process suitability, dropping marks, image burn-in, and dielectric constant anisotropy.

A preferred content of the compound represented by General Formula (II-3) is, for example, 2% to 45% by mass relative to the total mass of the liquid crystal composition of the present invention. Above all, for example, the content is preferably 5% to 45% by mass, 8% to 45% by mass, 11% to 45% by mass, 14% to 45% by mass, 17% to 45% by mass, 20% to 45% by mass, 23% to 45% by mass, 26% to 45% by mass, 29% to 45% by mass, or 2% to 45% by mass, 2% to 40% by mass, 2% to 35% by mass, 2% to 30% by mass, 2% to 25% by mass, 2% to 20% by mass, 2% to 15% by mass, or 2% to 10% by mass.

Furthermore, the compound represented by General Formula (II-3) is preferably, for example, a compound represented by any one of Formula (12.1) to Formula (1.2.3):

[Chemical Formula 87]

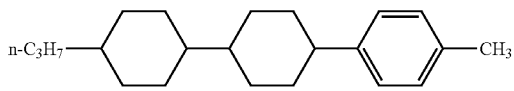

(12.1)

[Chemical Formula 88]

(12.2)

[Chemical Formula 89]

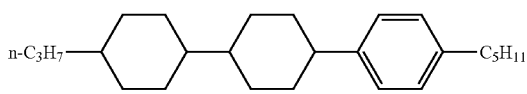

(12.3)

According to the required performance such as solubility at low temperature, transition temperature, electrical reliability, and birefringence, the liquid crystal composition may include a compound represented by Formula (12.1), may include a compound represented by Formula (12.2), or may include both a compound represented by Formula (12.1) and a compound represented by Formula (12.2). The compound represented by Formula (12.3) may be an optically active compound.

A preferred content of the compounds represented by Formulae (12.1) to (12.3) is, for example, 1% to 15% by mass relative to the total mass of the liquid crystal composition of the present invention. Above all, for example, the content is preferably 1% to 13% by mass, 1% to 10% by mass, 2% to 15% by mass, 2% to 14% by mass, 2% to 11% by mass, or 3% to 10% by mass.

Furthermore, the compound represented by General Formula (II-3) related to the present invention is preferably, for example, a compound selected from the group of compounds represented by General Formula (II-3-1):

[Chemical Formula 90]

(II-3-1)

(wherein in General Formula (II-3-1), $R^{25}$ represents an alkyl group having 1 to 5 carbon atoms; and $R^{26}$ represents an alkoxy group having 1 to 4 carbon atoms).

It is preferable to adjust the content of the compound represented by General Formula (II-3-1) according to the required performance such as solubility at low temperature, transition temperature, electrical reliability, and birefringence, and the content is preferably from 1% by mass to 24% by mass, preferably from 4% by mass to 18% by mass, and preferably from 6% by mass to 14% by mass.

Furthermore, the compound represented by General Formula (II-3-1) is preferably, for example, a compound represented by any one of Formula (1.3.1) to Formula (1.3.4), and particularly preferably a compound represented by Formula (13.3):

[Chemical Formula 91]

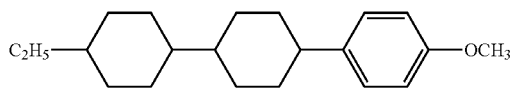

(13.1)

[Chemical Formula 92]

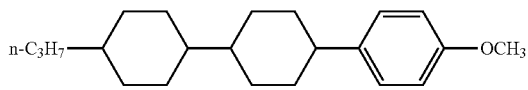

(13.2)

[Chemical Formula 93]

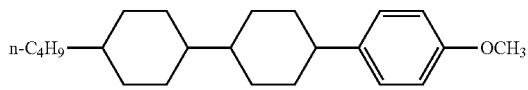

(13.3)

[Chemical Formula 94]

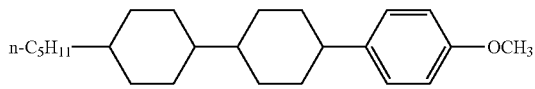

(13.4)

Furthermore, the compound represented by General Formula (II) related to the present invent ion is preferably, for example, a compound selected from the group of compounds represented by General Formula (II-4):

[Chemical Formula 95]

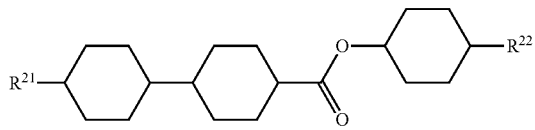

(II-4)

(wherein in General Formula (I-4), $R^{21}$ and $R^{22}$ each independently represent an alkenyl group having 2 to 5 carbon atoms, an alkyl group having 1 to 5 carbon atoms, or an alkoxy group having 1 to 4 carbon atoms).

Among these compounds, the liquid crystal composition may include only one kind of compound, or may include two or more kinds of compounds, and it is preferable to appropriately combine the compounds according to the required performance. There are no particular limitations on the kind of the compounds that can be used in combination; however, it is preferable that the liquid crystal composition includes 1 to 2 kinds of compounds among these compounds, and more preferably 1 to 3 kinds of compounds, according to the required performance such as solubility at low temperature, transition temperature, electrical reliability, and birefringence.

The content of the compound represented by General Formula (II-4) is preferably from 1% by mass to 15% by mass, preferably from 2% by mass to 15% by mass, preferably from 3% by mass to 15% by mass, preferably from 4% by mass to 12% by mass, and preferably from 5% by mass to 7% by mass, relative to the total mass of the liquid crystal composition of the present invention.

Furthermore, the compound represented by General Formula (II-4) is preferably, for example, a compound represented by any one of Formula (14.1) to Formula (14.5), and particularly preferably a compound represented by Formula (14.2) or/and Formula (14.5):

[Chemical Formula 96]

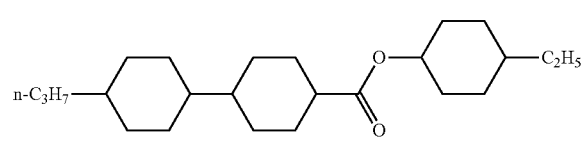
(14.1)

[Chemical Formula 97]

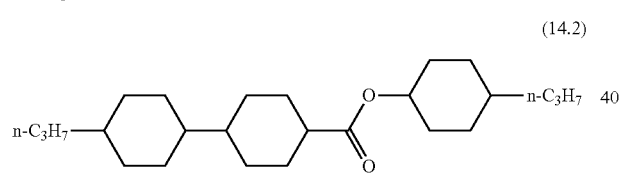
(14.2)

[Chemical Formula 98]

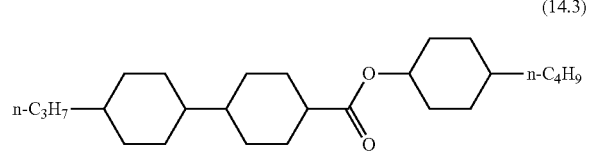
(14.3)

[Chemical Formula 99]

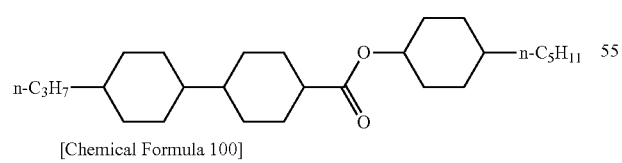
(14.4)

[Chemical Formula 100]

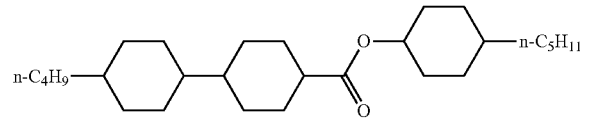
(14.5)

Furthermore, the compound represented by General Formula (L) related to the present invention is preferably a compound selected from the group of compounds represented by General Formula (III):

[Chemical Formula 101]

(III)

(wherein in General Formula (III), $R^{31}$ and $R^{32}$ each independently represent an alkenyl group having 2 to 5 carbon atoms, an alkyl group having 1 to 5 carbon atoms, or an alkoxy group having 1 to 4 carbon atoms).

Regarding the content of the compound represented by General Formula (III), it is preferable that the liquid crystal composition includes the compound represented by General Formula (III) at a proportion of from 1% by mass to 25% by mass, preferably from 2% by mass to 20% by mass, preferably from 2% by mass to 15% by mass, preferably from 2% by mass to 10% by mass, and preferably from 4% by mass to 6% by mass, relative to the total mass of the liquid crystal composition of the present invention, in view of the desired solubility, birefringence or the like.

Furthermore, the compound represented by General Formula (III) is preferably, for example, a compound represented by Formula (15.1) or Formula (15.2), and particularly preferably a compound represented by Formula (15.1):

[Chemical Formula 102]

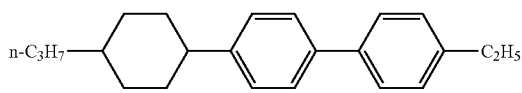
(15.1)

[Chemical Formula 103]

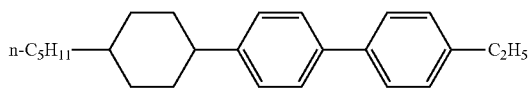
(15.2)

Furthermore, the compound represented by General Formula (III) is preferably a compound selected from the group of compounds represented by General Formula (III-1):

[Chemical Formula 104]

(III-1)

(wherein in General Formula (III-1), $R^{33}$ represents an alkenyl group having 2 to 5 carbon atoms; and $R^{32}$'s each independently represent an alkyl group having 1 to 5 carbon atoms or an alkoxy group having 1 to 4 carbon atoms).

In regard to the compound represented by General Formula (III-1), it is preferable to adjust the content of the compound according to the required performance such as solubility at low temperature, transition temperature, electrical reliability, and birefringence. The content is preferably from 4% by mass to 23% by mass, preferably from 6% by mass to 1.8% by mass, and preferably from 10% by mass to 13% by mass, relative to the total mass of the liquid crystal composition of the present invention.

The compound represented by General Formula (III-1) is preferably, for example, a compound represented by any one of Formula (16.1) to Formula (16.10):

[Chemical Formula 105]

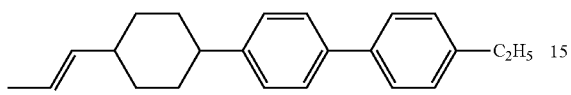
(16.1)

[Chemical Formula 106]

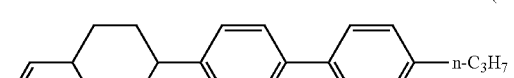
(16.2)

[Chemical Formula 107]

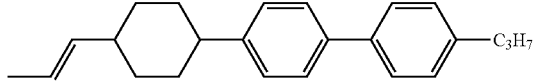
(16.3)

[Chemical Formula 108]

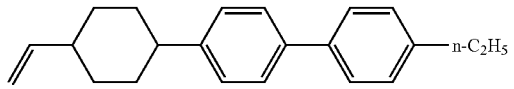
(16.4)

[Chemical Formula 109]

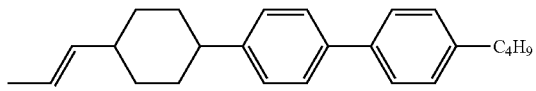
(16.5)

[Chemical Formula 110]

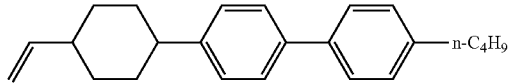
(16.6)

[Chemical Formula 111]

(16.7)

[Chemical Formula 112]

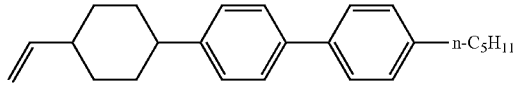
(16.8)

[Chemical Formula 113]

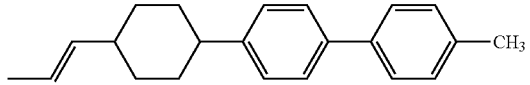
(16.9)

-continued

[Chemical Formula 114]

(16.10)

Furthermore, the compound represented by General Formula (III) is preferably a compound selected from the group of compounds represented by General Formula (III-2):

[Chemical Formula 115]

(III-2)

(wherein in General Formula (III-2), $R^{31}$ has the same meaning as the meaning for General Formula (III)).

It is preferable that the content of the compound represented by General Formula (III-2) is adjusted according to the required performance such as solubility at low temperature, transition temperature, electrical reliability, and birefringence. The content is preferably from 4% by mass to 23% by mass, preferably from 6% by mass to 18% by mass, and preferably from 10% by mass to 13% by mass, relative to the total mass of the liquid crystal composition of the present invention.

Furthermore, the relevant compound represented by General Formula (III-2) is preferably, for example, a compound selected from the group of compounds represented by Formula (17.1) to Formula (17.3), and particularly preferably a compound represented by Formula (17.3):

[Chemical Formula 116]

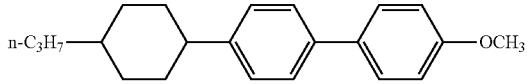
(17.1)

[Chemical Formula 117]

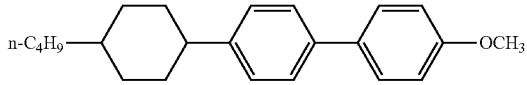
(17.2)

[Chemical Formula 118]

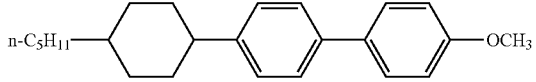
(17.3)

It is preferable that the compound represented by General Formula (L) related to the present invention is selected from the group of compounds represented by General Formula (IV):

[Chemical Formula 119]

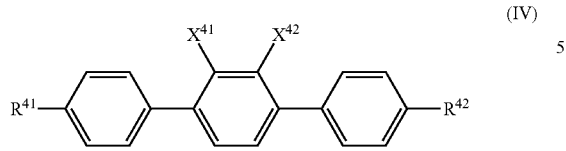

(IV)

(wherein in General Formula (IV), $R^{41}$ and $R^{42}$ each independently represent an alkyl group having 1 to 5 carbon atoms or an alkenyl group having 2 to 5 carbon atoms; and $X^{41}$ and $X^{42}$ each independently represent a hydrogen atom or a fluorine atom).

There are no particular limitations on the kind that can be used in combination with the relevant compound represented by General Formula (IV), and the compounds are appropriately combined according to the required performance such as solubility at low temperature, transition temperature, electrical reliability, and birefringence. When a compound having a structure of General Formula (IV), such as a compound represented by any one of Formula (18.1) to Formula (18.9) described below, is added to a liquid crystal composition, the Δn of the liquid crystal composition or the solubility with other components that constitute the liquid crystal composition is improved.

Regarding the kind of the compounds to be used, for example, 1 to 6 kinds of compounds are used according to an embodiment of the present invention.

The content of the compound represented by General Formula (IV) relative to the total mass of the liquid crystal composition of the present invention is, for example, 1% to 35% by mass according to an embodiment. The content is 1% to 30% by mass according to another embodiment of the present invention. Furthermore, the content is 1% to 26% by mass according to still another embodiment of the present invention. Furthermore, the content is 1% to 22% by mass according to still another embodiment of the present invention. Furthermore, the content is 1% to 10% by mass according to still another embodiment of the present invention. Furthermore, the content is 1% to 8% by mass according to still another embodiment of the present invention. Furthermore, the content is 1% to 6% by mass according to still another embodiment of the present invention. Furthermore, the content is 2% to 26% by mass according to still another embodiment of the present invention. Furthermore, the content is 3% to 26% by mass according to still another embodiment of the present invention. Furthermore, the content is 11% to 26% by mass according to still another embodiment of the present invention. Furthermore, the content is 20% to 26% by mass according to still another embodiment of the present invention. Furthermore, the content is 2% to 8% by mass according to still another embodiment of the present invention. Furthermore, the content is 2% to 6% by mass according to still another embodiment of the present invention. Furthermore, the content is 11% to 22% by mass according to still another embodiment of the present invention.

Furthermore, the compound represented by General Formula (IV) is preferably, for example, a compound selected from the group of compounds represented by General Formula (IV-1):

[Chemical Formula 120]

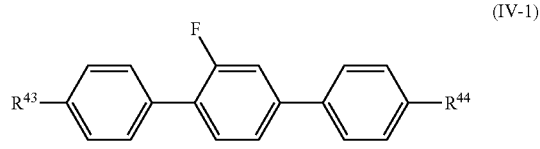

(IV-1)

(wherein in General Formula (IV), $R^{43}$ and $R^{44}$ each independently represent an alkyl group having 1 to 5 carbon atoms).

The content of the compound represented by General Formula (IV-1) needs to be appropriately adjusted according to the required performance such as solubility at low temperature, transition temperature, electrical reliability, birefringence, process suitability, dropping marks, image burn-in, and dielectric constant anisotropy.

The content of the compound represented by General Formula (IV-1) relative to the total mass of the liquid crystal composition of the present invention is, for example, 1% to 35% by mass according to an embodiment. Furthermore, the content is 1% to 30% by mass according to another embodiment of the present invention. Furthermore, the content is 1% to 26% by mass according to another embodiment of the present invention. Furthermore, the content is 1% to 22% by mass according to still another embodiment of the present invention. Furthermore, the content is 1% to 10% by mass according to still another embodiment of the present invention. Furthermore, the content is 1% to 8% by mass according to still another embodiment of the present invention. Furthermore, the content is 1% to 6% by mass according to still another embodiment of the present invention. Furthermore, the content is 2% to 26% by mass according to still another embodiment of the present invention. Furthermore, the content is 3% to 26% by mass according to still another embodiment of the present invention. Furthermore, the content is 11% to 26% by mass according to still another embodiment of the present invention. Furthermore, the content is 20% to 26% by mass according to still another embodiment of the present invention. Furthermore, the content is 2% to 8% by mass according to still another embodiment of the present invention. Furthermore, the content is 2% to 6% by mass according to still another embodiment of the present invention. Furthermore, the content is 11% to 22% by mass according to still another embodiment of the present invention.

Furthermore, the compound represented by General Formula (IV-1) is preferably, for example, a compound represented by any one of Formula (18.1) to Formula (18.9):

[Chemical Formula 121]

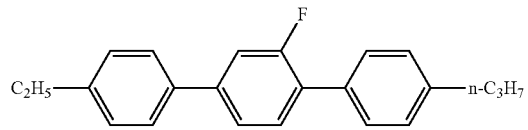

(18.1)

[Chemical Formula 122]

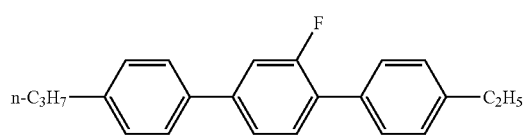

(18.2)

-continued

[Chemical Formula 123]

(18.3)

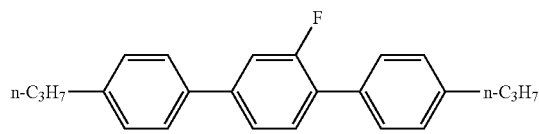

[Chemical Formula 124]

(18.4)

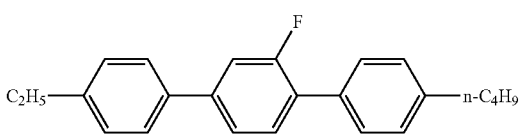

[Chemical Formula 125]

(18.5)

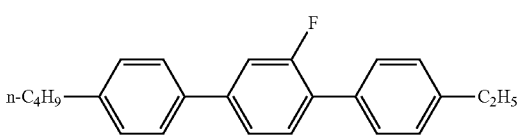

[Chemical Formula 126]

(18.6)

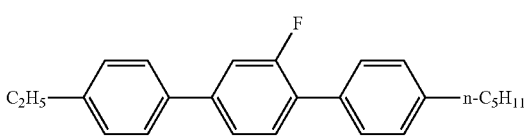

[Chemical Formula 127]

(18.7)

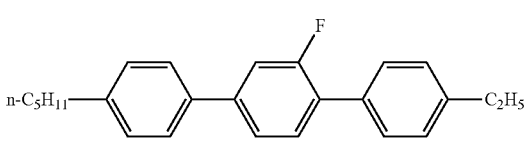

[Chemical Formula 128]

(18.8)

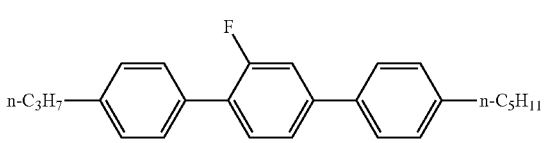

[Chemical Formula 129]

(18.9)

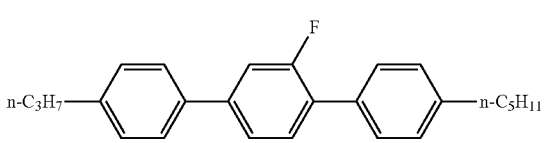

In regard to the compound represented by General Formula (IV-1), there are no particular limitations on the kind of the compound that can be used in combination therewith; however, it is preferable that the liquid crystal composition includes one kind to three kinds of compounds among these compounds, and more preferably one kind to four kinds of compounds. Furthermore, since having a broad molecular weight distribution of the compound selected from the group of compounds represented by General Formula (IV-1) is also effective for solubility, for example, it is preferable to select one from compounds represented by Formula (18.1) or (18.2), one from compounds represented by Formula (18.4) or (18.5), one from compounds represented by Formula (18.6) or Formula (18.7), and one from compounds represented by Formula (18.8) or (18.9), and appropriately combine these compounds. Among these, it is preferable that the liquid crystal composition includes compounds represented by Formula (18.1), Formula (18.3), Formula (18.4), Formula (18.6), and Formula (18.9).

Furthermore, the compound represented by General Formula (L) related to the present invention is preferably a compound selected from the group of compounds represented by General Formula (V):

[Chemical Formula 130]

(V)

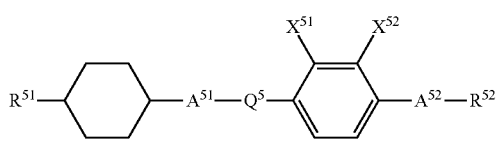

(wherein in General Formula (V), $R^{51}$ and $R^{52}$ each independently represent an alkyl group having 1 to 5 carbon atoms, an alkenyl group having 2 to 5 carbon atoms, or an alkoxy group having 1 to 4 carbon atoms; $A^{51}$ and $A^{52}$ each independently represent a 1,4-cyclohexylene group or a 1,4-phenylene group; $Q^5$ represents a single bond or —COO—; $X^{51}$ and $X^{52}$ each independently represent a fluorine atom or a hydrogen atom).

There are no particular limitations on the kind of the compound that can be used in combination, and the compounds are appropriately combined according to the required performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention. Furthermore, 3 kinds of compounds are used according to another embodiment of the present invention. Furthermore, 4 kinds of compounds are used according to another embodiment of the present invention.

The content of the compound represented by General Formula (V) relative to the total mass of the liquid crystal composition related to the present invention is, for example, 1.% to 25% by mass according to an embodiment. Furthermore, the content is 1% to 20% by mass according to another embodiment of the present invention. Furthermore, the content is 1% to 19% by mass according to still another embodiment of the present invention. Furthermore, the content is 1% to 10% by mass according to still another embodiment of the present invention. Furthermore, the content is 1% to 9% by mass according to still another embodiment of the present invention. Furthermore, the content is 1% to 8% by mass according to still another embodiment of the present invention. Furthermore, the content is 1% to 7% by mass according to still another embodiment of the present invention. Furthermore, the content is 1% to 5% by mass according to still another embodiment of the present invention. Furthermore, the content is 1% to 3% by mass according to still another embodiment of the present invention. Furthermore, the content is 1% to 2% by mass according to still another embodiment of the present invention. Furthermore, the content is 2% to 19% by mass according to still another embodiment of the present invention. Furthermore, the content is 5% to 19% by mass according to still another embodiment of the present invention. Furthermore, the content is 9% to 1.9% by mass according to still another embodiment of the present invention. Furthermore, the content is 2% to 8% by mass according to still another embodiment of the present invention. Furthermore, the content is 6% to 8% by mass according to still another embodiment of the present invention.

Furthermore, the compound represented by General Formula (V) related to the present invention is preferably a compound represented by General Formula (V-1):

[Chemical Formula 131]

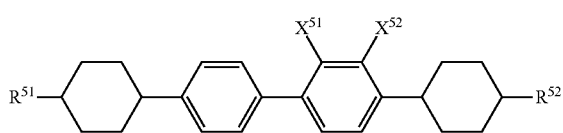
(V-1)

(wherein in General Formula (V-1), $R^{51}$, $R^{52}$, $X^{51}$, and $X^{52}$ have the same meanings as the meanings for General Formula (V), respectively).

Furthermore, the compound represented by General Formula (V-1) is preferably a compound represented by General Formula (V-1-1):

[Chemical Formula 132]

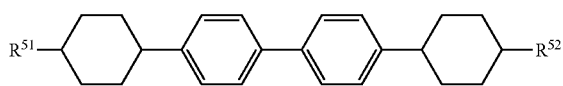
(V-1-1)

(wherein in General Formula (V-1-1), $R^{51}$ and $R^{52}$ have the same meanings as the meanings for General Formula (V)).

It is preferable that the liquid crystal composition of the present invention includes the compound represented by General Formula (V-1-1) at a proportion of from 1% by mass to 15% by mass, more preferably at a proportion of from 1% by mass to 10% by mass, preferably at a proportion of from 3% by mass to 10% by mass, preferably at a proportion of from 3% by mass to 7% by mass, preferably at a proportion of from 3% by mass to 5% by mass, and preferably at a proportion of from 3% by mass to 4% by mass, relative to the total mass of the liquid crystal composition.

Furthermore, the compound represented by General Formula (V-1-1) is preferably a compound represented by any one of Formula (20.1) to Formula (20.4), and preferably a compound represented by Formula (20.2):

[Chemical Formula 133]

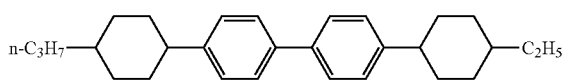
(20.1)

-continued

[Chemical Formula 134]

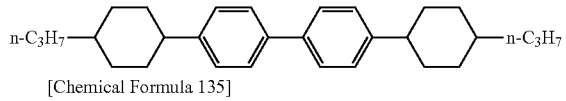
(20.2)

[Chemical Formula 135]

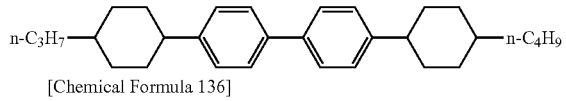
(20.3)

[Chemical Formula 136]

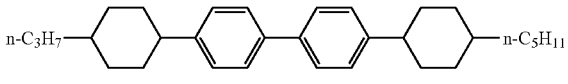
(20.4)

Furthermore, the compound represented by General Formula (V-1) related to the present invention is preferably a compound represented by General Formula (V-1-2):

[Chemical Formula 137]

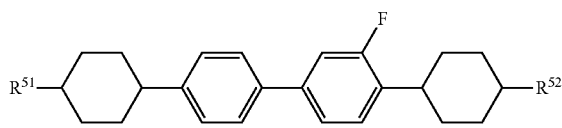
(V-1-2)

(wherein in General Formula (V-1-2), $R^{51}$ and $R^{52}$ have the same meanings as the meanings for General Formula (V), respectively).

It is preferable that the liquid crystal composition of the present invention includes the compound represented by General Formula (V-1-2) at a proportion of from 1% by mass to 15% by mass, preferably at a proportion of from 1% by mass to 10% by mass, preferably at a proportion of from 1% by mass to 7% by mass, and preferably at a proportion of from 1% by mass to 5% by mass, relative to the total mass of the liquid crystal composition.

Furthermore, the compound represented by General Formula (V-1-2) is preferably a compound represented by any one of Formula (21.1) to Formula (21.3), and preferably a compound represented by Formula (21.1):

[Chemical Formula 138]

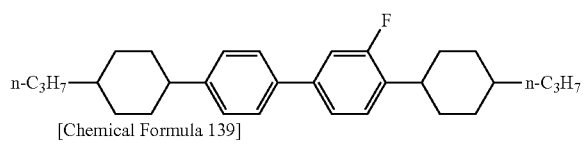
(21.1)

[Chemical Formula 139]

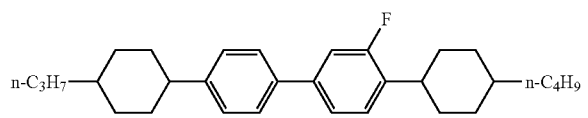
(21.2)

-continued

[Chemical Formula 140]

(21.3)

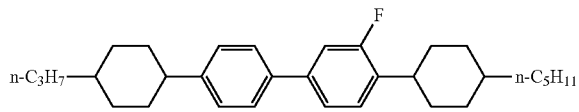

Furthermore, it is preferable that the compound represented by General Formula (V-1) related to the present invention is a compound represented by General Formula (V-1-3):

[Chemical Formula 141]

(V-1-3)

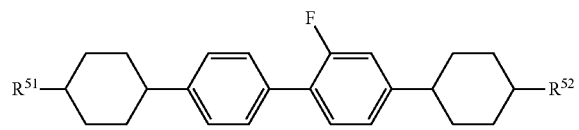

(wherein in General Formula (V-1-3), $R^{51}$ and $R^{52}$ have the same meanings as the meanings for General Formula (V), respectively).

It is preferable that the liquid crystal composition of the present invention includes the compound represented by formula (V-1-3) at a proportion of from 1% by mass to 15% by mass, preferably at a proportion of from 2% by mass to 15% by mass, preferably at a proportion of from 3% by mass to 10% by mass, and preferably at a proportion of from 4% by mass to 8% by mass, relative to the total mass of the liquid crystal composition.

Furthermore, the compound represented by General Formula (V-1-3) is a compound represented by any one of Formula (22.1) to Formula (22.3). The compound represented by General Formula (V-1-3) is preferably a compound represented by Formula (22.1).

[Chemical Formula 142]

(22.1)

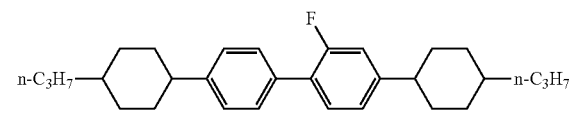

[Chemical Formula 143]

(22.2)

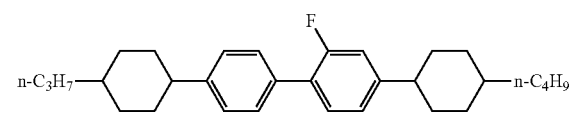

[Chemical Formula 144]

(22.3)

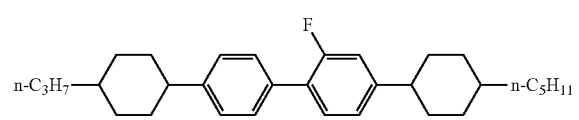

Furthermore, the compound represented by General Formula (V) related to the present invention is preferably a compound represented by General Formula (V-2):

[Chemical Formula 145]

(V-2)

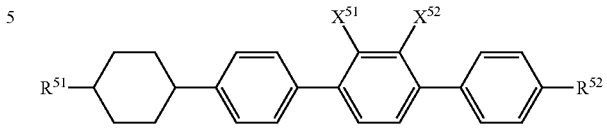

(wherein in General Formula (V-2), $R^{51}$, $R^{52}$, $X^{51}$, and $X^{52}$ have the same meanings as the meanings for General Formula (V), respectively).

There are no particular limitations on the kind of the compounds that can be used in combination, and the compounds are appropriately combined according to the required performance such as solubility at low temperature, transition temperature, electrical reliability, and birefringence. The compound to be used is, for example, of one kind according to an embodiment of the present invention. Alternatively, 2 or more kinds of compounds are used according to another embodiment of the present invention.

The content of the compound represented by General Formula (V-2) relative to the total mass of the liquid crystal composition of the present invention is, for example, 1% to 30% by mass according to an embodiment. Furthermore, the content of the compound is 2% to 25% by mass according to another embodiment of the present invention. Furthermore, the content of the compound is 5% to 19% by mass according to still another embodiment of the present invention. Furthermore, the content of the compound is 6% to 10% by mass according to still another embodiment of the present invention. Furthermore, the content of the compound is 10% to 19% by mass according to still another embodiment of the present invention. Furthermore, the content of the compound is 4% to 8% by mass according to still another embodiment of the present invention.

In a case in which the embodiment of having a liquid crystal composition of the present invent ion with a high Tni is desirable, it is preferable to adjust the content of the compound represented by General Formula (V-2) to a larger value, and in a case in which an embodiment with low viscosity is desirable, it is preferable to adjust the content to a smaller value.

Furthermore, the compound represented by General Formula (V-2) related to the present invention is preferably a compound represented by General Formula (V-2-1):

[Chemical Formula 146]

(V-2-1)

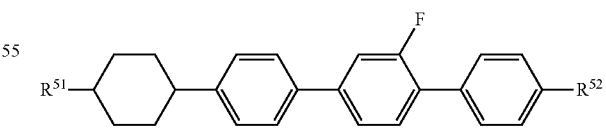

(wherein in General Formula (V-2), $R^{51}$ and $R^{52}$ have the same meanings as the meanings for General Formula (V), respectively).

Furthermore, the compound represented by General Formula (V-2-1) is preferably a compound represented by any one of Formula (23.1) to Formula (23.4), and is preferably a compound represented by Formula (23.1) or/and Formula (23.2).

[Chemical Formula 147]

(23.1)

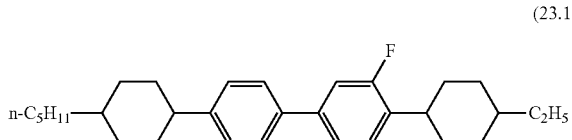

[Chemical Formula 148]

(23.2)

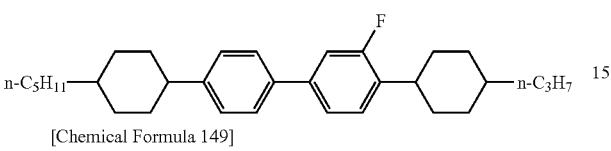

[Chemical Formula 149]

(23.3)

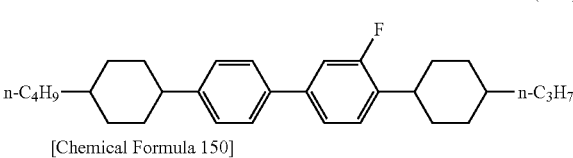

[Chemical Formula 150]

(23.4)

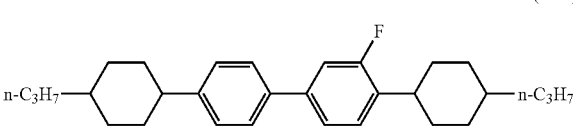

Furthermore, the compound represented by General Formula (V-2) related to the present invention is preferably a compound represented by General Formula (V-2-2):

[Chemical Formula 151]

(V-2-2)

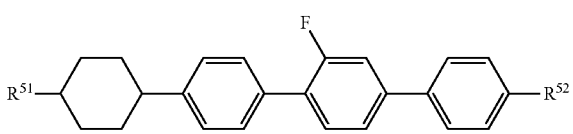

(wherein in General Formula (V-2-2), $R^{51}$ and $R^{52}$ have the same meanings as the meanings for General Formula (V), respectively).

Furthermore, the compound represented by General Formula (V-2-2) is preferably a compound represented by any one of Formula (24.1) to Formula (24.4), and preferably a compound represented by Formula (24.1) or/and Formula (24.2).

[Chemical Formula 152]

(24.1)

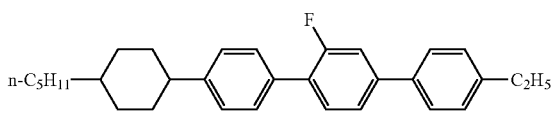

[Chemical Formula 153]

(24.2)

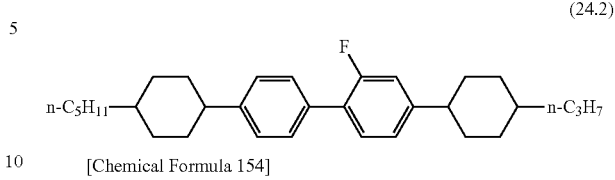

[Chemical Formula 154]

(24.3)

[Chemical Formula 155]

(24.4)

Furthermore, the compound represented by General Formula (V) related to the present invention is preferably a compound represented by General Formula (V-3):

[Chemical Formula 156]

(V-3)

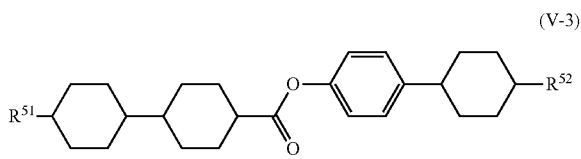

(wherein in General Formula (V-3), $R^{51}$ and $R^{52}$ have the same meanings as the meanings for General Formula (V), respectively).

There are no particular limitations on the kind of the compounds that can be used in combination, and the compounds are appropriately combined according to the required performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention. Furthermore, 3 or more kinds of compounds are used according to another embodiment of the present invention.

It is preferable that the liquid crystal composition of the present invention includes the compound represented by General Formula (V-3) at a proportion of from 1% by mass to 16% by mass, preferably from 1% by mass to 13% by mass, preferably from 1% by mass to 9% by mass, and preferably from 3% by mass to 9% by mass, relative to the total mass of the liquid crystal composition.

Furthermore, the compound represented by General Formula (V-3) is preferably a compound represented by any one of Formula (25.1) to Formula (24.3):

[Chemical Formula 157]

(25.1)
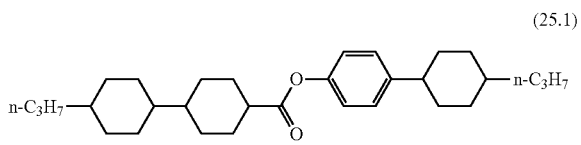

[Chemical Formula 158]

(25.2)
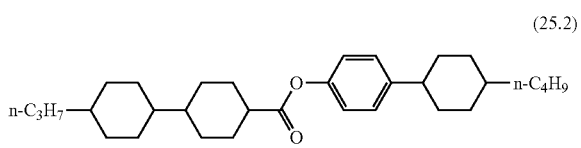

[Chemical Formula 159]

(25.3)
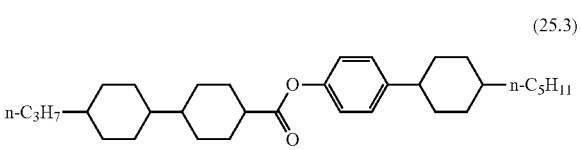

The compound represented by General Formula (V) related to the present invention is preferably a compound represented by General Formula (V-4):

[Chemical Formula 160]

(V-4)
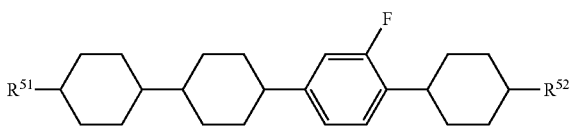

(wherein in General Formula (V-4), $R^{51}$ and $R^{52}$ each independently represent an alkyl group having 1 to 5 carbon atoms, an alkenyl group having 2 to 5 carbon atoms, or an alkoxy group having 1 to 4 carbon atoms).

It is preferable that the liquid crystal composition of the present invention includes the compound represented by General Formula (V-4) at a proportion of from 1% by mass to 15% by mass, preferably at a proportion of from 2% by mass to 15% by mass, preferably at a proportion of from 3% by mass to 10% by mass, and preferably at a proportion of from 4% by mass to 8% by mass, relative to the total mass of the liquid crystal composition.

Furthermore, the compound represented by General Formula (V-4) is preferably at least one compound selected from the group of compounds represented by Formula (25.11) to Formula (25.13), and more preferably a compound represented by Formula (25.13).

[Chemical Formula 161]

(25.11)
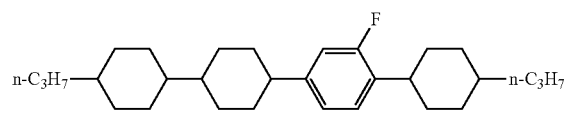

(25.12)
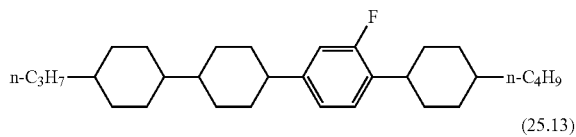

(25.13)
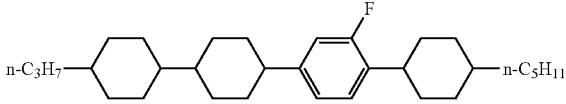

The compound represented by General Formula (L) related to the present invention is preferably a compound represented by General Formula (V'-5).

[Chemical Formula 162]

(V'-5)
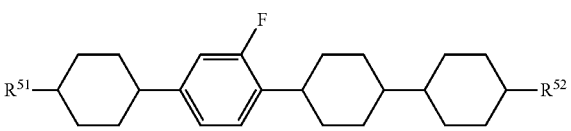

(wherein in General Formula (V'-5), $R^{51}$ and $R^{52}$ each independently represent an alkyl group having 1 to 5 carbon atoms, an alkenyl group having 2 to 5 carbon atoms, or an alkoxy group having 1 to 4 carbon atoms).

It is preferable that the liquid crystal composition of the present invention includes the compound represented by General Formula (V'-5) at a proportion of from 1% by mass to 15% by mass, preferably at a proportion of from 2% by mass to 15% by mass, preferably at a proportion of from 2% by mass to 10% by mass, and preferably at a proportion of from 5% by mass to 10% by mass, relative to the total mass of the liquid crystal composition.

Furthermore, the compound represented by General Formula (V'-5) is preferably at least one compound selected from the group of compounds represented by Formula (25.21) to Formula (25.24), and more preferably a compound represented by Formula (25.21) and/or Formula (25.23).

[Chemical Formula 163]

(25.21)
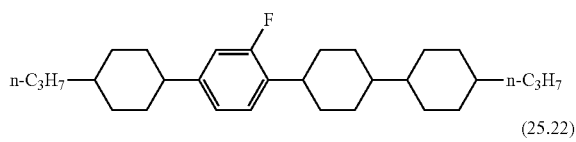

(25.22)
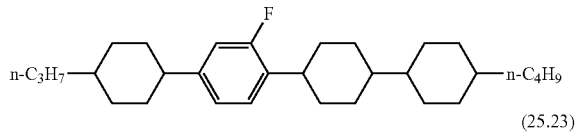

(25.23)
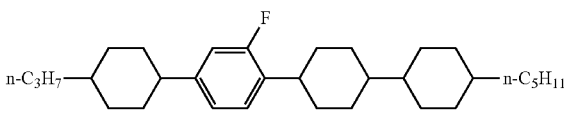

(25.24)

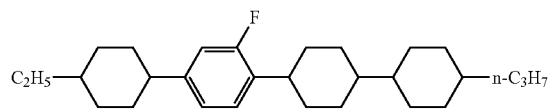

It is preferable that the liquid crystal composition of the present invention further includes at least one or more selected from the group consisting of compounds represented by General Formula (VI) and compounds represented by General Formula (VII). Furthermore, the compound represented by General Formula (L) related to the present invention is preferably a compound represented by General Formula (VI) and/or a compound represented by General Formula (VII).

[Chemical Formula 164]

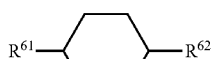

(VI)

[Chemical Formula 165]

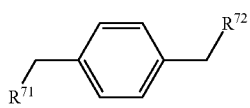

(VII)

(wherein in General Formulae (VI) and (VII), $R^{61}$, $R^{62}$, $R^{71}$, and $R^{72}$ each independently represent a linear alkyl group having 1 to 10 carbon atoms, a linear alkoxy group having 1 to 10 carbon atoms, or a linear alkenyl group having 2 to 10 carbon atoms).

Regarding the compound represented by General Formula (VI), specifically those compounds described below can be suitably used.

[Chemical Formula 166]

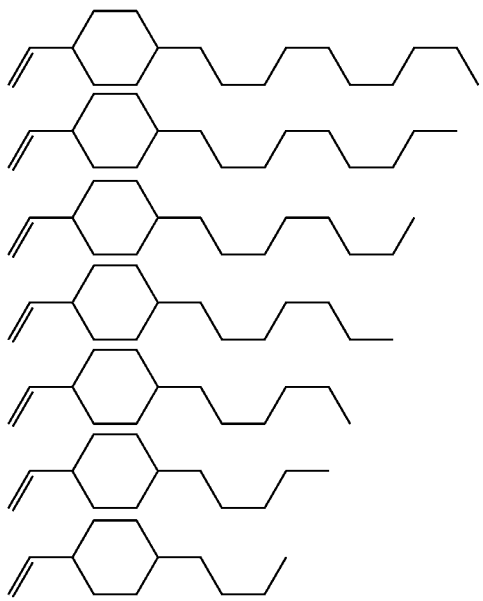
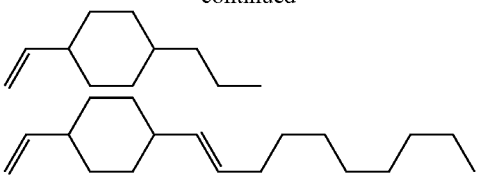
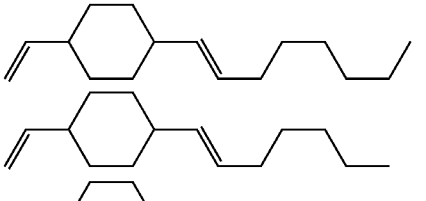
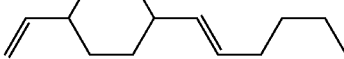
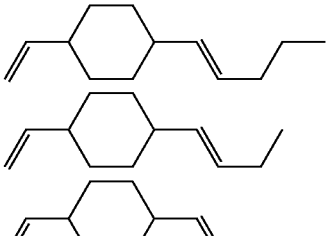
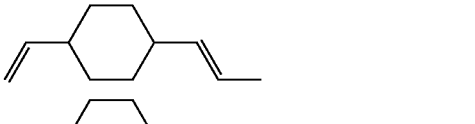
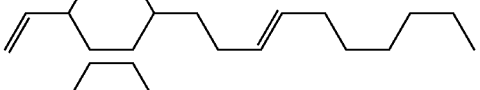
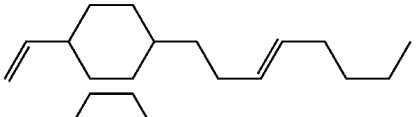
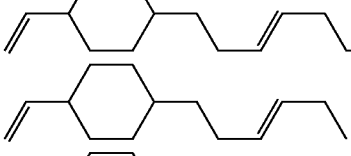
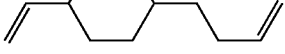

[Chemical Formula 167]

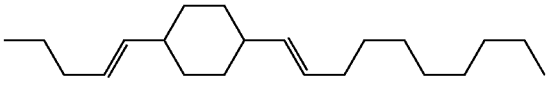
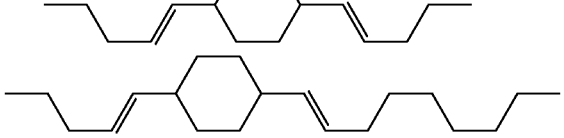

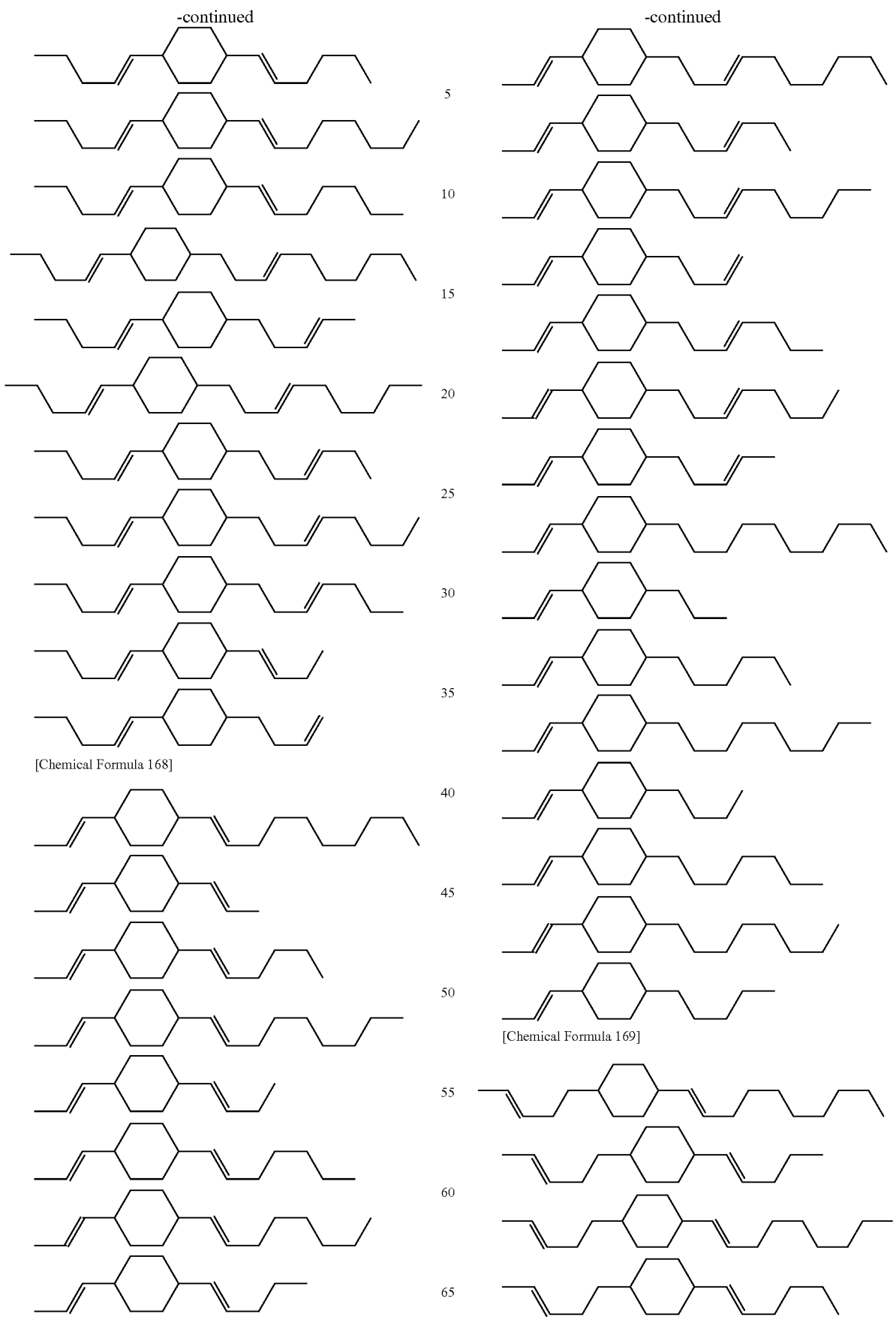

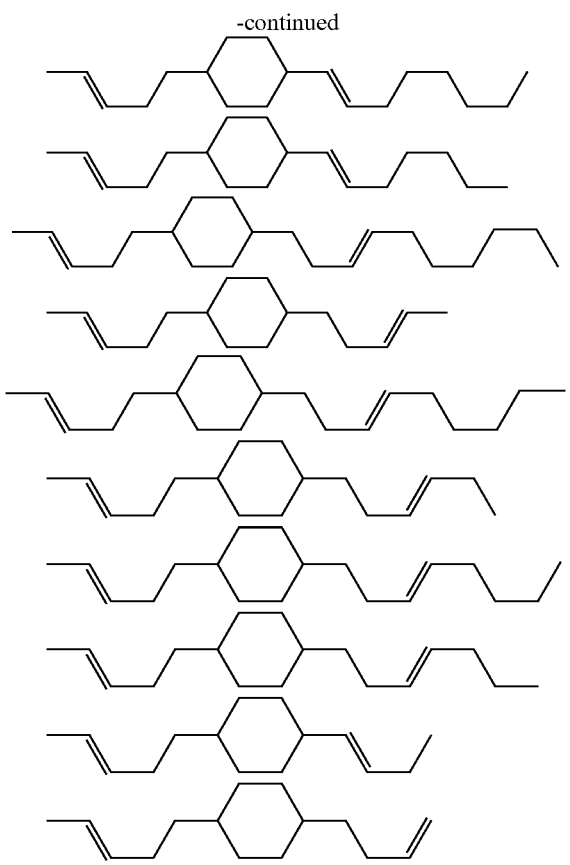

Regarding the compound represented by General Formula (VII), specifically the compounds described below can be suitably used.

[Chemical Formula 170]

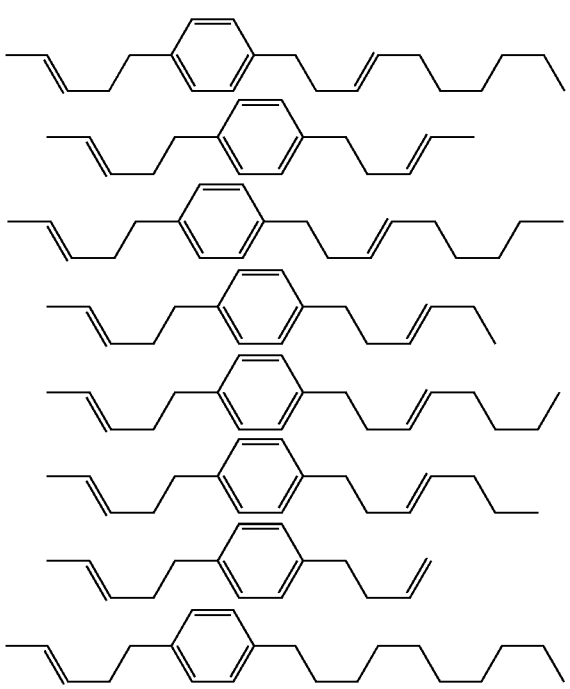

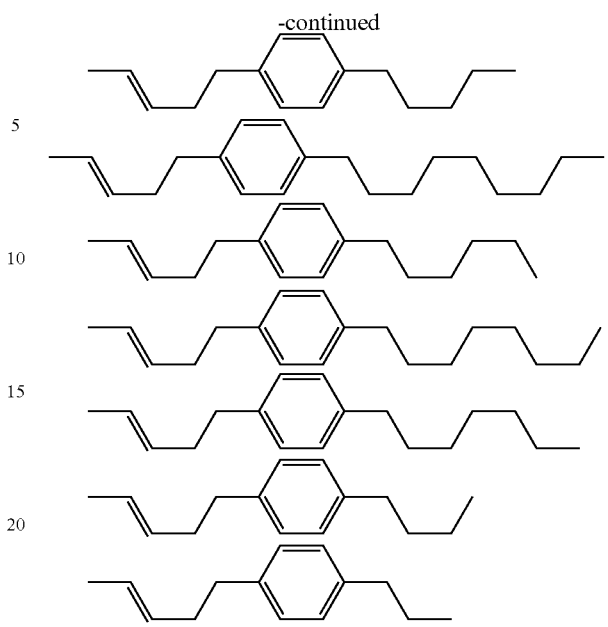

For each of the compounds that satisfy the requirement of being the compound represented by General Formula (VI) or General Formula (VII), there are no particular limitations on the kinds of compounds that satisfy the respective structural formulae and can be used in combination. However, it is preferable to blend 1 to 3 kinds of the compounds that satisfy the respective formulae; it is more preferable for the liquid crystal composition to include 1 to 4 kinds of the compounds; and it is particularly preferable for the liquid crystal composition to include 1 to 5 kinds of the compounds, according to the required performance such as solubility at low temperature, transition temperature, electrical reliability, and birefringence.

The content of the compound represented by General Formula (VI) is preferably 0% to 35% by mass, preferably 0% to 25% by mass, and preferably 0% to 155 by mass, relative to the total mass of the liquid crystal composition of the present invention.

The content of the compound represented by General Formula (VII) is preferably 0% to 35% by mass, preferably 0% to 25% by mass, and preferably 0% to 15% by mass, relative to the total mass of the liquid crystal composition of the present invention.

The liquid crystal composition related to the present invention may further include a compound represented by the following General Formula (M), and the relevant compound represented by General Formula (M) is preferably a polar compound (having a dielectric anisotropy of +5 to +30).

General Formula (M) related to the present invention is as follows:

[Chemical Formula 171]

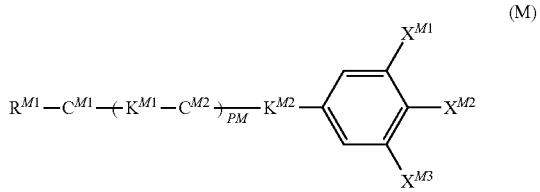

(wherein in General Formula (M), $R^{M1}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, while one or more hydrogen atoms of the alkyl group, alkenyl group, alkoxy group or alkenyloxy group may be substituted by fluorine atoms, and one —CH$_2$— moiety or two or more non-adjacent —CH$_2$— moieties in the alkyl group, alkenyl group, alkoxy group or alkenyloxy group may be each independently substituted by —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of:

(d) a 1,4-cyclohexylene group (one —CH$_2$— moiety or two or more non-adjacent —CH$_2$— moieties present in this group may be substituted by —O— or —S—, and (e) a 1,4-phenylene group (one —CH$_2$— moiety or two or more non-adjacent —CH$_2$— moieties present in this group may be substituted by —N=), the group (d) and the group (e) may be each independently substituted with a cyano group, a fluorine atom, or a chlorine atom;

$K^{M1}$ and $K^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—;

in a case in which PM represents 2, 3 or 4, and there are plural $K^{M1}$'s, they may be identical or different, and in a case in which PM represents 2, 3 or 4, and there are plural $C^{M2}$'s, they may be identical or different;

$X^{M1}$ and $X^{M3}$ each independently represent a hydrogen atom, a chlorine atom, or a fluorine atom; and $X^{M2}$ represent a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group, provided that the compound represented by General Formula (L) is excluded).

There are no particular limitations on the kind of the compound represented by General Formula (M), which can be used in combination as a second component, and the compounds are used in combination according to the desired performance such as solubility at low temperature, transition temperature, electrical reliability, dielectric constant, and birefringence. The compound to be used is, for example, of one kind according to an embodiment of the present invention. Alternatively, two kinds of compounds are used according to another embodiment of the present invention. Furthermore, 3 kinds of compounds are used according to another embodiment of the present invention. Furthermore, 4 kinds of compounds are used according to still another embodiment of the present invention. Furthermore, 5 kinds of compounds are used according to still another embodiment of the present invention. Furthermore, 6 kinds of compounds are used according to still another embodiment of the present invention. Furthermore, 7 or more kinds of compounds are used according to still another embodiment of the present invention.

The content of the compound represented by General Formula (M) in the liquid crystal composition of the present invention needs to be appropriately adjusted according to the required performance such as solubility at low temperature, transition temperature, electrical reliability, birefringence, process suitability, dropping marks, image burn-in, and dielectric constant anisotropy.

The content of the compound represented by General Formula (M) is 0.5% to 35% by mass relative to the total mass of the liquid crystal composition of the present invention according to an embodiment of the present invention. Furthermore, for example, the content of the compound is 1% to 30% by mass according to another embodiment of the present invention. For example, the content of the compound is 3% to 28% by mass according to still another embodiment of the present invention. For example, the content of the compound is 5% to 27% by mass according to still another embodiment of the present invention. For example, the content of the compound is 7% to 26% by mass according to still another embodiment of the present invention. For example, the content of the compound is 8% to 25% by mass according to still another embodiment of the present invention. For example, the content of the compound is 9% to 24% by mass according to still another embodiment of the present invention. For example, the content of the compound is 10% to 23% by mass according to still another embodiment of the present invention. For example, the content of the compound is 11% to 20% by mass according to still another embodiment of the present invention.

In a case in which the viscosity of the liquid crystal composition of the present invention needs to be maintained low, and a liquid crystal composition having a fast response speed is needed, it is preferable to adjust the lower limit described above to a lower value, and to adjust the upper limit to a lower value. Furthermore, in a case in which the Tni of the liquid crystal composition of the present invention needs to be maintained high, and a liquid crystal composition having satisfactory temperature stability is needed, it is preferable to adjust the lower limit described above to a lower value, and to adjust the upper limit to a lower value. Furthermore, when it is wished to have a large dielectric constant anisotropy in order to maintain the driving voltage at a low level, it is preferable to adjust the lower limit described above to a higher value, and to adjust the upper limit to a higher value.

Regarding $R^{M1}$, in a case in which the cyclic structure to which $R^{M1}$ is bonded is a phenyl group (aromatic), $R^{M1}$ is preferably a linear alkyl group having 1 to 5 carbon atoms, a linear alkoxy group having 1 to 4 carbon atom, or an alkenyl group having 4 to 5 carbon atoms. In a case in which the cyclic structure to which $R^{M1}$ is bonded is a saturated cyclic structure such as cyclohexane, pyran or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

In a case in which chemical stability of the liquid crystal composition is required, it is preferable that the compound represented by General Formula (M) related to the present invention does not have a chlorine atom within the molecule of the compound. It is preferable that the content of compounds having chlorine atoms in the liquid crystal composition is 5% or less, preferably 3% or less, preferably 1% or less, and preferably 0.5% or less, and it is preferable that the liquid crystal composition substantially does not include any compound having chlorine atoms. The phrase "substantially does not include" means that compounds produced as impurities at the time of compound production and the like are not intended, and only compounds containing chlorine atoms are incorporated into the liquid crystal composition.

The compound represented by General Formula (M) related to the present invention is preferably a compound represented by General Formula (B):

[Chemical Formula 172]

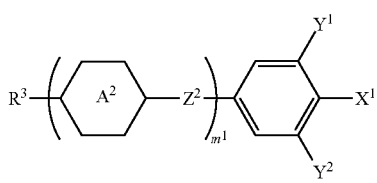

(B)

(wherein in General Formula (B), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, while one or more hydrogen atoms of the alkyl group, alkenyl group, alkoxy group or alkenyloxy group may be substituted by fluorine atoms, and a methylene group in the alkyl group, alkenyl group, alkoxy group or alkenyloxy group may be substituted by an oxygen atom as long as oxygen atoms are not linked in succession, or may be substituted by a carbonyl group as long as carbonyl groups are not linked in succession;

$A^2$'s each independently represent a 1,4-cyclohexylenecyclohexylene group, a 1,4-phenylene group, a tetrahydropyran-2,5-diyl group, a dioxane-2,5-diyl group, or a pyrimidine-2,5-diyl group; however, in a case in which $A^1$ represents a 1,4-phenylene group, one or more hydrogen atoms of the 1,4-phenylene group may be substituted by fluorine atoms;

$Z^2$'s each independently represent a single bond, —OCH$_2$—, —OCF$_2$—, —CH$_2$O—, or —CF$_2$O—;

$Y^1$ and $Y^2$ each independently represent a fluorine atom or a hydrogen atom; $X^1$ represents a fluorine atom, a —CN group, or a —OCF$_3$ group; and $m^1$ represents 1, 2, 3 or 4). Furthermore, in regard to the compound represented by General Formula (B) related to the present invention, it is preferable that $m^1$ is 2 or 3. When $m^1$ is 2, the liquid crystal composition has a characteristic of a lower driving voltage. Furthermore, when $m^1$ is 3, the liquid crystal composition has a characteristic of a higher transition temperature.

The compound represented by General Formula (M) related to the present invention is preferably a compound represented by General Formula (X):

[Chemical Formula 173]

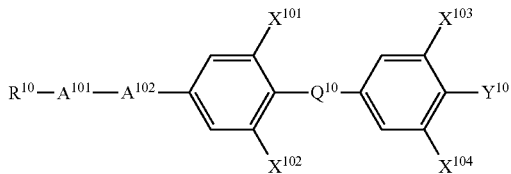

(X)

(wherein in General Formula (X), $X^{101}$ to $X^{104}$ each independently represent a fluorine atom or a hydrogen atom; $Y^{10}$ represents a fluorine atom, a chlorine atom, or —OCF$_3$; $Q^{10}$ represents a single bond or —CF$_2$O—; $R^{10}$ represents an alkyl group having 1 to 5 carbon atoms, an alkenyl group having 2 to 5 carbon atoms, or an alkoxy group having 1 to 4 carbon atoms; and $A^{101}$ and $A^{102}$ each independently represent a 1,4-cyclohexylene group, a 1,4-phenylene group, or one of the following moieties:

[Chemical Formula 174]

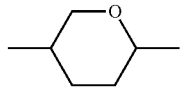

[Chemical Formula 175]

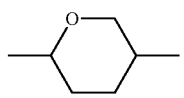

[Chemical Formula 176]

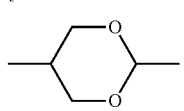

provided that the hydrogen atoms on the 1,4-phenylene group may be substituted by fluorine atoms).

There are no particular limitations on the compound that can be used in combination with the compound represented by General Formula (X), and the compounds are appropriately combined in view of solubility at low temperature, transition temperature, electrical reliability, and birefringence. For example, one kind of compound is used according to an embodiment of the present invention. Furthermore, 2 kinds of compounds are used according to another embodiment of the present invention. Furthermore, 3 kinds of compounds are used according to another embodiment of the present invention. Furthermore, 4 kinds of compounds are used according to still another embodiment of the present invention. Furthermore, 5 or more kinds of compounds are used according to still another embodiment of the present invention.

The content of the compound represented by General Formula (X) is appropriately adjusted for each embodiment in view of characteristics such as solubility at low temperature, transition temperature, electrical reliability, and birefringence. For example, the content of the compound represented by General Formula (X) is 1% to 35% by mass according to an embodiment of the present invention, 1% to 30% by mass according to another embodiment, 1% to 25% by mass according to still another embodiment, 1% to 24% by mass according to still another embodiment, 1% to 20% by mass according to still another embodiment, 1% to 19% by mass according to still another embodiment, 1% to 1.6% by mass according to still another embodiment, 1% to 12% by mass according to still another embodiment, 1% to 11% by mass according to still another embodiment, 1% to 10% by mass according to still another embodiment, 1% to 9% by mass according to still another embodiment, 1% to 8% by mass according to still another embodiment, 1% to 7% by mass according to still another embodiment, 1% to 3% by mass according to still another embodiment, 3% to 24% by mass according to still another embodiment, 5% to 24% by mass according to still another embodiment, 6% to 24% by mass according to still another embodiment, 8% to 24% by mass according to still another embodiment, 11% to 24% by mass according to still another embodiment, 13% to 24% by mass according to still another embodiment, 15% to 24% by mass according to still another embodiment, 17% to 24% by mass according to still another embodiment, 3% to 7% by mass according to still another embodiment, 5% to 10% by mass according to still another embodiment, 6% to 9% by mass according to still another embodiment, 6% to 8% by mass according to still another embodiment, 8% to 11% by mass according to still another embodiment, 11% to 19% by mass according to still another embodiment, 11% to 12% by mass according to still another embodiment, 13% to 16% by mass according to still another embodiment, 15% to 19% by mass according to still another embodiment, and 17% to 20% by mass according to still another embodiment, relative to the total mass of the liquid crystal composition of the present invention.

In a case in which the viscosity of the liquid crystal composition of the present invention needs to be maintained low, and a liquid crystal composition having a fast response speed is needed, it is preferable to adjust the lower limit described above to a lower value, and to adjust the upper limit to a lower value. Furthermore, in a case in which a liquid crystal composition which does not easily cause image burn-in, it is preferable to adjust the lower limit described above to a lower value, and to adjust the upper limit to a lower value. Furthermore, when it is wished to have a large dielectric constant anisotropy in order to maintain the driving voltage low, it is preferable to adjust the lower limit described above to a higher value, and to adjust the upper limit to a higher value.

The compound represented by General Formula (M) related to the present invention is preferably a compound represented by General Formula (X-1):

[Chemical Formula 177]

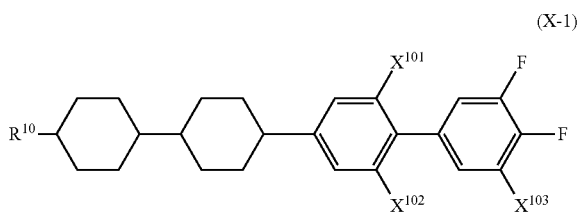

(X-1)

(wherein in General Formula (X-1), $X^{101}$ to $X^{103}$ and $R^{10}$ have the same meanings as the meanings for General Formula (X), respectively).

There are no particular limitations on the compound that can be used in combination, and the compounds are appropriately combined for each embodiment in view of solubility at low temperature, transition temperature, electrical reliability, and birefringence. For example, one kind of compound is used according to an embodiment of the present invention. Furthermore, 2 kinds of compounds are used according to another embodiment of the present invention. Furthermore, 3 kinds of compounds are used according to still another embodiment of the present invention. Furthermore, 4 kinds of compounds are used according to still another embodiment of the present invention. Furthermore, 5 or more kinds of compounds are used according to still another embodiment of the present invention.

The content of the compound represented by General Formula (X-1) is appropriately adjusted in view of characteristics such as solubility at low temperature, transition temperature, electrical reliability, and birefringence.

For example, the content of the compound represented by General Formula (X-1) is 1% to 20% by mass according to an embodiment of the present invention, 1% to 15% by mass according to another embodiment, 1% to 10% by mass according to still another embodiment, 1% to 9% by mass according to still another embodiment, 1% to 8% by mass according to still another embodiment, 1% to 7% by mass according to still another embodiment, 1% to 6% by mass according to still another embodiment, 1% to 3% by mass according to still another embodiment, 3% to 9% by mass according to still another embodiment, 4% to 9% by mass according to still another embodiment, 5% to 9% by mass according to still another embodiment, 6% to 9% by mass according to still another embodiment, 8% to 9% by mass according to still another embodiment, 3% to 7% by mass according to still another embodiment, 5% to 7% by mass according to still another embodiment, and 6% to 7% by mass according to still another embodiment, relative to the total mass of the liquid crystal composition of the present invention.

Furthermore, the compound represented by General Formula (X-1) related to the present invention is preferably a compound represented by General Formula (X-1-1):

[Chemical Formula 178]

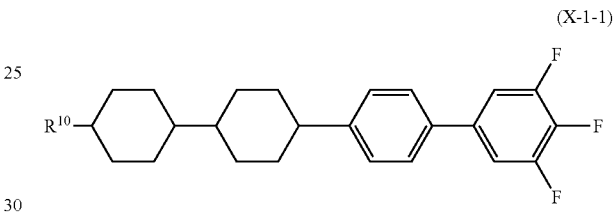

(X-1-1)

(wherein in General Formula (X-1-1), $R^{10}$ has the same meaning as the meaning for General Formula (X)).

The content of the compound represented by General Formula (X-1-1) is appropriately adjusted in view of characteristics such as solubility at low temperature, transition temperature, electrical reliability, and birefringence.

The content of the compound represented by General Formula (X-1-1) is 1% to 25% by mass according to an embodiment of the present invention, 1% to 20% by mass according to another embodiment, 1% to 15% by mass according to still another embodiment, 1% to 10% by mass according to still another embodiment, 3% to 10% by mass according to still another embodiment, and 5% to 10% by mass according to still another embodiment, relative to the total mass of the liquid crystal composition of the present invention.

Furthermore, it is preferable that the compound represented by General Formula (X-1-1), which is used for the liquid crystal composition of the present invention, is specifically a compound represented by any one of Formula (36.1) to Formula (36.4), and above all, it is preferable that the compound represented by General Formula (X-1-1) includes a compound represented by Formula (36.1) and/or Formula (36.2).

[Chemical Formula 179]

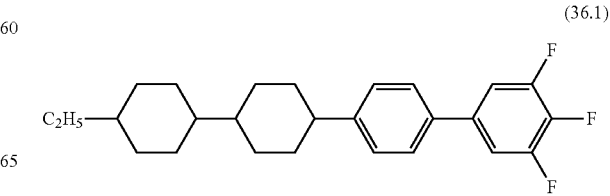

(36.1)

[Chemical Formula 180]

(36.2)

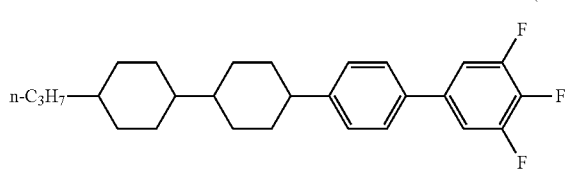

[Chemical Formula 181]

(36.3)

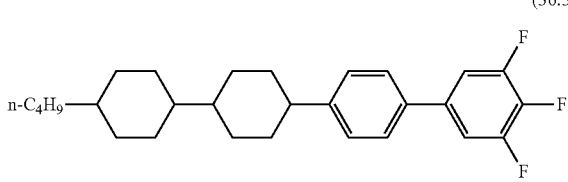

[Chemical Formula 182]

(36.4)

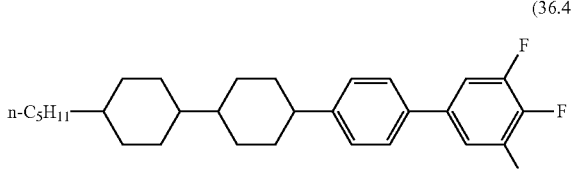

Furthermore, the compound represented by General Formula (X-1), which is used for the liquid crystal composition of the present invention, is preferably a compound represented by General Formula (X-1-2):

[Chemical Formula 183]

(X-1-2)

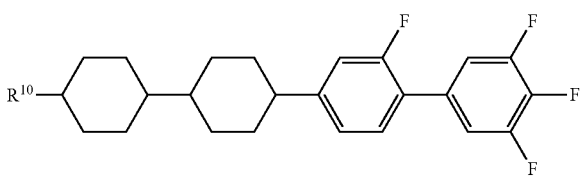

(wherein in General Formula (X-1-2), $R^{10}$ represents an alkyl group having 1 to 5 carbon atoms, an alkenyl group having 2 to 5 carbon atoms, or an alkoxy group having 1 to 4 carbon atoms).

The content of the compound represented by General Formula (X-1-2) is preferably 1% by mass or more, more preferably 2% by mass or more, and even more preferably 6% by mass or more, relative to the total amount of the liquid crystal composition of the present invention. Furthermore, in view of solubility at low temperature, transition temperature, electrical reliability, and the like, it is preferable to limit the maximum ratio to 20% by mass or less, more preferably to 16% by mass or less, even more preferably to 12% by mass or less, and particularly preferably to 10% by mass or less.

Furthermore, it is preferable that the compound represented by General Formula (X-1-2) is specifically a compound represented by Formula (37.1) to Formula (37.4), and above all, it is preferable that the compound represented by General Formula (X-1-2) includes a compound represented by Formula (37.2).

[Chemical Formula 184]

(37.1)

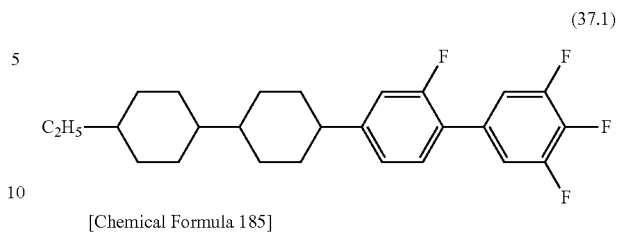

[Chemical Formula 185]

(37.2)

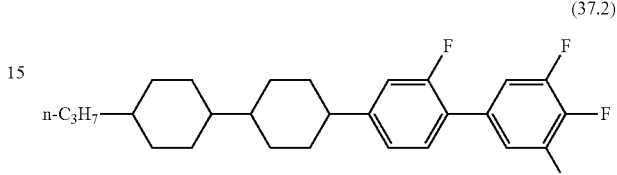

[Chemical Formula 186]

(37.3)

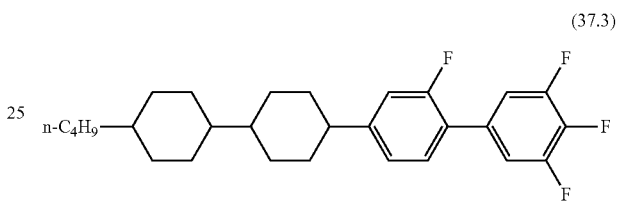

[Chemical Formula 187]

(37.4)

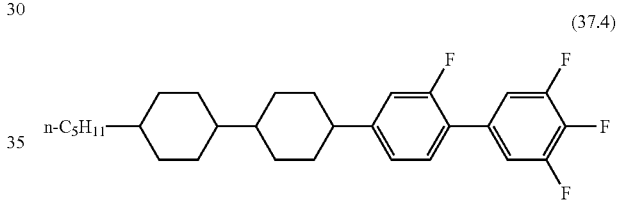

Furthermore, the compound represented by General Formula (X-1) related to the present invention is preferably a compound represented by General Formula (X-1-3):

[Chemical Formula 188]

(X-1-3)

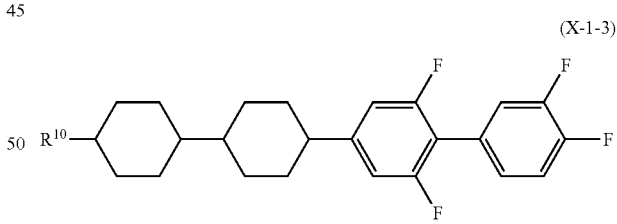

(wherein in General Formula (X-1-3), $R^{10}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, it is preferable to combine one kind or two or more kinds of compounds in view of solubility at low temperature, transition temperature, electrical reliability, birefringence, and the like.

The content of the compound represented by General Formula (X-1-3) is preferably 1% by mass or more, more preferably 2% by mass or more, and even more preferably 6% by mass or more, relative to the total amount of the liquid crystal composition of the present invention. Furthermore, in view of solubility at low temperature, transition temperature, electrical reliability, and the like, it is preferable to limit the maximum ratio to 20% by mass or less, more preferably to 16% by mass or less, even more preferably to 12% by mass or less, and particularly preferably to 10% by mass or less.

It is preferable that the compound represented by General Formula (X-1-3), which is used for the liquid crystal composition of the present invention, is specifically a compound represented by any one of Formula (38.1) to Formula (38.4), and above all, it is preferable that the compound represented by General Formula (X-1-3) includes a compound represented by Formula (38.2).

[Chemical Formula 189]

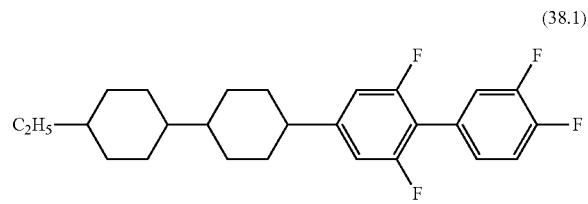

(38.1)

[Chemical Formula 190]

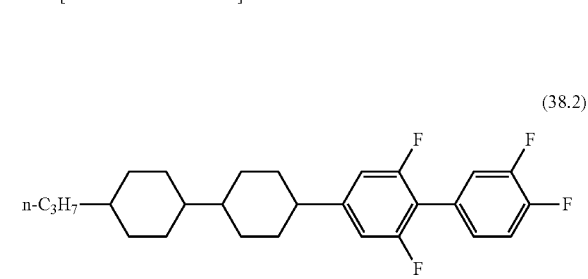

(38.2)

[Chemical Formula 191]

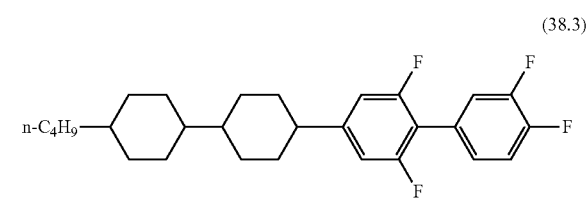

(38.3)

[Chemical Formula 192]

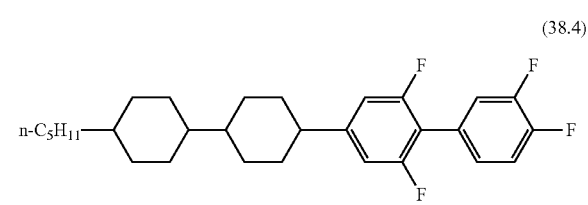

(38.4)

The compound represented by General Formula (X), which is related to the liquid crystal composition of the present invention, is preferably a compound represented by General Formula (X-2):

[Chemical Formula 193]

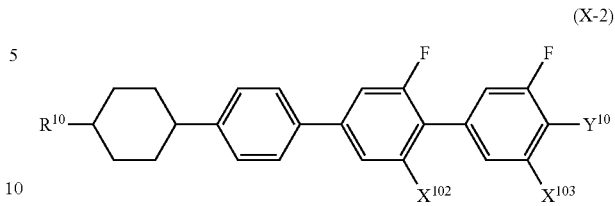

(X-2)

(wherein in General Formula (X-2), $X^{102}$ and $X^{103}$ each independently represent a fluorine atom or a hydrogen atom; $Y^{10}$ represents a fluorine atom, a chlorine atom, or —$OCF_3$—; and $R^{10}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, it is preferable to combine one kind or two or more kinds in view of solubility at low temperature, transition temperature, electrical reliability, birefringence and the like.

Furthermore, the compound represented by General Formula (X-2), which is related to the present invention, is preferably a compound represented by General Formula (X-2-1):

[Chemical Formula 194]

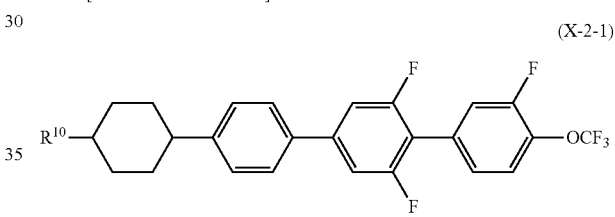

(X-2-1)

(wherein in General Formula (X-2-1), $R^{10}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, it is preferable that one kind or two or more kinds of compounds are used in combination in view of solubility at low temperature, transition temperature, electrical reliability, birefringence and the like, and it is more preferable that one kind to three or more kinds of compounds are used in combination.

The content of the compound represented by General Formula (X-2-1) is preferably 1% by mass or more, more preferably 2% by mass or more, and even more preferably 3% by mass or more, relative to the total amount of the liquid crystal composition of the present invention. Furthermore, in view of solubility at low temperature, transition temperature, electrical reliability and the like, it is preferable to limit the maximum ratio to 20% by mass or less, more preferably to 16% by mass or less, even more preferably to 12% by mass or less, and particularly preferably to 10% by mass or less.

Furthermore, it is preferable that the compound represented by General Formula (X-2-1), which is used for the liquid crystal composition of the present invention, is specifically a compound represented by any one of Formula (39.1) to Formula (39.4), and above all, it is preferable that the compound represented by General Formula (X-2-1) includes a compound represented by Formula (39.2).

[Chemical Formula 195]

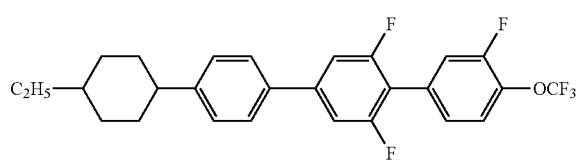
(39.1)

[Chemical Formula 196]

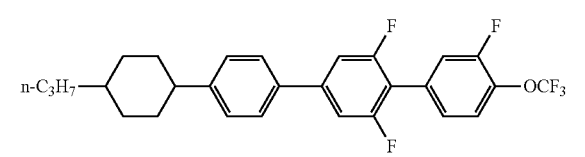
(39.2)

[Chemical Formula 197]

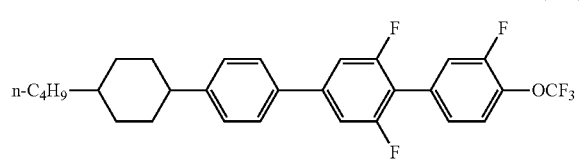
(39.3)

[Chemical Formula 198]

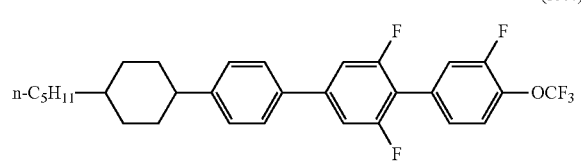
(39.4)

Furthermore, the compound represented by General Formula (X-2) related to the present invention is preferably a compound represented by General Formula (X-2-2):

[Chemical Formula 199]

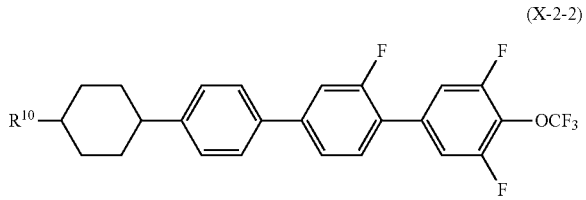
(X-2-2)

(wherein in General Formula (X-2-2), $R^{10}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, it is preferable to combine one kind to two or more kinds of compounds in view of solubility at low temperature, transition temperature, electrical reliability, birefringence, and the like. The content of the compound represented by General Formula (X-2-2) is preferably 1% by mass or more, more preferably 2% by mass or more, and even more preferably 3% by mass or more, relative to the total amount of the liquid crystal composition of the present invention. Furthermore, in view of solubility a t low temperature, transition temperature, electrical reliability, and the like, it is preferable to limit the maximum ratio to 20% by mass or less, more preferably to 16% by mass or less, even more preferably to 12% by mass or less, and particularly preferably to 10% by mass or less.

Furthermore, it is preferable that the compound represented by General Formula (X-2-2), which is used for the liquid crystal composition of the present invention, is specifically a compound represented by any one of Formula (40.1) to Formula (40.4), and above all, it is preferable that the compound represented by General Formula (X-2-2) includes a compound represented by Formula (40.2).

[Chemical Formula 200]

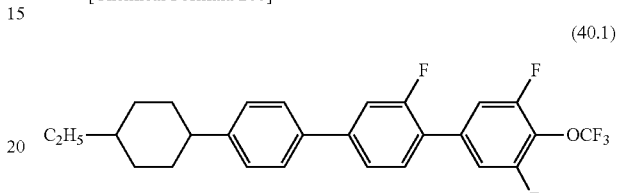
(40.1)

[Chemical Formula 201]

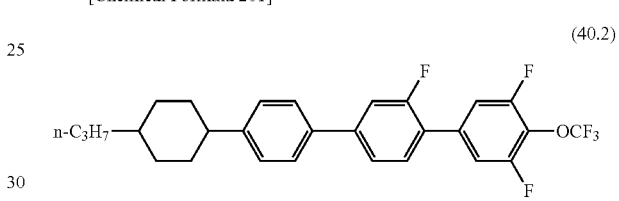
(40.2)

[Chemical Formula 202]

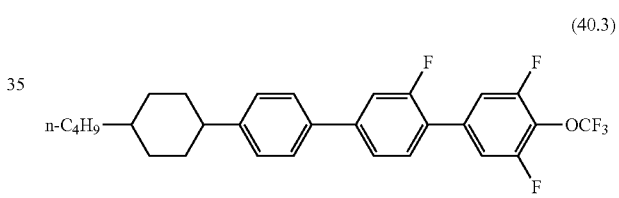
(40.3)

[Chemical Formula 203]

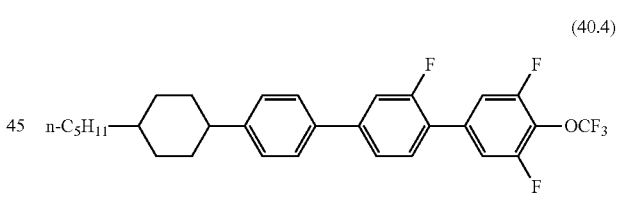
(40.4)

The compound represented by General Formula (M) related to the present invention is preferably a compound represented by General Formula (IIb).

It is preferable that at least one compound is selected from the group of compounds represented by the formula:

[Chemical Formula 204]

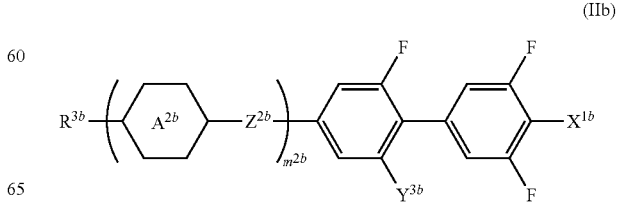
(IIb)

(wherein in General Formula (IIb), $R^{1b}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, while one or more hydrogen atoms of the alkyl group, alkenyl group, alkoxy group, or alkenyloxy group may be substituted by fluorine atoms, and a methylene group in the alkyl group, alkenyl group, alkoxy group or alkenyloxy group may be substituted by an oxygen atom as long as oxygen atoms are not linked in succession, or may be substituted by a carbonyl group as long as carbonyl groups are not linked in succession;

$A^{2b}$'s each independently represent a 1,4-cyclohexylenecyclohexylene group, a 1,4-phenylene group, a tetrahydropyran-2,5-diyl group, a dioxane-2,5-diyl group, or a pyrimidine-2,5-diyl group; however, in a case in which $A^{2b}$ represents a 1,4-phenylene group, one or more hydrogen atoms of the 1,4-phenylene group may be substituted by fluorine atoms;

$Z^{2b}$'s each independently represent a single bond, —OCH$_2$—, —OCF$_2$—, —CH$_2$O—, or —CF$_2$O—;

$m^{2b}$ represents 1, 2, 3 or 4; $Y^{3b}$'s each independently represent a fluorine atom or a hydrogen atom; and $X^{1b}$ represents a fluorine atom, a —CN group, or a —OCF$_3$ group), and $m^{2b}$ is more preferably 2 or 3.

The content of the compound represented by General Formula (IIb) has an upper limit and a lower limit for each embodiment, in view of characteristics such as solubility at low temperature, transition temperature, electrical reliability, and birefringence. The lower limit of the content of the relevant compound is, for example, 0.01% relative to the total amount of the liquid crystal composition of the present invention according to an embodiment of the present invention, 0.05% according to another embodiment, 0.1% according to still another embodiment, 0.2% according to still another embodiment, 0.3% according to still another embodiment, 0.4% according to still another embodiment, and 0.5% according to still another embodiment. Furthermore, the upper limit of the content of the compound represented by General Formula (IIb) is, for example, 10% according to an embodiment of the present invention, 8% according to another embodiment, 2% according to still another embodiment, 1% according to still another embodiment, 0.8% according to still another embodiment, and 0.7% according to still another embodiment.

When the compound represented by General Formula (IIa) is included in a liquid crystal composition, dielectric properties such as Δε can be secured, and also, the compatibility with a compound of General Formula (L) is not impaired.

The compound represented by General Formula (X) related to the present invention is preferably a compound represented by General Formula (X-3):

[Chemical Formula 205]

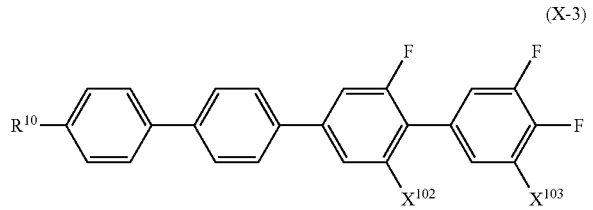

(X-3)

(wherein in General Formula (X-3), $X^{102}$ to $X^{103}$ each independently represent a fluorine atom or a hydrogen atom; and $R^{10}$ represents an alkyl group having 0.1 to 5 carbon atoms, an alkenyl group having 2 to 5 carbon atoms, or an alkoxy group having 1 to 4 carbon atoms).

There are no particular limitations on the compounds that can be used in combination; however, it is preferable to combine one kind to two or more kinds of compounds in view of solubility at low temperature, transition temperature, electrical reliability, birefringence and the like. When a compound represented by General Formula (X-3) is included in a liquid crystal composition, dielectric properties such as Δε can be secured, and also, the compatibility with a first component such as a compound of General Formula (L) is not impaired.

The content of the compound represented by General Formula (X-3) is preferably 0.1% by mass or more, more preferably 0.2% by mass or more, and even more preferably 0.3% by mass or more, relative to the total amount of the liquid crystal composition of the present invention. Furthermore, in view of solubility at low temperature, transition temperature, electrical reliability, and the like, it is preferable to limit the maximum ratio to 8% by mass or less, more preferably to 5% by mass or less, even more preferably to 2% by mass or less, and particularly preferably to 1% by mass or less.

Furthermore, the compound represented by General Formula (X-3), which is used for the liquid crystal composition of the present invention, is preferably a compound represented by General Formula (X-3-1):

[Chemical Formula 206]

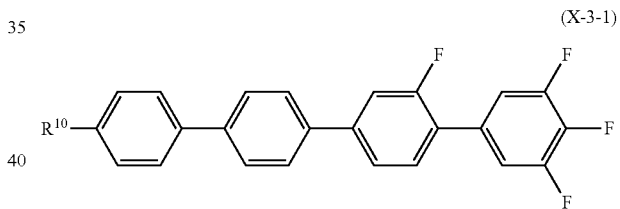

(X-3-1)

(wherein in General Formula (X-3-1), $R^{10}$ represents an alkyl group having 1 to 5 carbon atoms, an alkenyl group having 2 to 5 carbon atoms, or an alkoxy group having 1 to 4 carbon atoms).

In regard to the compound that satisfies General Formula (X-3-1), there are no particular limitations on the compounds to be used in combination; however, it is preferable to combine one kind or two or more kinds of compounds therewith in view of solubility at low temperature, transition temperature, electrical reliability, birefringence, and the like.

The content of the compound represented by General Formula (X-3-1) is preferably 0.05% by mass or more, more preferably 0.2% by mass or more, and even more preferably 0.3% by mass or more, relative to the total amount of the liquid crystal composition of the present invention. Furthermore, in view of solubility at low temperature, transition temperature, electrical reliability and the like, it is preferable to limit the maximum ratio to 5% by mass or less, more preferably to 3% by mass or less, even more preferably to 2% by mass or less, and particularly preferably to 1% by mass or less.

Furthermore, it is preferable that the compound represented by General Formula (X-3-1), which is used for the liquid crystal composition of the present invention, is specifically a compound represented by any one of Formula (41.1) to Formula (41.4), and above all, it is preferable that the compound represented by General Formula (X-3-1) includes a compound represented by Formula (41.2). When a compound represented by any one of Formula (41.1) to Formula (41.4) is included in a liquid crystal composition, dielectric properties such as Δε can be secured, and also, the compatibility with a non-polar first component is not impaired.

[Chemical Formula 207]

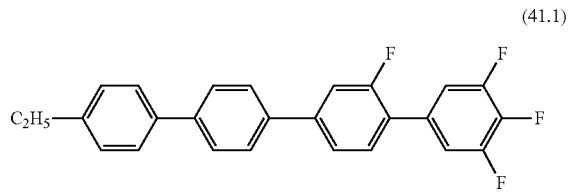

(41.1)

[Chemical Formula 208]

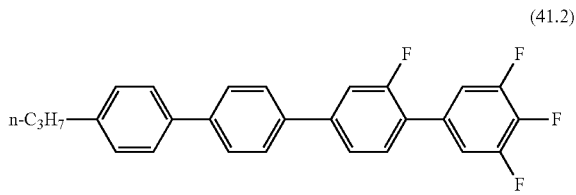

(41.2)

[Chemical Formula 209]

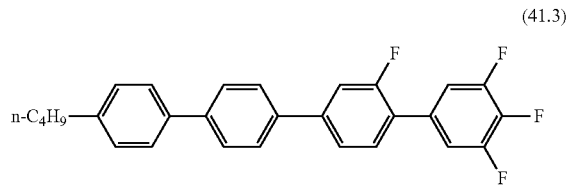

(41.3)

[Chemical Formula 210]

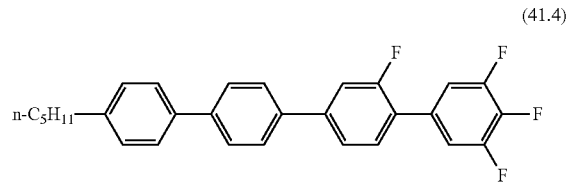

(41.4)

Furthermore, the compound represented by General Formula (X-3), which is used for the liquid crystal composition of the present invention, is preferably a compound represented by General Formula (X-3-1):

[Chemical Formula 211]

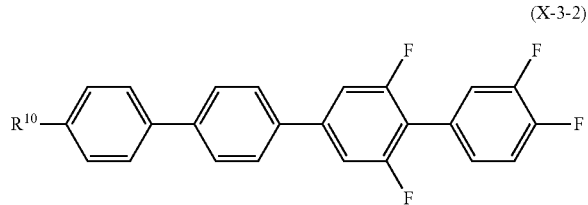

(X-3-2)

(wherein in General Formula (X-3-2), $R^{10}$ represents an alkyl group having 1 to 5 carbon atoms, an alkenyl group having 2 to 5 carbon atoms, or an alkoxy group having 1 to 4 carbon atoms).

In regard to the compound that satisfies General Formula (X-3-2), there are no particular limitations on the compounds to be used in combination; however, it is preferable to combine one kind or two or more kinds of compounds therewith in view of solubility at low temperature, transition temperature, electrical reliability, birefringence, and the like.

The content of the compound represented by General Formula (X-3-2) is preferably 0.05% by mass or more, more preferably 0.2% by mass or more, and even more preferably 0.3% by mass or more, relative to the total amount of the liquid crystal composition of the present invention. Furthermore, in view of solubility at low temperature, transition temperature, electrical reliability and the like, it is preferable to limit the maximum ratio to 5% by mass or less, more preferably to 3% by mass or less, even more preferably to 2% by mass or less, and particularly preferably to 1.5% by mass or less.

Furthermore, it is preferable that the compound represented by General Formula (X-3-2), which is used for the liquid crystal composition of the present invention, is specifically a compound represented by any one of Formula (41.5) to Formula (41.8), and above all, it is preferable that the compound represented by General Formula (X-3-2) includes a compound represented by Formula (41.6). When a compound represented by any one of Formula (41.5) to Formula (41.7) is included in a liquid crystal composition, dielectric properties such as Δε can be secured, and also, the compatibility with a non-polar first component is not impaired.

[Chemical Formula 212]

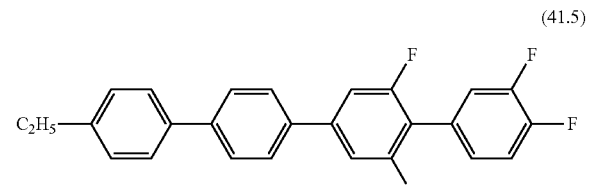

(41.5)

[Chemical Formula 213]

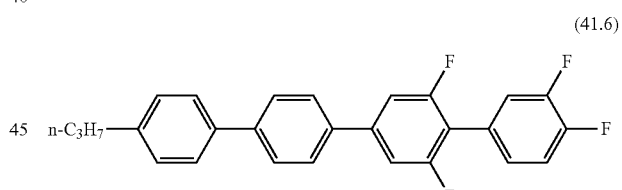

(41.6)

[Chemical Formula 214]

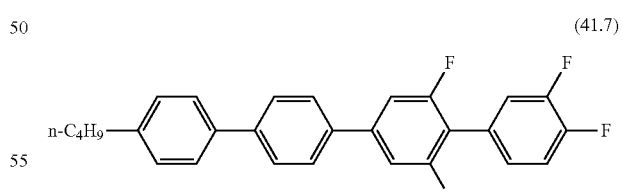

(41.7)

[Chemical Formula 215]

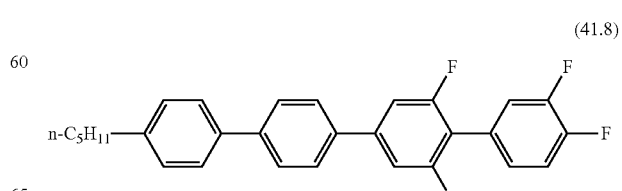

(41.8)

Furthermore, the compound represented by General Formula (X) is preferably a compound represented by General Formula (X-4):

[Chemical Formula 216]

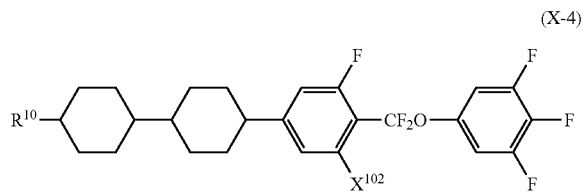

(X-4)

(wherein in General Formula (X-4), $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, it is preferable to combine one kind to two or more kinds of compounds in view of solubility at low temperature, transition temperature, electrical reliability, birefringence and the like, and it is more preferable to combine one kind to three or more kinds of compounds.

Furthermore, the compound represented by General Formula (X-4) related to the present invention is preferably a compound represented by General Formula (X-4-1):

[Chemical Formula 217]

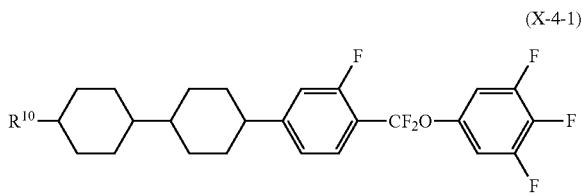

(X-4-1)

(wherein in General Formula (X-4-1), $R^{10}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, it is preferable to combine one kind or two or more kinds of compounds in view of solubility at low temperature, transition temperature, electrical reliability, birefringence and the like, and it is more preferable to combine one kind to three or more kinds of compounds.

The content of the compound represented by General Formula (X-4-1) is preferably 2% by mass or more, more preferably 5% by mass or more, and even more preferably 10% by mass or more, relative to the total amount of the liquid crystal composition of the present invention. Furthermore, in view of solubility at low temperature, transition temperature, electrical reliability and the like, it is preferable to limit the maximum ratio to 20% by mass or less, more preferably to 17% by mass or less, even more preferably to 15% by mass or less, and particularly preferably to 13% by mass or less.

Furthermore, it is preferable that the compound represented by General Formula (X-4-1), which is used for the liquid crystal composition of the present invention, is specifically a compound represented by any one of Formula (42.1) to Formula (42.4), and above all, it is preferable that the compound represented by General Formula (X-4-1) includes a compound represented by Formula (42.3).

[Chemical Formula 218]

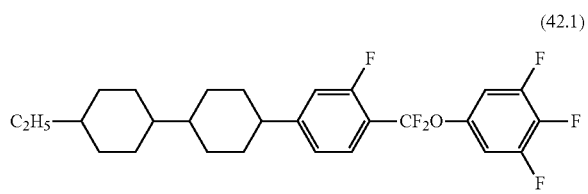

(42.1)

[Chemical Formula 219]

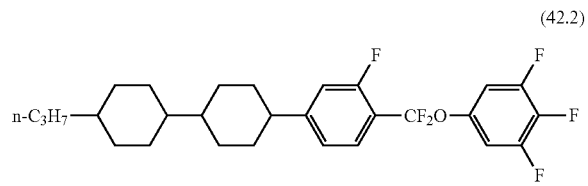

(42.2)

[Chemical Formula 220]

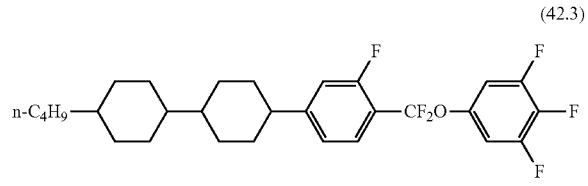

(42.3)

[Chemical Formula 221]

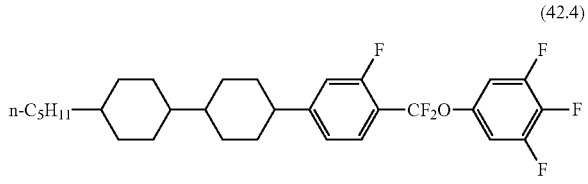

(42.4)

Furthermore, the compound represented by General Formula (X) related to the present invention is preferably a compound represented by General Formula (X-5):

[Chemical Formula 222]

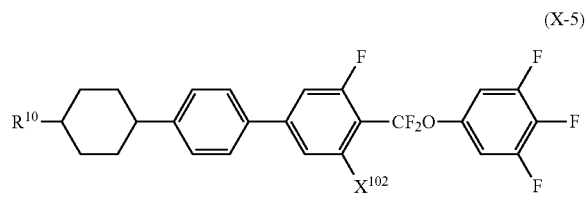

(X-5)

(wherein in General Formula (X-5), $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, it is preferable to combine one kind or two or more kinds of compounds in view of solubility at low temperature, transition temperature, electrical reliability, birefringence and the like, and it is more preferable to combine one kind to three or more kinds of compounds.

Furthermore, the compound represented by General Formula (X-5), which is used for the liquid crystal composition of the present invention, is preferably a compound represented by General Formula (X-5-1):

[Chemical Formula 223]

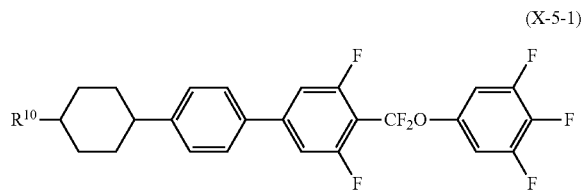

(X-5-1)

(wherein in General Formula (X-5-1), $R^{10}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, it is preferable to combine one kind or two or more kinds of compounds in view of solubility at low temperature, transition temperature, electrical reliability, birefringence and the like, and it is more preferable to combine one kind to three or more kinds of compounds.

Furthermore, it is preferable that the compound represented by General Formula (X-5-1), which is used for the liquid crystal composition of the present invention, is specifically a compound represented by any one of Formula (43.1) to Formula (43.4), and above all, it is preferable that the compound represented by General Formula (X-5-1) includes a compound represented by Formula (43.2).

[Chemical Formula 224]

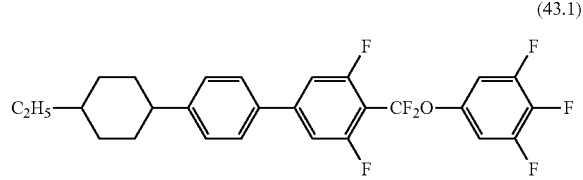

(43.1)

[Chemical Formula 225]

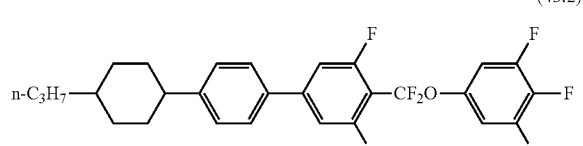

(43.2)

[Chemical Formula 226]

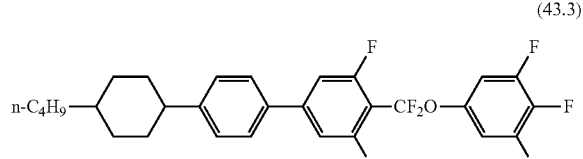

(43.3)

[Chemical Formula 227]

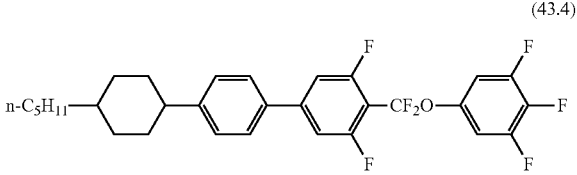

(43.4)

The content of the compound represented by any one of Formula (43.1) to Formula (43.4) is preferably 1.% by mass or more, more preferably 2% by mass or more, and even more preferably 3% by mass or more, relative to the total amount of the liquid crystal composition of the present invention. Furthermore, in view of solubility at low temperature, transition temperature, electrical reliability and the like, it is preferable to limit the maximum ratio to 18% by mass or less, more preferably to 15% by mass or less, even more preferably to 12% by mass or less, and particularly preferably to 10% by mass or less.

The compound represented by General Formula (M), which is used for the liquid crystal composition of the present invention, is preferably a compound represented by General Formula (IIa).

It is preferable that at least one compound is selected from the group of compounds represented by the formula:

[Chemical Formula 228]

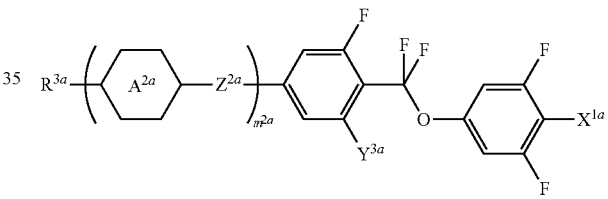

(IIa)

(wherein in General Formula (IIa), $R^{3a}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, while one or more hydrogen atoms of the alkyl group, alkenyl group, alkoxy group or alkenyloxy group may be substituted by fluorine atoms, and a methylene group in the alkyl group, alkenyl group, alkoxy group or alkenyloxy group may be substituted by an oxygen atom as long as oxygen atoms are not linked in succession, or may be substituted by a carbonyl group as long as carbonyl groups are not linked in succession;

$A^{2a}$'s each independently represent a 1,4-cyclohexylenecyclohexylene group, a 1,4-phenylene group, a tetrahydropyran-2,5-diyl group, a dioxane-2,5-diyl group, or a pyrimidine-2,5-diyl group; however, in a case in which $A^{2a}$ represents a 1,4-phenylene group, one or more hydrogen atoms of the 1,4-phenylene group may be substituted by fluorine atoms;

$Z^{2a}$'s each independently represent a single bond, —OCH$_2$—, —OCF$_2$—, —CH$_2$O—, or —CF$_2$O—;

$m^{2a}$ represents 1, 2, 3 or 4; $Y^{3a}$'s each independently represent a fluorine atom or a hydrogen atom; and $X^{1a}$ represents a fluorine atom, a —CN group, or a —OCF$_3$ group), and it is more preferable that at least two compounds are selected from the compounds represented by General Formula (IIa). Furthermore, in regard to General Formula (IIa), it is more preferable that md is 2, 3, or 4; it is even more preferable that $m^{2a}$ is 2 or 3; and it is particularly preferable that $m^{2a}$ is 3.

It has been confirmed that compatibility is markedly increased by a combination of compounds having commonality in the chemical skeleton or characteristics of the chemical skeleton. Above all, in regard to a liquid crystal composition having a component including the above-mentioned compound represented by General Formula (M-1), which is of lower concept of the compound represented by General Formula (IIa), and a component including a compound represented by General Formula (i), precipitation of the liquid crystal compound, which has been a traditional problem, has been ameliorated.

The content of the compound represented by General Formula (IIa) has an upper limit and a lower limit for each embodiment in view of characteristics such as solubility at low temperature, transition temperature, electrical reliability, and birefringence. The lower limit of the content of the relevant compound is, for example, 2% relative to the total amount of the liquid crystal composition of the present invent ion according to an embodiment of the present invention, 3% according to another embodiment, 4% according to still another embodiment, 5% according to still another embodiment, 6% according to still another embodiment, 7% according to still another embodiment, and 8% according to still another embodiment. Furthermore, the lower limit of the content is 9% according to another embodiment. In other embodiments, the lower limit of the content is 11%, 15% according to still another embodiment, and 18% according to still another embodiment. Furthermore, the upper limit of the content of the compound represented by General Formula (IIa) is, for example, 30% according to an embodiment of the present invention, 20% according to another embodiment, 13% according to still another embodiment, 10% according to still another embodiment, 7% according to still another embodiment, and 3% according to still another embodiment.

Furthermore, the compound represented by General Formula (X) is preferably a compound selected from the group of compounds represented by General Formula (XI):

[Chemical Formula 229]

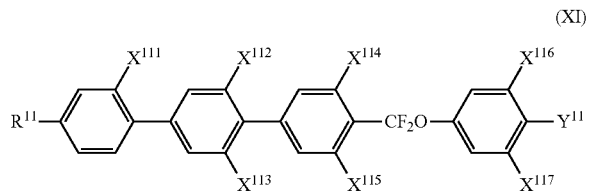

(XI)

(wherein in General Formula (XI), $X^{111}$ to $X^{117}$ each independently represent a fluorine atom or a hydrogen atom; at least one of $X^{111}$ to $X^{117}$ represents a fluorine atom; $R^{11}$ represents an alkyl group having 1 to 5 carbon atoms, an alkenyl group having 2 to 5 carbon atoms, or an alkoxy group having 1 to 4 carbon atoms; and $Y^{11}$ represents a fluorine atom or —$OCF_3$).

There are no particular limitations on the compounds that can be used in combination; however, it is preferable to combine one kind to three or more kinds of compounds in view of solubility at low temperature, transition temperature, electrical reliability, birefringence, and the like.

It has been confirmed that when a compound represented by General Formula (XI) is present in a liquid crystal composition, the compound exhibits a high transition point, a large Δε dielectric constant, a high Δn, and viscosity that is lower for a tetracyclic compound. Furthermore, it has been confirmed that this compound represented by General Formula (XI) exhibits satisfactory compatibility with compounds represented by General Formula (i), General Formula (M-1), General Formula (M-2) and General Formula (M-3). Thereby, it is also more preferable for the liquid crystal composition related to the present invention to include a compound of General Formula (XI) as the compound of General Formula (M) to the extent that the value of Δε does not exceed 5.

The content of the compound represented by General Formula (XI) has an upper limit and a lower limit for each embodiment in view of characteristics such as solubility at low temperature, transition temperature, electrical reliability, and birefringence. The lower limit of the content is, for example, 2% relative to the total amount of the liquid crystal composition of the present invention according to an embodiment of the present invention, 4% according to another embodiment, 5% according to still another embodiment, 7% according to still another embodiment, 9% according to still another embodiment, 10% according to still another embodiment, and 12% according to still another embodiment. Furthermore, the lower limit of the content is 13% according to another embodiment. The lower limit of the content is 1.5% according to still another embodiment. Furthermore, the lower limit of the content is 18% according to still another embodiment.

Furthermore, the upper limit of the content is, for example, 30% according to an embodiment of the present invention, 25% according to another embodiment, 20% according to still another embodiment, 15% according to still another embodiment, 10% according to still another embodiment, and 5% according to still another embodiment.

In a case in which the liquid crystal composition of the present invention is used for a liquid crystal display element having a small cell gap, it is suitable to adjust the content of the compound represented by General Formula (XI) to a larger value. In a case in which the liquid crystal composition is used for a liquid crystal display element having a small driving voltage, it is suitable to adjust the content of the compound represented by General Formula (XI) to a larger value. Furthermore, in a case in which the liquid crystal composition is used for a liquid crystal display element used in an environment at low temperature, it is suitable to adjust the content of the compound represented by General Formula (XI) to a smaller value. In the case of a liquid crystal composition which is used for a liquid crystal display element having a fast response speed, it is suitable to adjust the content of the compound represented by General Formula (XI) to a smaller value.

Meanwhile, the cell gap according to the present specification means the average distance between alignment layers that face each other, and in other words, the cell gap means the average thickness of a liquid crystal layer filled with a liquid crystal composition (for example, the relevant thickness is calculated as an average of 10 sites or the like).

Furthermore, the compound represented by General Formula (XI), which is used for the liquid crystal composition of the present invention, is preferably a compound represented by General Formula (XI-1):

[Chemical Formula 230]

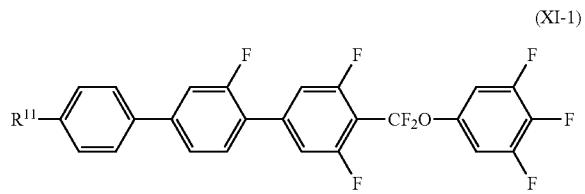

(XI-1)

(wherein in General Formula (XI-1), $R^{11}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination, and compounds are appropriately combined for each embodiment in view of solubility at low temperature, transition temperature, electrical reliability, birefringence, and the like. For example, one kind of compound is used according to an embodiment of the present invention, two kinds of compounds are used in combination according to another embodiment, and three or more kinds of compounds are used in combination according to still another embodiment.

Furthermore, in regard to the compound represented by General Formula (XI-1), it may also be considered that the fluorine on the second benzene ring from the left-hand side contributes particularly to compatibility, and it has been confirmed that the compound exhibits a high transition point, a large Δε dielectric constant, a high Δn, and viscosity that is lower for a tetracyclic compound. Therefore, it has been confirmed that the compound represented by General Formula (XI-1) exhibits satisfactory compatibility with a composition including compounds represented by General Formula (i), General Formula (M-1), General Formula (M-2), and General Formula (M-3).

The content of the compound represented by General Formula (XI-1) is preferably 1% by mass or more, more preferably 2% by mass or more, even more preferably 3% by mass or more, still more preferably 4% by mass or more, and particularly preferably 5% by mass or more, relative to the total amount of the liquid crystal composition of the present invention. Furthermore, in view of solubility at low temperature, transition temperature, electrical reliability and the like, it is preferable to limit the maximum ratio to 20% by mass or less, more preferably to 15% by mass or less, even more preferably to 12% by mass or less, and particularly preferably to 10% by mass or less.

Furthermore, it is preferable that the compound represented by General Formula (XI-1), which is used for the liquid crystal composition of the present invention, is specifically a compound represented by any one of Formula (45.1) to Formula (45.4), and above all, it is preferable that the compound represented by General Formula (XI-1) includes a compound represented by any one of Formula (45.2) to Formula (45.4), while it is more preferable that the compound represented by General Formula (XI-1) includes a compound represented by Formula (45.2).

[Chemical Formula 231]

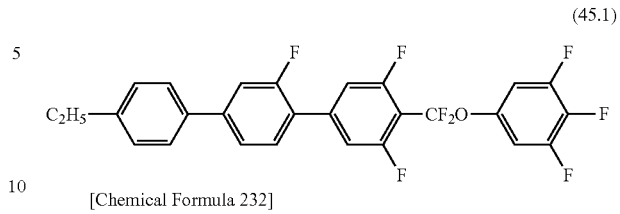

(45.1)

[Chemical Formula 232]

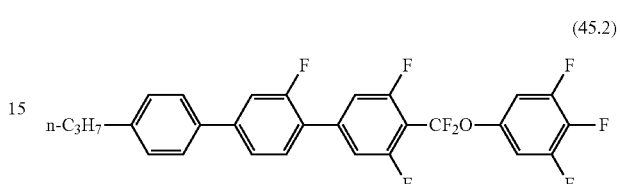

(45.2)

[Chemical Formula 233]

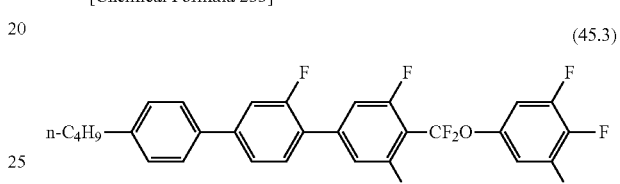

(45.3)

[Chemical Formula 234]

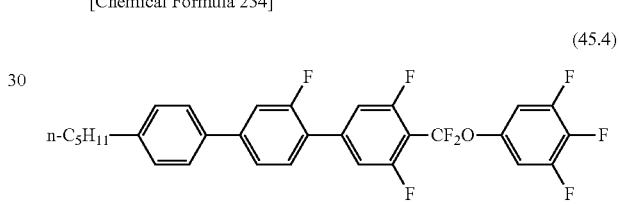

(45.4)

The content of the compound represented by any one of Formula (45.1) to Formula (45.4) is preferably 1% by mass or more, more preferably 1.5% by mass or more, even more preferably 2% by mass or more, still more preferably 2.5% by mass or more, and particularly preferably 3% by mass or more, relative to the total amount of the liquid crystal composition of the present invention. Furthermore, in view of solubility at low temperature, transition temperature, electrical reliability, and the like, it is preferable to limit the maximum ratio to 18% by mass or less, more preferably to 15% by mass or less, even more preferably to 12% by mass or less, and particularly preferably to 10% by mass or less.

Furthermore, the compound represented by General Formula (X) is preferably a compound selected from the group of compounds represented by General Formula (XII):

[Chemical Formula 235]

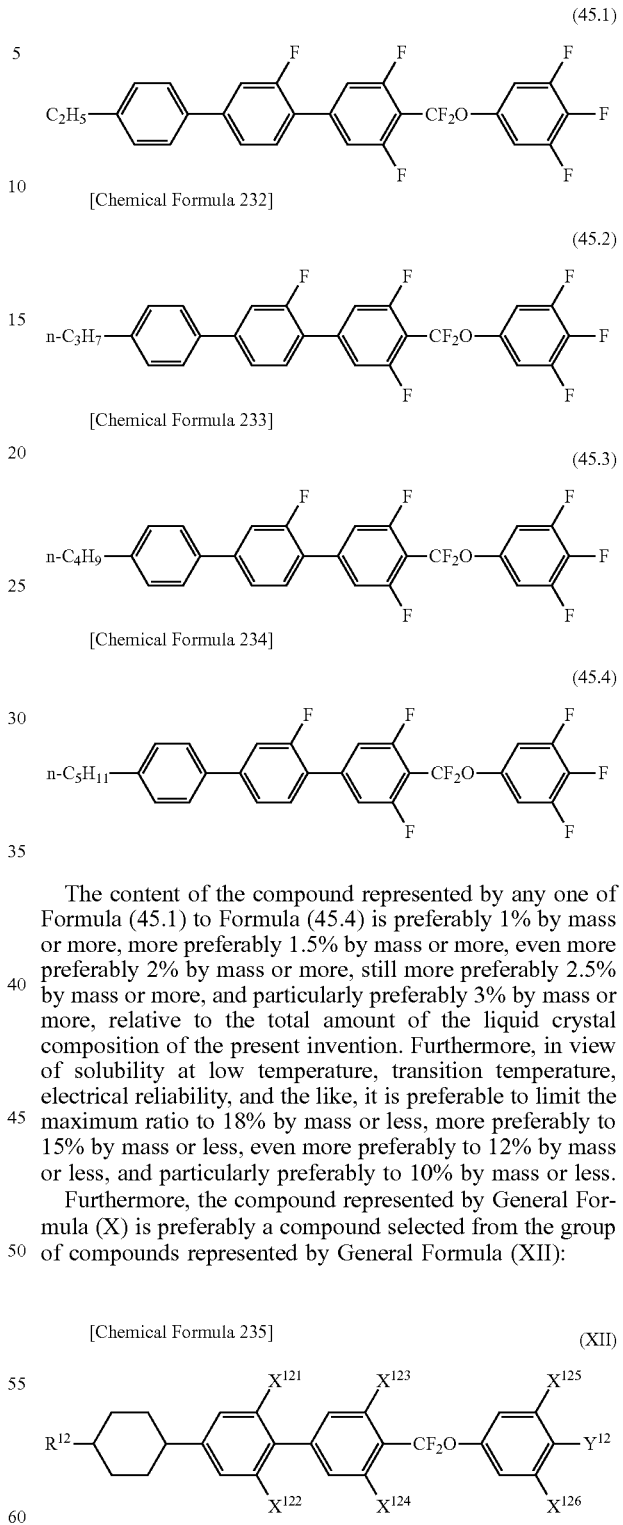

(XII)

(wherein in General Formula (XII), $X^{121}$ to $X^{126}$ each independently represent a fluorine atom or a hydrogen atom; $R^{12}$ represents an alkyl group having 1 to 5 carbon atoms, an alkenyl group having 2 to 5 carbon atoms, or an alkoxy group having 1 to 4 carbon atoms; and $Y^{12}$ represents a fluorine atom or —$OCF_3$).

There are no particular limitations on the compounds that can be used in combination; however, in view of solubility at low temperature, transition temperature, electrical reliability, birefringence and the like, it is preferable to combine one kind to three or more kinds of compounds, and it is more preferable to combine one kind to four or more kinds of compounds.

Furthermore, the compound represented by General Formula (XII), which is used for the liquid crystal composition of the present invention, is preferably a compound represented by General Formula (XII-1):

[Chemical Formula 236]

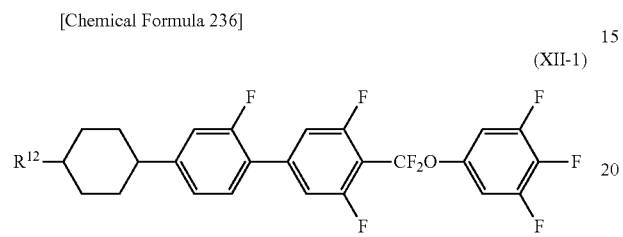

(XII-1)

(wherein in General Formula (XII-1), $R^{12}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, in view of solubility at low temperature, transition temperature, electrical reliability, birefringence and the like, it is preferable to combine one kind or two or more kinds of compounds, and it is more preferable to combine one kind to three or more kinds of compounds.

The content of the compound represented by General Formula (XII-1) is preferably 1% by mass or more, more preferably 2% by mass or more, even more preferably 3% by mass or more, and particularly preferably 4% by mass or more, relative to the total amount of the liquid crystal composition of the present invention. Furthermore, in view of solubility at low temperature, transition temperature, electrical reliability, and the like, it is preferable to limit the maximum ratio to 15% by mass or less, more preferably to 10% by mass or less, even more preferably to 8% by mass or less, and particularly preferably to 6% by mass or less.

Furthermore, it is preferable that the compound represented by General Formula (XII-1), which is used for the liquid crystal composition of the present invention, is specifically a compound represented by any one of Formula (46.1) to Formula (46.4), and above all, it is preferable that the compound represented by General Formula (XII-1) includes a compound represented by any one of Formula (46.2) to Formula (46.4).

[Chemical Formula 237]

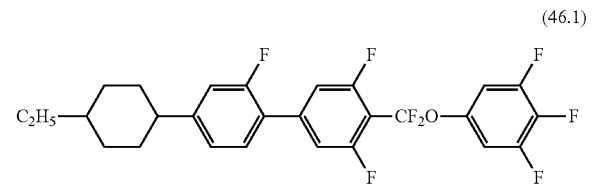

(46.1)

-continued

[Chemical Formula 238]

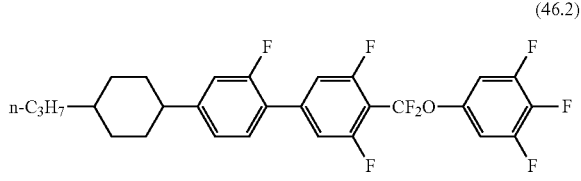

(46.2)

[Chemical Formula 239]

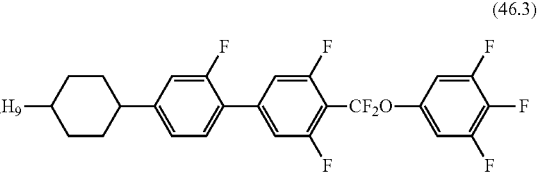

(46.3)

[Chemical Formula 240]

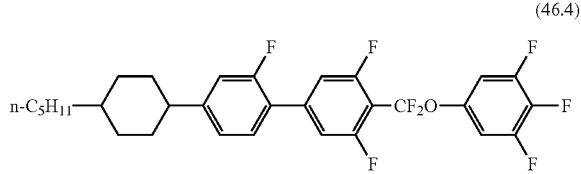

(46.4)

Furthermore, the compound represented by General Formula (XII) is preferably a compound represented by General Formula (XII-2):

[Chemical Formula 241]

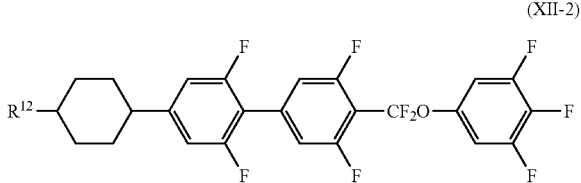

(XII-2)

(wherein in General Formula (XII-2), $R^{12}$ represents an alkyl group having 1 to 5 carbon atoms, an alkenyl group having 2 to 5 carbon atoms, or an alkoxy group having 1 to 4 carbon atoms).

There are no particular limitations on the compounds that can be used in combination; however, in view of solubility at low temperature, transition temperature, electrical reliability, birefringence and the like, it is preferable to combine one kind or two or more kinds of compounds, and it is more preferable to combine one kind to three or more kinds of compounds.

The content of the compound represented by General Formula (XII-2) is preferably 1% by mass or more, more preferably 3% by mass or more, even more preferably 4% by mass or more, still more preferably 6% by mass or more, and particularly preferably 9% by mass or more, relative to the total amount of the liquid crystal composition of the present invention. Furthermore, in view of solubility at low temperature, transition temperature, electrical reliability and the like, it is preferable to limit the maximum ratio to 20% by mass or less, more preferably to 17% by mass or less, even more preferably to 15% by mass or less, and particularly preferably to 13% by mass or less.

Furthermore, it is preferable that the compound represented by General Formula (XII-2), which is used for the liquid crystal composition of the present invention, is specifically a compound represented by any one of Formula (47.1) to Formula (47.4), and above all, it is preferable that the compound represented by General Formula (XII-2) includes a compound represented by any one of Formula (47.2) to Formula (47.4).

[Chemical Formula 242]

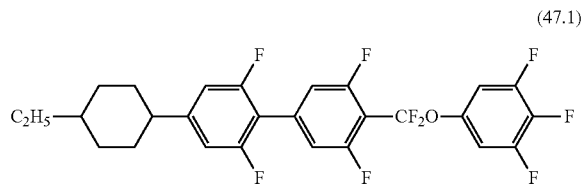

(47.1)

[Chemical Formula 243]

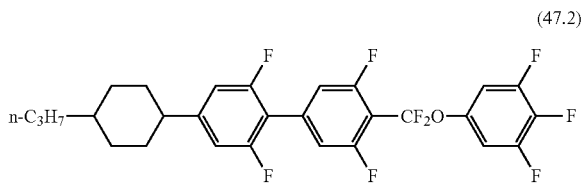

(47.2)

[Chemical Formula 244]

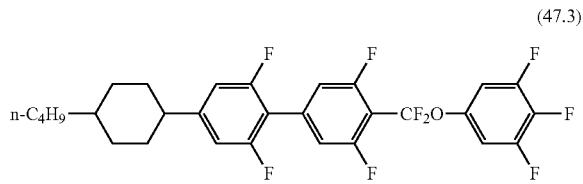

(47.3)

[Chemical Formula 245]

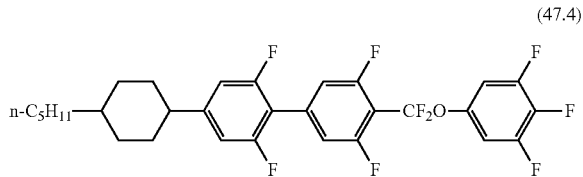

(47.4)

The compound represented by General Formula (M) related to the present invention is preferably, for example, a compound selected from the group of compounds represented by General Formula (VIII):

[Chemical Formula 246]

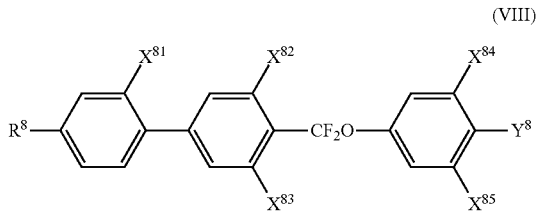

(VIII)

(wherein in General Formula (VIII), $R^8$ represents an alkyl group having 1 to 5 carbon atoms, an alkenyl group having 2 to 5 carbon atoms, or an alkoxy group having 1 to 4 carbon atoms; $X^{81}$ to $X^{85}$ each independently represent a hydrogen atom or a fluorine atom; and $Y^8$ represents a fluorine atom or $-OCF_3$).

There are no particular limitations on the kind of the compounds that can be used in combination, and the compounds are used in appropriate combinations according to the desired performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention. Furthermore, 3 or more kinds of compounds are used according to another embodiment of the present invention. When a compound represented by General Formula (VIII) is present in a liquid crystal composition, the liquid crystal composition exhibits a high Δn, and an effect that the transition point can be easily controlled by adjustment of the ratio with other tetracyclic compounds is provided.

The content of the compound represented by General Formula (VIII) in the liquid crystal composition of the present invention needs to be appropriately adjusted according to the required performance such as solubility at low temperature, transition temperature, electrical reliability, birefringence, process suitability, dropping marks, image burn-in, and dielectric constant anisotropy.

The content of the compound represented by General Formula (VIII) relative to the total mass of the liquid crystal composition of the present invention is, for example, 1% to 25% by mass according to an embodiment of the present invention. Furthermore, for example, the content of the compound is 1% to 20% by mass according to another embodiment of the present invention. For example, the content of the compound is 1% to 15% by mass according to another embodiment of the present invention. For example, the content of the compound is 1% to 10% by mass according to still another embodiment of the present invention. For example, the content of the compound is 1% to 7% by mass according to still another embodiment of the present invention. For example, the content of the compound is 1% to 6% by mass according to still another embodiment of the present invention. For example, the content of the compound is 1% to 5% by mass according to still another embodiment of the present invention. For example, the content of the compound is 1% to 4% by mass according to still another embodiment of the present invention. For example, the content of the compound is 3% to 7% by mass according to still another embodiment of the present invention. For example, the content of the compound is 3% to 6% by mass according to still another embodiment of the present invention. For example, the content of the compound is 4% to 7% by mass according to still another embodiment of the present invention.

In a case in which the viscosity of the liquid crystal composition of the present invention needs to be maintained low, and a liquid crystal composition having a fast response speed is needed, it is preferable to adjust the lower limit described above to a lower value, and to adjust the upper limit to a lower value. Furthermore, in a case in which the Tni of the liquid crystal composition of the present invention needs to be maintained high, and a liquid crystal composition having satisfactory temperature stability is needed, it is preferable to adjust the lower limit described above to a lower value, and to adjust the upper limit to a lower value. Furthermore, when it is wished to have a large dielectric constant anisotropy in order to maintain the driving voltage low, it is preferable to adjust the lower limit described above to a higher value, and to adjust the upper limit to a higher value.

Furthermore, the compound represented by General Formula (VIII) related to the present invention is preferably a compound represented by General Formula (VIII-1):

[Chemical Formula 247]

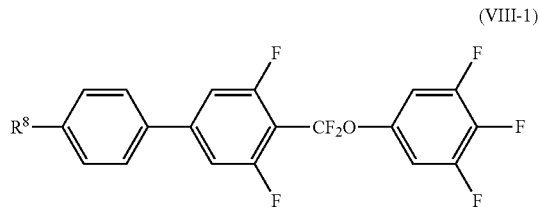

(VIII-1)

(wherein in General Formula (VIII-1), $R^8$ has the same meaning as the meaning for General Formula (VIII)).

Furthermore, it is preferable that the compound represented by General Formula (VIII-1) is specifically a compound represented by any one of Formula (26.1) to Formula (26.4), and the compound represented by General Formula (VIII-1) is preferably a compound represented by Formula (26.1) or Formula (26.2), and more preferably a compound represented by Formula (26.2).

[Chemical Formula 248]

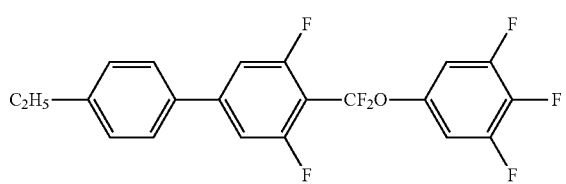

(26.1)

[Chemical Formula 249]

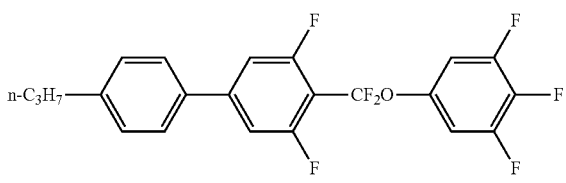

(26.2)

[Chemical Formula 250]

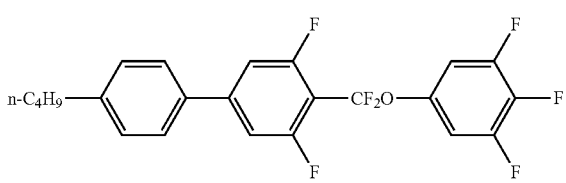

(26.3)

[Chemical Formula 251]

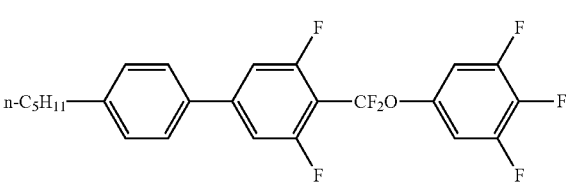

(26.4)

The content of the compound represented by any one of Formulae (26.1) to (26.4) is preferably from 1% by mass to 20% by mass, more preferably from 1% by mass to 15% by mass, even more preferably from 1% by mass to 10% by mass, and still more preferably from 1% by mass to 7% by mass, relative to the total mass of the liquid crystal composition of the present invention, in view of solubility at low temperature, transition temperature, electrical reliability, birefringence, and the like. Among these, for example, a content of from 1% by mass to 6% by mass, from 1% by mass to 5% by mass, from 3% by mass to 7% by mass, from 3% by mass to 6% by mass, or from 4% by mass to 7% by mass, is preferred.

Furthermore, the compound represented by General Formula (VIII) related to the present invention is preferably a compound represented by General Formula (VIII-2):

[Chemical Formula 252]

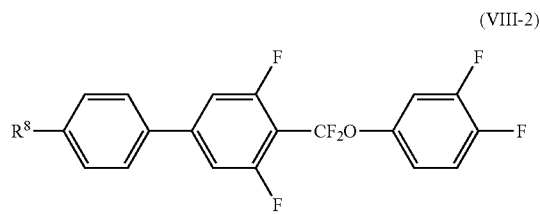

(VIII-2)

(wherein in General Formula (VIII-2), $R^8$ has the same meaning as the meaning for General Formula (VIII)).

There are no particular limitations on the kind of the compounds that can be used in combination as General Formula (VIII-2), and the compounds are used in appropriate combinations according to the desired performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention. Alternatively, 3 or more kinds of compounds are used according to still another embodiment of the present invention.

The content of the compound represented by General Formula (VIII-2) is preferably from 2.5% by mass to 25% by mass, preferably from 8% by mass to 25% by mass, preferably from 10% by mass to 20% by mass, and preferably from 12% by mass to 15% by mass, relative to the total mass of the liquid crystal composition of the present invention, in view of solubility at low temperature, transition temperature, electrical reliability, birefringence, and the like.

Furthermore, the compound represented by General Formula (VIII-2) is preferably a compound represented by any one of Formula (27.1) to Formula (27.4), and preferably a compound represented by Formula (27.2).

[Chemical Formula 253]

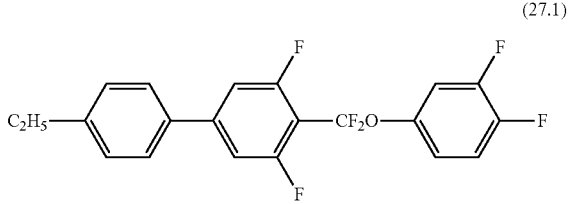

(27.1)

-continued

[Chemical Formula 254]

(27.2)

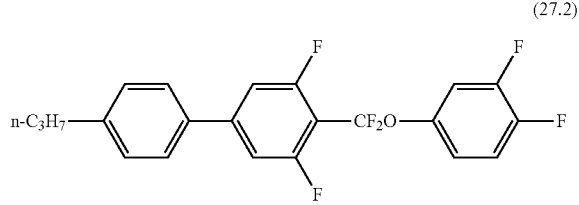

[Chemical Formula 255]

(27.3)

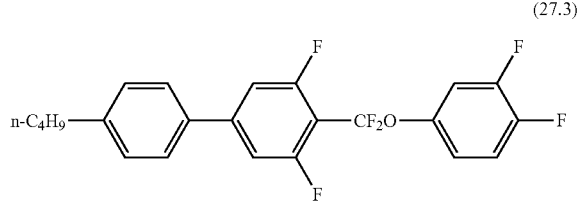

[Chemical Formula 256]

(27.4)

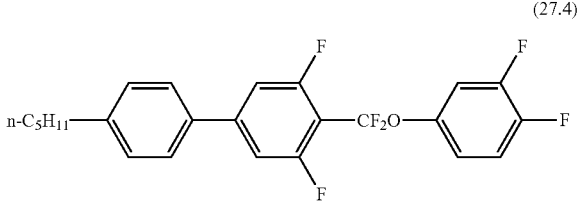

Furthermore, the compound represented by General Formula (M) related to the present invention is preferably, for example, a compound selected from the group of compounds represented by General Formula (IX):

[Chemical Formula 257]

(IX)

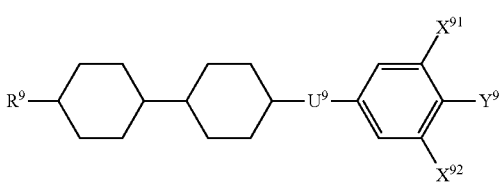

(wherein in General Formula (IX), $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; $Y^9$ represents a fluorine atom, a chlorine atom, or —$OCF_3$; and $U^9$ represents a single bond, —COO—, or —$CF_2O$—).

There are no particular imitations on the kind of the compounds that can be used in combination, and the compounds are used in appropriate combinations according to the desired performance such as solubility at low temperature, transition temperature, electrical reliability, and birefringence. The compound to be used is, for example, of one kind according to an embodiment of the present invention. Alternatively, 2 or more kinds of compounds are used according to another embodiment of the present invention.

The content of the compound represented by General Formula (VIII-3) is preferably from 0.5% by mass to 15% by mass, preferably from 0.5% by mass to 10% by mass, preferably from 0.5% by mass to 5% by mass or less, and preferably from 1% by mass to 5% by mass relative to the total mass of the liquid crystal composition of the present invention, in view of solubility at low temperature, transition temperature, electrical reliability, birefringence and the like.

In a case in which the viscosity of the liquid crystal composition of the present invention needs to be maintained low, and a liquid crystal composition having a fast response speed is needed, it is preferable to adjust the lower limit described above to a lower value, and to adjust the upper limit to a lower value. Furthermore, in a case in which the Tni of the liquid crystal composition of the present invention needs to be maintained high, and a liquid crystal composition which does not easily cause image burn-in is needed, it is preferable to adjust the lower limit described above to a lower value, and to adjust the upper limit to a lower value. Furthermore, when it is wished to have a large dielectric constant anisotropy in order to maintain the driving voltage low, it is preferable to adjust the lower limit described above to a higher value, and to adjust the upper limit to a higher value.

Furthermore, the compound represented by General Formula (IX) related to the present invention is preferably a compound represented by General Formula (IX-1):

[Chemical Formula 258]

(IX-1)

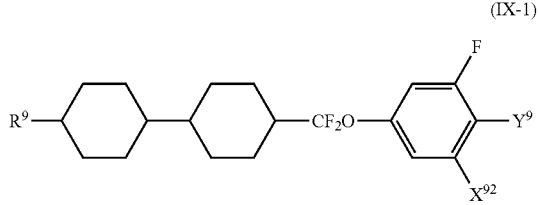

(wherein in General Formula (IX-1), $R^9$ and $X^{92}$ have the same meanings as the meanings for General Formula (IX), respectively).

Furthermore, the compound represented by General formula (IX-1) related to the present invention is preferably a compound represented by General Formula (IX-1-1):

[Chemical Formula 259]

(IX-1-1)

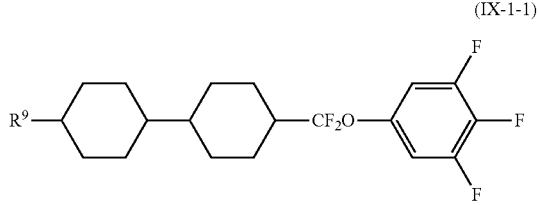

(wherein in General Formula (IX-1-1), $R^9$ has the same meaning as the meaning for General Formula (IX)).

There are no particular limitations on the kind of the compounds that can be used in combination, and the compounds are used in appropriate combinations according to the desired performance such as solubility at low temperature, transition temperature, electrical reliability, and birefringence. The compound to be used is, for example, of one kind according to an embodiment of the present invention. Alternatively, 2 kinds of compounds are used according to another embodiment of the present invention. Furthermore, 3 or more kinds of compounds are used according to another embodiment of the present invention.

The content of the compound represented by General Formula (IX-1) is appropriately adjusted according to each embodiment, in view of solubility at low temperature, transition temperature, electrical reliability, birefringence, and the like.

The content of the compound represented by General Formula (IX-1-1) relative to the total mass of the liquid crystal composition of the present invention is, for example, 1% to 30% by mass according to an embodiment of the present invention. Furthermore, for example, the content of the compound is 2% to 25% by mass according to another embodiment of the present invention. For example, the content of the compound is 3% to 20% by mass according to still another embodiment of the present invention. For example, the content of the compound is 9% to 15% by mass according to still another embodiment of the present invention. For example, the content of the compound is 1.2% to 20% by mass according to still another embodiment of the present invention.

Furthermore, the compound represented by General Formula (IX-1-1) is preferably a compound represented by any one of Formula (28.1) to Formula (28.5), and preferably a compound represented by Formula (28.3) or/and Formula (28.5).

[Chemical Formula 260]

(28.1)

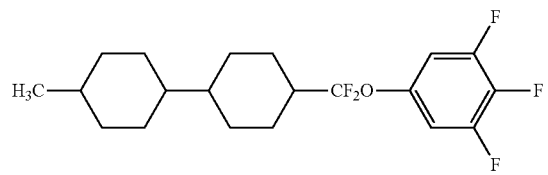

[Chemical Formula 261]

(28.2)

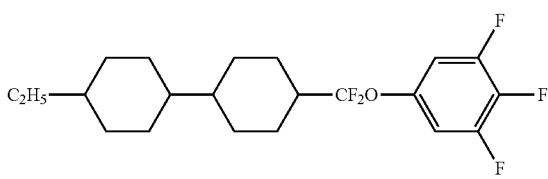

[Chemical Formula 262]

(28.3)

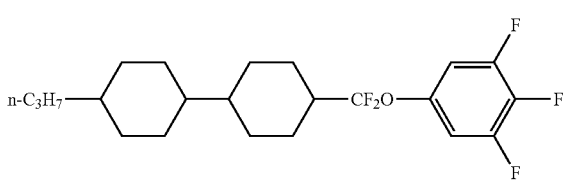

[Chemical Formula 263]

(28.4)

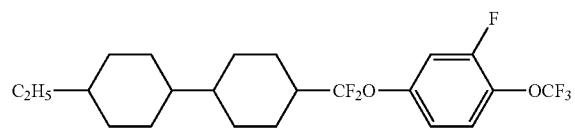

[Chemical Formula 264]

(28.5)

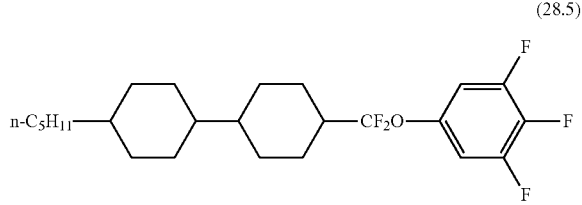

Furthermore, the compound represented by General Formula (IX-1) related to the present invention is preferably a compound represented by General Formula (IX-1-2):

[Chemical Formula 265]

(IX-1-2)

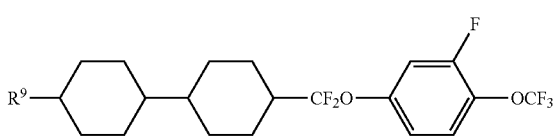

(wherein in Formula (IX-1-2), $R^9$ has the same meaning as the meaning for General Formula (IX)).

There are no particular limitations on the kind of the compounds that can be used in combination; however, it is preferable to combine one kind to three kinds of compounds in view of solubility at low temperature, transition temperature, electrical reliability, birefringence, and the like, and it is more preferable to combine one kind to four kinds of compounds.

The content of the compound represented by General Formula (IX-1-2) is preferably from 1% by mass to 30% by mass, preferably from 5% by mass to 25% by mass, and preferably from 8% by mass to 20% by mass, relative to the total mass of the liquid crystal composition of the present invention, in view of solubility at low temperature, transition temperature, electrical reliability, and the like.

Furthermore, the compound represented by General Formula (IX-1-2) is preferably a compound represented by any one of Formula (29.1) to Formula (29.4), and preferably a compound represented by Formula (29.2) or/and Formula (29.4).

[Chemical Formula 266]

(29.1)

[Chemical Formula 267]

(29.2)

-continued

[Chemical Formula 268]

(29.3)

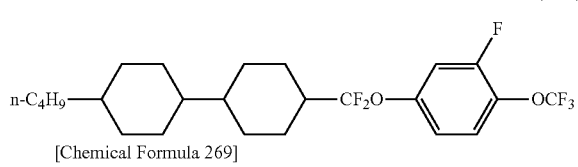

[Chemical Formula 269]

(29.4)

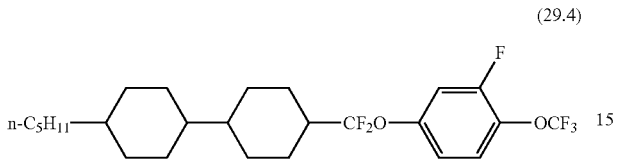

Furthermore, the compound represented by General Formula (IX) is preferably a compound represented by General Formula (IX-2):

[Chemical Formula 270]

(IX-2)

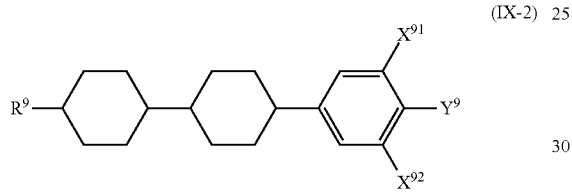

(wherein in General Formula (IX-2), $R^9$, $X^{91}$, and $X^{92}$ have the same meanings as the meanings for General Formula (IX), respectively).

Furthermore, the compound represented by General Formula (IX-2) related to the present invention is preferably a compound represented by General Formula (IX-2-1):

[Chemical Formula 271]

(IX-2-1)

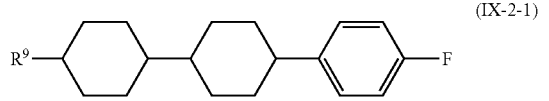

(wherein in General Formula (IX-2-1), $R^9$ has the same meaning as the meaning for General Formula (IX)).

For example, according to an embodiment of the present invention, the content of the compound represented by General Formula (IX-2-1) is 1% to 25% by mass relative to the total mass of the liquid crystal composition of the present invention. The content of the compound is 1% to 20% by mass according to another embodiment. The content of the compound is 1% to 15% by mass according to still another embodiment. Furthermore, the content of the compound is 1% to 3.0% by mass according to still another embodiment. Furthermore, the content of the compound is 1% to 5% by mass according to still another embodiment. Furthermore, the content of the compound is 1% to 4% by mass according to still another embodiment.

Furthermore, the compound represented by General Formula (IX-2-1) is preferably a compound represented by any one of Formula (30.1) to Formula (30.4), and preferably a compound represented by any one of Formula (30.1) to Formula (30.2).

[Chemical Formula 272]

(30.1)

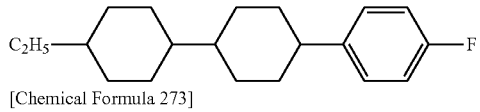

[Chemical Formula 273]

(30.2)

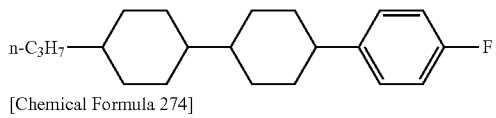

[Chemical Formula 274]

(30.3)

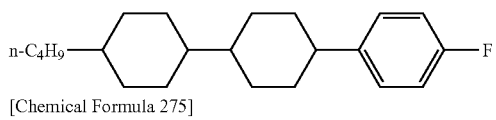

[Chemical Formula 275]

(30.4)

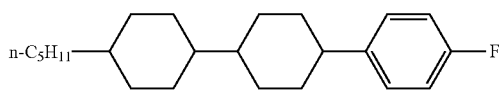

Furthermore, the compound represented by General Formula (IX-2) related to the present invention is preferably a compound represented by General Formula (IX-2-2):

[Chemical Formula 276]

(IX-2-2)

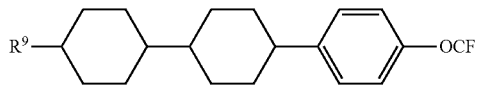

(wherein in General Formula (IX-2-2), $R^9$ has the same meaning as the meaning for General Formula (IX)).

The content of the compound represented by General Formula (IX-2-2) is appropriately adjusted for each embodiment in view of characteristics such as solubility at low temperature, transition temperature, electrical reliability, and birefringence.

The content of the compound represented by General Formula (IX-2-2) relative to the total mass of the liquid crystal composition of the present invention is 1% to 30% by mass according to an embodiment of the present invention, 1% to 25% by mass according to another embodiment, 1% to 20% by mass according to still another embodiment, 1% to 17% by mass according to still another embodiment, 1% to 16% by mass according to still another embodiment, 1% to 12% by mass according to still another embodiment, 1% to 11% by mass according to still another embodiment, 1% to 10% by mass according to still another embodiment, 1% to 9% by mass according to still another embodiment, 2% to 17% by mass according to still another embodiment, 6% to 17% by mass according to still another embodiment, 8% to 17% by mass according to still another embodiment, 9% to 17% by mass according to still another embodiment, 14% to 17% by mass according to still another embodiment, 14% to 1.6% by mass according to still another embodiment, 2% to 9% by mass according to still another embodiment, 6% to 10% by mass according to still another embodiment, 8% to 11% by mass according to still another embodiment, and 9% to 12% by mass according to still another embodiment.

Furthermore, the compound represented by General Formula (IX-2-2) is preferably a compound represented by any one of Formula (31.1) to Formula (31.4), and preferably a compound represented by any one of Formula (31.1) to Formula (31.4).

[Chemical Formula 277]

(31.1)

[Chemical Formula 278]

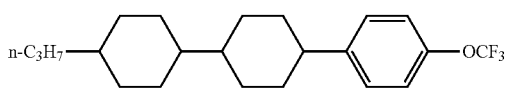

(31.2)

[Chemical Formula 279]

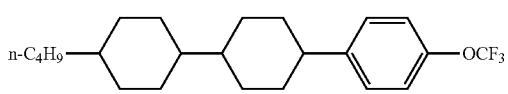

(31.3)

[Chemical Formula 280]

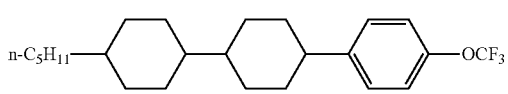

(31.4)

Furthermore, the compound represented by General Formula (IX-2) is preferably a compound represented by General Formula (IX-2-3):

[Chemical Formula 281]

(IX-2-3)

(wherein in General Formula (IX-2-3), $R^9$ has the same meaning as the meaning for General Formula (IX)).

There are no particular limitations on the kind of the compounds that can be used in combination; however, it is preferable to combine 1 to 2 kinds of compounds in view of solubility at low temperature, transition temperature, electrical reliability, birefringence, and the like.

The content of the compound represented by General Formula (IX-2-3) is preferably from 1% by mass to 30% by mass, more preferably from 3% by mass to 20% by mass, even more preferably from 6% by mass to 15% by mass, and still more preferably from 8% by mass to 10% by mass, relative to the total mass of the liquid crystal composition of the present invention, in view of solubility at low temperature, transition temperature, electrical reliability, and the like.

Furthermore, the compound represented by General Formula (IX-2-3) is preferably a compound represented by any one of Formula (32.1) to Formula (32.4), and preferably a compound represented by any one of Formula (32.2) and/or Formula (32.4).

[Chemical Formula 282]

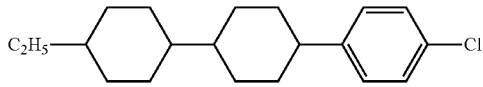

(32.1)

[Chemical Formula 283]

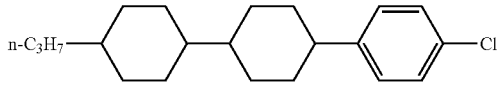

(32.2)

[Chemical Formula 284]

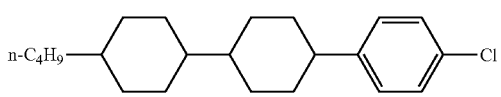

(32.3)

[Chemical Formula 285]

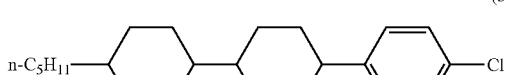

(32.4)

Furthermore, the compound represented by General Formula (IX-2) related to the present invention is preferably a compound represented by General Formula (IX-2-4):

[Chemical Formula 286]

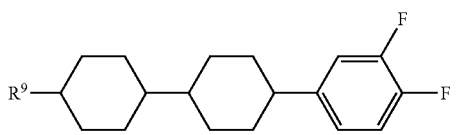

(IX-2-4)

(wherein in General Formula (IX-2-4), $R^9$ has the same meaning as the meaning for General Formula (IX)).

The content of the compound represented by General Formula (IX-2-4) is preferably from 1% by mass to 25% by mass, preferably from 1% by mass to 20% by mass, preferably from 1% by mass to 15% by mass, preferably from 1% by mass to 12% by mass, preferably from 5% by mass to 12% by mass, and preferably from 7% by mass to 12% by mass, relative to the total mass of the liquid crystal composition of the present invention, in view of solubility at low temperature, transition temperature, electrical reliability, and the like.

Furthermore, the compound represented by General Formula (IX-2-4) is preferably a compound represented by any one of Formula (33.1) to Formula (33.8), and more preferably a compound represented by any one of Formula (33.1), Formula (33.8), and Formulae (33.2) to Formula (33.5).

[Chemical Formula 287]

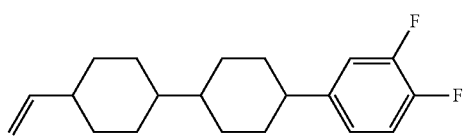

(33.1)

[Chemical Formula 288]

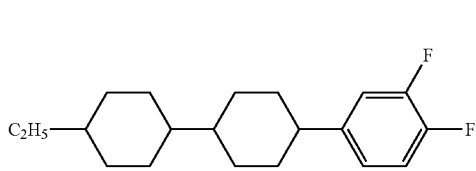
(33.2)

[Chemical Formula 289]

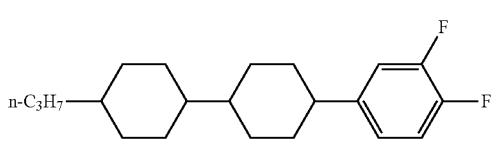
(33.3)

[Chemical Formula 290]

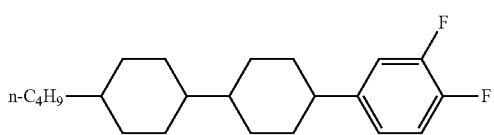
(33.4)

[Chemical Formula 291]

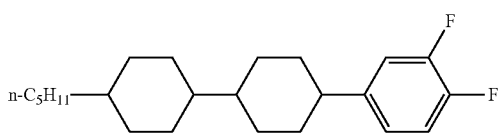
(33.5)

[Chemical Formula 292]

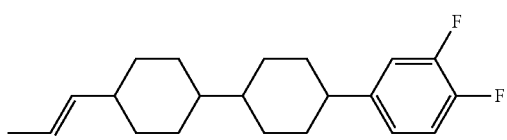
(33.6)

[Chemical Formula 293]

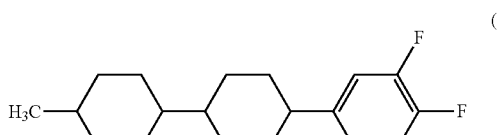
(33.7)

(33.8)

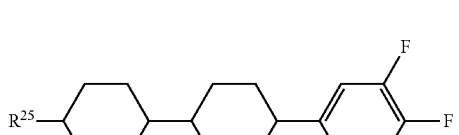

In Formula (33.8), $R^{25}$ is preferably an alkenyl group having 2 to 6 carbon atoms.

Furthermore, the compound represented by General Formula (IX-2) related to the present invention is preferably a compound represented by General Formula (IX-2-5):

[Chemical Formula 294]

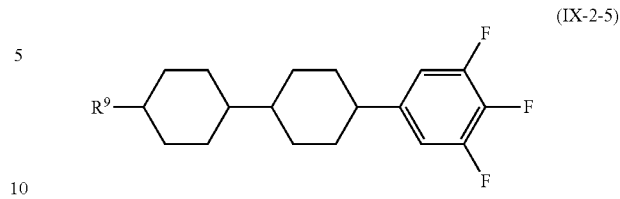
(IX-2-5)

(wherein in General Formula (IX-2-5), $R^9$ has the same meaning as the meaning for General Formula (IX)).

There are no particular limitations on the kind of the compounds that can be used in combination, and the compounds are used in appropriate combinations for each embodiment in view of solubility at low temperature, transition temperature, electrical reliability, birefringence, and the like. For example, one kind of compound is used according to an embodiment of the present invention, 2 kinds of compounds are used according to another embodiment, 3 kinds of compounds are used according to still another embodiment, and 4 or more kinds of compounds are used according to still another embodiment.

The content of the compound represented by General Formula (IX-2-5) is appropriately adjusted for each embodiment in view of characteristics such as solubility at low temperature, transition temperature, electrical reliability, and birefringence.

For example, the content of the compound represented by General Formula (IX-2-5) is 0.1% to 30% by mass according to an embodiment of the present invention, 0.3% to 25% by mass according to another embodiment, 0.5% to 20% by mass according to still another embodiment, 1% to 1.5% by mass according to still another embodiment, 2% to 14% by mass according to still another embodiment, 2.5% to 15% by mass according to still another embodiment, and 3% to 12% by mass according to still another embodiment, relative to the total mass of the liquid crystal composition of the present invention.

In a case in which the viscosity of the liquid crystal composition of the present invention needs to be maintained low, and a liquid crystal composition having a fast response speed is needed, it is preferable to adjust the lower limit described above to a lower value, and to adjust the upper limit to a lower value. Furthermore, in a case in which the Tni of the liquid crystal composition of the present invention needs to be maintained high, and a liquid crystal composition which does not easily cause image burn-in is needed, it is preferable to adjust the lower limit described above to a lower value, and to adjust the upper limit to a lower value. Furthermore, when it is wished to have a large dielectric constant anisotropy in order to maintain the driving voltage low, it is preferable to adjust the lower limit described above to a higher value, and to adjust the upper limit to a higher value.

Furthermore, the compound represented by General Formula (IX-2-5) is preferably a compound represented by any one of Formula (34.1) to Formula (34.5), and preferably a compound represented by any one of Formula (34.1), Formula (34.2), Formula (34.3), and/or Formula (34.5).

[Chemical Formula 295]

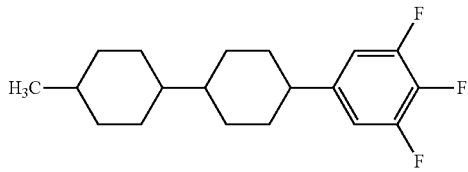
(34.1)

[Chemical Formula 296]

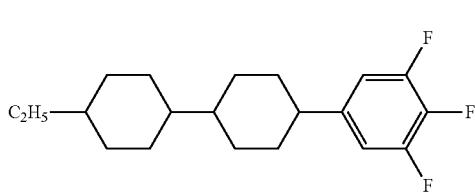
(34.2)

[Chemical Formula 297]

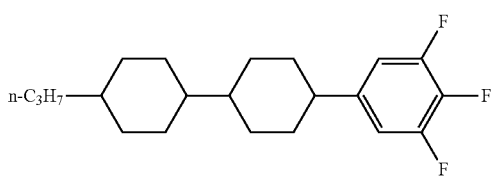
(34.3)

[Chemical Formula 298]

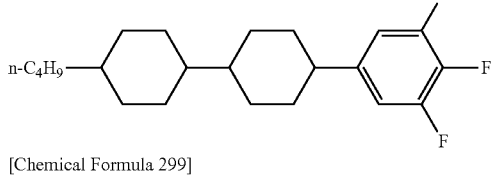
(34.4)

[Chemical Formula 299]

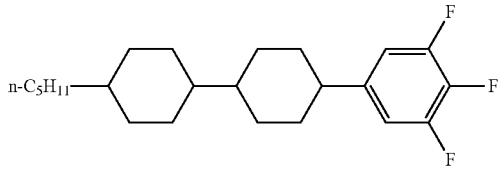
(34.5)

[Chemical Formula 300]

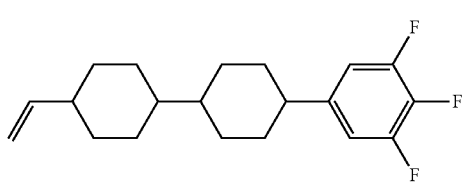
(34.6)

[Chemical Formula 301]

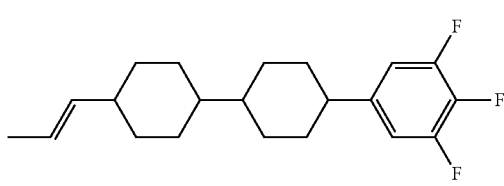
(34.7)

Furthermore, the compound represented by General Formula (IX) related to the present invention is preferably a compound represented by General Formula (IX-3):

[Chemical Formula 302]

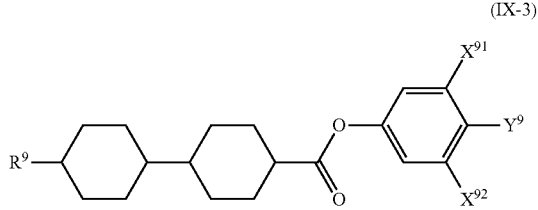
(IX-3)

(wherein in General Formula (IX-3), $R^9$, $X^{91}$, and $X^{92}$ have the same meanings as the meanings for General Formula (IX), respectively).

Furthermore, the compound represented by General Formula (IX-3) is preferably a compound represented by General Formula (IX-3-1):

[Chemical Formula 303]

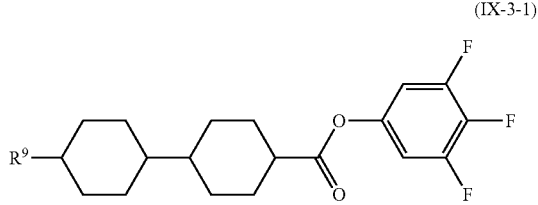
(IX-3-1)

(wherein in General Formula (IX-3-1), $R^9$ has the same meaning as the meaning for General Formula (IX)).

There are no particular limitations on the kind of the compounds that can be used in combination; however, it is preferable to combine 1 to 2 kinds of compounds in view of solubility at low temperature, transition temperature, electrical reliability, birefringence, and the like.

The content of the compound represented by General Formula (IX-3-1) is preferably from 3% by mass to 30% by mass, preferably from 7% by mass to 30% by mass, preferably from 13% by mass to 20% by mass, and preferably from 15% by mass to 18% by mass, relative to the total mass of the liquid crystal composition of the present invention, in view of solubility at low temperature, transition temperature, electrical reliability, and the like.

Furthermore, the compound represented by General Formula (IX-3-1) is preferably a compound represented by any one of Formula (35.1) to Formula (35.4), and preferably a compound represented by Formula (35.1) and/or Formula (35.2).

[Chemical Formula 304]

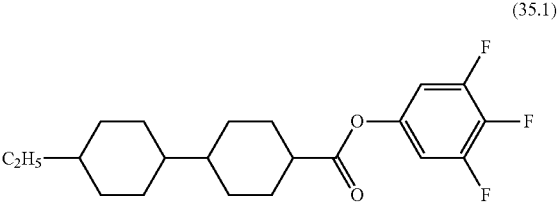
(35.1)

[Chemical Formula 305]

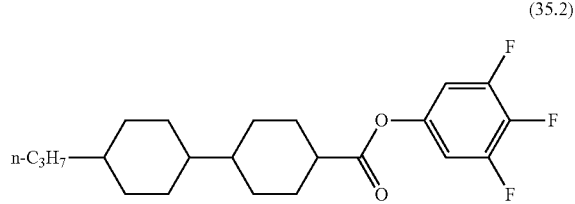

(35.2)

[Chemical Formula 306]

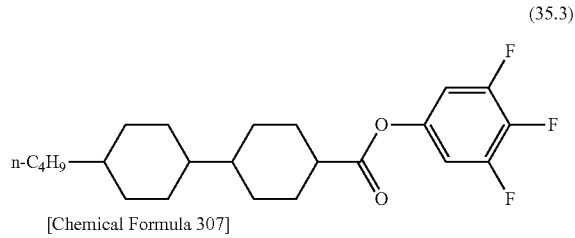

(35.3)

[Chemical Formula 307]

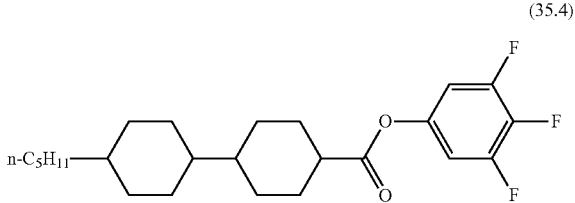

(35.4)

Furthermore, the compound represented by General Formula (M) related to the present invention is preferably a compound selected from the group of compounds represented by General Formula (XIII):

[Chemical Formula 308]

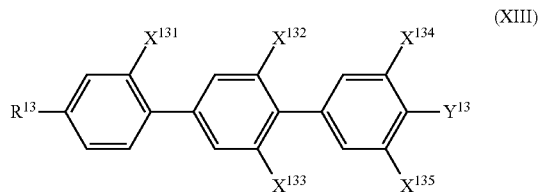

(XIII)

(wherein in General Formula (XIII), $X^{131}$ to $X^{135}$ each independently represent a fluorine atom or a hydrogen atom; $R^{13}$ represents an alkyl group having 1 to 5 carbon atoms, an alkenyl group having 2 to 5 carbon atoms, or an alkoxy group having 1 to 4 carbon atoms; and $Y^{13}$ represents a fluorine atom or —OCF$_3$).

There are no particular limitations on the kind of the compounds that can be used in combination; however, among these compounds, it is preferable for the liquid crystal composition to include one kind to two kinds of compounds, more preferably one kind to three kinds of compounds, and even more preferably one kind to four kinds of compounds.

The content of the compound represented by General Formula (XXIII) has an upper limit and a lower limit for each embodiment in view of characteristics such as solubility at low temperature, transition temperature, electrical reliability, and birefringence. The lower limit of the content is, for example, 2% relative to the total amount of the liquid crystal composition of the present invent ion according to an embodiment of the present invention, 4% according to another embodiment, 5% according to still another embodiment, 7% according to still another embodiment, 9% according to still another embodiment, 11% according to still another embodiment, and 13% according to still another embodiment. Furthermore, the lower limit of the content is 14% according to still another embodiment. Furthermore, the lower limit of the content is 16% according to still another embodiment. Furthermore, the lower limit of the content is 20% according to still another embodiment.

Furthermore, the upper limit of the content is, for example, 30% according to an embodiment of the present invention, 25% according to another embodiment, 20% according to still another embodiment, 15% according to still another embodiment, 10% according to still another embodiment, and 5% according to still another embodiment.

In a case in which the liquid crystal composition of the present invention is used for a liquid crystal display element having a small cell gap, it is suitable to adjust the content of the compound represented by General Formula (XIII) to a larger value. In a case in which the liquid crystal composition is used for a liquid crystal display element having a small driving voltage, it is suitable to adjust the content of the compound represented by General Formula (XIII) to a larger value. Furthermore, in a case in which the liquid crystal composition is used for a liquid crystal display element used in an environment at low temperature, it is suitable to adjust the content of the compound represented by General Formula (XIII) to a smaller value. In the case of a liquid crystal composition which is used for a liquid crystal display element having a fast response speed, it is suitable to adjust the content of the compound represented by General Formula (XIII) to a smaller value.

Furthermore, the compound represented by General Formula (XIII) related to the present invention is preferably a compound represented by General Formula (XIII-1):

[Chemical Formula 309]

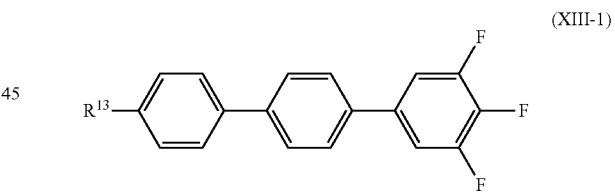

(XIII-1)

(wherein in General Formula (XIII-1), $R^{13}$ represents an alkyl group having 1 to 5 carbon atoms, an alkenyl group having 2 to 5 carbon atoms, or an alkoxy group having 1 to 4 carbon atoms).

It is preferable that the compound represented by General Formula (XIII-1) is included at a proportion of 1% by mass or more, more preferably at a proportion of 3% by mass or more, even more preferably at a proportion of 5% by mass or more, and particularly preferably at a proportion of 10% by mass or more, relative to the total amount of the liquid crystal composition of the present invention. Furthermore, the ratio at which the compound represented by General Formula (XIII-1) can be included at the maximum is preferably 25% by mass or less, more preferably 20% by mass or less, and even more preferably 15% by mass or less.

Furthermore, the compound represented by General Formula (XIII-1) is preferably a compound represented by any one of Formula (48.1) to Formula (48.4), and preferably a compound represented by Formula (48.2).

[Chemical Formula 310]

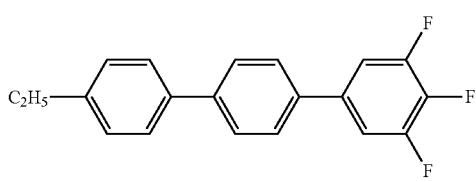
(48.1)

[Chemical Formula 311]

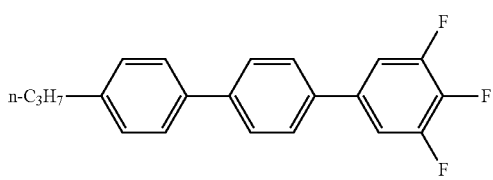
(48.2)

[Chemical Formula 312]

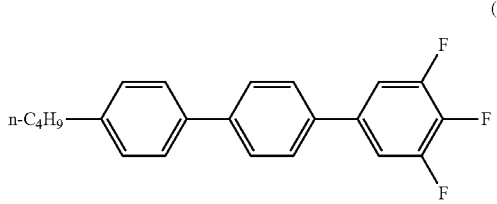
(48.3)

[Chemical Formula 313]

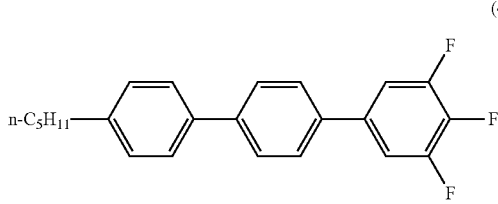
(48.4)

Furthermore, the compound represented by General Formula (XIII) related to the present invention is preferably a compound represented by General Formula (XIII-2):

[Chemical Formula 314]

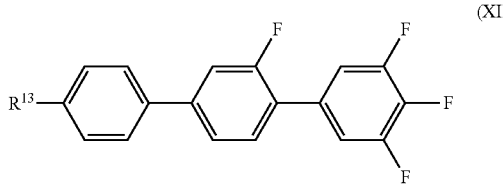
(XIII-2)

(wherein in General Formula (XIII-2), $R^{13}$ represents an alkyl group having 1 to 5 carbon atoms, an alkenyl group having 2 to 5 carbon atoms, or an alkoxy group having 1 to 4 carbon atoms).

There are no particular limitations on the kind of the compounds that can be used in combination; however, it is preferable that one kind or two or more kinds of compounds among these compounds are included in the liquid crystal composition.

It is preferable for the liquid crystal composition of the present invention to include the compound represented by General Formula (XIII-2) at a proportion of 5% by mass or more, more preferably at a proportion of 6% by mass or more, even more preferably at a proportion of 8% by mass or more, and particularly preferably at a proportion of 10% by mass or more, relative to the total amount of the liquid crystal composition. Furthermore, the ratio at which the compound represented by General Formula (XIII-2) can be included at the maximum is preferably 25% by mass or less, more preferably 20% by mass or less, and even more preferably 15% by mass or less.

Furthermore, the compound represented by General Formula (XIII-2) is preferably a compound represented by any one of Formula (49.1) to Formula (49.4), and preferably a compound represented by Formula (49.1) or/and Formula (49.2).

[Chemical Formula 315]

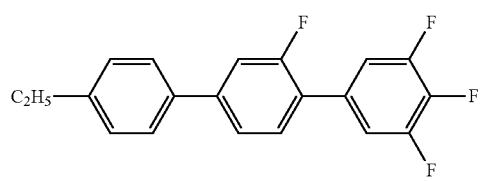
(49.1)

[Chemical Formula 316]

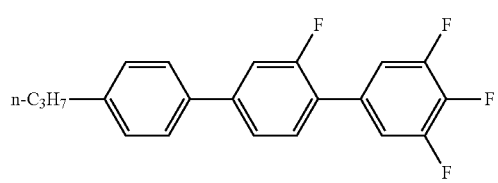
(49.2)

[Chemical Formula 317]

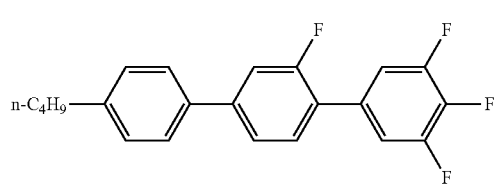
(49.3)

[Chemical Formula 318]

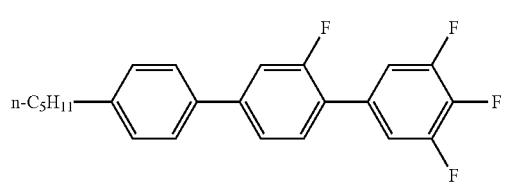
(49.4)

Furthermore, the compound represented by General Formula (XIII) related to the present invention is preferably a compound represented by General Formula (XIII-3):

[Chemical Formula 319]

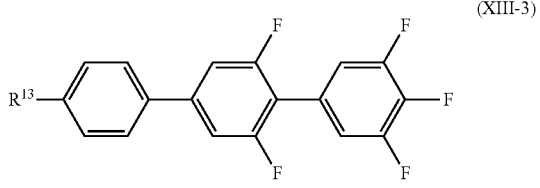

(XIII-3)

(wherein in General Formula (XIII-3), $R^{13}$ represents an alkyl group having 1 to 5 carbon atoms, an alkenyl group having 2 to 5 carbon atoms, or an alkoxy group having 1 to 4 carbon atoms).

There are no particular limitations on the kind of the compounds that can be used in combination; however, it is preferable that one kind or two or more kinds of compounds among these compounds are included in the liquid crystal composition.

It is preferable for the liquid crystal composition of the present invention to include the compound represented by General Formula (XIII-3) at a proportion of 2% by mass or more, more preferably at a proportion of 4% by mass or more, even more preferably at a proportion of 9% by mass or more, and particularly preferably at a proportion of 11% by mass or more, relative to the total amount of the liquid crystal composition. Furthermore, the ratio at which the compound represented by General Formula (XIII-3) can be included at the maximum is preferably 20% by mass or less, more preferably 17% by mass or less, and even more preferably 14% by mass or less.

Furthermore, the compound represented by General Formula (XIII-3) is preferably a compound represented by any one of Formula (50.1) to Formula (50.4), and preferably a compound represented by formula (50.1) or/and Formula (50.2).

[Chemical Formula 320]

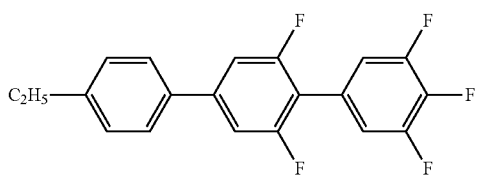

(50.1)

[Chemical Formula 321]

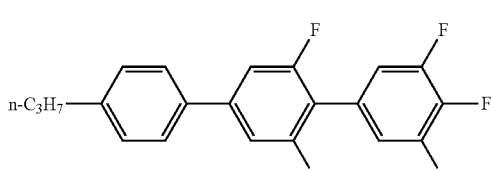

(50.2)

[Chemical Formula 322]

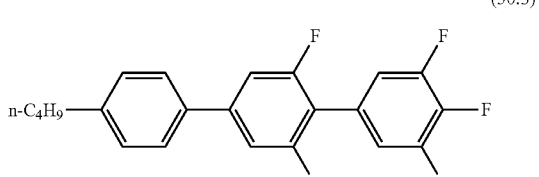

(50.3)

[Chemical Formula 323]

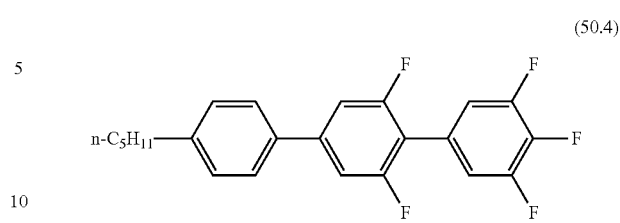

(50.4)

Furthermore, the compound represented by General Formula (M) related to the present invention is preferably a compound selected from the group of compounds represented by General Formula (XIV):

[Chemical Formula 324]

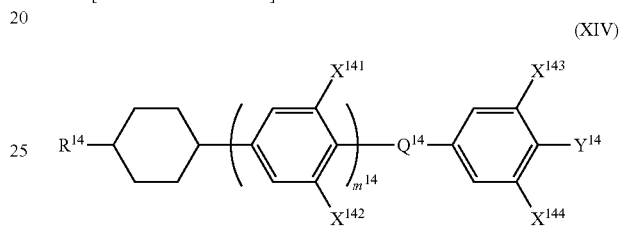

(XIV)

(wherein in General Formula (XIV), $R^{14}$ represents an alkyl group having 1 to 7 carbon atoms, an alkenyl group having 2 to 7 carbon atoms, or an alkoxy group having 1 to 7 carbon atoms; $X^{143}$ to $X^{144}$ each independently represent a fluorine atom or a hydrogen atom; $Y^{14}$ represents a fluorine atom, a chlorine atom, or —$OCF_3$; $Q^{14}$ represents a single bond, —COO—, or —$CF_2O$—; and $m^{14}$ represents 0 or 1).

There are no limitations on the kind of the compounds that can be used in combination, and the compounds are appropriately combined for each embodiment in view of solubility at low temperature, transition temperature, electrical reliability, birefringence, and the like. For example, one kind of compound is used according to an embodiment of the present invention. Furthermore, 2 kinds of compounds are used according to another embodiment of the present invention. Alternatively, 3 kinds of compounds are used according to still another embodiment of the present invention. Furthermore, 4 kinds of compounds are used according to still another embodiment of the present invention. Alternatively, 5 kinds of compounds are used according to still another embodiment of the present invention. Alternatively, 6 or more kinds of compounds are used according to still another embodiment of the present invention.

The content of the compound represented by General Formula (XIV) has an upper limit and a lower limit for each embodiment in view of characteristics such as solubility at low temperature, transition temperature, electrical reliability, and birefringence. The lower limit of the content is, for example, 3% relative to the total amount of the liquid crystal composition of the present invent ion according to an embodiment of the present invention, 7% according to another embodiment, 8% according to still another embodiment, 11% according to still another embodiment, 12% according to still another embodiment, 16% according to still another embodiment, and 18% according to still another embodiment. The lower limit of the content is 19% according to still another embodiment. Furthermore, the lower limit of the content is 22% according to still another embodiment. Furthermore, the lower limit of the content is 25% according to still another embodiment.

Furthermore, the upper limit of the content is, for example, 40% according to an embodiment of the present invention, 35% according to another embodiment, 30% according to still another embodiment, 25% according to still another embodiment, 20% according to still another embodiment, and 15% according to still another embodiment.

In a case in which the liquid crystal composition of the present invention is used for a liquid crystal display element having a small driving voltage, it is suitable to adjust the content of the compound represented by General Formula (XIV) to a larger value. Furthermore, in the case of a liquid crystal composition which is used for a liquid crystal display element having a fast response speed, it is suitable to adjust the content of the compound represented by General Formula (XIV) to a smaller value.

Furthermore, the compound represented by General Formula (XIV) related to the present invention is preferably a compound represented by General Formula (XIV-1):

[Chemical Formula 325]

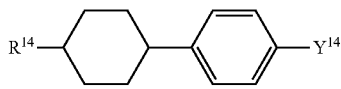

(XIV-1)

(wherein in General Formula (XIV-1), $R^{14}$ represents an alkyl group having 1 to 7 carbon atoms, an alkenyl group having 2 to 7 carbon atoms, or an alkoxy group having 1 to 7 carbon atoms; and $Y^{14}$ represents a fluorine atom, a chlorine atom, or $-OCF_3$).

There are no particular limitations on the kind of the compounds that can be used in combination; however, it is preferable to combine one kind to three kinds of compounds in view of solubility at low temperature, transition temperature, electrical reliability, birefringence, and the like.

Furthermore, the compound represented by General Formula (XIV-1) is preferably a compound represented by General Formula (XIV-1-1):

[Chemical Formula 326]

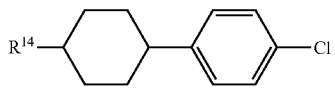

(XIV-1-1)

(wherein in General Formula (XIV-1), $R^{14}$ represents an alkyl group having 1 to 7 carbon atoms, an alkenyl group having 2 to 7 carbon atoms, or an alkoxy group having 1 to 7 carbon atoms).

The content of the compound represented by General Formula (XIV-1) is preferably 2% by mass or more, more preferably 4% by mass or more, even more preferably 7% by mass or more, still more preferably 10% by mass or more, and particularly preferably 1.8% by mass or more, relative to the total amount of the liquid crystal composition of the present invention. Furthermore, in view of solubility at low temperature, transition temperature, electrical reliability, and the like, it is preferable to limit the maximum ratio to 30% by mass or less, more preferably to 27% by mass or less, even more preferably to 24% by mass or less, and particularly preferably to less than 21% by mass.

Furthermore, it is preferable that the compound represented by General Formula (XIV-1-1) is specifically a compound represented by any one of Formula (51.1) to Formula (51.4), and it is more preferable that the compound represented by General Formula (XIV-1-1) includes a compound represented by Formula (51.1).

[Chemical Formula 327]

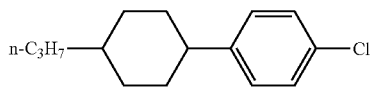

(51.1)

[Chemical Formula 328]

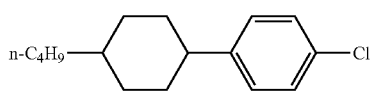

(51.2)

[Chemical Formula 329]

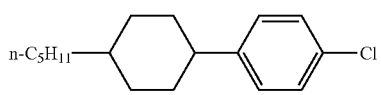

(51.3)

[Chemical Formula 330]

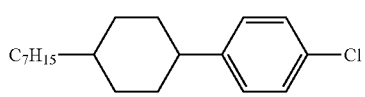

(51.4)

Furthermore, the compound represented by General Formula (XIV-1) is preferably a compound represented by General Formula (XIV-1-2):

[Chemical Formula 331]

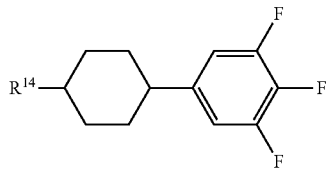

(XIV-1-2)

(wherein in General Formula (XIV-1-2), $R^{14}$ represents an alkyl group having 1 to 7 carbon atoms, an alkenyl group having 2 to 7 carbon atoms, or an alkoxy group having 1 to 7 carbon atoms).

The content of the compound represented by General Formula (XIV-1-2) is preferably 1% by mass or more, more preferably 3% by mass or more, even more preferably 5% by mass or more, and particularly preferably 7% by mass or more, relative to the total amount of the liquid crystal composition of the present invention. Furthermore, in view of solubility at low temperature, transition temperature, electrical reliability, and the like, it is preferable to limit the maximum ratio to 15% by mass or less, more preferably to 13% by mass or less, even more preferably to 11% by mass or less, and particularly preferably to less than 9% by mass.

Furthermore, it is preferable that the compound represented by General Formula (XIV-1-2) is specifically a compound represented by any one of Formula (52.1) to Formula (52.4), and above all, it is preferable that the compound represented by General Formula (XIV-1-2) includes a compound represented by Formula (52.4).

[Chemical Formula 332]

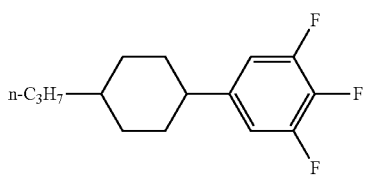

(52.1)

[Chemical Formula 333]

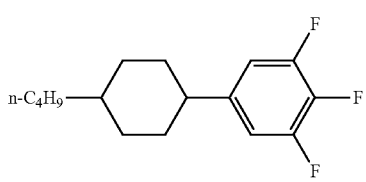

(52.2)

[Chemical Formula 334]

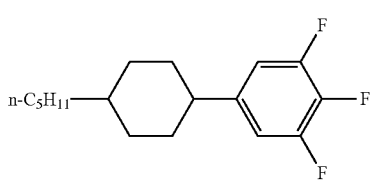

(52.3)

[Chemical Formula 335]

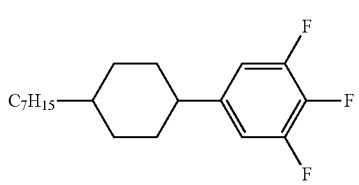

(52.4)

Furthermore, the compound represented by General Formula (XIV) related to the present invention is preferably a compound represented by General Formula (XIV-2):

[Chemical Formula 336]

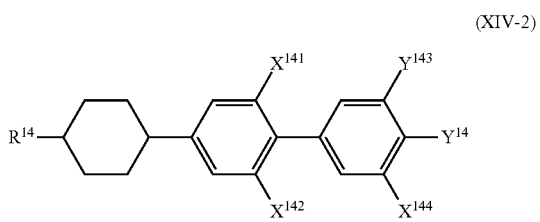

(XIV-2)

(wherein in General Formula (XIV-2), $R^{14}$ represents an alkyl group having 1 to 5 carbon atoms, an alkenyl group having 2 to 5 carbon atoms, or an alkoxy group having 1 to 4 carbon atoms; $X^{141}$ to $X^{144}$ each independently represent a fluorine atom or a hydrogen atom; and $Y^{14}$ represents a fluorine atom, a chlorine atom, or —$OCF_3$).

There are no limitations on the kind of the compounds that can be used in combination, and the compounds are appropriately combined for each embodiment, in view of solubility at low temperature, transition temperature, electrical reliability, birefringence, and the like. For example, one kind of compound is used according to an embodiment of the present invention. Furthermore, 2 kinds of compounds are used according to another embodiment of the present invention. Alternatively, 3 kinds of compounds are used according to still another embodiment of the present invention. Furthermore, 4 kinds of compounds are used according to still another embodiment of the present invention. Alternatively, 5 or more kinds of compounds are used according to still another embodiment of the present invention.

The content of the compound represented by General Formula (XIV-2) has an upper limit and a lower limit for each embodiment, in view of characteristics such as solubility at low temperature, transition temperature, electrical reliability, and birefringence. The lower limit of the content is, for example, 0.1% relative to the total amount of the liquid crystal composition of the present invention according to an embodiment of the present invention, 0.5% according to another embodiment, 1% according to still another embodiment, 1.2% according to still another embodiment, 1.5% according to still another embodiment, 2% according to still another embodiment, and 2.5% according to still another embodiment. Furthermore, the lower limit of the content is 3% according to still another embodiment.

Furthermore, the upper limit of the content is, for example, 20% according to an embodiment of the present invention, 18% according to another embodiment, 12% according to still another embodiment, 10% according to still another embodiment, 8% according to still another embodiment, and 7% according to still another embodiment.

In a case in which the liquid crystal composition of the present invention is used for a liquid crystal display element having a small driving voltage, it is suitable to adjust the content of the compound represented by General Formula (XIV-2) to a larger value. Furthermore, in the case of liquid crystal composition which is used for a liquid crystal display element having a fast response speed, it is suitable to adjust the content of the compound represented by General Formula (XIV-2) to a smaller value.

Furthermore, the compound represented by General Formula (XIV-2) related to the present invention is preferably a compound represented by General Formula (XIV-2-1):

[Chemical Formula 337]

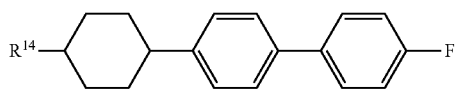

(XIV-2-1)

(wherein in General Formula (XIV-2-1), $R^{14}$ represents an alkyl group having 1 to 5 carbon atoms, an alkenyl group having 2 to 5 carbon atoms, or an alkoxy group having 1 to 4 carbon atoms).

The content of the compound represented by General Formula (XIV-2-1) is preferably 1% by mass or more, more preferably 3% by mass or more, even more preferably 5% by mass or more, and particularly preferably 7% by mass or more, relative to the total amount of the liquid crystal composition of the present invention. Furthermore, in view of solubility a t low temperature, transition temperature, electrical reliability, and the like, it is preferable to limit the maximum ratio to 15% by mass or less, more preferably to 13% by mass or less, even more preferably to 11% by mass or less, and particularly preferably to less than 9% by mass.

Furthermore, it is preferable that the compound represented by General Formula (XIV-2-1) is specifically a compound represented by any one of Formula (53.1) to Formula (53.4), and above all, it is preferable that the compound represented by General Formula (XIV-2-1) includes a compound represented by Formula (53.4).

[Chemical Formula 338]

(53.1)
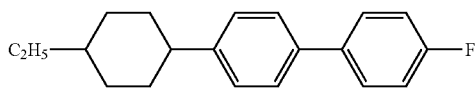

[Chemical Formula 339]

(53.2)
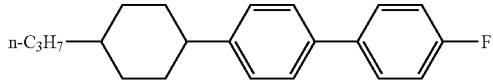

[Chemical Formula 340]

(53.3)
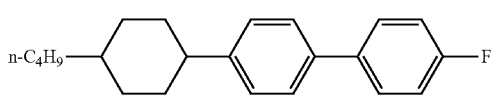

[Chemical Formula 341]

(53.4)
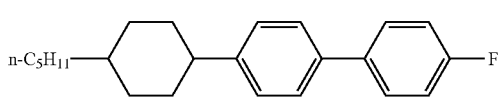

Furthermore, the compound represented by General Formula (XIV-2) is preferably a compound represented by General Formula (XIV-2-2):

[Chemical Formula 342]

(XIV-2-2)
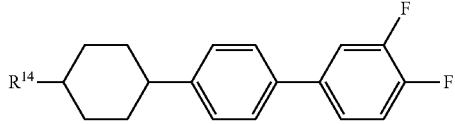

(wherein in General Formula (XIV-2-2), $R^{14}$ represents an alkyl group having 1 to 5 carbon atoms, an alkenyl group having 2 to 5 carbon atoms, or an alkoxy group having 1 to 4 carbon atoms).

The content of the compound represented by General Formula (XIV-2-2) is preferably 3% by mass or more, more preferably 6% by mass or more, even more preferably 9% by mass or more, and particularly preferably 12% by mass or more, relative to the total amount of the liquid crystal composition of the present invention. Furthermore, it is preferable to limit the maximum ratio to 20% by mass or less, more preferably to 17% by mass or less, even more preferably to 15% by mass or less, and particularly preferably to 14% by mass or less, in view of solubility at low temperature, transition temperature, electrical reliability, and the like.

Furthermore, it is preferable that the compound represented by General Formula (XIV-2-2) is specifically a compound represented by any one of Formula (54.1) to Formula (54.4), and above all, it is preferable that the compound represented by General Formula (XIV-2-2) includes a compound represented by Formula (54.2) and/or Formula (54.4).

[Chemical Formula 343]

(54.1)

[Chemical Formula 344]

(54.2)
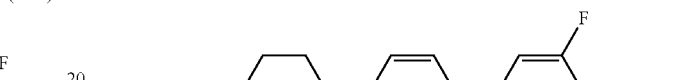

[Chemical Formula 345]

(54.3)
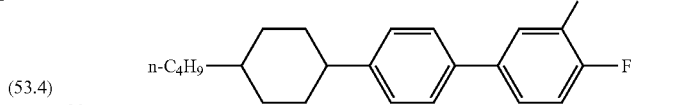

[Chemical Formula 346]

(54.4)
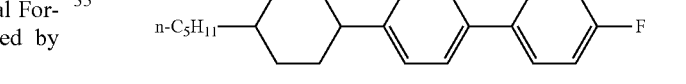

Furthermore, the compound represented by General Formula (XIV-2) is preferably a compound represented by General Formula (XIV-2-3):

[Chemical Formula 347]

(XIV-2-3)
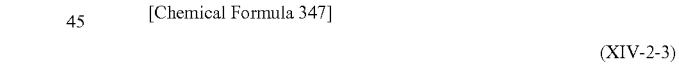

(wherein in General Formula (XIV-2-3), $R^{14}$ represents an alkyl group having 1 to 5 carbon atoms, an alkenyl group having 2 to 5 carbon atoms, or an alkoxy group having 1 to 4 carbon atoms).

The content of the compound represented by General Formula (XIV-2-3) is preferably 5% by mass or more, more preferably 9% by mass or more, and particularly preferably 12% by mass or more, relative to the total amount of the liquid crystal composition of the present invention. Furthermore, it is preferable to limit the maximum ratio to 30% by mass or less, more preferably to less than 27% by mass, even more preferably to 24% by mass or less, and particularly preferably to less than 20% by mass, in view of solubility at low temperature, transition temperature, electrical reliability, and the like.

Furthermore, it is preferable that the compound represented by General Formula (XIV-2-3) is specifically a compound represented by any one of Formula (55.1) to Formula (55.4), and above all, it is preferable that the compound represented by General Formula (XIV-2-3) includes a compound represented by Formula (55.2) and/or Formula (55.4).

[Chemical Formula 348]

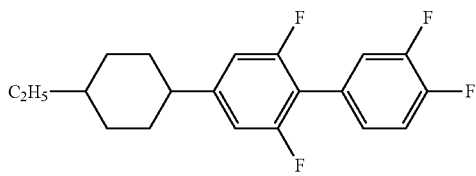

(55.1)

[Chemical Formula 349]

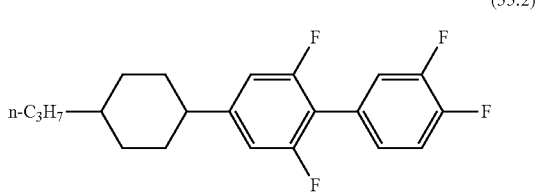

(55.2)

[Chemical Formula 350]

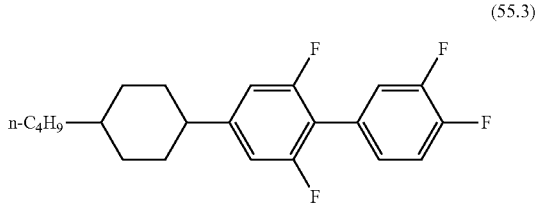

(55.3)

[Chemical Formula 351]

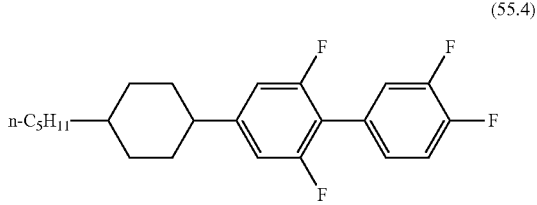

(55.4)

Furthermore, the compound represented by General Formula (XIV-2) is preferably a compound represented by General Formula (XIV-2-4):

[Chemical Formula 352]

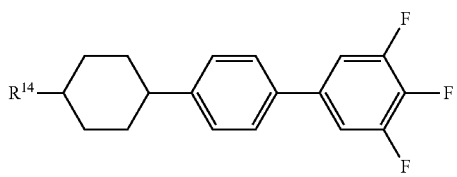

(XIV-2-4)

(wherein in General Formula (XIV-2-4), $R^{14}$ represents an alkyl group having 1 to 5 carbon atoms, an alkenyl group having 2 to 5 carbon atoms, or an alkoxy group having 1 to 4 carbon atoms).

There are no limitations on the kind of the compounds that can be used in combination, and the compounds are appropriately combined for each embodiment in view of solubility at low temperature, transition temperature, electrical reliability, birefringence, and the like. For example, one kind of compound is used according to an embodiment of the present invention. Furthermore, 2 kinds of compounds are used according to another embodiment of the present invention. Alternatively, 3 or more kinds of compounds are used according to still another embodiment of the present invention.

The content of the compound represented by General Formula (XIV-2-4) has an upper limit and a lower limit for each embodiment in view of characteristics such as solubility at low temperature, transition temperature, electrical reliability, and birefringence. The lower limit of the content is, for example, 0.1% relative to the total amount of the liquid crystal composition of the present invention according to an embodiment of the present invention, 0.5% according to another embodiment, 0.7% according to still another embodiment, 1% according to still another embodiment, 1.2% according to still another embodiment, 1.8% according to still another embodiment, and 2% according to still another embodiment. Furthermore, the lower limit of the content is 2.5% according to still another embodiment. The lower limit of the content is 3% according to still another embodiment.

Furthermore, the upper limit of the content is, for example, 15% according to an embodiment of the present invention, 12% according to another embodiment, 11% according to still another embodiment, 10% according to still another embodiment, 8% according to still another embodiment, and 6% according to still another embodiment.

In a case in which the liquid crystal composition is used for a liquid crystal display element having a small driving voltage, it is suitable to adjust the content of the compound represented by General Formula (XIV-2-4) to a larger value. In the case of a liquid crystal composition which is used for a liquid crystal display element having a fast response speed, it is suitable to adjust the content of the compound represented by General Formula (XIV-2-4) to a smaller value.

Furthermore, it is preferable that the compound represented by General Formula (XIV-2-4) is specifically a compound represented by Formula (56.1) to (Formula 56.4), and above all, it is preferable that the compound represented by General Formula (XIV-2-4) includes a compound represented by any one of Formula (56.1), Formula (56.2), and Formula (56.4).

[Chemical Formula 353]

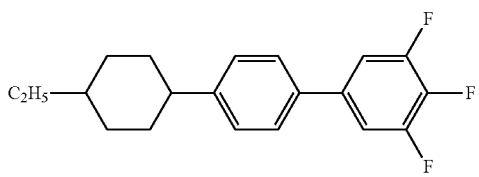

(56.1)

-continued

[Chemical Formula 354]

(56.2)

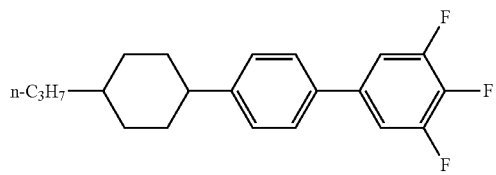

[Chemical Formula 355]

(56.3)

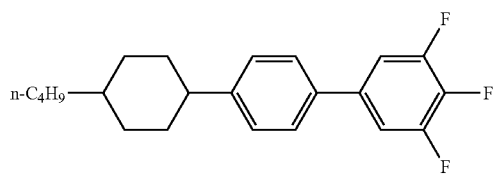

[Chemical Formula 356]

(56.4)

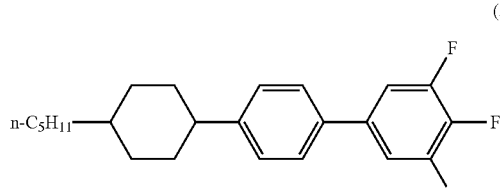

Furthermore, the compound represented by General Formula (XIV-2) is preferably a compound represented by General Formula (XIV-2-5):

[Chemical Formula 357]

(XIV-2-5)

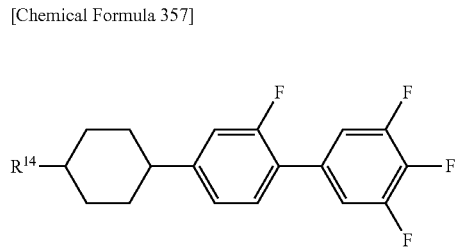

(wherein in General Formula (XIV-2-5), $R^{14}$ represents an alkyl group having 1 to 5 carbon atoms, an alkenyl group having 2 to 5 carbon atoms, or an alkoxy group having 1 to 4 carbon atoms).

The content of the compound represented by General Formula (XIV-2-5) is preferably 5% by mass or more, more preferably 10% by mass or more, and particularly preferably 13% by mass or more, relative to the total amount of the liquid crystal composition of the present invention. Furthermore, in view of solubility at low temperature, transition temperature, electrical reliability and the like, it is preferable to limit the maximum ratio to 25% by mass or less, more preferably to less than 22% by mass, even more preferably to 18% by mass or less, and particularly preferably to less than 15% by mass.

Furthermore, the compound represented by General Formula (XIV-2-5) is specifically a compound represented by any one of Formula (57.1) to Formula (57.4). Among them, it is preferable that the compound represented by General Formula (XIV-2-5) includes a compound represented by Formula (57.1).

[Chemical Formula 358]

(57.1)

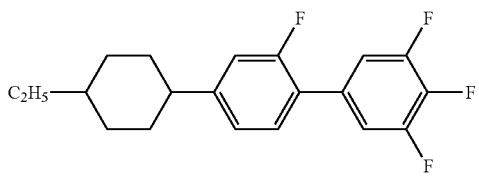

[Chemical Formula 359]

(57.2)

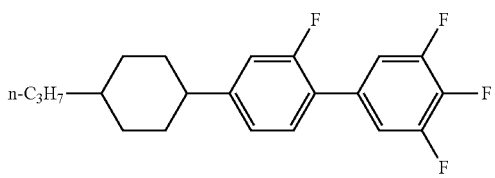

[Chemical Formula 360]

(57.3)

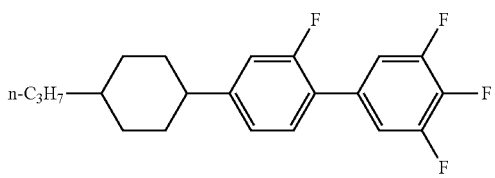

[Chemical Formula 361]

(57.4)

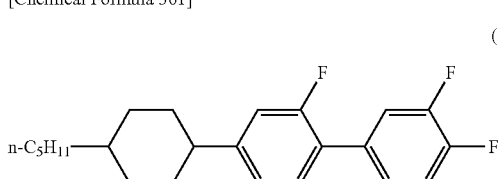

Furthermore, the compound represented by General Formula (XIV-2) is preferably a compound represented by General Formula (XIV-2-6):

[Chemical Formula 362]

(XIV-2-6)

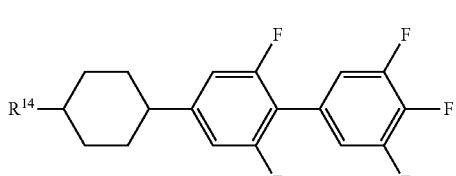

(wherein $R^{14}$ represents an alkyl group having 1 to 5 carbon atoms, an alkenyl group having 2 to 5 carbon atoms, or an alkoxy group having 1 to 4 carbon atoms).

The content of the compound represented by General Formula (XIV-2-6) is preferably 5% by mass or more, more preferably 10% by mass or more, and particularly preferably 15% by mass or more, relative to the total amount of the liquid crystal composition of the present invention. Furthermore, in view of solubility at low temperature, transition temperature, electrical reliability, and the like, it is preferable to limit the maximum ratio to 25% by mass or less, more preferably to 22% by mass or less, even more preferably to 20% by mass or less, and particularly preferably to less than 17% by mass.

Furthermore, it is preferable that the compound represented by General Formula (XIV-2-6) is specifically a compound represented by any one of Formula (58.1) to Formula (58.4), and above all, it is preferable that the compound represented by General Formula (XIV-2-6) includes a compound represented by Formula (58.2).

[Chemical Formula 363]

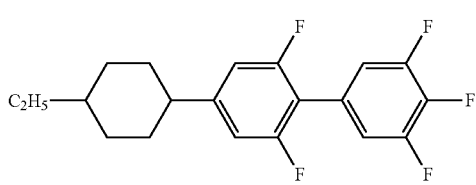
(58.1)

[Chemical Formula 364]

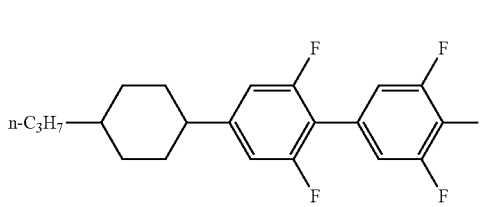
(58.2)

[Chemical Formula 365]

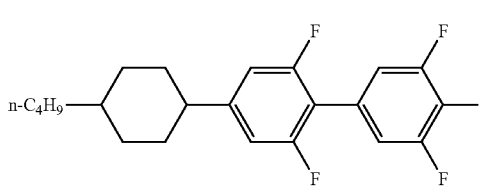
(58.3)

[Chemical Formula 366]

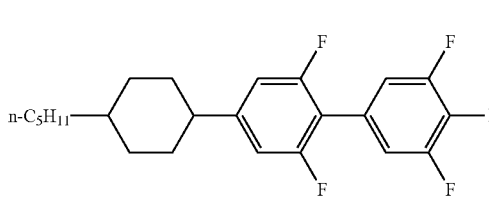
(58.4)

The compounds used for the present invention do not have a peracid (—CO—OO—) structure in the molecule. Furthermore, in a case in which reliability and long-term stability of the liquid crystal composition are regarded as important, it is preferable not to use a compound having a carbonyl group. Furthermore, in a case in which stability against UV irradiation is regarded as important, it is preferable not to use a compound substituted with a chlorine atom. It is also preferable to use only those compounds in which the cyclic structures in the molecule are all 6-membered rings.

A preferred embodiment of the liquid crystal composition related to the present invention is a liquid crystal composition which includes at least one or more compounds represented by General Formula (i):

[Chemical Formula 367]

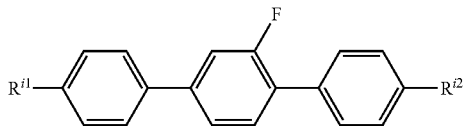
(i)

(wherein in General Formula (i), $R^{i1}$ and $R^{i2}$ each independently represent an alkyl group having 1 to 10 carbon atoms, an alkenyl group having 2 to 10 carbon atoms, or an alkoxy group having 1 to 10 carbon atoms, and at least any one of $R^{i1}$ or $R^{i2}$ is an alkenyl group), at least one or more compounds represented by General Formula (M-1):

[Chemical Formula 368]

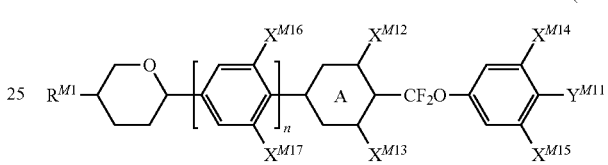
(M-1)

(wherein in General Formula (M-1), $X^{M12}$, $X^{M13}$, $X^{M14}$, $X^{M15}$, $X^{M16}$, and $X^{M17}$ each independently represent a hydrogen atom or a fluorine atom;

rings A each independently represent a group selected from the group consisting of:
(a) a 1,4-cyclohexylene group (one —CH$_2$— moiety or at least two non-adjacent —CH$_2$— moieties present in this group may be substituted by —O—); and
(b) a 1,4-phenylene group (one —CH═ moiety or at least two non-adjacent —CH═ moieties present in this group may be substituted by —N═), the above-mentioned group (a) and group (b) may be each independently substituted with a cyano group, a fluorine atom or a chlorine atom;

$R^{M1}$ represents an alkyl group having 1 to 10 carbon atoms, an alkenyl group having 2 to 10 carbon atoms, or an alkoxy group having 1 to 10 carbon atoms;

$Y^{M11}$ represents an alkyl group having 1 to 10 carbon atoms, an alkenyl group having 2 to 10 carbon atoms, an alkoxy group having 1 to 10 carbon atoms, a hydrogen atom, a fluorine atom, a cyano group, —CF$_3$, or —OCF$_3$; and n represents an integer from 0 to 2), at least one or more compounds represented by General Formula (I-1):

[Chemical Formula 369]

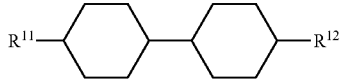
(I-1)

(wherein in General Formula (I-1), $R^{11}$ and $R^{12}$ each independently represent an alkyl group having 1 to 8 carbon atoms, an alkoxy group having 1 to 8 carbon atoms, or an alkenyl group having 2 to 8 carbon atoms, while one or more hydrogen atoms of the alkyl group, alkenyl group, alkoxy group or alkenyloxy group may be substituted by fluorine atoms, and a methylene group in the alkyl group, alkenyl group, alkoxy group or alkenyloxy group may be substituted by an oxygen atom as long as oxygen atoms are not linked in succession, or may be substituted by a carbonyl group as long as carbonyl groups are not linked in succession), and which has a dielectric constant anisotropy at 25° C. of greater than 0 and 5 or less.

That is, in regard to the liquid crystal composition related to the present invention, when at least one kind of compound is selected from the group of compounds represented by General Formula (i) as a first component, and at least one kind of compound is selected from the group of compounds represented by General Formula (M-1) as a second component, the capacitance of the liquid crystal layer is decreased, and thereby the influence of charging of a condenser, which is corresponding to $C_{TOTAL}$ in voltage input scanning of a TFT, can be reduced. Then, phenomena such as flickering and deterioration of the response speed, which are caused by distortion or delay of the voltage waveform, may not occur, or occur only to a negligible extent, and the problem related to low temperature stability, the problem of dropping marks, and the effect of maintaining rapid responsiveness are all addressed.

Furthermore, if needed, as a non-polar component (General Formula (L)), at least one compound selected from the group consisting of compounds represented by General Formula (I-4), General Formula (I-5), General Formula (II-2), and General Formula (II-3) may be included, and as a polar component (General Formula (M)), at least one compound selected from the group consisting of compounds represented by General Formula (X-2), General Formula (X-3), General Formula (X-5), General Formula (VIII), and General Formula (XI) may be included.

Furthermore, it is preferable that the liquid crystal composition includes the at least one kind of compound selected from each of the groups of compounds represented by General Formula (i) and General Formula (M-1) at a proportion of 1% to 50% by mass, more preferably at a proportion of 2% to 45% by mass, even more preferably at a proportion of 3% to 40% by mass, still more preferably at a proportion of 4% to 38% by mass, and particularly preferably at a proportion of 5% to 35% by mass, relative to the total amount of the liquid crystal composition.

According to a preferred embodiment of the liquid crystal composition related to the present invention, it is preferable that the liquid crystal composition includes the at least one kind of compound selected from each of the groups of compounds represented by General Formula (i), General Formula (M-1), General Formula (L), and General Formula (M) at a proportion of 50% to 100% by mass, more preferably at a proportion of 55% to 98% by mass, even more preferably at a proportion of 60% to 95% by mass, still more preferably at a proportion of 65% to 90% by mass, and particularly preferably at a proportion of 68% to 85% by mass, relative to the total amount of the liquid crystal composition.

According to another preferred embodiment of the liquid crystal composition related to the present invention, it is preferable that the liquid crystal composition includes the at least one kind of compound selected from each of the groups of compounds represented by General Formula (i), General Formula (M-1), and General Formula (I-1) at a proportion of 40% to 100% by mass, more preferably at a proportion of 50% to 90% by mass, even more preferably at a proportion of 55% to 85% by mass, still more preferably at a proportion of 60% to 80% by mass, and particularly preferably at a proportion of 65% to 75% by mass, relative to the total amount of the liquid crystal composition.

According to another preferred embodiment of the liquid crystal composition related to the present invention, it is preferable that the liquid crystal composition includes the at least one kind of compound selected from each of the groups of compounds represented by General Formula (i), General Formula (M-1), and General Formula (L) at a proportion of 40% to 3.00% by mass, more preferably at a proportion of 50% to 93% by mass, even more preferably at a proportion of 55% to 88% by mass, still more preferably at a proportion of 58% to 85% by mass, and particularly preferably at a proportion of 60% to 82% by mass, relative to the total amount of the liquid crystal composition.

According to another preferred embodiment of the liquid crystal composition related to the present invention, it is preferable that the liquid crystal composition includes the at least one kind of compound selected from each of the groups of compounds represented by General Formula (i), General Formula (M-1), and General Formula (M) at a proportion of 20% to 90% by mass, more preferably at a proportion of 30% to 80% by mass, even more preferably at a proportion of 35% to 75% by mass, still more preferably at a proportion of 40% to 70% by mass, and particularly preferably at a proportion of 45% to 60% by mass, relative to the total amount of the liquid crystal composition.

In a case in which the improvement of viscosity and the improvement of Tni are regarded as important, it is preferable to reduce the content of a compound having a 2-methylbenzene-1,4-diyl group, in which a hydrogen atom may be substituted by a halogen atom, in the molecule. It is preferable to adjust the content of the compound having a 2-methylbenzene-1,4-diyl group in the molecule to 10% by mass or less, and more preferably to 5% by mass or less, relative to the total mass of the composition, and it is even more preferable that the liquid crystal composition substantially does not include the relevant compound.

In order to suppress deterioration of the liquid crystal composition caused by oxidation, it is preferable to reduce the content of a compound having a cyclohexenylene group as a cyclic structure. It is preferable to adjust the content of the compound having a cyclohexenylene group to 10% by mass or less, and more preferably to 5% by mass or less, relative to the total mass of the composition, and it is even more preferable that the liquid crystal composition substantially does not include a compound having a cyclohexenylene group.

Another preferred embodiment of the liquid crystal composition related to the present invention is a liquid crystal composition which includes compounds represented by General Formula (i), General Formula (M-1), and General Formula (II-2), and it is preferable that the dielectric constant anisotropy at 25° C. is larger than 0 and 5 or less, it is more preferable that the dielectric constant anisotropy at 25° C. is larger than 0 and 4 or less, while it is particularly preferable that the dielectric constant anisotropy at 25° C. is larger than 0 and 3 or less.

In the case of this composition including compounds represented by General Formula (i), General Formula (M-1) and General Formula (II-2), it is preferable that these three kinds of compounds are included at a proportion of 3% to 75% by mass in the total amount of the liquid crystal composition, more preferably at a proportion of 6% to 70% by mass, even more preferably at a proportion of 9% to 65% by mass, still more preferably at a proportion of 12% to 60% by mass, and particularly preferably at a proportion of 15% to 55% by mass.

Particularly, in a case in which those compounds represented by Formula (11.1) and/or Formula (11.2) among the compounds represented by General Formula (II-2) are incorporated at a proportion of about 10% to 30% by mass, a liquid crystal composition which suitably has various performances that are required from a liquid crystal composition for a liquid crystal display element, such a higher upper limit range of nematic temperature, further decreased viscosity, high reliability, and a high elastic coefficient, can be provided without impairing the excellent compatibility brought about by the combination of compounds of General Formula (i) and General Formula (M). In a case in which low viscosity is regarded as important, a compound of Formula (11.1) can be suitably used, and in a case in which a higher elastic coefficient is regarded as important, a compound of Formula (11.2) can be suitably used. Furthermore, by arbitrarily adjusting the ratio of the compounds represented by General Formula (i) and Formula (11.1) and/or Formula (11.2) in the composition such that the total amount is in the range of 20% to 60% by mass, the refractive index anisotropy of the liquid crystal medium can be arbitrarily adjusted while having a high elastic coefficient, without impairing the effects of the present invention.

In regard to the liquid crystal composition of the present invention, the dielectric constant anisotropy (Δε) at 25° C. is larger than 0 and +5 or less, and the dielectric constant anisotropy at 25° C. is preferably from +0.5 to +4.0, more preferably from +1.0 to +3.5, and particularly preferably from +1.5 to +3.0.

In regard to the liquid crystal composition of the present invention, the refractive index anisotropy (Δn) at 25° C. is 0.06 to 0.20, and the refractive index anisotropy at 25° C. is more preferably from 0.07 to 0.1.8, and particularly preferably from 0.08 to 0.16. To be more specific, in the case of coping with a small cell gap, the refractive index anisotropy is preferably from 0.11 to 0.14, and in the case of coping with a large cell gap, the refractive index anisotropy is preferably from 0.08 to 0.11.

In regard to the liquid crystal composition of the present invention, the nematic phase-isotropic liquid phase transition temperature ($T_{ni}$) is from 60° C. to 120° C., and the nematic phase-isotropic liquid phase transition temperature is more preferably from 70° C. to 110° C., and particularly preferably from 70° C. to 100° C.

In regard to the liquid crystal composition of the present invention, the viscosity (η) at 25° C. is from 5 mPa·s to 20 mPa·s, and the viscosity at 25° C. is more preferably 18 mPa·s or less, and particularly preferably 15 mPa·s or less.

In regard to the liquid crystal composition of the present invention, the rotational viscosity ($\gamma_1$) at 25° C. is from 20 mPa·s to 60 mPa·s, and the rotational viscosity at 25° C. is more preferably 50 mPa·s or less, and particularly preferably 40 mPa·s or less.

The liquid crystal composition including a polymerizable compound related to the present invention is imparted with liquid crystal alignment ability when the polymerizable compound included therein is polymerized by ultraviolet irradiation, and it is preferable that the liquid crystal composition is used for a liquid crystal display element in which the transmitted light quantity is controlled by utilizing the birefringence of a liquid crystal composition.

The liquid crystal composition related to the present invention may include a polymerizable compound, in order to produce liquid crystal display elements of the PSA mode, the lateral electric field type PSA mode, or the like. Examples of the polymerizable compound that can be used include a photopolymerizable monomer with which polymerization proceeds under the effect of energy rays such as light, and regarding the structure, examples include polymerizable compounds having a liquid crystal skeleton in which plural 6-membered rings of a biphenyl derivative, a terphenyl derivative or the like are linked. More specifically, a bifunctional monomer represented by General Formula (XX) is preferable.

[Chemical Formula 370]

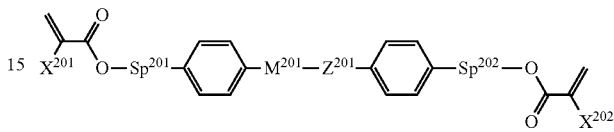

(XX)

wherein in General Formula (XX), $X^{201}$ and $X^{202}$ each independently represent a hydrogen atom or an alkyl group having 1 to 3 carbon atoms (a methyl group, an ethyl group, or a propyl group);

$Sp^{201}$ and $Sp^{202}$ each independently represent a single bond, an alkylene group having 1 to 8 carbon atoms, or —O—$(CH_2)_s$— (wherein s represents an integer from 2 to 7; and the oxygen atom is to be bonded to the aromatic ring);

$Z^{201}$ represents —$OCH_2$—, —$CH_2O$—, —CO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (wherein $Y^1$ and $Y^2$ each independently represent a fluorine atom or a hydrogen atom), —C≡C—, or a single bond;

$M^{201}$ represents a trans-1,4-cyclohexylene group, a single bond, or a 1,4-phenylene group in which an arbitrary hydrogen atom has been substituted by a fluorine atom, and all of 1,4-phenylene groups in General Formula (XX) may each have an arbitrary hydrogen atom substituted by a fluorine atom.

According to a preferred embodiment of the polymerizable compound related to the present invention, a diacrylate derivative in which both $X^{201}$ and $X^{202}$ represent hydrogen atoms, and a dimethacrylate derivative in which both $X^{201}$ and $X^{202}$ have methyl groups are both preferable, and a compound in which any one of them represents a hydrogen atom, and the other represents a methyl group is also preferable. The rates of polymerization of these compounds are such that a diacrylate derivative has the fastest rate of polymerization, a diacrylate derivative has a low rate of polymerization, a non-symmetric compound has an intermediate rate of polymerization, and a preferable embodiment can be used according to the use of the compound. For a PSA display element, a dimethacrylate derivative is particularly preferable.

$Sp^{201}$ and $Sp^{202}$ each independently represent a single bond, an alkylene group having 1 to 8 carbon atoms, or —O—$(CH_2)_s$—, and for a PSA display element, it is preferable that at least one of $Sp^{201}$ and $Sp^{202}$ is a single bond, and a compound in which both represent single bonds, or an embodiment in which one of them represents a single bond, while the other represents an alkylene group having 1 to 8 carbon atoms or —O—$(CH_2)_s$—, is preferable. In this case, an alkylene group having 1 to 4 carbon atoms is more preferred, and s is preferably 1 to 4.

$Z^{201}$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond; more preferably —COO—, —OCO—, or a single bond; and particularly preferably a single bond.

$M^{201}$ represents a 1,4-phenylene group in which an arbitrary hydrogen atom has been substituted by a fluorine atom, a trans-1,4-cyclohexylene group, or a single bond, and a 1,4-phenylene group in which an arbitrary hydrogen atom has been substituted by a fluorine atom, or a single bond is preferred. In a case in which $M^{201}$ represents a cyclic structure other than a single bond, $Z^{201}$ is preferably a linking group other than a single bond, and in a case in which $M^{20}$ represents a single bond, $Z^{201}$ is preferably a single bond.

From this point of view, specifically, the cyclic structure between Sp$^{20}$ and Sp$^{202}$ in General Formula (XX) is preferably a structure of any one of Formula (XXa-1) to Formula (XXa-5) described below.

In regard to General Formula (XX), in a case in which $M^{201}$ represents a single bond, and a cyclic structure is formed by two rings, it is preferable that General Formula (XX) represents any one of the following Formula (XXa-1) to Formula (XXa-5), it is more preferable that General Formula (XX) represents any one of Formula (XXa-1) to formula (XXa-3), and it is particularly preferable that General Formula (XX) represents Formula (XXa-1).

[Chemical Formula 371]

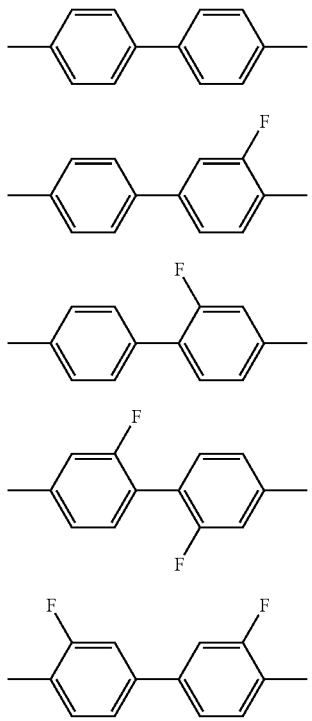

In regard to Formula (XXa-1) to Formula (XXa-5) described above, the two ends of a linking bond are to be bonded to Sp$^{201}$ or Sp$^{202}$.

Polymerizable compounds containing these skeletons have an alignment limiting force after polymerization that is optimum for a PSA type liquid crystal display element, and since a satisfactory alignment state is obtainable, display unevenness is suppressed, or does not occur at all.

From the above description, the polymerizable compound is preferably at least one compound selected from the group of compounds represented by General Formula (XX-1) to General Formula (XX-4), and among them, a compound represented by General Formula (XX-2) is more preferable.

[Chemical Formula 372]

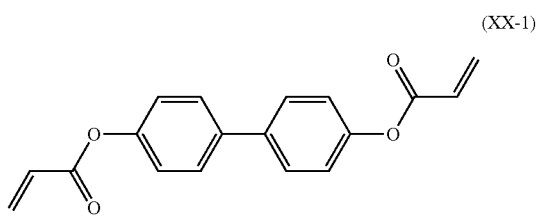

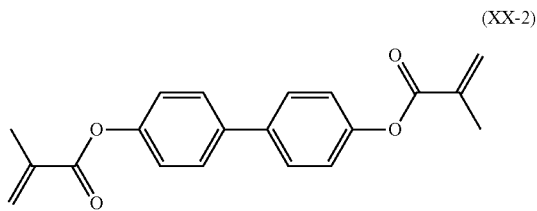

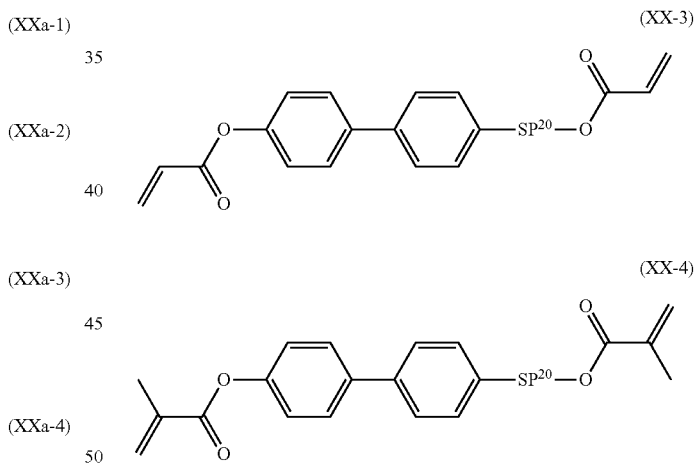

In General Formula (XX-3) and General Formula (XX-4), Sp$^{20}$ represents an alkylene group having 2 to 5 carbon atoms.

In a case in which a polymerizable compound is added to the liquid crystal composition related to the present invention, polymerization proceeds even in a case in which there is no polymerization initiator; however, the liquid crystal composition may include a polymerization initiator in order to accelerate polymerization. Examples of the polymerization initiator include benzoin ethers, benzophenones, acetophenones, benzyl ketals, and acylphosphine oxides.

The liquid crystal composition related to the present invention may further include a compound represented by General. Formula (Q) as an oxidation inhibitor.

[Chemical Formula 373]

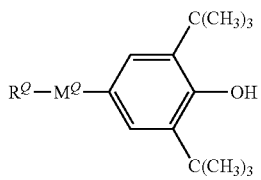

(Q)

wherein in General Formula (Q), $R^Q$ represents an alkyl group having 1 to 22 carbon atoms or alkoxy group; one or more $CH_2$ groups in the relevant alkyl group may be substituted by —O—, —CH=CH—, —CO—, —OCO—, —COO—, —C≡C—, —$CF_2O$—, or —$OCF_2$— such that an oxygen atom is not directly adjacent thereto; and $M^Q$ represents a trans-1,4-cyclohexylene group, a 1,4-phenylene group, or a single bond.

In General Formula (Q), $R^Q$ is preferably an alkyl group having 1 to 22 carbon atoms or alkoxy group, and the relevant alkyl group (including the alkyl group in the alkoxy group) may be a linear group or a branched group. Furthermore, $R^Q$ represents a linear or branched alkyl group having 1 to 22 carbon atoms, or a linear or branched alkoxy group, and one or more $CH_2$ groups in the relevant alkyl group (including the alkyl group in the alkoxy group) may be substituted by —O—, —CH=CH—, —CO—, —OCO—, —COO—, —C≡C—, —$CF_2O$—, or —$OCF_2$— such that an oxygen atom is not directly adjacent thereto. $R^Q$ in General Formula (Q) has 1 to 20 carbon atoms, and is preferably at least one selected from the group consisting of a linear alkyl group, a linear alkoxy group, a linear alkyl group in which one $CH_2$ group has been substituted by —OCO— or —COO—, a branched alkyl group, a branched alkoxy group, and a branched alkyl group in which one $CH_2$ group has been substituted by —OCO— or —COO—; and more preferably at least one selected from the group consisting of a linear alkyl group having 1 to 10 carbon atoms, a linear alkyl group in which one $CH_2$ group has been substituted by —OCO— or —COO—, a branched alkyl group, a branched alkoxy group, and a branched alkyl group in which one $CH_2$ group has been substituted by —OCO— or —COO—.

$M^Q$ represents a trans-1,4-cyclohexylene group, a 1,4-phenylene group, or a single bond, and $M^Q$ is preferably a trans-1,4-cyclohexylene group or a 1,4-phenylene group.

The compound represented by General Formula (Q) is preferably at least one compound selected from the group of compounds represented by the following General Formula (Q-a) to General Formula (Q-d), and is more preferably a compound represented by General Formula (Q-a) and/or (Q-c).

[Chemical Formula 374]

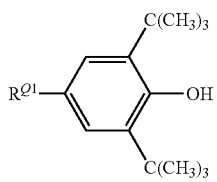

(Q-a)

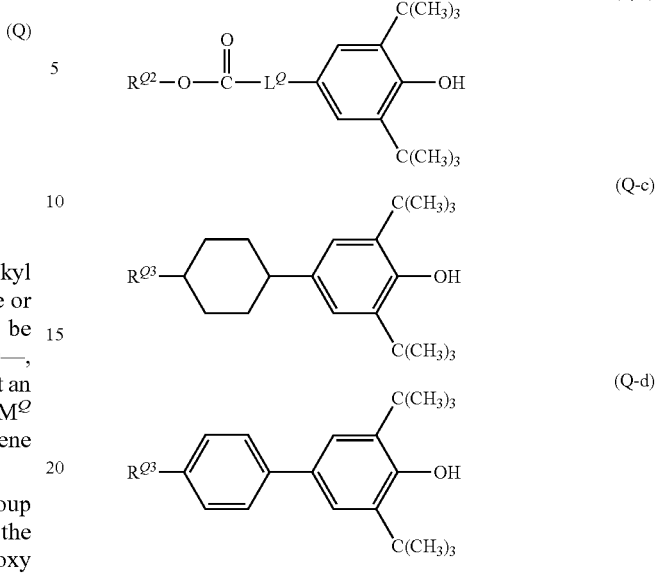

In General Formula (Q-a) to Formula (Q-d), $R^{Q1}$ is preferably a linear alkyl group or branched alkyl group having 1 to 10 carbon atoms; $R^{Q2}$ is preferably a linear alkyl group or branched alkyl group having 1 to 20 carbon atoms; $R^{Q1}$ represents a linear alkyl group having 1 to 8 carbon atoms, a branched alkyl group, a linear alkoxy group, or a branched alkoxy group; and $L^Q$ is preferably a linear alkylene group or branched alkylene group having 1 to 8 carbon atoms. Among these, the compound represented by General Formula (Q) is more preferably a compound represented by the following Formula (Q-a-1) and/or (Q-c-1).

[Chemical Formula 375]

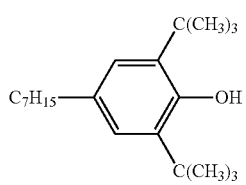

(Q-a-1)

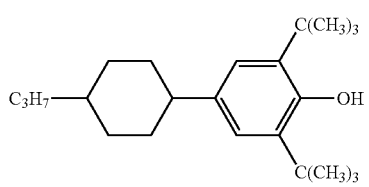

(Q-c-1)

It is preferable that the liquid crystal composition of the present invention includes one kind or two kinds of compounds represented by General Formula (Q), and more preferably includes 1 kind to 5 kinds of the compounds. The content of the compounds is preferably 0.001% to 1% by mass, preferably 0.001% to 0.1% by mass, and preferably 0.001% to 0.05% by mass, relative to the total mass of the liquid crystal composition of the present invention.

A second aspect of the present invention relates to a liquid crystal display element having a liquid crystal composition which includes the compound represented by General Formula (i) and the compound represented by General Formula (M-1), and has a dielectric constant anisotropy at 25° C. of larger than 0 and 5 or less.

The liquid crystal display element related to the present invention is useful for an AM-LCD (active matrix liquid crystal display element), and can be used for a transmission type or reflection type liquid crystal display element.

Furthermore, regarding the driving system (also referred to as mode) of the liquid crystal display element related to the present invention, the liquid crystal display element is useful for ECB-LCD, VA-LCD, VA-IPS-LCD, FFS (Fringe Field Switching) LCD, TN (Nematic liquid crystal display element), STN-LCD (Super-Twisted Nematic liquid crystal display element), OCB-LCD, and IPS-LCD (In-Plane Switching liquid crystal display element), and a liquid crystal display element of the IPS mode or the FFS mode is particularly preferable.

In recent years, in regard to the liquid crystal displays used in portable tablet computers, which are represented by smartphones, low power consumption is regarded as important in the lateral electric field type liquid crystal displays of the IPS mode, the FFS mode and the like that have been rapidly developed and popularized, and therefore, mainly liquid crystal compositions having a positive dielectric anisotropy with a high $\Delta\varepsilon$ are preferably used. In that case, the viscosity of the liquid crystal itself tends to increase, and a time loss caused by charging of the liquid crystal layer as well as the FFS substrate insulating layer (for example, insulating layer 18 in FIG. 5 and FIG. 7 described below) may easily occur. Therefore, the response speed is not sufficient. In order to ameliorate this, it is speculated that when the capacitance of the liquid crystal layer is decreased, that is, a liquid crystal composition having a $\Delta\varepsilon$ that is positive and very small is used, induced polarization of the liquid crystal layer can be reduced. Thereby, the viscosity of the liquid crystal composition itself is also decreased, and a very fast response speed for the IPS mode or the FFS mode can be achieved.

For the two sheets of substrates of the liquid crystal cell used for the liquid crystal display element, a flexible transparent material such as glass or a plastic can be used, and an opaque material such as silicon may also be used. A transparent substrate having a transparent electrode layer can be obtained by, for example, sputtering indium tin oxide (ITO) on a transparent substrate such as a glass plate.

The color filter can be produced by, for example, a pigment dispersion method, a printing method, an electrodeposition method, or a dyeing method. To describe a method for producing a color filter according to a pigment dispersion method as an example, a curable coloring composition for a color filter is applied on the aforementioned transparent substrate, and the coloring composition is subjected to a patterning treatment and then is cured by heating or by irradiation with light. Pixel parts for a color filter can be produced by carrying out this process for three colors such as red, green and blue, respectively. In addition to that, a pixel electrode provided with active elements such as a TFT and a thin film diode may also be provided on the substrate.

The substrates are arranged to face each other such that the transparent electrode layers are disposed on the inner side. At that time, the spacing between the substrates may be adjusted by interposing a spacer therebetween. In this case, it is preferable to adjust the thickness of the light modulating layer (liquid crystal layer) thus obtainable to be 1 µm to 100 µm. The thickness is more preferably 1.5 µm to 10 µm, and in the case of using a polarizing plate, it is preferable to adjust the product of the refractive index anisotropy $\Delta n$ of the liquid crystal and the cell thickness G so as to obtain the maximum contrast. Furthermore, in a case in which there are two sheets of polarizing plates, the viewing angle or the contrast can also be adjusted to a satisfactory level by adjusting the axis of polarization of each polarizing plate. Furthermore, a retardation film for extending the viewing angle can also be used. Examples of the spacer include pillar-shaped spacers formed from glass particles, plastic particles, alumina particles, a photoresist material, and the like. Thereafter, a sealing agent such as an epoxy-based thermocurable composition is screen-printed on the substrate in a form provided with a liquid crystal injection port, and the substrates are bonded together and heated to thermally cure the sealing agent.

Regarding the method of sandwiching a liquid crystal composition (including a polymerizable compound as necessary) between two sheets of substrate, a conventional vacuum injection method or a conventional ODF method can be used. However, in regard to a vacuum injection method, while dropping marks are not generated, there is a problem that marks of injection remain. According to the present invention, a display element produced using an ODF method can be more suitably used. In the liquid crystal display element production process of the ODF method, a sealing agent such as an epoxy-based photothermal-combined curable agent is used to draw a closed loop embankment form using a dispenser on any one substrate between a backplane and a frontplane, and a predetermined amount of a liquid crystal composition is dropped within the embankment under deaeration. Subsequently, the frontplane and the backplane are bonded together, and thereby a liquid crystal display element can be produced. The liquid crystal composition of the present invention can be suitably used in the ODF process because the liquid crystal composition allows dropping of the liquid crystal composition to be performed stably.

Regarding the method for polymerizing a polymerizable compound, since an appropriate rate of polymerization is desirable in order to obtain satisfactory alignment performance of the liquid crystal, a method of performing polymerization by irradiating the liquid crystal composition with active energy radiation such as ultraviolet radiation or electron beam singly, in combination, or sequentially, is preferable. In the case of using ultraviolet radiation, a polarizing light source may be used, or a non-polarizing light source may be used. Also, in a case in which polymerization is performed in a state in which a polymerizable compound-containing liquid crystal composition is interposed between two sheets of substrate, at least the substrate on the irradiated surface side must be imparted with appropriate transparency to active energy radiation. A technique of polymerizing only particular parts using a mask at the time of irradiation with light, subsequently changing the alignment state of unpolymerized parts by changing the conditions such as the electric field, magnetic field, or temperature, and further polymerizing the unpolymerized parts by irradiating the parts with active energy radiation, may also be used. Particularly, when the liquid crystal composition is exposed to ultraviolet radiation, it is preferable to perform exposure to ultraviolet radiation while an alternating electric field is applied to the polymerizable compound-containing liquid crystal composition. The alternating electric field to be applied is preferably an alternating current with a frequency of 10 Hz to 10 kHz, and more preferably with a frequency of 60 Hz to 10 kHz, and the voltage is selected depending on the desired pre-tilt angle of the liquid crystal display element. That is, the pre-tilt angle of the liquid crystal display element can be controlled by the voltage to be applied. In a liquid crystal display element of the lateral electric field type MVA mode, it is preferable to control the pre-tilt angle to 80° to 89.9° from the viewpoints of alignment stability and contrast.

It is preferable that the temperature at the time of irradiation is within the temperature range in which the liquid crystalline state of the liquid crystal composition of the present invention is maintained. It is preferable to perform polymerization at a temperature close to room temperature, that is, typically at a temperature of 15° C. to 35° C. Regarding the lamp that produces ultraviolet radiation, a metal halide lamp, a high-pressure mercury lamp, an ultra-high-pressure mercury lamp, and the like can be used. Furthermore, regarding the wavelength of the ultraviolet radiation to be radiated, it is preferable to radiate ultraviolet radiation having a wavelength range that is not included in the absorption wavelength range of the liquid crystal composition, and if necessary, it is preferable to use by cutting off ultraviolet radiation. The intensity of the ultraviolet radiation to be radiated is preferably 0.1 mW/cm$^2$ to 100 W/cm$^2$, and more preferably 2 mW/cm$^2$ to 50 W/cm$^2$. The energy quantity of the ultraviolet radiation to be radiated can be appropriately adjusted; however, the energy quantity is preferably from 10 mJ/cm$^2$ to 500 J/cm$^2$, and more preferably from 100 mJ/cm$^2$ to 200 J/cm$^2$. When ultraviolet radiation is radiated, the intensity may be varied. The time for radiating ultraviolet radiation is appropriately selected depending on the intensity of ultraviolet radiation to be radiated; however, the time is preferably from 10 seconds to 3600 seconds, and more preferably from 10 seconds to 600 seconds.

A liquid crystal display element that uses the liquid crystal composition of the present invention is a useful element in which a balance is achieved between rapid response and suppression of display defects. The liquid crystal display element is useful for a liquid crystal display element for active matrix driving, and can be applied to liquid crystal display elements for VA mode, PSVA mode, PSA mode, IPS mode (In-Plane Switching) mode, VA-IPS mode, FFS (Fringe Field Switching) mode, and ECB mode.

Hereinafter, a suitable embodiment of the liquid crystal display element (an example of liquid crystal displays) related to the present invention will be described in detail with reference to the drawings.

FIG. 1 is a cross-sectional diagram illustrating a liquid crystal display element including two substrates facing each other; a sealing material provided between the substrates; and a liquid crystal sealed in a sealing region surrounded by the sealing material.

A specific embodiment of a liquid crystal display element is disclosed, which includes, specifically, a backplane having a TFT layer 102 and a pixel electrode 103 provided on a first substrate 100, and having a passivation film 104 and a first alignment film 105 provided thereon; a frontplane having a black matrix 202, a color filter 203, a flattening film (overcoat layer) 201, and a transparent electrode 204 provided on a second substrate 200, and having second alignment film 205 provided thereon, the frontplane being arranged to face the backplane; a sealing material 301 provided between the substrates; and a liquid crystal layer 303 sealed in a sealing region surrounded by the sealing material, in which protrusions (pillar-shaped spacers) 302 and 304 are provided on the substrate surfaces that are in contact with the sealing material 301.

Regarding the first substrate and the second substrate, there are no particular limitations on the material as long as the material is substantially transparent, and glass, ceramics, plastics, and the like can be used. For plastic substrates, cellulose derivatives such as cellulose, triacetyl cellulose, and diacetyl cellulose; polycycloolefin derivatives; polyesters such as polyethylene terephthalate and polyethylene naphthalate; polyolefins such as polypropylene and polyethylene; polycarbonate, polyvinyl alcohol, polyvinyl chloride, polyvinylidene chloride, polyamide, polyimide, polyimideamide, polystyrene, polyacrylate, polymethyl methacrylate, polyether sulfone, polyallylate; inorganic-organic composite materials such as glass fiber-epoxy resin and glass fiber-acrylic resin; and the like can be used.

Furthermore, when a plastic substrate is used, it is preferable to provide a barrier film. The function of a barrier film is to decrease the moisture permeability of a plastic substrate, and to increase reliability of the electrical characteristics of a liquid crystal display element. The barrier film is not particularly limited as long as a film having high transparency and low moisture permeability is used, and generally, a thin film formed using an inorganic material such as silicon oxide by vapor deposition, sputtering, or a chemical vapor deposition method (CVD method), is used.

According to the present invention, for the first substrate and the second substrate, the same material may be used, or different materials may be used, and there are no particular limitations. When a glass substrate is used, a liquid crystal display element having excellent heat resistance or dimensional stability can be produced, which is preferable. Furthermore, when a plastic substrate is used, the substrate is adequate for a production method according to a roll-to-roll method, and is appropriate for weight reduction or flexibilization, which is preferable. Furthermore, if impartation of flattening and heat resistance is intended, satisfactory results are obtained when a plastic substrate and a glass substrate are combined.

Furthermore, in the Examples described below, substrates are used as the materials of a first substrate 100 or a second substrate 200.

For a backplane, a TFT layer 102 and a pixel electrode 103 are provided on the first substrate 100. These are produced by a conventional array process. A passivation film 104 and a first alignment film 105 are provided thereon, and thus a backplane is obtained.

The passivation film 104 (also called inorganic protective film) is a film intended to protect the TFT layer, and usually, a nitride film (SiNx), an oxide film (SiOx) or the like is formed by a chemical vapor deposition (CVD) technology or the like.

Furthermore, the first alignment film 105 is a film having a function of aligning liquid crystal molecules, and usually, polymeric materials such as polyimide are frequently used. Regarding a coating liquid, an aligning agent solution formed from a polymeric material and a solvent is used. Since an alignment film has a possibility of inhibiting the adhesive force to a sealing material, the alignment agent solution is applied patternwise within a sealing region. For the coating, a printing method such as a flexographic printing method, or a liquid droplet ejection method such as inkjetting is used. The applied aligning agent solution is temporarily dried to thereby evaporate the solvent, and then the aligning agent solution is crosslinked and cured by baking. Thereafter, an alignment treatment is performed in order to obtain an alignment function.

The alignment treatment is usually carried out by a rubbing method. The top of a polymer film formed as described above is rubbed unidirectionally using a rubbing cloth formed from fibers such as rayon fibers, and thereby liquid crystal alignment ability is obtained.

Furthermore, a photoalignment method is also used. A photoalignment method is a method of generating alignment ability by irradiating the top of an alignment film containing an organic material having photosensitivity, with polarized light, and the generation of scratches of the substrate or dust caused by a rubbing method does not occur. Examples of the organic material for the photoalignment method include materials containing dichroic dyes. Regarding the dichroic dyes, a dye having a group which induces a photoreaction that originates liquid crystal alignment ability, such as a molecular alignment induction or isomerization reaction based on Weigert's effect caused by photodichroism (example: an azobenzene group), a dimerization reaction (example: a cynnamoyl group), a photocrosslinking reaction (example: a benzophenone group), or a photodecomposition reaction (example: a polyimide group) (hereinafter, simply referred to as photoaligning group), can be used. The applied aligning agent solution is temporarily dried to thereby evaluate the solvent, and then is irradiated with light having arbitrary polarization (polarized light). Thereby, an alignment film having alignment ability in an arbitrary direction can be obtained.

On one side of the frontplane, a black matrix 202, a color filter 203, a flattening film 201, a transparent electrode 204, and a second alignment film 205 are provided on the second substrate 200.

The black matrix 202 is produced by, for example, a pigment dispersion method. Specifically, a color resin liquid obtained by uniformly dispersing a black colorant for forming a black matrix is applied on a second substrate 200 provided with a barrier film 201, and a colored layer is formed. Subsequently, the colored layer is cured by baking. A photoresist is applied thereon, and this is pre-baked. The photoresist is exposed to light through a mask pattern, and then the colored layer is subjected to patterning by performing developing. Thereafter, the photoresist layer is peeled off, and the colored layer is baked. Thus, the black matrix 202 is completed.

Alternatively, a photoresist type pigment dispersion liquid may also be used. In this case, a photoresist type pigment dispersion liquid is applied and prebaked, and then the pigment dispersion liquid is exposed to light through a mask pattern. Subsequently, developing is performed, and thus the colored layer is patterned. Thereafter, the photoresist layer is peeled off, and the colored layer is baked. Thus, the black matrix 202 is completed.

The color filter 203 is produced by a pigment dispersion method, an electrodeposition method, a printing method, a dyeing method, or the like. To take the pigment dispersion method as an example, a color resin liquid obtained by uniformly dispersing a pigment (for example, a red pigment) is applied on the second substrate 200, and the color resin liquid is baked and cured. Subsequently, a photoresist is applied thereon and prebaked. The photoresist is exposed to light through a mask pattern, and then patterning is achieved by performing developing. Thereafter, the photoresist layer is peeled off, and the colored layer is baked again. Thereby, a (red) color filter 203 is completed. There are no particular limitations on the order of colors to be produced. In the same manner, a green color filter 203 and a blue color filter 203 are formed.

The transparent electrode 204 is provided on the color filter 203 (by providing an overcoat layer (201) for surface flattening on the color filter 203, as necessary). It is preferable that the transparent electrode 204 has a high transmittance, and it is preferable that the transparent electrode has small electrical resistance. The transparent electrode 204 is formed by forming an oxide film of ITO or the like by a sputtering method or the like.

Furthermore, there are also occasions in which a passivation film is provided on the transparent electrode 204 for the purpose of protecting the transparent electrode 204.

The second alignment film 205 is the same as the first alignment film 105 described above.

Thus, a specific embodiment concerning the backplane and the frontplane used for the present invention has been described; however, the present invention is not intended to be limited to this specific embodiment, and modification of the embodiment in accordance with the desired liquid crystal display element can be freely made.

The shape of the pillar-shaped spacers is not particularly limited, and the horizontal cross-section thereof can be made into various shapes such as a circular shape, a rectangular shape, and a polygonal shape. However, in consideration of the misalignment margin during the process, it is particularly preferable to make the horizontal cross-section into a circular shape or a regular polygonal shape. Also, it is preferable that the protrusion shape is a truncated cone or a truncated pyramid.

The material of the pillar-shaped spacers is not particularly limited as long as the material is a material which does not dissolve in a sealing material or the organic solvent used in a sealing material, or in liquid crystals; however, in view of processing and weight reduction, the material is preferably a synthetic resin (curable resin). On the other hand, the protrusions can be provided on the surface of the first substrate that is brought into contact with the sealing material, by a method based on photolithography or a liquid droplet ejection method. From such a reason, it is preferable to use a photocurable resin appropriate for a method based on photolithography or a liquid droplet ejection method.

Figure 2:
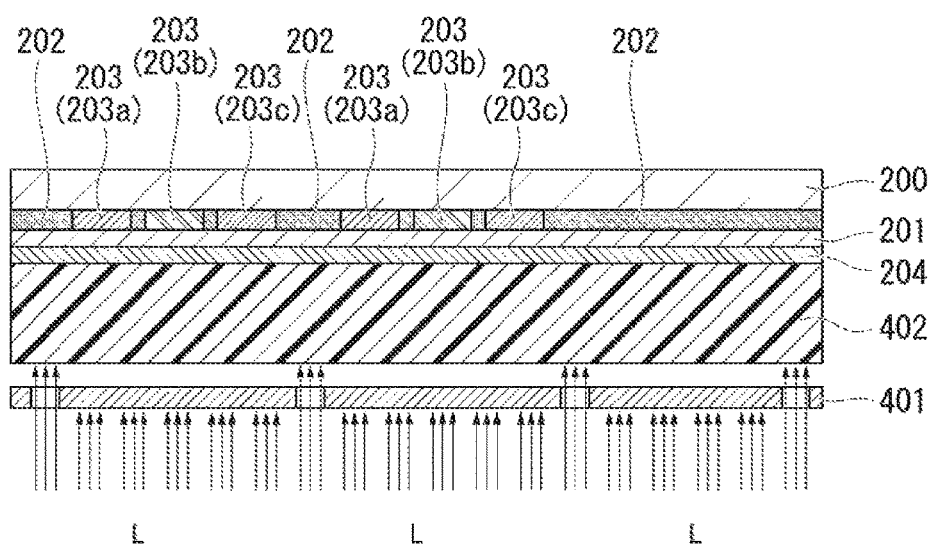
FIG. 2 is a diagram schematically illustrating the configuration of the liquid crystal display element according to another embodiment of the present invention.

As an example, the case of obtaining the pillar-shaped spacers according to a photolithographic method will be described. FIG. 2 is a diagram illustrating an exposure treatment process using a pattern for producing pillar-shaped spacers, which are formed on a black matrix as a photomask pattern.

On the transparent electrode 204 of the frontplane, a resin liquid (not including a colorant) for forming pillar-shaped spacers is applied. Subsequently, this resin layer 402 is cured by baking. A photoresist is applied thereon, and this is prebaked. The photoresist is exposed to light through a mask pattern 401, and then the resin layer is patterned by performing developing. Thereafter, the photoresist layer is peeled off, and the resin layer is baked. Thus, pillar-shaped spacers (302 and 304 in FIG. 1) are completed.

The position of formation of the pillar-shaped spacers can be determined to be at a desired position by means of the mask pattern. Therefore, spacers can be simultaneously produced both inside the sealing region of the liquid crystal display element and outside the sealing region (sealing material-coated parts). Furthermore, it is preferable that the pillar-shaped spacers are formed so as to be positioned on the black matrix, so that the product quality of the sealing region is not decreased. As such, those pillar-shaped spacers produced according to a photolithographic method may be referred to as column spacers or photo spacers.

Regarding the material for the spacers, a negative type water-soluble resin such as a PVA-stilbazolium photosensitive resin, or a mixture of a polyfunctional acrylic monomer, an acrylic acid copolymer, a triazole-based initiator, and the like, is used. Alternatively, there is also available a method of using a color resin obtained by dispersing a colorant in a polyimide resin. There are no particular limitations on the present invention, and spacers of known materials can be obtained according to the compatibility with the liquid crystal or sealing material used.

As such, pillar-shaped spacers are provided on the surface on the frontplane where a sealing region is formed, and then a sealing material (301 in FIG. 1) is applied on the surface of the backplane where the sealing material is brought into contact.

There are no particular Limitations on the material of the sealing material, and a curable resin composition obtained by adding a polymerization initiator to an epoxy-based or acrylic, photocurable, thermosetting, or photo-thermal combined curable resin, is used. Furthermore, in order to control moisture permeability, elastic modulus, viscosity, and the like, fillers formed from inorganic materials or organic materials may be added to the resin composition. The shape of these fillers is not particularly limited, and examples include a spherical shape, a fibrous form, and an irregular shape. Furthermore, in order to satisfactorily control the cell gap, a spherical or fibrous gap material having a monodisperse diameter may be incorporated into the resin composition, or in order to further reinforce the adhesive force to the substrate, a fibrous material that is easily entangled with the protrusions on the substrate may be incorporated. The diameter of the fibrous material used at that time is preferably about 1/5 to 1/10 or less of the cell gap, and the length of the fibrous material is preferably shorter than the seal coating width.

Furthermore, the material of the fibrous material is not particularly limited as long as a predetermined shape may be obtained, and synthetic fibers of cellulose, polyamide, polyester or the like, or an inorganic material of glass, carbon or the like can be appropriately selected.

Examples of the method for applying the sealing material include a printing method and a dispensing method; however, a dispensing method that uses a smaller amount of the sealing material is preferable. The position of application of the sealing material is usually set on the black matrix so that there is no adverse effect on the sealing region. In order to form a liquid crystal dropping region of the subsequent process (so that leakage of the liquid crystal does not occur), the coating shape of the sealing material is set to a closed loop shape.

A liquid crystal is dropped on the closed loop shape (sealing region) of the frontplane on which the sealing material has been applied. Usually, a dispenser is used. In order to make the amount of the liquid crystal to be dropped accord with the liquid crystal cell volume, an amount equal to the volume obtained by multiplying the height of the pillar-shaped spacers by the seal coating area, is basically employed. However, in order to optimize liquid crystal leakage or display characteristics in a cell bonding process, the amount of liquid crystal to be dropped is appropriately adjusted, or the liquid crystal dropping position may be dispersed.

Next, the backplane is pasted to the frontplane on which the sealing material has been applied and a liquid crystal has been dropped specifically, the frontplane and the backplane are adsorbed to a stage having a mechanism of adsorbing a substrate, such as an electrostatic chuck, the second alignment film of the frontplane and the first alignment film of the backplane are arranged to face each other, and the frontplane and the backplane are disposed at positions (distance) at which the sealing material and the other substrate are not any more brought into contact. In this state, the pressure inside the system is reduced. After completion of pressure reduction, the positions of the two substrates are adjusted while the bonding positions of the frontplane and the backplane are checked (alignment operation). When the adjustment of the bonding positions is completed, the substrates are approached to the positions at which the sealing material on the frontplane and the backplane are brought into contact. In this state, the system is filled with an inert gas, and while the reduced pressure is slowly released, the pressure is returned to normal pressure. At this time, the frontplane and the backplane are bonded together by the atmospheric pressure, and a cell gap is formed at the position of the height of the pillar-shaped spacers. In this state, the sealing material is irradiated with ultraviolet radiation to cure the sealing material, and thereby a liquid crystal cell is formed. Thereafter, a heating process is added as necessary, and curing of the sealing material is accelerated. A heating process is added in many cases in order to strengthen the adhesive force of the sealing material and to enhance the electrical characteristics reliability.

Hereinafter, a more preferred embodiment of the liquid crystal display element of the present invention will be described.

A second preferred embodiment of the liquid crystal display element related to the present invention is a liquid crystal display element in which a first substrate having a first alignment layer and an electrode layer containing thin film transistors on the surface, and a second substrate having a second alignment layer on the surface are arranged to be separated apart such that the alignment layers face each other, and a liquid crystal layer including a liquid crystal composition is filled in between the first substrate and the second substrate. It is preferable that the electrode layer containing thin film transistors includes plural gate wirings and data wirings that are arranged in a network form; thin film transistors provided at the respective intersections of the gate wirings and the data wirings; a pixel electrode connected to the thin film transistors; and a common electrode provided on the first substrate to be separated apart from the pixel electrode. Furthermore, it is preferable that the first alignment layer and the second alignment layer, which are provided to be close to the liquid crystal layer, are alignment films that induce homogeneous orientation for the liquid crystal composition.

That is, it is preferable that the liquid crystal display element has a configuration in which a second polarizing plate; a second substrate; an electrode layer containing thin film transistors (or also referred to as thin film transistor layer); an alignment layer; a liquid crystal layer including a liquid crystal composition; an alignment layer; a color filter; a first substrate; and a first polarizing plate are laminated in sequence.

When a common electrode and a pixel electrode are provided to be separated apart on the same substrate (or electrode layer), the electric field (E) generated between the common electrode and the pixel electrode can have a surface direction component. Accordingly, for example, there can be provided an element in which, when an alignment film which induces homogeneous orientation for the liquid crystal composition is used for the alignment layer, before a voltage is applied between the common electrode and the pixel electrode, the liquid crystal molecules that are arranged in the planar direction, which is the direction of orientation of the alignment film, block light; and when a voltage is applied, the liquid crystal molecules rotate horizontally due to the electric field (E) applied in the surface direction, and the liquid crystal molecules are arranged along the relevant electric field direction, and thereby block light.

Furthermore, the form of the liquid crystal display element related to the present invention may be a so-called color filter on array (COA), and a color filter may be provided between the electrode layer containing thin film transistors and the liquid crystal layer, or a color filter may be provided between the electrode layer containing thin film transistors and the second substrate. That is, the configuration of the liquid crystal display element related to the present invention is preferably such that a color filter 6 is formed on the same substrate side as the first substrate on which an electrode layer 3 containing thin film transistors is formed.

Meanwhile, the term "on the substrate" according to the present specification includes the state in which an object is in direct contact with the substrate, as well as the state in which an object is in indirect contact with the substrate, that is, the object is supported by the substrate.

Another more preferred form (FFS) of the second embodiment of the liquid crystal display composition related to the present invention is a liquid crystal display element in which a first substrate having a first alignment layer and an electrode layer containing thin film transistors on the surface, and a second substrate having a second alignment layer on the surface are disposed to be separated apart such that the alignment layers face each other, and a liquid crystal layer including a liquid crystal composition is filled in between the first substrate and the second substrate. The electrode layer containing thin film transistors includes plural gate wirings and data wirings that are arranged in a network form; thin film transistors provided at the respective intersections between the gate wirings and the data wirings; a pixel electrode connected to the thin film transistors; and a common electrode that is provided to be separated apart from the pixel electrode such that the two electrodes are both provided side by side on the first substrate. It is preferable that the shortest separation distance d between the common electrode and the pixel electrode is shorter than the shortest separation distance G between the alignment layers.

Furthermore, according to the present specification, a liquid crystal display element under the conditions that the shortest separation distance d between a common electrode and a pixel electrode is longer than the shortest separation distance G between alignment layers, is referred to as a liquid crystal display element of the IPS mode, while an element under the conditions in which the shortest separation distance d between a common electrode and a pixel electrode that are close to each other is shorter than the shortest separation distance G between alignment layers, is referred to as FFS. Therefore, since the shortest separation distance d between a common electrode and a pixel electrode that are close to each other being shorter than the shortest separation distance G between alignment layers is the only condition for the FFS mode, there are no limitation on the relationship of the position in the thickness direction between the surface of the common electrode and the surface of the pixel electrode. Therefore, in a liquid crystal display element of the FFS mode related to the present invention, as illustrated in FIG. 3 to FIG. 7, a pixel electrode may be provided on the liquid crystal layer side rather than a common electrode, or a pixel electrode and a common electrode may be provided on the same plane.

When the liquid crystal composition related to the present invention is used particularly for a liquid crystal display element of the FFS driving mode (FFS-LCD), induced polarization of the liquid crystal layer can be reduced. Furthermore, it is preferable from the viewpoints of rapid response and reduction of image burn-in.

Figure 3:
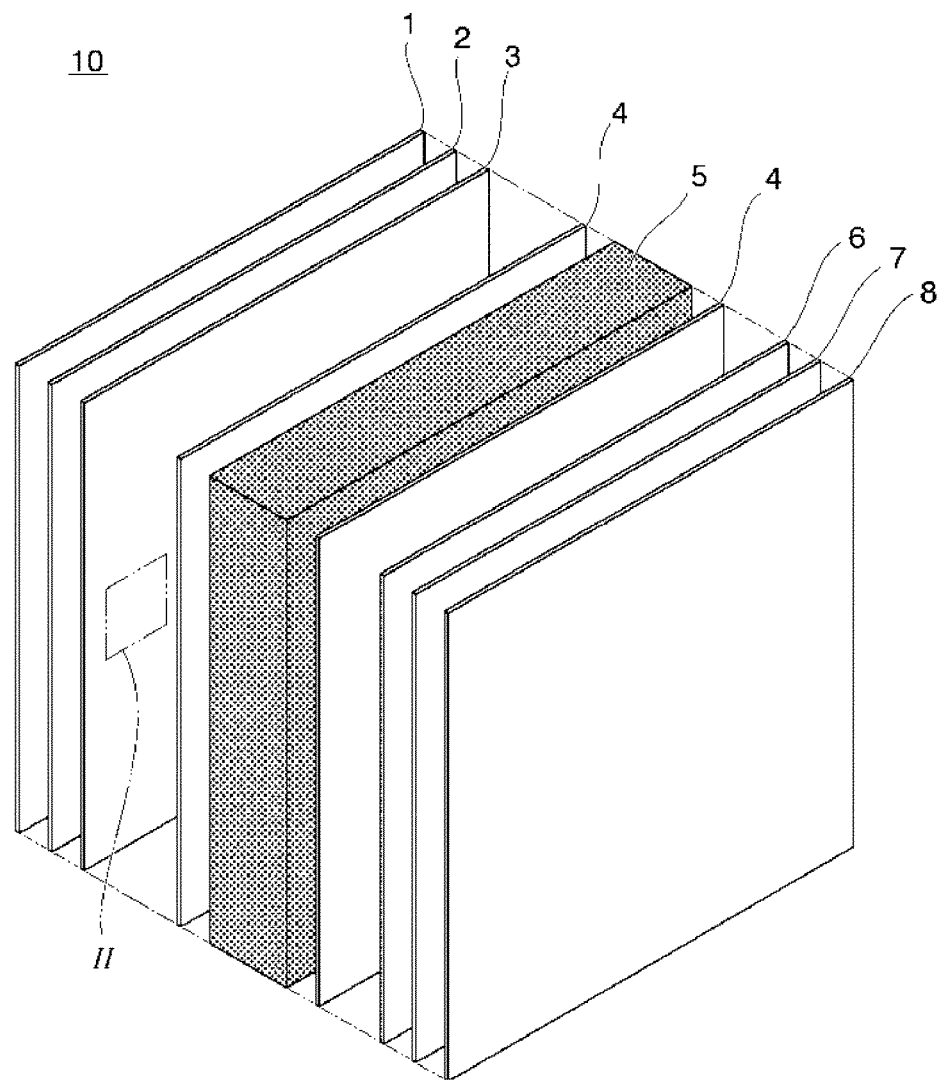
FIG. 3 is a diagram schematically illustrating the configuration of the liquid crystal display element according to another embodiment of the present invention.

An example of the more preferred embodiment of the second embodiment related to the present invention is described below using FIG. 3 to FIG. 7. FIG. 3 is an exploded perspective view diagram schematically illustrating the structure of one kind of a liquid crystal display element, and illustrates a so-called FFS mode liquid crystal display element. A liquid crystal display element 10 related to the present invention preferably has a configuration in which a second polarizing plate 8, a second substrate 7, an electrode layer containing thin film transistors (or also called thin film transistor layer) 3, an alignment film 4, a liquid crystal layer 5 containing a liquid crystal composition, an alignment film 4, a color filter 6, a first substrate 2, and a first polarizing plate 1 are laminated in sequence. Furthermore, as illustrated in FIG. 3, the second substrate 7 and the first substrate 2 may be sandwiched by a pair of polarizing plates 1 and 8. Furthermore, in FIG. 3, a color filter 6 is provided between the second substrate 7 and the alignment layer 4. Furthermore, a pair of alignment films 4 may be formed on the (transparent) electrode (layer) 3 such that the alignment layers 4 are close to the liquid crystal layer 5 related to the present invention and are in direct contact with the liquid crystal composition that constitutes the relevant liquid crystal layer 5.

Another suitable embodiment of the liquid crystal, display element 10 related to the present invention may be a so-called color filter on array (COA), and a color filter 6 may be provided between the thin film transistor layer 3 and the liquid crystal layer 5, or a color filter 6 may be provided between the relevant thin film transistor layer 3 and the first substrate 2.

A liquid crystal display element of the FFS mode utilizes a fringe electric field, and if the shortest separation distance d between a common electrode and a pixel electrode that are close to each other is shorter than the shortest separation distance C between alignment layers, a fringe electric field is formed between the common electrode and the pixel electrode, so that the alignment in the horizontal direction and the vertical direction of liquid crystal molecules can be efficiently utilized. That is, in the case of a liquid crystal display element of the FFS mode, an electric filed in the horizontal direction and a parabolic electric field that are formed in a direction perpendicular to the lines that form the comb teeth shape of the pixel electrode 21, can be utilized.

Figure 4:
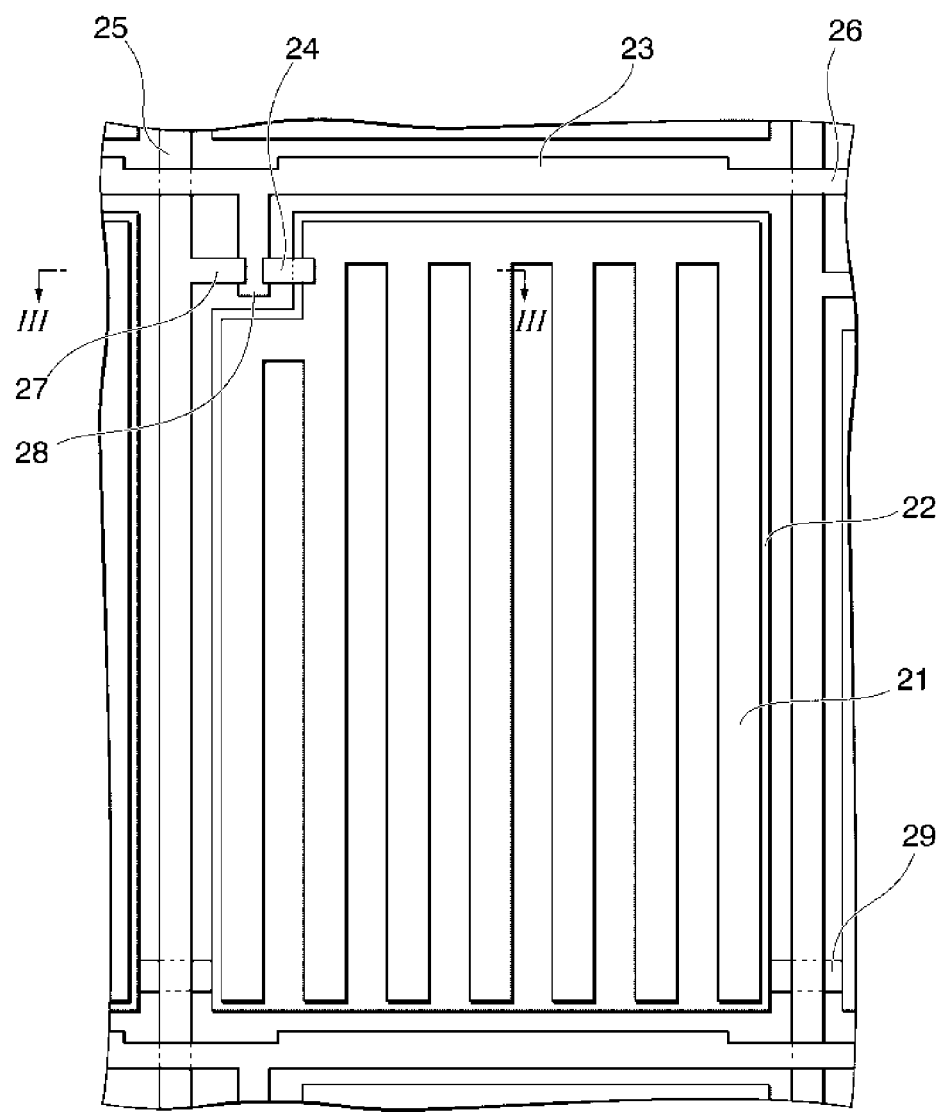
FIG. 4 is a plan view diagram illustrating a magnified view of a region surrounded by line II in the electrode layer 3 formed on the substrate 2 in FIG. 3.

FIG. 4 is a plan view diagram illustrating a magnified view of the region of II of the electrode layer 3 containing thin film transistors (or also called a thin film transistor layer 3), which is formed on the substrate in FIG. 3. In the vicinity of the intersections at which gate wirings 26 and data wirings 25 intersect each other, thin film transistors 20 each including a source electrode 27, a drain electrode 24 and a gate electrode 28, are provided to be connected to the pixel electrode 21 as switch elements that supply display signals to the pixel electrode 21. The relevant FIG. 4 illustrates, as an example, a configuration in which a flat plate-shaped common electrode 22 is formed on one surface, with an insulating layer (not illustrated in the diagram) being interposed therebetween, on the back surface of the comb teeth-shaped pixel electrode 21. Furthermore, the front surface of the pixel electrode 21 may be coated with a protective insulating film and an alignment film layer. Meanwhile, in the regions surrounded by the plural gate wirings 26 and the plural data wirings 25, there may be provided stray di capacitors 23 that store the display signals supplied through the data wirings 25. Furthermore, a common line 29 is provided in parallel to the gate wirings 26. This common line 29 is connected to the common electrode 22 in order to supply common signals to the common electrode 22.

Figure 5:
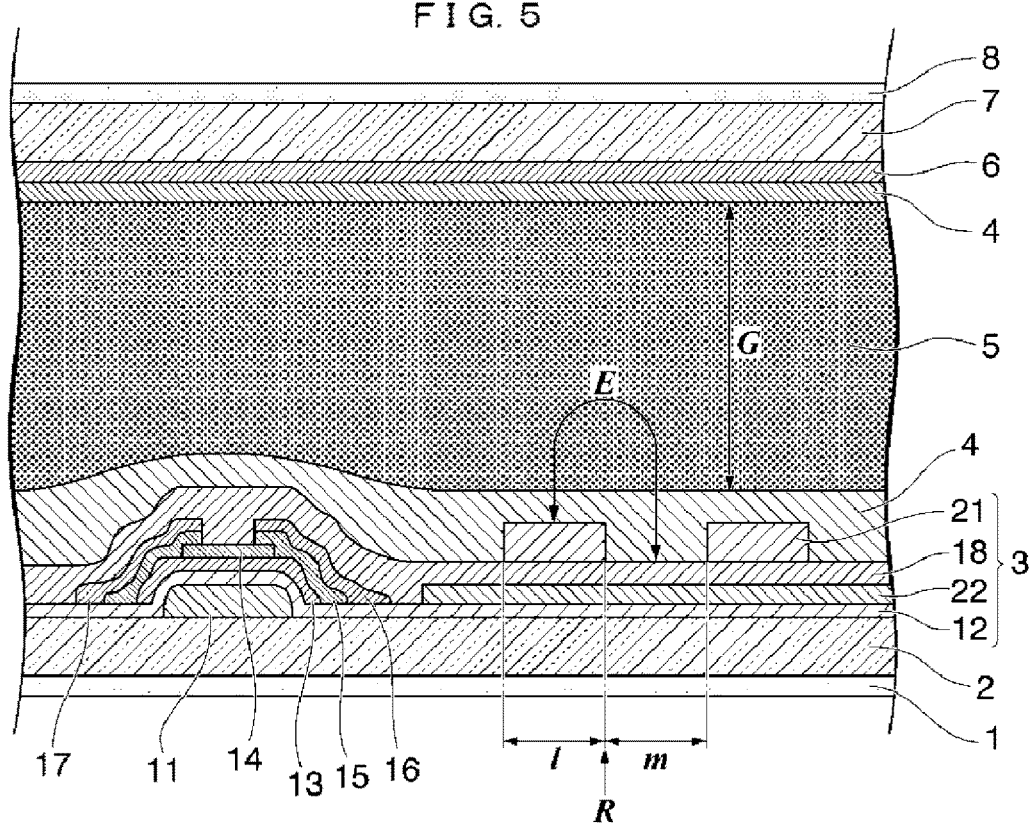
FIG. 5 is a cross-sectional view diagram illustrating the liquid crystal display element illustrated in FIG. 1, which is cut in the direction of line III-III in FIG. 3.

FIG. 5 is an example of a cross-sectional view diagram obtained by cutting a liquid crystal display element in the direction of line III-III illustrated in FIG. 4. A first substrate 2 having an alignment layer 4 and an electrode layer 3 containing thin film transistors 20 (11, 12, 13, 14, 15, 16, and 17) formed on the surface, and a second substrate 7 having an alignment layer 4 formed on the surface are separated apart at a predetermined interval G such that the alignment layers face each other, and this space formed therebetween is filled with a liquid crystal layer 5 including a liquid crystal composition. A gate insulating film 12 is formed on a portion of the surface of the first substrate 2, and a common electrode 22 is formed on a portion of the surface of the relevant gate insulating film 12. An insulating film 18 is formed so as to cover the common electrode 22 and the thin film transistors 20. Furthermore, a pixel electrode 21 is provided on the insulating film 18, and the relevant pixel electrode 21 is in contact with the liquid crystal layer 5, with an alignment layer 4 being interposed therebetween. Therefore, the shortest separation distance d between the pixel electrode and the common electrode can be adjusted as the (average) film thickness of the gate insulating film 12. In other words, in the embodiment of FIG. 5, the distance between the pixel electrode and the common electrode in a direction horizontal to the substrate becomes zero (0). It is preferable that the electrode width: I of the comb teeth-shaped parts of the pixel electrode 21, and the width of the gaps: m of the comb teeth-shaped parts of the pixel electrode 21, are formed at a width to the extent that all of the liquid crystal molecules within the liquid crystal layer 5 can be driven by an electric field generated.

As illustrated in FIG. 3 to FIG. 7, in the case of a FFS mode liquid crystal display element under the conditions in which the shortest separation distance d between a common electrode and a pixel electrode that are close to each other, is shorter than the shortest separation distance G between alignment layers, when a voltage is applied to the liquid crystal molecules disposed such that the major axis direction is parallel to the direction of orientation of the alignment layer, equipotential lines of a parabolic electric field between the pixel electrode 21 and the common electrode 22 are formed to the upper part of the pixel electrode 21 and the common electrode 22, and the liquid crystal molecules within the liquid crystal layer 5 rotate within the liquid crystal layer 5 along the electric field thus formed, and provide the effect as a switching element. More specifically, for example, when an alignment film which induces homogeneous alignment for a liquid crystal composition is used in the alignment layer, before a voltage is applied between the common electrode and the pixel electrode, the liquid crystal molecules that are arranged in the planar direction, which is the direction of orientation of the alignment film, block light. When a voltage is applied, an electric field of the surface direction component caused by the fact that the common electrode and the pixel electrode are provided to be separated apart on the same substrate (or electrode layer), and an electric field (fringe electric field) of the vertical direction component originating from the periphery of these electrodes, which is caused by the fact that the shortest separation distance d between the common electrode and the pixel electrode that are close to each other is shorter than the shortest separation distance G between the alignment layers, are generated. Therefore, even liquid crystal molecules having low dielectric constant anisotropy can be driven.

Accordingly, the amount of a compound having a dielectric constant anisotropy ($\Delta\varepsilon$) with high characteristics of the liquid crystal composition itself can be reduced as much as possible, and therefore, a low-viscosity compound can be incorporated in a large amount into the liquid crystal composition itself.

Furthermore, even in regard to the problem related to low temperature stability, such as the precipitation of liquid crystal compounds occurring in a case in which a large amount of a low-viscosity compound is included as in the case of the liquid crystal composition related to the present invention, such a problem can be solved by employing a combination of compounds of General Formula (i) and General Formula (M-1), and more preferably a combination of compounds of General Formula (i), General Formula (M-1) and General Formula (L). Therefore, when the liquid crystal composition related to the present invention is applied to a FFS, the characteristics can be manifested at the maximum level.

Since the liquid crystal molecules having relatively low dielectric constant anisotropy, with a $\Delta\varepsilon$ of 5 or less, of the liquid crystal composition related to the present invention are used, the major axis directions of the liquid crystal molecules are arranged along the direction of the electric field generated. However, from the viewpoint that low-voltage driving is enabled because the interelectrode distance is short compared to the IPS mode, even liquid crystal molecules having relatively low dielectric constant anisotropy with a $\Delta\varepsilon$ of 5 or less can also be driven. Therefore, superior characteristics can be obtained compared to liquid crystal display elements having a driving mode other than the FPS mode in which liquid crystal molecules having high dielectric constant anisotropy are used.

The configuration (FFS) of another more preferred form of the second embodiment for the liquid crystal display composition related to the present invention, is a liquid crystal display element in which a first substrate having a first alignment layer and an electrode layer containing thin film transistors on the surface, and a second substrate having a second alignment layer on the surface are arranged to be separated apart such that the alignment layers face each other, and a liquid crystal layer including a liquid crystal composition is filled in between the first substrate and the second substrate. The electrode layer containing thin film transistors includes a common electrode; plural gate wirings and data wirings that are arranged in a network form; thin film transistors provided at the respective intersections between the gate wirings and the data wirings; and a pixel electrode connected to the thin film transistors, and it is preferable that the pixel electrode is provided to protrude further toward the second substrate side than the common electrode. Furthermore, it is preferable that the first alignment layer and the second alignment layer provided to be close to the liquid crystal layer are alignment films that induce homogeneous alignment for a liquid crystal composition.

Figure 6:
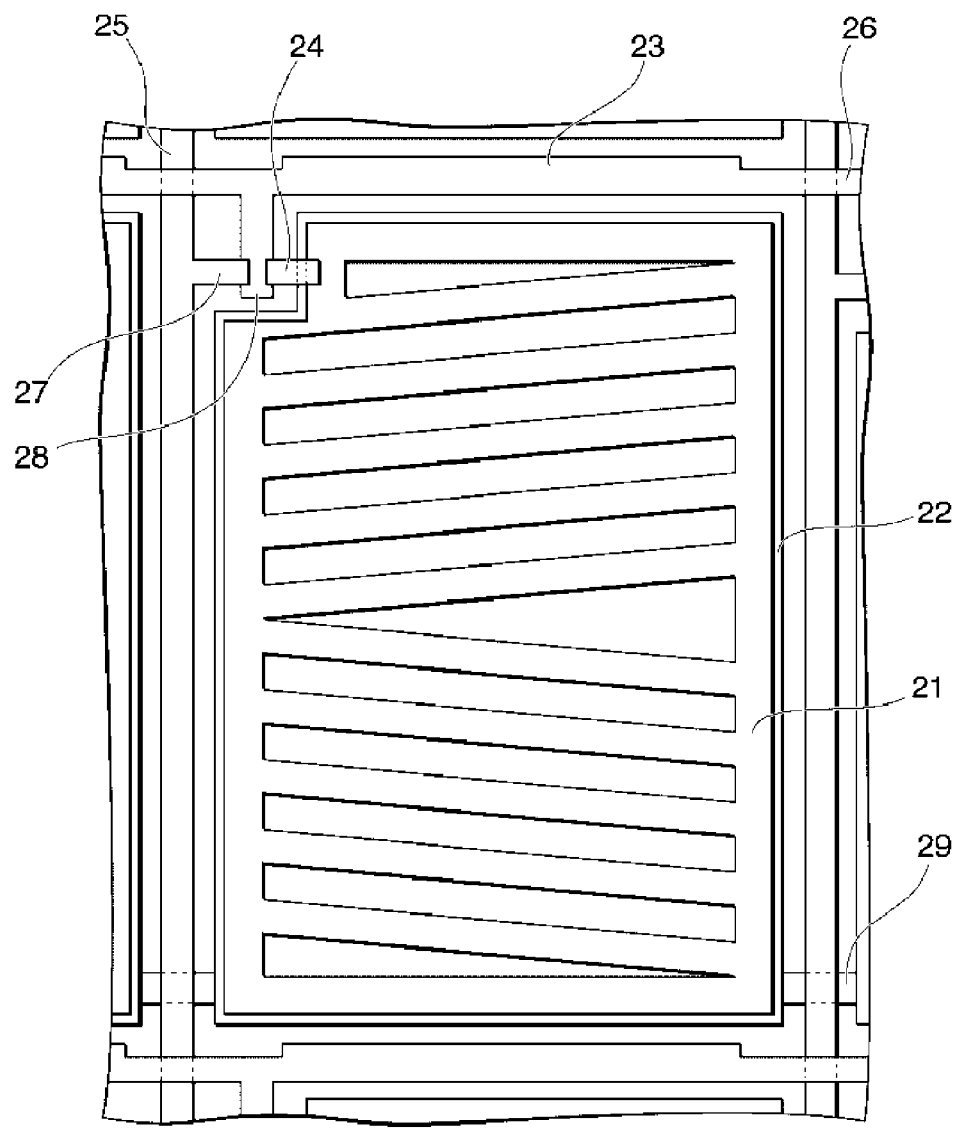
FIG. 6 is a plan view diagram illustrating a magnified view of another embodiment of a region surrounded by line II in the electrode layer 3 formed on the substrate 2 in FIG. 1.

FIG. 6 is another form of a plan view diagram illustrating a magnified view of the region of II of the electrode layer 3 containing thin film transistors (or also called thin film transistor layer 3), which is formed on the substrate in FIG. 3. In the vicinity of the intersections at which gate wirings 26 and data wirings 25 intersect each other, thin film transistors 20 each including a source electrode 27, a drain electrode 24 and a gate electrode 28, are provided to be connected to the pixel electrode 21 as switch elements that supply display signals to the pixel electrode 21. Furthermore, the pixel electrode 21 may have a structure in which at least one notch part has been cut out, and FIG. 6 illustrates an example thereof. The pixel electrode 21 has a shape in which triangular-shaped notch parts have been cut out from the center and the two ends of a rectangular flat plate, and eight rectangular-shaped notch parts have been cut out from the remaining region, while the common electrode 22 is a comb teeth-shaped body (not illustrated in the diagram). Furthermore, the surface of the pixel electrode may be coated with a protective insulating film and an alignment film layer. Meanwhile, in the regions surrounded by the plural gate wirings 25 and the plural data wirings 24, there may be provided stray di capacitors 23 that store the display signals supplied through the data wirings 24. Meanwhile, there are no particular limitations on the shape, number and the like of the notch parts.

Figure 7:
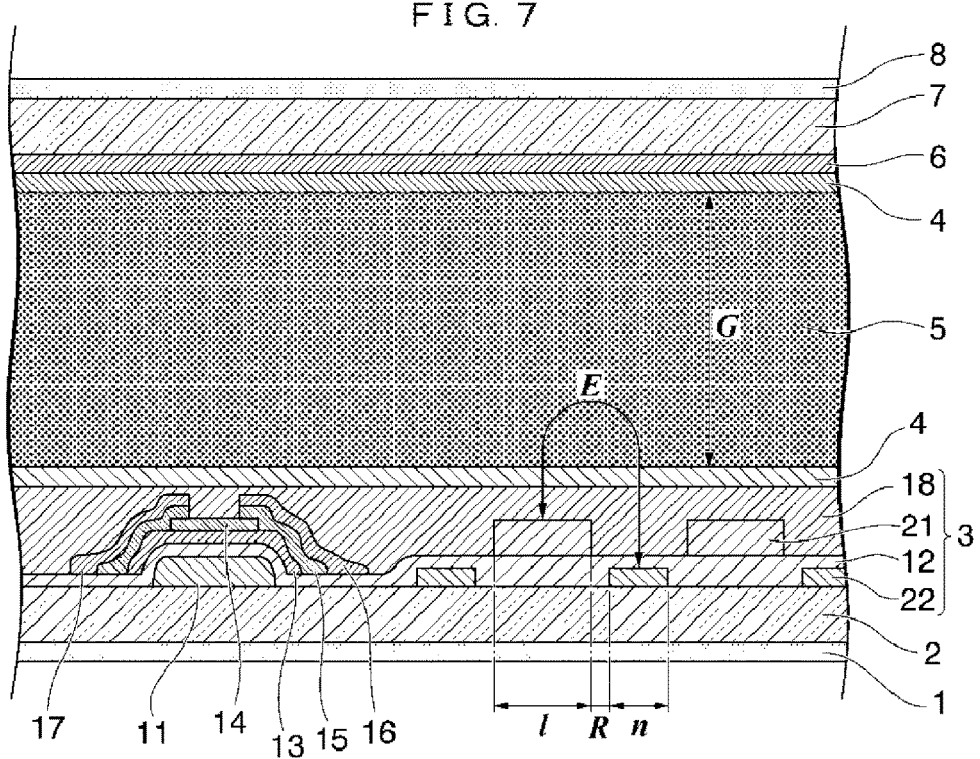
FIG. 7 is a cross-sectional view diagram illustrating another embodiment of the liquid crystal display element illustrated in FIG. 1, which is cut in the direction of line III-III in FIG. 2.

FIG. 7 is an example of another form of a cross-sectional view diagram obtained by cutting the liquid crystal display element illustrated in FIG. 6, at a position in the direction III-III similarly to FIG. 4. That is, the difference between this and the structure of the liquid crystal display element of FIG. 5 is that in the liquid crystal display element illustrated in FIG. 5, the common electrode is a flat plate body, while the pixel electrode is a comb teeth-shaped body. On the other hand, as described above, in the liquid crystal display element illustrated in FIG. 7, the pixel electrode 21 has a shape in which triangular-shaped notch parts have been cut out from the center and the two ends of a rectangular flat plate, and eight rectangular-shaped notch parts have been cut out from the remaining region, while the common electrode has a structure of a comb teeth-shaped body. Accordingly, the minimum separation distance d between the pixel electrode and the common electrode is equal to or larger than the (average) film thickness of the gate insulating film 12, and is less than the separation distance of alignment layers G. Also, in FIG. 7, the common electrode has a structure of a comb teeth-shaped body; however, the common electrode may also be produced into a flat plate body in this embodiment. Furthermore, in any case, it is acceptable for the liquid crystal display element of the FFS mode related to the present invention, as long as the requirement that the shortest separation distance d between a common electrode and a pixel electrode that are close to each other is shorter than the shortest separation distance G between alignment layers is satisfied. Furthermore, in the configuration of the liquid crystal display element illustrated in FIG. 7, the pixel electrode 21 is covered by a protective film 18; however, in the configuration of the liquid crystal display element illustrated in FIG. 5, the pixel electrode 21 is covered by an alignment layer 4. According to the present invention, the pixel electrode may be covered by any of a protective film or an alignment layer.

Furthermore, in FIG. 7, a polarizing plate is formed on one surface of a first substrate 2, a gate insulating film 12 is formed so as to cover a comb-shaped common electrode 22 formed on a portion of the other surface, a pixel electrode 21 is formed on a portion of the surface of the gate insulating film 12, and an insulating film 18 is formed so as to cover the pixel electrode 21 and thin film transistors 20. Furthermore, an alignment layer 4, a liquid crystal layer 5, an alignment layer 4, a color filter 6, a second substrate 7, and a polarizing plate 8 are laminated on the insulating film 18. Accordingly, the minimum separation distance d between the pixel electrode and the common electrode can be adjusted by means of the positions of the two electrodes, the electrode width: I of the comb teeth-shaped parts of the pixel electrode 21, or the gap width: m of the comb teeth-shaped parts of the pixel electrode 21.

As illustrated in FIG. 7, when the pixel electrode protrudes further toward the second substrate side than the common electrode, and both the electrodes are provided in parallel on the first substrate, an electric field of the surface direction component is formed between the common electrode and the pixel electrode. Also, since the heights in the thickness direction of the surface of the pixel electrode and the surface of the common electrode are different, an electric field (E) of the thickness direction component can also be simultaneously applied.

Meanwhile, since a liquid crystal display element of the FFS mode utilizes a fringe electric field, and there are no particular limitations as long as the requirement that the shortest separation distance d between a common electrode and a pixel electrode that are close to each other is shorter than the shortest separation distance G between alignment layers is satisfied, the liquid crystal display element may be configured such that, for example, plural teeth of a comb teeth-shaped pixel electrode and plural teeth of a comb teeth-shaped common electrode are provided on the substrate in a state of being interlocked while being separated apart. In this case, when the separation distance between the teeth of the common electrode and the teeth of the pixel electrode is made shorter than the shortest separation distance G between alignment layers, a fringe electric field can be utilized.

In a case in which the composition of the present invention and a liquid crystal composition are used in a liquid crystal display element of the FFS mode, from the viewpoint that the AA of the liquid crystal composition used is low, effects of rapid response and reduction of image burn-in can be provided.

EXAMPLES

Hereinafter, the present invention will be described in more detail by way of Examples; however, the present invention is not intended to be limited to these Examples. Also, the unit "percent (%)" concerning the compositions of the following Examples and Comparative Examples means "percent (%) by mass".

Characteristics measured in the Examples are as follows.
Tni: nematic phase-isotropic liquid phase transition temperature (° C.)
Δn: refractive index anisotropy at 295 K (also known as: birefringence)
Δε: dielectric constant anisotropy at 295 K
η: viscosity (mPa·s) at 295 K
γ1: rotational viscosity (mPa·s) at 295 K
VHR: voltage holding ratio (%) at 313 K under the conditions of a frequency of 60 Hz and an applied voltage of 5 V
Image Burn-in:
An evaluation of image burn-in of a liquid crystal display element was carried out by an evaluation based on the following four-grade criteria, by displaying a predetermined fixed pattern within a display area for 1440 hours, and then visually inspecting the level of afterimage of the fixed pattern when a full-screen uniform display was implemented.
⊚: No afterimage
○: Very little afterimage exists to an acceptable level
Δ: Afterimage exists to an unacceptable level
X: Afterimage exists to a considerably poor level
Volatility/Production Apparatus Contaminability:
An evaluation of volatility of a liquid crystal material was carried out by observing the operation state of a vacuum stirring degassing mixer while illuminating the mixer with a stroboscope, and observing the foaming of the liquid crystal material, by visual inspection. Specifically, 0.8 kg of a liquid crystal composition was introduced into a vessel for exclusive use in a vacuum stirring degassing mixer having a capacity of 2.0 L, and under degassing at 4 kPa, a vacuum stirring degassing mixer was operated at a revolution velocity of 1.5 $S^{-1}$ and a rotation velocity of 7.5 $S^{-1}$. The evaluation was carried out according to the following four-grade criteria, based on the time taken until foaming was initiated.

⊙: 3 or more minutes taken until foaming. The possibility of apparatus contamination caused by volatilization is low.

○: 1 or more minutes and less than 3 minutes taken until foaming. There is a slight risk of apparatus contamination caused by volatilization.

Δ: 30 seconds or more and less than 1 minute taken until foaming. Apparatus contamination caused by volatilization occurred.

X: Less than 30 seconds taken until foaming. There is a serious risk of apparatus contamination caused by volatilization.

Process Suitability:

In regard to process suitability, in an ODF process, dropping of a liquid crystal in an amount of 40 pL each time using a constant volume metering pump was performed 100,000 times, and the changes in the amount of liquid crystal dropped after 200 times each, such as "0 to 200 times, 201 to 400 times, 401 to 600 times, . . . and 99801 to 100,000 times", were evaluated according to the following four-stage criteria.

⊙: The changes are very small (a liquid crystal display element can be produced stably)

○: There are slight changes to an acceptable level

Δ: There are changes to an unacceptable level (product yield is deteriorated due to the generation of spots)

X: There are changes to a considerably poor level (liquid crystal leakage or vacuum foaming occurs)

Solubility at Low Temperature:

An evaluation of solubility at low temperature was carried out according to the following four-grade criteria, by preparing a liquid crystal composition, subsequently weighing 0.5 g of the liquid crystal composition in a 1-mL sample jar, continuously applying temperature changes to this liquid crystal composition in a temperature control type testing chamber according to the following cycle: "−20° C. (held for 1 hour)→temperature increase (0.2° C./min)→0° C. (held for 1 hour)→temperature increase (0.2° C./min)→20'C (held for 1 hour)→temperature decrease (−0.2° C./min)→0° C. (held for 1 hour)→temperature decrease (−0.2° C./min)→−20° C.", and observing the generation of precipitates from the liquid crystal composition by visual inspection.

⊙: Precipitates were not observed for 600 hours or longer.

○: Precipitates were not observed for 300 hours or longer.

Δ: Precipitates were observed within 150 hours.

X: Precipitates were observed within 75 hours.

The following abbreviations are used for the description of compounds in the Examples.

(Side Chain Structures and Linking Structures)

Furthermore, the following abbreviations are used for the description of compounds in the Examples.

(Side Chains)

-n: —$C_nH_{2n+1}$ linear alkyl group having n carbon atoms

—On: —$OC_nH_{2n+1}$ linear alkoxy group having n carbon atoms

—V (or VO): —C=$CH_2$ vinyl group

—Vn: —C=C—$C_nH_{2n+1}$ 1-alkene having (n+1) carbon atoms

—F: —F fluorine atom

F—: —F fluorine atom n-: $C_nH_{2n+1}$— linear alkyl group having n carbon atoms nO—: $C_nH_{2n+1}O$— linear alkoxy group having n carbon atoms

V—: CH=CH—

—V1: —CH=CH—$CH_3$

1V—: $CH_3$—CH=CH—

-2V: —$CH_2$—$CH_2$—CH=$CH_3$

V2-: $CH_3$=CH—CH—$CH_2$—

-2V1: —$CH_2$—$CH_2$—CH=CH—$CH_3$

1V2-: $CH_3$—CH=CH—$CH_2$—$CH_2$

—COO—: —COO— (ester group)

—CF2O—: —$CF_2O$— group (Cyclic Structure)

[Chemical Formula 374]

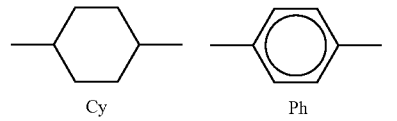

Cy    Ph

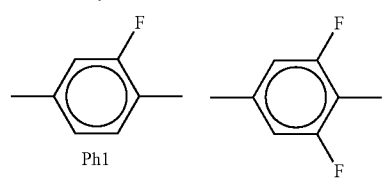

Ph1    Ph3

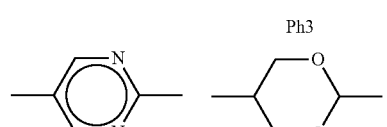

Ma    Oc

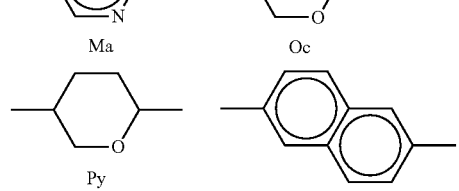

Py    Np

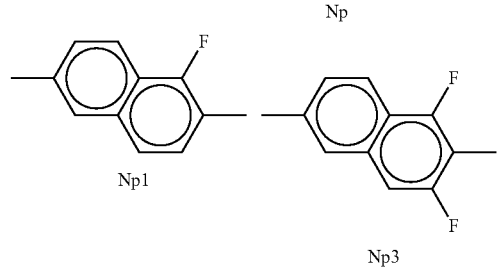

Np1    Np3

Example

TABLE 1

|  | Example 1 | Example 2 | Example 3 | Example 4 | Example 5 | Example 6 |
|---|---|---|---|---|---|---|
| $T_{NI}$/° C. | 87.2 | 85.1 | 79.1 | 79.4 | 77.6 | 79.2 |
| T→N | −24 | −26 | −22 | −37 | −28 | −20 |
| Δn | 0.1090 | 0.1107 | 0.1322 | 0.1049 | 0.1402 | 0.1165 |
| no | 1.4860 | 1.4857 | 1.4921 | 1.4865 | 1.4964 | 1.4865 |
| Δε | 2.82 | 4.40 | 3.90 | 1.90 | 4.90 | 4.30 |
| ε⊥ | 2.67 | 2.76 | 2.70 | 2.45 | 2.93 | 2.72 |
| γ1/mPa·s | 44 | 46 | 48 | 36 | 58 | 45 |
| η/mPa·s | 10.0 | 10.4 | 12.4 | 8.6 | 15.1 | 10.0 |
| 3-Cy-Cy-V0 | 46 | 45 | 42 | 46 | 36 | 45 |
| 3-Cy-Cy-V1 | 12 | 12 | 6 | 12 |  | 12 |
| 3-Cy-Ph-O1 |  |  |  | 6 |  |  |
| 3-Cy-Cy-Ph-1 | 6 |  |  |  |  |  |
| 3-Cy-Cy-Ph-3 | 4 |  |  |  |  |  |
| V-Cy-Cy-Ph-1 |  | 4 |  | 4 |  | 4 |
| V2-Cy-Cy-Ph-1 |  | 3 |  | 4 | 6 |  |
| 5-Ph-Ph-1 |  |  |  |  | 6 | 3 |
| 1V2-Ph-Ph-1 |  |  | 8 |  | 8 |  |
| V-Cy-Ph-Ph-3 |  |  | 6 |  |  |  |
| 1-Ph-Ph1-Ph-2V | 8 | 6 | 6 | 8 | 6 | 6 |
| 2-Ph-Ph1-Ph-2V | 6 | 6 | 10 | 6 | 10 | 6 |
| 3-Ph-Ph1-Ph-2V | 6 | 6 | 6 | 6 | 6 | 6 |
| 3-Ph-CFFO-Ph3-3F |  |  |  |  |  |  |
| 3-Py-Cy-CFFO-Ph3-F |  |  |  |  |  |  |
| 3-Py-Ph-Ph3-CFFO-Ph3-F | 12 | 12 | 8 | 8 | 12 | 10 |
| 2-Py-Ph-Ph3-CFFO-Ph3-F |  | 6 | 8 |  | 10 |  |
| 3-Ph-Ph1-Ph3-CFFO-Ph3-3F |  |  |  |  |  | 3 |
| 4-Ph-Ph1-Ph3-CFFO-Ph3-4F |  |  |  |  |  | 5 |
| 3-Cy-Ph-Ph3-CFFO-Ph3-F |  |  |  |  |  |  |
| 3-Ph-Ph-Ph1-Ph3-F |  |  |  |  |  |  |

An evaluation of solubility at low temperature was carried Out using the method described above for the liquid crystal compositions of Examples 1 to 6, and precipitation was not observed for 300 hours or longer in Example 3 and Example 5, while precipitation was not observed for 600 hours or longer in Example 1, Example 2, Example 4, and Example 6.

TABLE 2

|  | Example 7 | Example 8 | Example 9 | Example 10 | Example 11 | Example 12 |
|---|---|---|---|---|---|---|
| $T_{NI}$/° C. | 81.6 | 78.6 | 82.8 | 81.5 | 81.5 | 78.8 |
| T→N | −26 | −24 | −30 | −24 | −33 | −24 |
| Δn | 0.1177 | 0.0961 | 0.0957 | 0.1187 | 0.1197 | 0.134 |
| no | 1.4873 | 1.4860 | 1.4859 | 1.4890 | 1.4894 | 1.499 |
| Δε | 4.80 | 2.69 | 1.50 | 2.60 | 2.98 | 1.50 |
| ε⊥ | 2.85 | 2.59 | 2.35 | 2.54 | 2.67 | 2.40 |
| γ₁/mPa·s | 55 | 36 | 35 | 39 | 41 | 40 |
| η/mPa·s | 11.4 | 8.9 | 8.8 | 11.3 | 10.9 | 12.6 |
| 3-Cy-Cy-V0 | 42 | 44 | 45 | 42 | 43 | 35 |
| 3-Cy-Cy-V1 | 10 | 13 | 10 | 6 | 7 | 5 |
| 3-Cy-Ph-O1 |  |  | 9 |  |  | 4 |
| 3-Cy-Cy-Ph-1 |  |  | 6 |  |  |  |
| 3-Cy-Cy-Ph-3 |  |  |  |  |  |  |
| V-Cy-Cy-Ph-1 | 4 | 8 | 4 | 8 | 7 | 4 |
| V2-Cy-Cy-Ph-1 | 5 | 8 | 4 |  | 2 |  |
| 5-Ph-Ph-1 |  |  |  |  |  | 10 |
| 1V2-Ph-Ph-1 |  | 7.5 |  | 8 | 6 |  |
| V-Cy-Ph-Ph-3 |  |  | 4 | 6 | 4 |  |
| 1-Ph-Ph1-Ph-2V | 6 |  | 4 | 4 | 5 | 8 |
| 2-Ph-Ph1-Ph-2V | 6 | 7 | 4 | 8 | 8 | 10 |
| 3-Ph-Ph1-Ph-2V | 6 |  | 4 | 4 | 4 | 6 |
| 3-Ph-CFFO-Ph3-3F | 6 |  |  |  | 2 |  |
| 3-Py-Cy-CFFO-Ph3-F |  |  |  | 6 | 4 |  |
| 3-Py-Ph-Ph3-CFFO-Ph3-F | 10 | 12 | 6 | 8 | 6 | 2 |
| 2-Py-Ph-Ph3-CFFO-Ph3-F |  |  |  |  |  |  |
| 3-Ph-Ph1-Ph3-CFFO-Ph3-3F |  |  |  |  |  |  |
| 4-Ph-Ph1-Ph3-CFFO-Ph3-4F | 5 |  |  |  | 2 |  |
| 3-Cy-Ph-Ph3-CFFO-Ph3-F |  |  |  |  |  | 6 |
| 3-Ph-Ph-Ph1-Ph3-F |  | 0.5 |  |  |  |  |

An evaluation of solubility at low temperature was carried Out using the method described above for the liquid crystal compositions of Examples 7 to 12, and precipitation was not observed for 300 hours or longer in Example 10 and Example 12, while precipitation was not observed for 600 hours or longer in Example 7, Example 8, Example 9, and Example 11.

Comparative Examples

TABLE 3

|  | Comparative Example 1 | Comparative Example 2 |
|---|---|---|
| TN1/° C. | 75.0 | 82.0 |
| T→N |  |  |
| Δn (20° C.) | 0.1085 | 0.1000 |
| no | — | — |
| Δε (20° C.) | 4.4 | 5.7 |
| ε⊥ |  |  |
| $\gamma_1$/mPa·s (20° C.) | 59 | 66 |
| η/mPa·s |  |  |
| 3-Cy-Cy-V1 | 13 | 13 |
| 4-Cy-Cy-V | 16 | 18 |
| V-Cy-Cy-Ph-1 | 16 | 13 |
| V2-Cy-Cy-Ph-1 |  | 5 |
| 3-Cy-Ph—O1 | 12 | 7 |
| 2-Ph—Ph1—Ph-3 | 5 |  |
| 2-Ph—Ph1—Ph—2V | 5 | 8 |
| V-Cy-Cy-Ph1—F | 8 |  |
| 3-Cy-Cy-COO—Ph3—F (tricyclic ester) |  | 12 |
| 2-Cy-Cy-Ph—OCF3 | 4 | 3.5 |
| 3-Cy-Cy-Ph—OCF3 | 4 | 4.5 |
| 2-Ph—Ph1—Ph3—F | 2 |  |
| 3-Ph—Ph1—Ph3—F | 4 |  |
| 2-Ph—Ph3—CF2O—F | 5 | 8 |
| 3-Ph—Ph3—CF2O—F | 6 | 8 |

An evaluation of solubility at low temperature was carried out using the method described above for the liquid crystal compositions of Comparative Example 1 and Comparative Example 2, and precipitates were observed within 150 hours in both the compositions.

REFERENCE SIGNS LIST

100: FIRST SUBSTRATE;
102: TFT LAYER
103: PIXEL ELECTRODE
104: PASSIVATION FILM
105: FIRST ALIGNMENT FILM
200: SECOND SUBSTRATE
201: FLATTENING FILM (OVERCOAT LAYER)
202: BLACK MATRIX
203: COLOR FILTER
204: TRANSPARENT ELECTRODE
205: SECOND ALIGNMENT FILM
301: SEALING MATERIAL
302: PROTRUSION (PILLAR-SHAPED SPACER)
303: LIQUID CRYSTAL LAYER
304: PROTRUSION (PILLAR-SHAPED SPACER.)
401: MASK PATTERN
402: RESIN LAYER
L: LIGHT
1, 8: POLARIZING PLATE
2: FIRST SUBSTRATE
3: ELECTRODE LAYER
4: ALIGNMENT LAYER
5: LIQUID CRYSTAL LAYER
6: COLOR FILTER
6G: COLOR FILTER GREEN
6R: COLOR FILTER RED
7: SECOND SUBSTRATE
11: GATE ELECTRODE
12: GATE INSULATING FILM
13: SEMICONDUCTOR LAYER
14: INSULATING LAYER
15: OHMIC CONTACT LAYER
16: DRAIN ELECTRODE
17: SOURCE ELECTRODE
18: INSULATING PROTECTIVE LAYER
21: PIXEL ELECTRODE
22: COMMON ELECTRODE
23: STRAY DI CAPACITOR
24: DRAIN ELECTRODE
25: DATA WIRING
27: SOURCE WIRING
29: COMMON LINE
30: BUFFER LAYER

The invention claimed is:

1. A liquid crystal composition comprising compounds, wherein the compounds comprising:
   1 to 35% by mass of at least one or more compounds represented by General Formula (i):

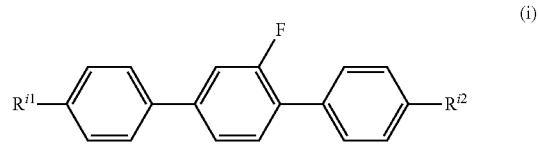

(i)

wherein in General Formula (i), $R^{i1}$ and $R^{i2}$ each independently represent an alkyl group having 1 to 10 carbon atoms, an alkenyl group having 2 to 10 carbon atoms, or an alkoxy group having 1 to 10 carbon atoms; and at least any one of $R^{i1}$ or $R^{i2}$ is an alkenyl group, and 5 to 30% by mass of at least one or more compounds represented by General Formula (M-1):

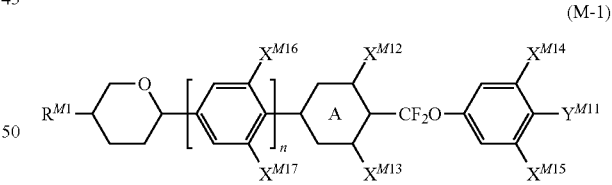

(M-1)

wherein in General Formula (M-1), $X^{M12}$, $X^{M13}$, $X^{M14}$, $X^{M15}$, $X^{M16}$, and $X^{M17}$ each independently represent a hydrogen atom or a fluorine atom;

rings A each independently represent a group selected from the group consisting of:

(a) a 1,4-cyclohexylene group in which one —CH$_2$— moiety or at least two non-adjacent —CH$_2$— moieties present in this group may be substituted by —O—, and (b) a 1,4-phenylene group in which one —CH= moiety or at least two non-adjacent —CH= moieties present in this group may be substituted by —N=, while the group (a) and the group (b) may be each independently substituted with a cyano group, a fluorine atom, or a chlorine atom;

$R^{M1}$ represents an alkyl group having 1 to 10 carbon atoms, an alkenyl group having 2 to 10 carbon atoms, or an alkoxy group having 1 to 10 carbon atoms;

$Y^{M11}$ represents an alkyl group having 1 to 10 carbon atoms, an alkenyl group having 2 to 10 carbon atoms, an alkoxy group having 1 to 10 carbon atoms, a hydrogen atom, a fluorine atom, a cyano group, —$CF_3$, or —$OCF_3$; and n represents an integer from 0 to 2, 30 to 90% by mass of at least one non-polar compound represented by General Formula (L) having a dielectric anisotropy of −1.0 to 1.0:

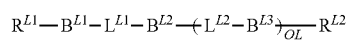 (L)

wherein in General Formula (L), $R^{L1}$ and $R^{L2}$ each independently represent an alkyl group having 1 to 8 carbon atoms, while one —$CH_2$— moiety or at least two non-adjacent —$CH_2$-moieties in the alkyl group may be each independently substituted by —CH=CH—, —O—, —CO—, —COO—, or —OCO—;

OL represents 0, 1, 2, or 3;

$B^{L1}$, $B^{L2}$, and $B^{L3}$ each independently represent a group selected from the group consisting of:
(a) a 1,4-cyclohexylene group in which one —$CH_2$— moiety or at least two non-adjacent —$CH_2$— moieties present in this group may be substituted by —O—, and
(b) a 1,4-phenylene group in which one —CH=moiety or at least two non-adjacent —CH=moieties present in this group may be substituted by —N=, while the group (a) and the group (b) may be each independently substituted with a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—; and in a case in which OL represents 2 or 3, and there are plural $L^{L2}$'s, they may be identical or different, while in a case in which OL represents 2 or 3, and there are plural $B^{L3}$'s, they may be identical or different, provided that compounds represented by General Formula (i) and General Formula (M-1) are excluded, wherein a dielectric constant anisotropy at 25° C. is from 0 to 5, wherein the liquid crystal composition has a nematic phase-isotropic liquid phase transition temperature ($T_{ni}$) of 60° C. to 100° C., wherein all ring structures of the compounds included in the liquid crystal composition are 6-membered, wherein the liquid crystal composition has a rotational viscosity measured at 295 K is from 35 mPa·s to 48 mPa·s.

2. The liquid crystal composition according to claim 1, further comprising at least one compound represented by General Formula (M):

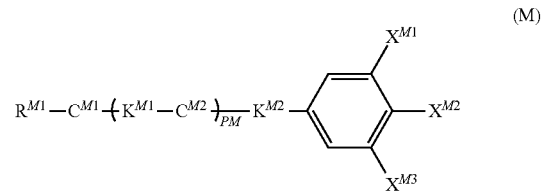 (M)

wherein in General Formula (M), $R^{M1}$ represents an alkyl group having 1 to 8 carbon atoms, while one —$CH_2$— moiety or at least two non-adjacent —$CH_2$— moieties in the alkyl group may be each independently substituted by —CH=CH—, —O—, —CO—, —COO—, or —OCO—;

PM represents 0, 1, 2, 3, or 4;

$C^{M1}$ and $C^{M2}$ each independently represent a group selected from the group consisting of:
(d) a 1,4-cyclohexylene group in which one —$CH_2$— moiety or at least two non-adjacent —$CH_2$— moieties present in this group may be substituted by —O— or —S—, and
(b) a 1,4-phenylene group in which one —CH=moiety or at least two non-adjacent —CH=moieties present in this group may be substituted by —N=, while the group (d) and the group (e) may be each independently substituted with a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

in a case in which PM represents 2, 3 or 4, and there are plural $K^{M1}$'s, they may be identical or different, while in a case in which PM represents 2, 3 or 4, and there are plural $C^{M2}$'s, they may be identical or different;

$X^{M1}$ and $X^{M3}$ each independently represent a hydrogen atom, a chlorine atom, or a fluorine atom; and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group, provided that compounds represented by General Formula (i), General Formula (M-1) and General Formula (L) are excluded.

3. A liquid crystal display element using the liquid crystal composition according to claim 1.

4. A liquid crystal display element for IPS mode, OCB mode, ECB mode, VA mode or FFS mode, using the liquid crystal composition according to claim 1.

5. A liquid crystal display device using the liquid crystal display element according to claim 3.

6. The liquid crystal composition according to claim 1, wherein the dielectric constant anisotropy at 25° C. is from +0.5 to +4.0.

7. The liquid crystal composition according to claim 1, wherein the liquid crystal composition has a nematic phase-isotropic liquid phase transition temperature ($T_{ni}$) of 70° C. to 100° C.

* * * * *